United States Patent
Way et al.

(10) Patent No.: US 11,356,549 B2
(45) Date of Patent: *Jun. 7, 2022

(54) SYSTEM AND METHOD FOR DISCOURAGING INAPPROPRIATE USE OF A MOBILE DEVICE

(71) Applicants: Brian Way, Villa Hills, KY (US); Geoff Cornwall, Loveland, OH (US); Greg Neiheisel, Covington, KY (US); David Pearce, Ft. Wright, KY (US)

(72) Inventors: Brian Way, Villa Hills, KY (US); Geoff Cornwall, Loveland, OH (US); Greg Neiheisel, Covington, KY (US); David Pearce, Ft. Wright, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,078

(22) Filed: Jan. 21, 2019

(65) Prior Publication Data
US 2019/0158654 A1    May 23, 2019

Related U.S. Application Data

(63) Continuation of application No. PCT/US2018/040764, filed on Jul. 3, 2018, and a
(Continued)

(51) Int. Cl.
*H04M 1/72463* (2021.01)
*H04W 4/50* (2018.01)
(Continued)

(52) U.S. Cl.
CPC ...... *H04M 1/72463* (2021.01); *H04L 43/045* (2013.01); *H04L 51/04* (2013.01);
(Continued)

(58) Field of Classification Search
CPC . H04M 1/72577; H04M 1/7253; H04W 4/50; H04W 52/0254; H04W 60/04;
(Continued)

(56) References Cited

U.S. PATENT DOCUMENTS 7,856,203 B2    12/2010    Lipovski et al.
8,503,991 B2    8/2013    Swift et al.
(Continued)

OTHER PUBLICATIONS

European Patent Office; Search Report in related International Patent Application No. PCT/US2018/040764 dated Sep. 20, 2018; 10 pages.
(Continued)

*Primary Examiner* — Santiago Garcia
(74) *Attorney, Agent, or Firm* — Wood Herron & Evans LLP

(57) ABSTRACT

A system and method for discouraging the in appropriate use of a mobile device including registering a mobile device with a monitoring application running on a system coupled with a network. A mobile device is linked with the monitoring application through the network. The operational status of the mobile device is monitored to detect if a change occurs in the operational status. A change in the operational status of the mobile device is reported to the monitoring program with time information and the status change is displayed in a graphical interface, and a notification message is sent to a system user. Beacons might also be implemented to advise a device user to disable a mobile device to be monitored.

18 Claims, 97 Drawing Sheets

Related U.S. Application Data continuation-in-part of application No. 15/481,953, filed on Apr. 7, 2017, now Pat. No. 10,187,513, which is a continuation of application No. 14/590,814, filed on Jan. 6, 2015, now Pat. No. 9,621,707.

(60) Provisional application No. 62/528,308, filed on Jul. 3, 2017, provisional application No. 62/075,003, filed on Nov. 4, 2014, provisional application No. 62/029,251, filed on Jul. 25, 2014, provisional application No. 61/924,526, filed on Jan. 7, 2014.

(51) Int. Cl.

| | | |
|---|---|---|
| *H04L 51/04* | (2022.01) | |
| *H04W 52/02* | (2009.01) | |
| *H04W 60/04* | (2009.01) | |
| *H04L 43/045* | (2022.01) | |
| *H04L 51/224* | (2022.01) | |
| *H04L 51/00* | (2022.01) | |
| *H04M 1/72412* | (2021.01) | |

(52) U.S. Cl.
CPC ............... *H04L 51/24* (2013.01); *H04W 4/50* (2018.02); *H04W 52/0254* (2013.01); *H04W 60/04* (2013.01); *H04L 51/12* (2013.01); *H04M 1/72412* (2021.01); *Y02D 30/70* (2020.08)

(58) Field of Classification Search
CPC ....... H04L 43/045; H04L 51/04; H04L 51/24; H04L 51/12; Y02D 70/142
See application file for complete search history.

(56) References Cited

U.S. PATENT DOCUMENTS

| | | | |
|---|---|---|---|
| 8,538,402 B2 | 9/2013 | Vidal et al. | |
| 8,583,319 B2 | 11/2013 | Scott | |
| 8,855,682 B2 | 10/2014 | Osann, Jr. | |
| 8,914,014 B2 | 12/2014 | Vidal et al. | |
| 8,923,931 B2 | 12/2014 | Rathus et al. | |
| 8,952,800 B2 | 2/2015 | Bantz et al. | |
| 8,958,853 B1 * | 2/2015 | Bovis | H04M 1/72552 455/569.2 |
| 9,007,255 B2 * | 4/2015 | Jarvis | G01S 7/40 342/20 |
| 9,769,297 B2 * | 9/2017 | Miller | H04M 1/67 |
| 2001/0009107 A1 | 7/2001 | Cheng et al. | |
| 2004/0209594 A1 * | 10/2004 | Naboulsi | B60Q 9/00 455/404.1 |
| 2005/0179320 A1 * | 8/2005 | Shimomura | B60R 25/2018 307/10.4 |
| 2006/0223593 A1 | 10/2006 | Ishak | |
| 2009/0221279 A1 | 9/2009 | Rutledge | |
| 2010/0210254 A1 | 8/2010 | Kelly et al. | |
| 2010/0297929 A1 | 11/2010 | Harris | |
| 2011/0059731 A1 | 3/2011 | Schivley | |
| 2011/0077032 A1 | 3/2011 | Correale et al. | |
| 2011/0130132 A1 | 6/2011 | Lipovski et al. | |
| 2012/0015690 A1 | 1/2012 | Miao | |
| 2012/0172014 A1 | 7/2012 | Smith | |
| 2012/0176232 A1 | 7/2012 | Bantz et al. | |
| 2012/0329484 A1 * | 12/2012 | Rothschild | G01S 5/0242 455/456.5 |
| 2013/0070957 A1 | 3/2013 | Zhang et al. | |
| 2013/0072174 A1 | 3/2013 | Enty et al. | |
| 2013/0157640 A1 * | 6/2013 | Aycock | H04M 1/72577 455/418 |
| 2013/0172018 A1 * | 7/2013 | Correale | H04W 4/027 455/456.4 |
| 2013/0176100 A1 * | 7/2013 | White | G08C 19/00 340/1.1 |
| 2013/0189964 A1 * | 7/2013 | Thompson | H04W 4/14 455/414.1 |
| 2013/0190978 A1 * | 7/2013 | Kato | G01C 21/3664 701/36 |
| 2013/0217331 A1 * | 8/2013 | Manente | H04W 4/80 455/41.2 |
| 2013/0244625 A1 | 9/2013 | Brakensiek et al. | |
| 2014/0334264 A1 * | 11/2014 | Thaker | G01S 19/45 367/118 |
| 2015/0079965 A1 * | 3/2015 | Mullins | H04W 12/0027 455/419 |
| 2015/0079967 A1 * | 3/2015 | Mullins | H04W 48/04 455/419 |
| 2015/0195399 A1 | 7/2015 | Way et al. | |
| 2017/0104865 A1 * | 4/2017 | Skelton | H04M 1/6075 |

OTHER PUBLICATIONS

U.S. Patent and Trademark Office; Notice of Allowance in related U.S. Appl. No. 15/481,953 dated Aug. 29, 2018; 7 pages.

The International Bureau of WIPO; International Preliminary Report On Patentability in related International Patent Application No. PCT/US2018/040764 dated Jan. 7, 2020; 5 pages.

* cited by examiner

Eye Can
Stay Alert. Stay Alive.

Put It Down

PLEDGE  TRACK  HOW IT WORKS  • Dashboard  🔒 Sign Out

PARENTS  COMPANIES  THE PLEDGE  STATISTICS

Current Devices

| | | | |
|---|---|---|---|
| Greg's phone | 859-555-4844 | Enrollment Code: 01YRRL7LQ | ✕ |
| Mindee's phone | 859-555-7262 | Enrollment Code: 01YR840YL | ✕ |
| Geoff's phone | 859-555-1212 | Enrolled | ✕ |
| Brian's phone | 859-555-1234 | Enrolled | ✕ |

Add a New Device
Label: John's phone

Phone number: 5555555555

[Add Device]

Add a New Beacon
Label: Car 1

ID: 123A-456B-789C-987X-654Y-321Z

[Add Beacon]

Email Notifications
Parent@notification.com   [Add]

FIG. 7A

Eye Can
Stay Alert. Stay Alive
Put It Down

PLEDGE    TRACK    HOW IT WORKS    🔵 Dashboard 🔒 Sign Out

PARENTS    COMPANIES    THE PLEDGE    STATISTICS

Current Devices

| | | | |
|---|---|---|---|
| Greg's phone | 859-555-4844 | Enrollment Code: 01YRRL7LQ | ✖ |
| Mindee's phone | 859-555-7262 | Enrollment Code: 01YR840YL | ✖ |
| Geoff's phone | 859-555-1212 | Enrolled | ✖ |
| Brian's phone | 859-555-1234 | Enrolled | ✖ |

Add a New Device
Label: [ John's phone ]
Phone number: [ 5555555555 ]
[Add Device]

Add a New Beacon
Label: [ Car 1 ]
ID: [ 123A-456B-789C-987X-654Y-321Z ]
[Add Beacon]

Email Notifications
[ Parent@notification.com ] [Add]
[ Parent@notification.com ] ✖ [None selected ▼]

FIG. 7B

Eye Can
Stay Alert. Stay Alive
Put It Down

PLEDGE   TRACK   HOW IT WORKS                    Dashboard   Sign Out

PARENTS   COMPANIES   THE PLEDGE   STATISTICS

Current Devices

| | | |
|---|---|---|
| Greg's phone | 859-555-4844 | Enrollment Code: 01YRRL7LQ   [×] |
| Mindee's phone | 859-555-7262 | Enrollment Code: 01YR840YL   [×] |
| Geoff's phone | 859-555-1212 | Enrolled   [×] |
| Brian's phone | 859-555-1234 | Enrolled   [×] |

Add a New Device
Label:
John's phone

Phone number:
5555555555

[Add Device]

Add a New Beacon
Label:
Car 1

ID:
123A-456B-789C-987X-654Y-321Z

Major:          Minor:
324560012           789005566789

[Add Beacon]

Email Notifications
Parent@notification.com    [Add]

FIG. 7E

From: EyeCan2 Notifications <notifications@eyecan2.org>
Subject: EyeCan Activation
Date: Tuesday, July 08, 2014 5:05 PM
To: Parent@notification.com "Alison" is activating EyeCan at 8:08:27 am EDT! *396*

FIG. 12

From: EyeCan2 Notifications <notifications@eyecan2.org>
Subject: Check in
Date: Tuesday, July 08, 2014 5:20 PM
To: Parent@notification.com

Check-in
October 10,2014 at 9:01 AM

"Brian II" has just checked in! *370*

The device was offline from 1:18:44 am CDT *372*
to 8:00:00am CDT (7 hours).

FIG. 18

SYSTEM AND METHOD FOR DISCOURAGING INAPPROPRIATE USE OF A MOBILE DEVICE

RELATED APPLICATIONS

This Application is a continuation of International Patent Application NO. PCT/US18/40764, filed Jul. 3, 2017 which claims priority to U.S. Provisional Application No. 62/528,308, filed Jul. 3, 2017. This application is also a continuation-in-part of U.S. patent application Ser. No. 15/481,953, filed Apr. 7, 2017, which is a continuation of U.S. patent application Ser. No. 14/590,814, filed Jan. 6, 2015, and issued as U.S. Pat. No. 9,621,707 and which is a Non-Provisional application, and claims priority to and the benefit of the filing date of U.S. Provisional Patent Application No. 62/075,003, filed Nov. 4, 2014, U.S. Provisional Patent Application No. 62/029,251, filed Jul. 25, 2014, and U.S. Provisional Patent Application No. 61/924,526, filed Jan. 7, 2014. The disclosures of such patents and applications are hereby incorporated by reference herein.

FIELD OF THE INVENTION

This present invention is related to a system and method for discouraging, preventing and reporting on the usage of mobile electronic devices, such as cell phones or tablets, when a user is engaged in another activity demanding their attention, and specifically to the prevention and discouragement of texting, communicating, or otherwise being distracted with mobile devices while driving, working, and doing other important activities.

BACKGROUND OF THE INVENTION

Cellular phones, tablets and other mobile electronic devices are ubiquitous in today's society, and are useful tools for staying connected with each other, retrieving information, and generally providing a platform for mobile communications between various parties. However, the attachment that members of society have to their cellular phones or other mobile devices and the addictive nature of the use of such devices, has also created significant problems when such use is concurrent with and/or interfering with the performance of other more important tasks that require the user's attention.

There are many daily activities and interactions that can be detrimentally affected by the inappropriate usage and distraction of a mobile device. In particular, the use of a mobile electronic device while the user is operating a motor vehicle, such as a car, is particularly problematic. Often, such device usage requires the visual attention of the user or driver, which, in turn, takes away from their visual attention to the road and their driving task. As a result, drivers that text and drive are a particular problem on today's highways.

Texting, in a general sense, is the typing out of a text message on a cellular telephone or other mobile device (referred to as SMS or MMS). Often, it is done using a very small keyboard on the device. Sending an email using a cellular phone presents the same problems as texting, and so both texting and emailing will be referred herein to generally as "texting". The resulting text message can be immediately received by another cellular telephone or computer. However, in typing out a text message, the driver generally has to look at the small keyboard provided with the mobile device, and look away from the road or their other activity temporarily. While some speech recognition capabilities on current devices have reduced the need for some typing, a large majority of device users still type out a text message using a keyboard. Even if speech recognition is utilized, they still are reviewing, modifying, and/or sending the text message while looking at the device screen or keyboard, and away from their main task, such as driving. As such, it takes their visual attention away from the more important tasks at hand.

Texting while driving is a particular problem as it has been estimated that sending or receiving a text takes a driver's eyes from the road for an average of 4.6 seconds. That amount of time is equivalent, at a 55 mile-per-hour driving speed, of driving the length of an entire football field generally blind to the road and to the surroundings.

In another area, the general use of mobile devices during the administration of healthcare is also problematic. As may be appreciated, attending to a patient, such as to administer care, perform major or minor surgery, or otherwise tend to the patient is a task that should occupy the individual attention of a caregiver. However, often such tasks involve active monitoring for a particular period of time where a caregiver might see a window, however brief, to engage their device. A distracted caregiver operating or monitoring a patient's vital signs may miss important symptoms or conditions.

As a result, there have been significant car and train traffic accidents, as well as medical accidents that have been attributed to a distracted driver or care provider who was attempting to text or otherwise engage with their mobile device while otherwise engaged. Such issues as driving and texting or being interrupted during a work task are examples of a larger set of problems involving mobile devices that are classified or referred to as "distracted living".

Mobile devices and their constant ringing, signaling and interrupting during daily living, including during sleeping periods, often cause significant disruptions in a user's life. The overuse and abuse of such devices in routine daily life and in competition with other tasks is a problem for young and old alike. For example, when a person is supposed to be engaged in another task, such as sleeping or in social interactions, they may be awoken or distracted by their device, such as through constant audible and visual notifications of incoming texts, incoming emails, incoming calls, etc. This is particularly a problem with children and young adults. For example, young adults may be in their bedroom for the purposes of sleeping or doing homework according to their parents' wishes, but may be actually engaging in communications, via text, email, or other applications. Distracted living and texting, communicating and device use in school is also a significant distraction. Use of mobile devices in the educational environment is often a detriment to the entire educational process.

While texting is discussed generally herein as an example, simply visually engaging a mobile device, such as a cellular phone, for the purposes of sending/reviewing a message, sending or reviewing emails, making a call, playing a game, engaging a device application or "app" and/or interfacing with the Internet are also incidents that may significantly increase the risk of the distracted device user getting into an accident, or a caregiver missing an important patient event, or a person generally being distracted in some detrimental way.

Various attempts have been made to address these issues, particularly the issue of texting and driving. Such proposed solutions include various systems, for example, that are interactive between a phone and a vehicle in order to monitor the speed of the vehicle, and essentially shut down the operation of a phone or other cellular device within the vehicle. However, generally such systems are elaborate and complicated (and thus, expensive) systems that involve wireless communications between the vehicle, such as through the onboard diagnostic (OBD) systems, and an interaction with the operational system of the phone. Based upon the evaluated vehicle information from the onboard diagnostics, various of the functions of the phone are shut down, or otherwise hindered, to prevent the use of the phone while the vehicle is in motion. However, not only are such systems expensive and complicated, they also may interfere with the need for emergency use of the device, such as to make an emergency telephone call, while the vehicle may still be in motion.

Also, such vehicle-devoted systems do not address other distracted uses of mobile devices. There is also a need to ensure that device users are not using their phone when they are engaged in activities that require their attention, such as on the job and during work time, but do not involve a vehicle. For example, physicians, nurses and other medical workers should be attentive to their tasks, particularly in such critical areas as an operating room. Sales representatives, office workers and others should also ensure they are attending to their primary tasks and are not distracted by their phone or other device.

Still further there is a need, in certain scenarios, to verify that a person was indeed not using their phone and were engaged in their primary task at hand and were not distracted at certain times. Currently, phone or other activity, or the lack thereof, might be determined only through tedious and time consuming methods. When a person is questioned about distracted driving or the distracted performance of their tasks, generally they only have their word to rely upon.

Accordingly, it is desirable to address these issues regarding distracted driving or working or living, as well as to address general life distractions that are based on use of mobile devices, such as cellular phones. It is further desirable to provide a solution without a complicated and expensive system, such as a system which monitors vehicle usage and essentially takes over the cellular phone or other mobile device. Still further it is desirable to provide a platform for verifying, such as with documented information, that a person was not using their phone or other mobile device, or alternatively for verifying that a person was not using their phone in the performance of a particular task or in a certain time frame. The present invention addresses these issues and other issues as set forth below.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIGS. 7A-7E are diagrammatic views of example graphical user interfaces that may be output on a display of a client device of FIG. 1, in accordance with the invention.

FIG. 12 is a schematic view of an activation message, in accordance with the invention.

FIG. 18 is a schematic view of a deactivate message, in accordance with the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
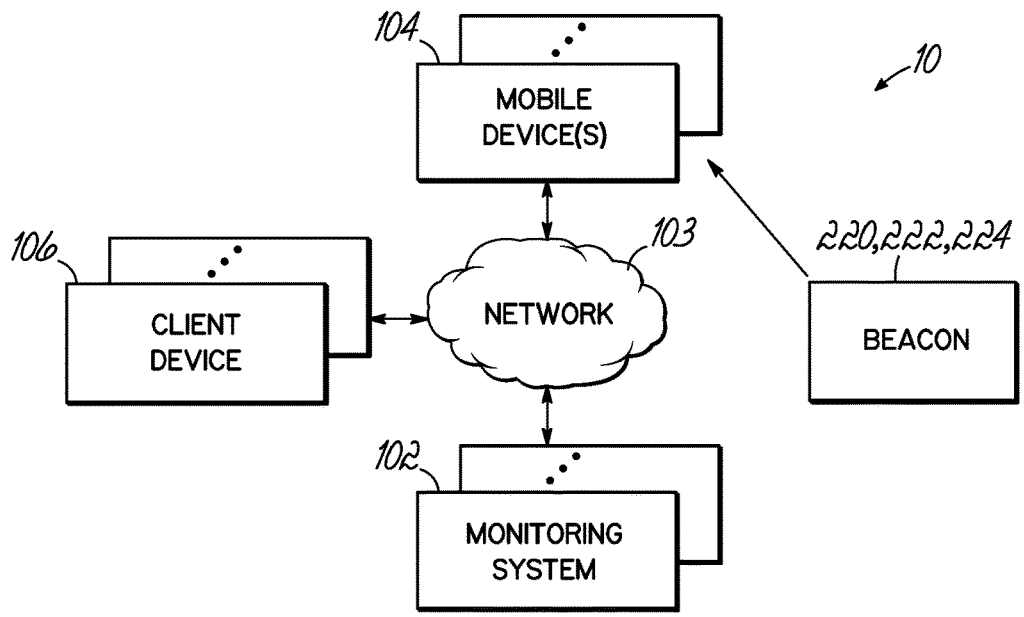
FIG. 1 is a block diagram of a monitoring system, one or more mobile devices, and one or more client devices consistent with embodiments of the invention.

Turning now to the figures, and particularly to FIG. 1, this figure provides a block diagram illustrating one or more devices and/or systems 10, consistent with embodiments of the invention. As shown in FIG. 1, system 10 includes monitoring system 102, in accordance with aspects of the invention, which may be implemented as one or more server devices or servers. The monitoring system may be connected to a suitable communication network 103, where the communication network 103 may comprise the Internet, a local area network (LAN), a wide area network (WAN), a cellular voice/data network, one or more high speed bus connections, and/or other such types of communication networks, or combinations of networks. The system 10 includes one or more mobile devices 104 and/or client devices 106 that may be connected to the communication network 103 such that the mobile devices 104 and/or client devices 106 may communicate data to and from the monitoring system 102. In general, the mobile device 104 may typically be a cellular phone or smart phone, tablet computer, laptop computer and/or other such personal computing devices, but the invention is not limited to such devices. The client device 106 may be a desktop computer, laptop computer, thin client terminal, smart phone, tablet computer, and/or other such computing device, but the invention is also not limited to such devices. Generally, the problem of texting and/or distracted device usage is mostly an issue with mobile phones, but other devices may also distract a user as well, and therefore, the invention is not limited to just addressing the problems of texting or other communications using a phone.

In general, the monitoring system 102 may be configured to monitor operational status of one or more mobile devices 104, and store and maintain and report operational status change information for one or more mobile devices 104 that are registered with the monitoring system 102. Furthermore system 12 is configured for monitoring mobile device interaction with other elements, such as beacon devices of system 10. In addition, the monitoring system 102 may be configured to interface with a client device 106 such that a user of the client device 106 may review the monitored status information and operational status change information and other interactions for a particular mobile device 104 that is registered with, and maintained by, the monitoring system 102. The information might be displayed as various transactions associated with the device.

As will be described in detail below, consistent with embodiments of the invention, an interface may be generated by the monitoring system 102 such that a system user (e.g., a parent, a supervisor, etc.) may input information using a client device 106, such as a computer. The input information may be utilized to set up a user record for the system user, and identify one or more particular mobile devices 104 for which the user wishes to view status information and operational status change information. In general, such an interface may be accessible via a client device 106, such as a personal computer, a portable electronic device (e.g., a smart phone, a tablet, a laptop, etc.), or a terminal configured to interface with a server providing such interface. Consistent with embodiments of the invention, the interface generated by the monitoring system 102 may be a web-based user interface, and the user may access the web-based user interface with an Internet web browser. In some embodiments, the interface generated by the monitoring system 102 may be a dedicated interface, such as an interface that may be provided by a special purpose application configured to be executed on the client device 106.

Moreover, consistent with embodiments of the invention, a mobile device 104 may be registered with the monitoring system 102 such that the mobile device 104 is linked with a user record for a registered user of the system, such as a user that is interfaced at a client device. After registration with the monitoring system, the mobile device may be configured to execute a status monitoring application that is configured to cause a processor of the mobile device 104 to monitor the mobile device, capture, and generate status information and other interaction information, and particularly, to generate a status change report that is responsive to an operational status or mode change of the mobile device. In general, the status change report may include data that indicates a status to which the mobile device 104 was changed and a time and date associated with the status change (i.e., a time/date stamp), as discussed further herein. Furthermore, in accordance with alternative embodiments of the invention, various notification messages, or communications, for example, email messages or text messages, might be sent, at various junctures, to one or more devices or accounts associated with the mobile device that is being monitored, and/or might be logged and displayed with status change information. In one particular embodiment of the invention, a mobile device is preferably disabled in some way to prevent use of the device and distractions, and the invention monitors how long the device was disabled, and when it was again enabled.

Figure 2:
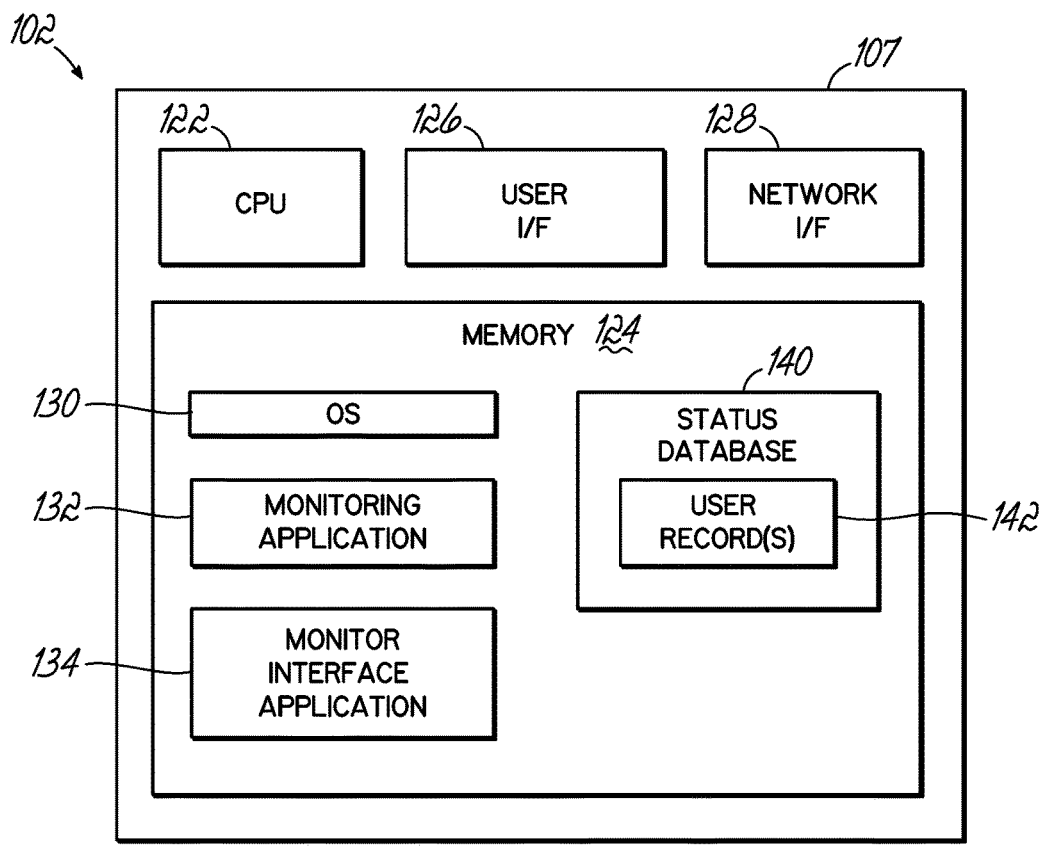
FIG. 2 is a block diagram of an embodiment of a monitoring system of FIG. 1.

FIG. 2 provides a block diagram that illustrates components of the one or more servers 107 of the monitoring system 102 consistent with some embodiments of the invention. The monitoring system server 107 includes at least one processor or CPU 122 including at least one hardware-based microprocessor and a memory 124 coupled to the at least one processor 122. The memory 124 may represent the random access memory (RAM) devices comprising the main storage of the monitoring system 102, as well as any supplemental levels of memory, e.g., cache memories, non-volatile or backup memories (e.g., programmable or flash memories), read-only memories, etc. In addition, memory 124 may be considered to include memory storage physically located elsewhere in the monitoring system 102, e.g., any cache memory in a microprocessor, as well as any storage capacity used as a virtual memory, e.g., as stored on a mass storage device or on another computer coupled to the monitoring system 102.

For the interface with a user or operator, the monitoring system 102 may include a user interface 126 incorporating one or more user input/output devices, e.g., a keyboard, a mouse or other pointing device, a display, a printer, etc. Data may be communicated by the system 102 to and from another device, computer or terminal (e.g., the mobile device 104, the client device 106, etc.) over a suitable network interface 128 that is coupled to the appropriate communication network 103. The monitoring system 102 also may be in communication with one or more mass storage devices, which may be, for example, internal hard disk storage devices, external hard disk storage devices, external databases, storage area network devices, etc.

The monitoring system 102 typically operates under the control of an operating system 130 and executes or otherwise relies upon various computer software applications, components, programs, objects, modules, engines, data structures, etc., including for example, a monitoring application 132, and/or a monitor interface application 134. In general, the monitoring application 132 may be configured to receive status data or information, such as status change report information or device interaction information, from a particular mobile device 104 over the communication network 103, and store status change information and other information in a corresponding user record for that mobile device based on the received status change report. Furthermore, the monitor interface application 134 is generally configured to interface with one or more client devices 106, and to retrieve and report stored status change information for a particular mobile device 104 based at least in part on one or more queries that is received from the client device 106 when the client device interfaces with system 102.

The memory 124 of the monitoring system 102 may generally include or store one or more databases including, for example, a status database 140 that may store one or more user records 142. In general, each user record 142 of the status database may be associated with a registered user that had registered with the monitoring system 102, and the user record may store status information and other information for one or more mobile devices that are linked to the registered user and/or were registered by the particular registered system user.

The databases 140 may comprise data and supporting data structures that store and organize the data used by the invention, including data from the mobile device, client devices, and monitoring systems. In particular, the databases 140 may be arranged with any database organization and/or structure including, but not limited to, a relational database, a hierarchical database, a network database, and/or combinations thereof. A database management system in the form of a computer software application executing as instructions on a processing unit 122 of the monitoring system 102 may be used to access the information or data stored in records of the databases 140 in response to one or more queries, where a query may be dynamically determined and executed by the operating system 130 and/or other applications 132, 134.

Figure 3:
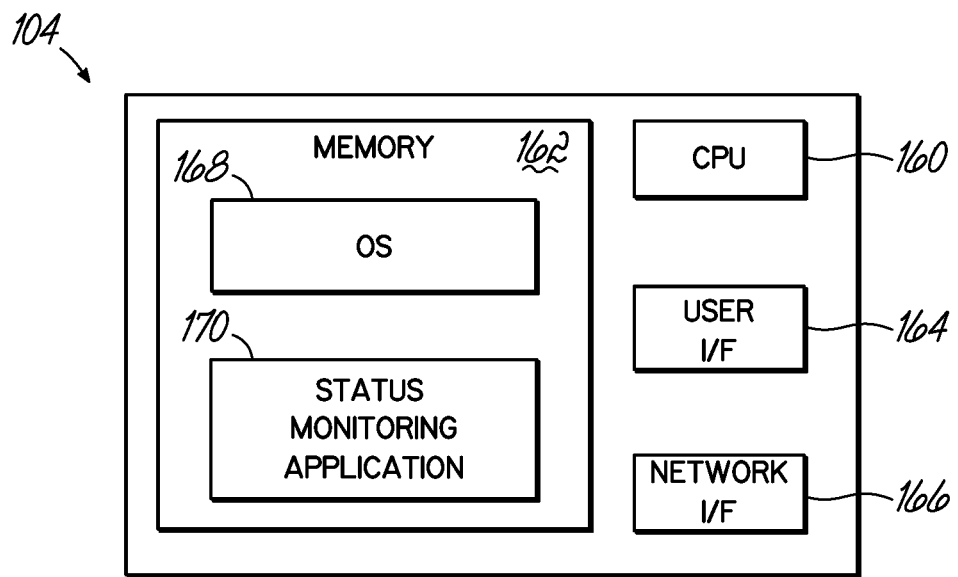
FIG. 3 is a block diagram of an embodiment of a mobile device of FIG. 1.

FIG. 3 provides a block diagram that illustrates the components of the mobile device 104 consistent with embodiments of the invention. Generally multiple mobile devices 104 are part of the system 10 of the invention. The mobile device 104 includes at least one processor or CPU 160 including at least one hardware-based microprocessor and a memory 162 coupled to the at least one processor 160. The memory 162 may represent the random access memory (RAM) devices comprising the main storage of the mobile device 104, as well as any supplemental levels of memory, e.g., cache memories, non-volatile or backup memories (e.g., programmable or flash memories), read-only memories, etc. In addition, memory 162 may be considered to include memory storage physically located elsewhere in the mobile device 104, e.g., any cache memory in a microprocessor, as well as any storage capacity used as a virtual memory, e.g., as stored on a mass storage device or on another computer coupled to the mobile device 104. As described above with respect to the monitoring system 102 of FIG. 2, the mobile device 104 may include at least one appropriate user interface 164 for interfacing with a user and a network interface 166 for communication over the one or more appropriate communication networks 103. For example, with a phone device, the user interface might include a keyboard, microphone, speaker, touch screen, etc. for communicating or interfacing with a user. Generally, most mobile devices rely upon their touch screens to provide a suitable user interface for engaging the devices and the applications they run. The network interface may include, for example, a cellular network interface, as well as a Wi-Fi interface or other suitable network interfaces for communication over network(s) 103.

The mobile device 104 typically operates under the control of an operating system 168 and/or application and executes or otherwise relies upon various computer software applications, components, programs, objects, modules, data structures, etc., including for example, a status monitoring application 170. The status monitoring application 170 may be executed by the processor 160 of the mobile device 104 to monitor status and interactions of the mobile device 104 and generate status change report information, interaction information or other status data/information responsive to detecting a change in status or some other interaction of the mobile device 104. The status change report information, or any other data or information, may be communicated to the monitoring system 102 over the communication network 103 and ultimately to a client device 106. The information may then be displayed for a system user to review.

In one embodiment, the status monitoring application 170 may be implemented as a downloadable application, such as an application supported by Android and iOS operating systems available from Open Handset Alliance and Apple Computer, respectively, or in other forms of program code as appropriate for a particular mobile device, such as a mobile phone or pad device, for example. In some embodiments, the status monitoring application 170 may be downloaded to a device 104 from an external source including for example, a network accessible location (e.g., a mobile application store, an accessible database), a computer readable storage media, and/or other such external sources.

Figure 4:
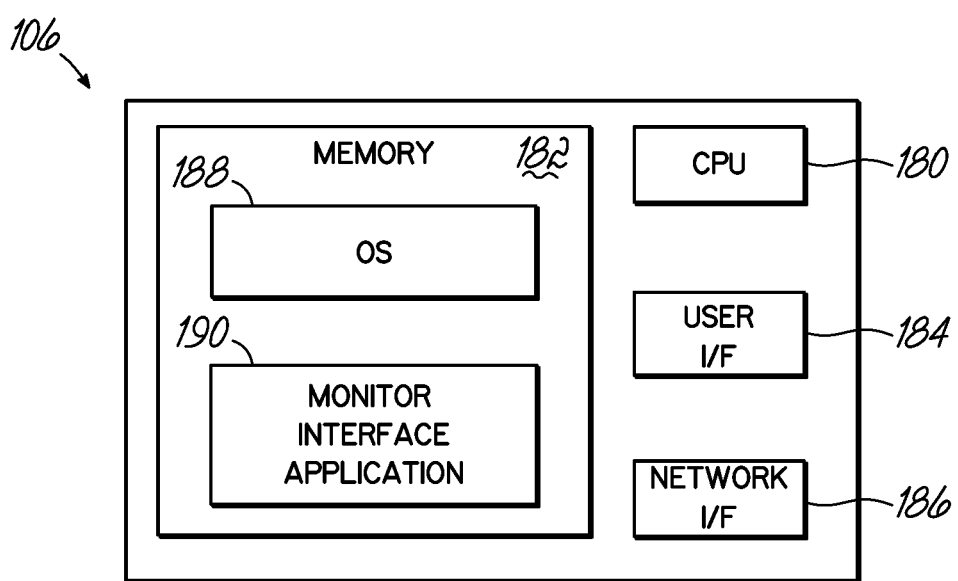
FIG. 4 is a block diagram of an embodiment of a client device of FIG. 1.

FIG. 4 provides a block diagram that illustrates the components of the client device 106 consistent with embodiments of the invention. The client device 106 includes at least one processor or CPU 180 including at least one hardware-based microprocessor and a memory 182 coupled to the at least one processor 180. The memory 182 may represent the random access memory (RAM) devices comprising the main storage of the client device 106, as well as any supplemental levels of memory, e.g., cache memories, non-volatile or backup memories (e.g., programmable or flash memories), read-only memories, etc. In addition, memory 182 may be considered to include memory storage physically located elsewhere in the client device 106, e.g., any cache memory in a microprocessor, as well as any storage capacity used as a virtual memory, e.g., as stored on a mass storage device or on another computer coupled to the client device 106. As described above with respect to the monitoring system 102 of FIG. 2, the client device 106 may include a user interface 184 for interfacing with a user and a network interface 186 for communication over the communication network 103. An exemplary client device might be a computer with a suitable keyboard and screen for a user interface and a suitable wired or wireless Ethernet or other network interface, or a mobile device, such as a phone or pad device.

The client device 106 typically operates under the control of an operating system 188 and/or application and executes or otherwise relies upon various computer software applications, components, programs, objects, modules, data structures, etc., including for example, a monitor interface application 190. The monitor interface application 190 may be executed by the processor 180 of the client device 106 to interface with the monitoring system 102 and receive status information/data and review status change information for one or more mobile devices 104.

In some embodiments, the monitor interface application 190 may comprise an Internet browser that may be directed to an Internet address associated with a web interface provided by the monitoring system 102 that is displayed to a user of the client device 106 in the browser. Generally in such embodiments, the monitoring system 102 may generate a web-based interface (e.g., a graphical user interface) that may be accessible by the client device using the Internet browser for viewing the operational status information, interaction information and status change information for one or more previously-registered mobile devices.

In some embodiments, the monitor interface application 190 may be configured to generate an interface (e.g., a graphical user interface) on the client device 106 that is configured to communicate data between the monitoring system 102 and the client device 106. Therefore, in these embodiments, the interface may be generated at the client device 106 by executing the monitor interface application 190. By interfacing with the monitor interface application 190 via the user interface 184, a user may, for example, register one or more devices, check device status, and/or provide data that may be communicated to/from the monitoring system 102.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., processors, microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution. Furthermore, as functionality of the system might be distributed between the various components, such as system servers, mobile devices, and other components, the invention is not limited to specific components handling specific functions.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by a computer or other device. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 5:
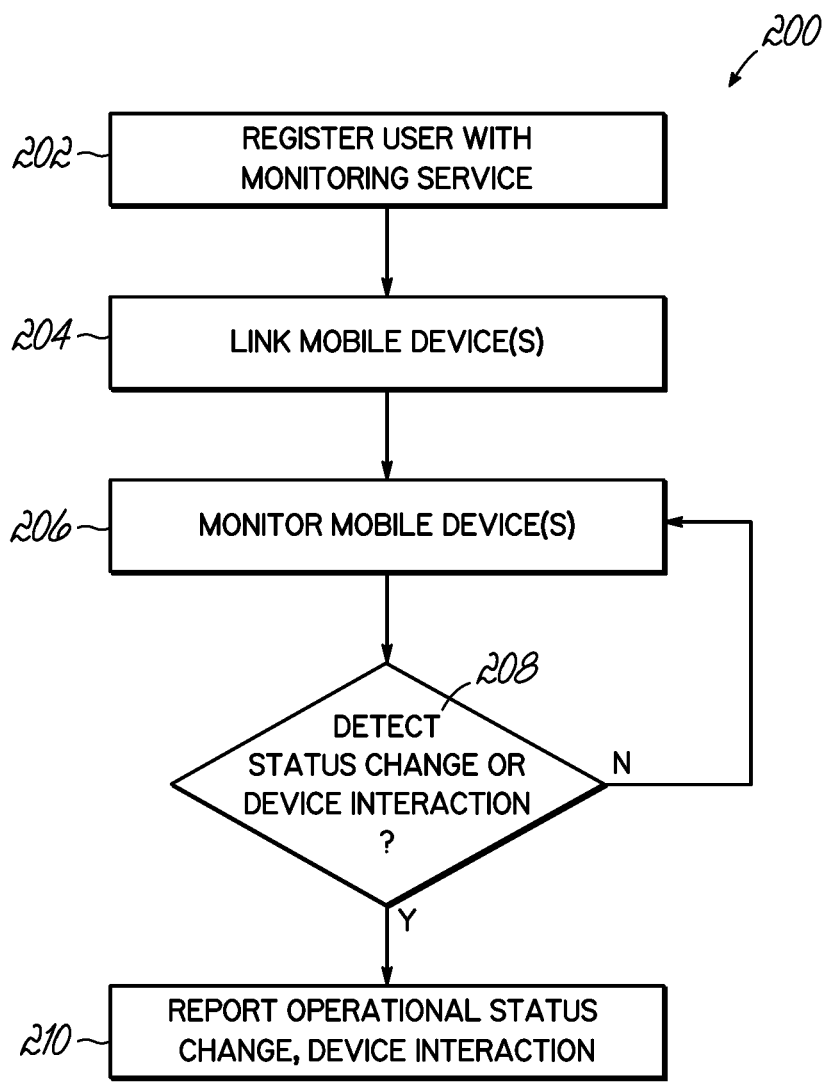
FIG. 5 is a flow design illustrating a sequence of operations that may be performed by the systems and devices of FIG. 1 consistent with embodiments of the invention to monitor an operational status of one or more mobile devices.

FIG. 5 provides a flowchart 200 that illustrates a basic sequence of operations in accordance with an embodiment of the invention that may be performed by the monitoring system 102, the mobile device 104, and the client device 106 consistent with various features of the invention. For example, consistent with one or more embodiments of the invention, a system user may register with the monitoring service that is offered through the application 132 of the monitoring system (block 202). In general, a system user may interface with the monitoring system 102 and application 132 via a client device 106 and network 103 to register for the monitoring service, to become a registered system user, create a user record, and to register one or more devices for the system to monitor. In general, registering for the inventive monitoring service may include the steps of providing user registration information through a client device 106 to the monitoring application run on system 102. The provided user information is then used to create a user record that is associated with the user, and ultimately, is associated with one or more mobile devices that are to be monitored. Such registration information may comprise, for example, a username, a password, payment information, contact information, information associated with the mobile devices to be registered for the service (e.g., a mobile telephone number associated with a mobile device), email addresses, mobile phone information, etc. In another embodiment of the invention, individual beacons are part of the overall system, and are used to interface with mobile devices to ensure that a user changes the operational status of their device at certain localities, or in certain working environments or situations. Therefore, the user registration information might also include information for one or more beacons that the monitored devices of various users may encounter, as discussed below. In accordance with another embodiment of the invention, various notification messages in the form of email messages or text messages, for example, may be sent to designated email addresses or phone numbers, and such information may be obtained from the user and designated as contact information for that purpose.

During registration and, as part of the process of linking one or more mobile devices with the system 102, the monitoring system 102 and application 132 may generate one or more codes, such as an enrollment code or some other code that may be associated with the registered system user. The codes are displayed for the system user. The enrollment code is then used by the system user or some other entity to be input into one or more mobile devices 104 running a status monitoring application 170 to thereby associate or link the mobile devices with the registered user and user recorder through system 102, as discussed herein. FIGS. 7A-7E illustrate such codes as they are displayed for a system user at a client device, for example.

After registration of the user and one or more mobile devices of interest to that system user, the one or more mobile devices 104 may be linked to the registered user (e.g., associated with a particular user record) through the monitoring application and the system 102. More specifically, one or more mobile devices will be linked with the monitoring application, through the network (block 204). Therefore, those mobile devices will be able to communicate with system 102 and application 132, and will be associated with one or more user records 142. As discussed above, in some embodiments, an enrollment code associated with a registered user and the user record of that registered user may be generated by the monitoring application of the monitoring system 102, and may be displayed by the monitoring application, such as on a screen of client device 106 (See FIGS. 7A-7E) for linking devices 104 with system 102.

Figure 8:
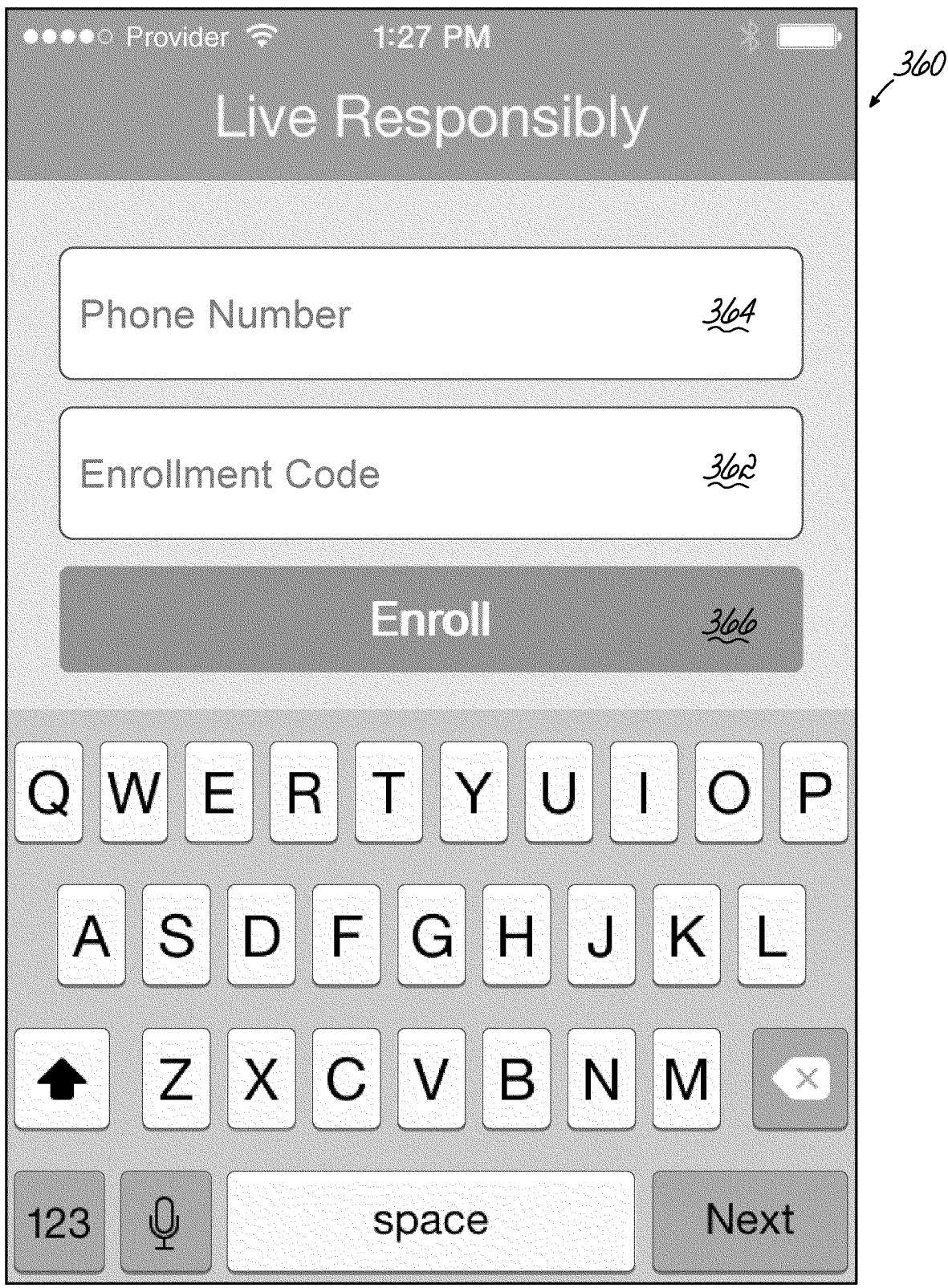
FIG. 8 is a diagrammatic view of an example graphical user interface that may be output on a display of a mobile device of FIG. 1, in accordance with the invention.

A user or other entity then provides or enters the enrollment code to the program interface of the mobile device that is used when executing the status monitoring application 170 on the mobile device 104. The application 170 and mobile device 104 interfaces/communicates with system 102, and provides the necessary enrollment information to link the device with a user record in system 102. This step or series of steps links the mobile device 104 (and the user of the mobile device) to the registered system user and to the associated user record of the monitoring application of system 102. For example, a user interface that is part of the status monitoring application 170, as shown in FIG. 8, might be used to get the code information. In other embodiments, the user may provide other identification information (e.g., a username and password) to link the mobile devices 104 to a registered system user and the monitoring application and system 102. As used herein with respect to the monitoring system, the terms "user" or "system user" will generally refer to the particular user, such as a parent or supervisor, who wishes to monitor the status of a mobile device that is being used by someone else, such as the device user (e.g. a teenager, a worker, a driver, etc.) Those entities (system user and device user) could be the same entity, but generally, will be different users. In one embodiment of the invention, when a mobile device is linked with a system user and a particular user record, the user will receive email and/or text notification messages of the status of the device and/or the device user, as discussed herein. Therefore, the device 104 and device user may be linked with one or more email addresses or mobile phone numbers through the monitoring application 132, and user records 142 associated therewith. Similarly, the devices 104 might be linked with one or more beacons, as discussed herein.

After linking the mobile device(s) 104 with the system user and a user record via the monitoring system 102 and monitoring application 132, the mobile device(s) 104 may execute the status monitoring application 170 on a particular device that communicates with system 102, such that the operational status of the mobile device(s) or interactions of the mobile device, such as with one or more beacons, may be monitored (block 206). In general, a mobile device may be configured to operate in one or more operational modes, states, or statuses, where each operational mode, state, or status may facilitate or define certain operating features and functions of the device. That is, based on the operational status, certain functional features are enabled and/or disabled for the device. More specifically, the device may have a normal or basic or enabled operational mode, state, or status where all or most of the functions of the device are operating or enabled. The device may also have one or more additional operational modes, states, or statuses where certain features are disabled or non-functional. That is, various functions of the mobile device 104 are limited or are not operational. These are referred to as disabled modes. To prevent distractions, it is generally desirable to have the device in one of the disabled modes where communication features, like cellular network connectivity or Wi-Fi connectivity are disabled so that the device is not used for distracting communications, or for otherwise distracting purposes.

Generally, in a first or basic and enabled operational state/mode or powered ON state/mode, the mobile device 104 may be configured to facilitate voice and data communications, execute one or more applications, facilitate processor communication with one or more components, etc. In a second or some other disabled operational mode, the mobile device may be completely OFF (e.g., Powered OFF state/mode), or may be configured to disable certain device features, to not allow voice and/or data communications, to prohibit the execution of one or more applications and/or prohibit processor communication with one or more components, etc. Often, such mobile device states are referred to as "modes". For example, in a particular mode (e.g., Airplane mode, Do Not Disturb mode, limited functionality mode, safety mode, etc.), the mobile device 104 may be configured to not allow certain voice communication and/or data communication (e.g., disabled phone calls, text messaging, email, Internet access, etc.). For example, an Airplane mode might disable all general communications, while a Do Not Disturb mode might be tailored to stop some communications or notifications, but allow certain phone calls. Herein, the term "disabled" mode or state will refer generally to some status wherein at least one or more of the communication or notification functions is disabled, as opposed to a normal, enabled mode. The disabling of the communication connectivity of a mobile device may be desirable to prevent or reduce use of devices and the distractions associated therewith.

Depending upon the environment of the mobile device, such as being on a plane, it may be desirable to disable or shut down certain features. Therefore, one such exemplary disabled mode for mobile devices, as noted, is referred to as "Airplane mode". But different devices may have different function-limiting modes, and the ultimate name of the disabled mode is less important than what the mode disables or enables. Other scenarios, such as when a person is driving, a person is in a meeting, a person is sleeping, a person is studying in a library, etc, might also be appropriate scenarios for disabling one or more features or functions of the phone or mobile device in order to prevent the distraction of using the device, or even prevent the temptation to use the device. Therefore, while "Airplane mode" is noted in several examples herein for description purposes, other disabled modes could be equally applicable to the invention.

Figure 9A:
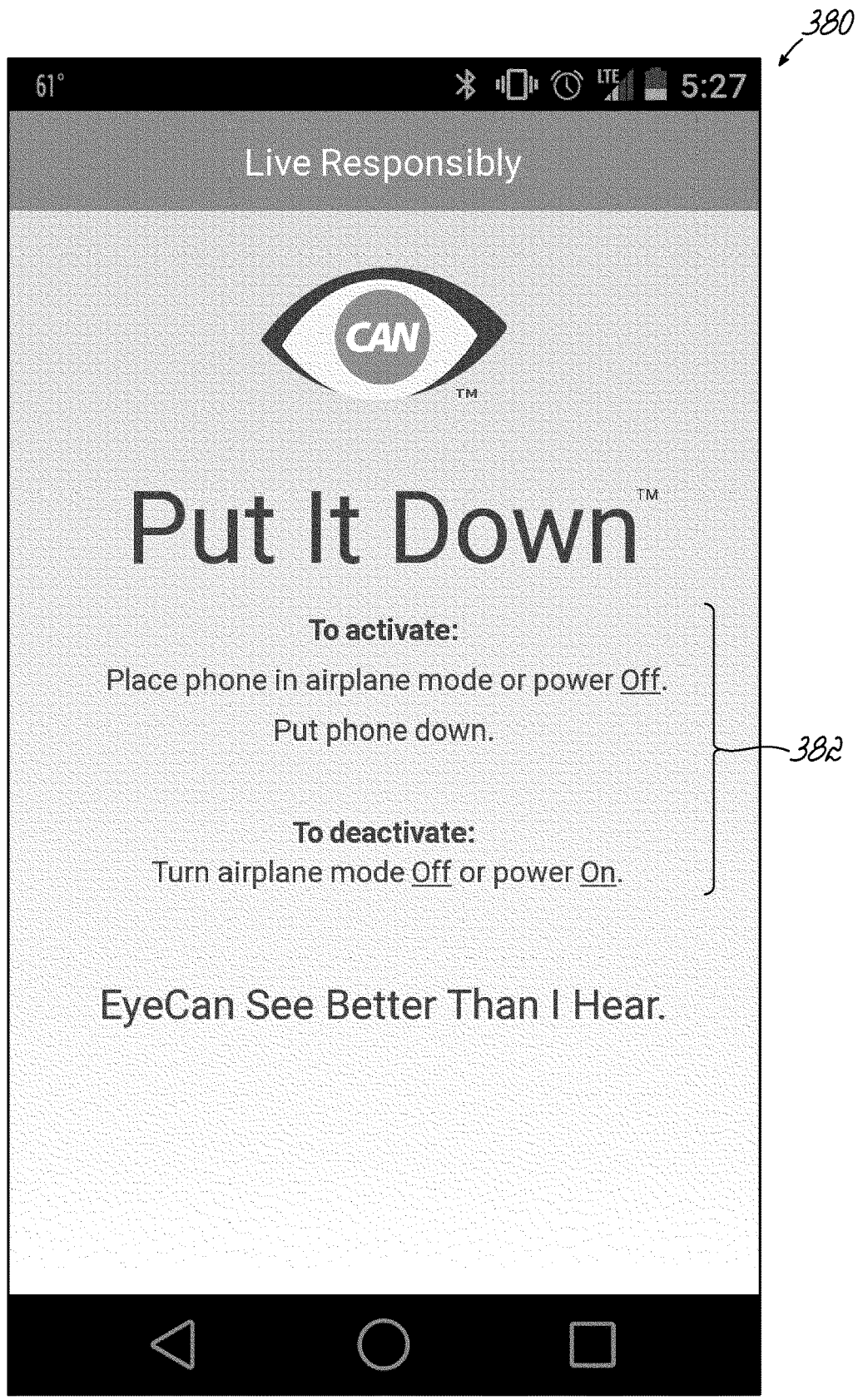
FIGS. 9A-9H are diagrammatic views of other example graphical user interfaces that may be output on a display of a mobile device of FIG. 1, for engaging the mobile device in accordance with the invention.
Figure 9B:
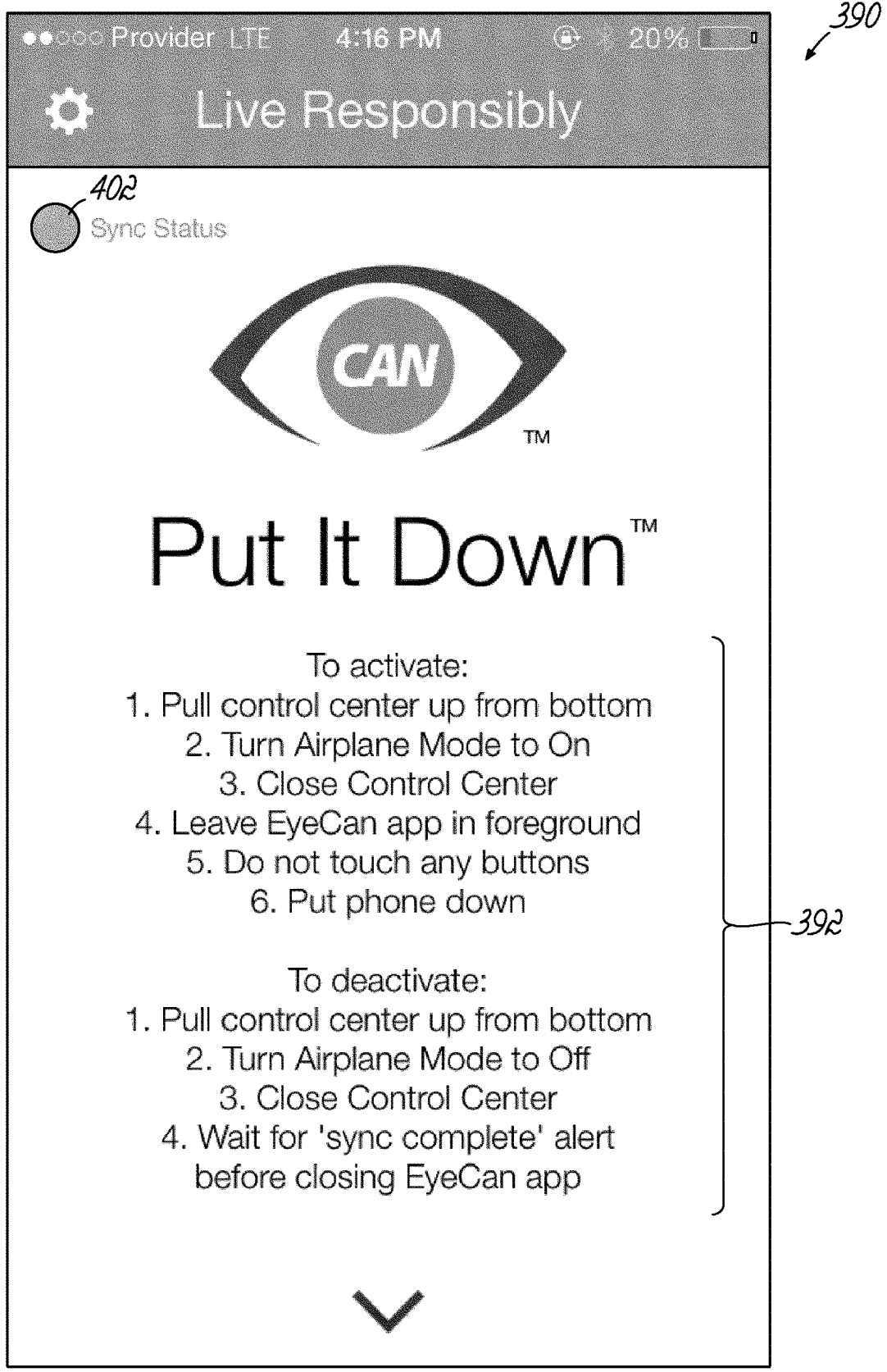

Therefore, consistent with embodiments of the invention, the mobile device 104 executing the status monitoring application 170 monitors the operational status of the mobile device 104 to detect status changes or to detect interactions, such as with a beacon (block 208). As may be appreciated, a user of the inventive system will have a vested interest to make sure that a disabled device remains disabled while the device user is otherwise engaged in another task, such as driving, operating on a patient, sleeping, working, studying, etc. In a system using beacons, a device user might be alerted that they are in a location or scenario where they should put their device into a disabled mode. In other scenarios (e.g., driving, sleeping), a device user may know that they are to put their device into a disabled mode. At the outset of opening and using the status monitoring application 170 of device 104, such as when the application or "app" is opened on a mobile device like a phone or pad device, the device user may be instructed, through a graphical interface on the mobile device, to place the device into a particular desired disabled state or mode. For example, as discussed below for the illustrated embodiment, the device user might be instructed to place the device in "Airplane mode", or some other mode, as part of the execution of application 170. FIGS. 9A and 9B illustrate various examples of a screen interface 370 of a device setting forth instructions for disabling communication features of a device and activating and engaging the status monitoring application 170. Depending on the devices, slightly different instructions might be used. As discussed herein, various icons or fields may be presented, such as in a touch screen of a device, for activating programs and features of the invention and it will be understood that such fields may be engaged with a touch by a user for activation. Accordingly, the presentation of touchscreen fields implies that the feature might be activated, opened, selected or otherwise made operable with a touch.

Figure 9C:
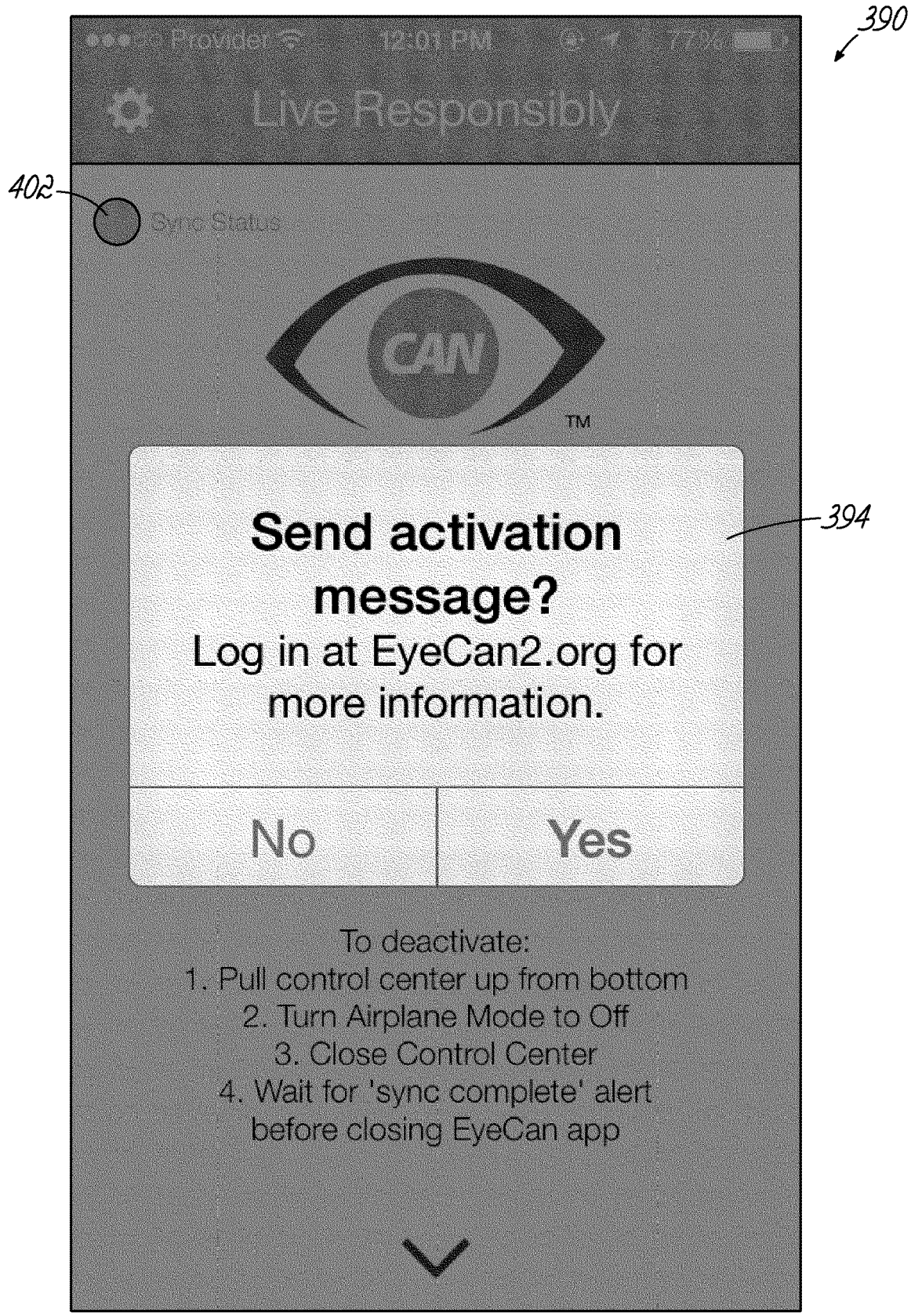

As noted herein, in some embodiments of the invention, the device user might be asked if they want to send an activation message (e.g., email or text message) that they will be starting, activating, or opening the status monitoring application or app (e.g., See FIG. 9C). As shown in FIG. 9C, before activating the program, an appropriate screen interface might prompt the device user, asking if they wish to send an activation message. If they do, such a message would be sent to one or more system users that may have an interest or stake in monitoring a mobile device and respective users and their activities. The email address or phone numbers that are used as destination information for the messaging might be set when the system user enters or provides login information regarding selecting and monitoring one or more user devices, and sets up a user record (FIGS. 7A-7E). In addition, the transaction associated with sending an activation message might be logged to be displayed, or reported with other operational status information.

The desirable selected disabled state/mode for a device running the application 170, in accordance with the invention, will disable certain functions, such as the texting and phone voice functions, in accordance with what is often instructed or mandated during takeoff and landing of an airplane. However, as noted, the invention is not limited to just a conventional "Airplane mode", and thus, the application may instruct a device user to enter some other suitable disabled mode or state for a device where features/functions are disabled, and to remain in that mode. For example, a powered OFF mode, or a Do Not Disturb mode, might be selected. Alternatively, the mobile device user might just be instructed to disable one or more functions, for example, a texting function or a phone function, and such disabling of a function may also represent a particular "state" or mode. The invention is not limited to any specific disabled state where certain communication features are disabled to prevent distractions. Once the specific disabled operational state/mode to be monitored is entered, the mobile device that is in the desired operational state/mode is then monitored, according to the invention, to determine and to detect any change in operational status, such as when a device user exits the disabled mode. In that way, the system encourages the device user to not use their device or otherwise be distracted by the device. For example, such a change in operational status might be the device being moved by the user back to a basic enabled operational state/mode where the device user can again text, make a call, or be otherwise distracted by the device and by using the device. The mode (Airplane, Do Not Disturb, etc.) might be turned OFF, or exited, or power might be turned ON, for example.

More specifically, while the mobile device 104 remains in a respective desired disabled operational state ("N" branch of block 208), the mobile device 104 executing the status monitoring application 170 continues monitoring the mobile device 206 (block 206) until a change in the operational status occurs, such as the device moving out of the desired state/mode or to another functional state/mode. Responsive to detecting a change in the operational status of the mobile device 104 (e.g., leaving or getting out of Airplane mode), the mobile device executing the status monitoring application 170 captures data about the change in status, and generates a status change report or generates data that is then communicated or reported to the monitoring system 102. In general, the status change report may include data or information about the state or mode that the device was in and status to which the mobile device 104 has changed and associated information, such as a time and date (e.g., a date/time stamp) at which the operational status change occurred. The change in operational status is then reported to the monitoring application and system 102, and then information about the status change is displayed appropriately to a system user. The status change might be displayed using an appropriate graphical interface, such as an interface screen or dashboard screen at a client device 106. For example, if the client device is a computer, the change in status will be reported to the system user by being displayed on a screen of the client device.

Figure 6:
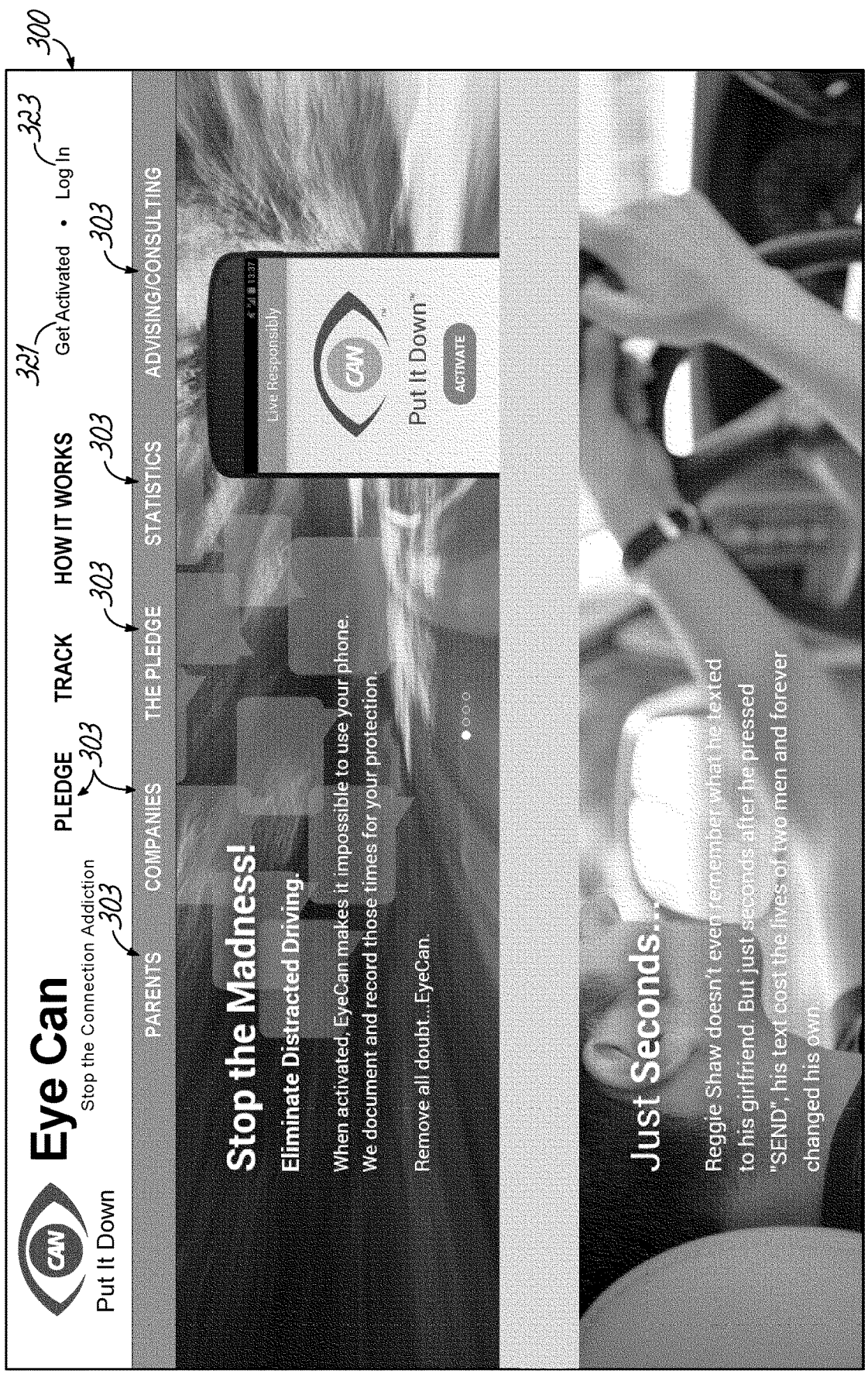
FIG. 6 is a diagrammatic view of an example graphical user interface that may be output on a display of a client device of FIG. 1, in accordance with the invention.

FIG. 6 provides an example illustration of a graphical user interface screen 300 that may be generated by the monitoring system 102 and accessible by a client device 106, through appropriate monitor interface applications 134, 190, for implementing an embodiment of the invention. As shown in FIG. 6, a user may register as a user of the monitoring service provided by the monitoring program and system 102 of the invention and/or log in to view status change information for various mobile devices that is stored in a user record associated with the registered user. The registered user interfaces with the example graphical user interface 300, such as through a web browser at a client device 106. Certain fields 321, 323 may be selected for registering with the system 10 of the invention to be set up as system user (321), or for signing in or out of the system user's account (323). Once signed or logged in, a user may view a dashboard to register further devices (See FIGS. 7A-7E), or review operational information that was logged and reported for certain devices (See FIGS. 13, 14). At a dashboard, the system user may log in, enter information, edit information, register one or more mobile devices with the monitoring system, enter email addresses or mobile phone numbers for messaging, and identify beacons to be tracked by one or more devices, for example. The graphical user interface links a user with a monitoring program 132 running on the monitoring system 102. The interface 300 might also provide additional information to a system user or other person, such as though various fields 303.

Figure 7C:
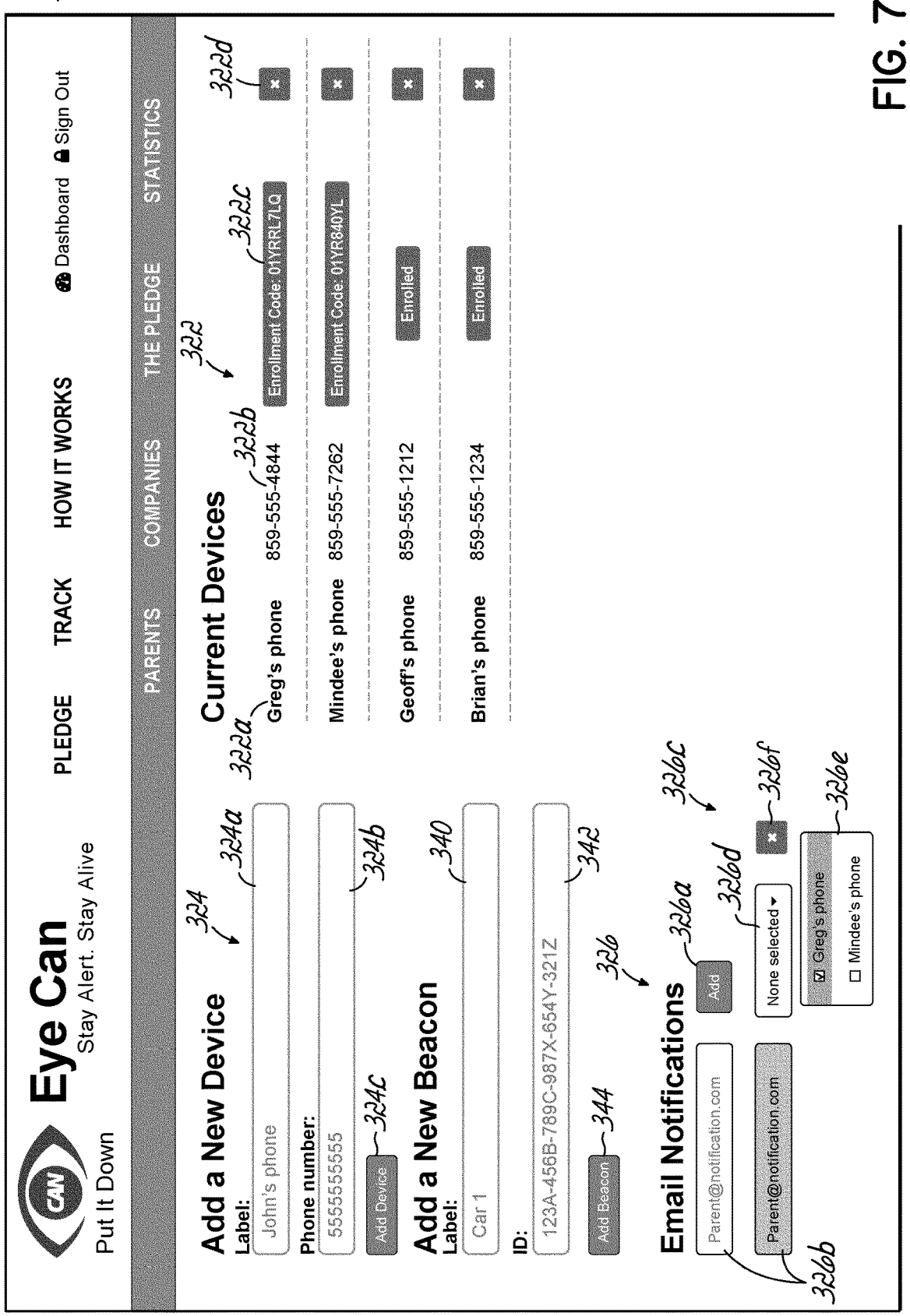

FIGS. 7A-7E provide example illustrations of another graphical user interface 320 in the form of a dashboard that may be generated by the monitoring system 102 and accessible by a client device 106 to be displayed on a screen via appropriate monitor interface applications 134, 190. Once a system user is registered, such as with an inquiry about the user (e.g., name, contact information, payment information, etc.), as part of being activated (321), the system user can then register one or more mobile devices to be monitored. In this example, the graphical user interface screen or dashboard 320 includes an information field 322 that displays information about all the mobile devices 104 that are currently registered and linked to a user record associated with a registered user through the application 132 of system 102, as well as devices to be linked. In this example, after logging in or signing in (e.g., providing a username and password associated with a user record), the dashboard interface 320 might be displayed, and a registered user associated with the user record may add one or more additional or new mobile devices for monitoring by interfacing with one or more interactive fields 324 of the graphical user interface 320 to provide information about the additional mobile device. For example, a user can engage field 324a to add a device. As illustrated in FIG. 7A, each device might be given a name to designate the device and its possible user, such as "John's phone" (field 324a). Also, other information designating the device, such as a phone number for a cellular phone device, or a cellular-enabled pad device, may be entered (field 324b). If a non-cellular enabled device is used, some other identification information might be provided in field 324b, and used to link the mobile device with the application 132 and system 102.

The selected mobile device is then linked to the user record for the system user and with the monitoring program 132. Current devices for a particular user and user record are illustrated via the dashboard interface 320 and fields 322. As shown, multiple devices might be added and selected for monitoring. The fields 322 a, 322b, and 322c illustrate the name of the device, identification information (e.g., phone number) for the device and its enrollment status. Field 322d might be used to delete one or more selected devices from the user record. As discussed herein, the various current devices that are linked to the monitoring program 132 may be monitored as appropriate for detecting when a change in the operational status occurs in a device. As noted herein, the link between the selected or added mobile device and system 102 and program 132 requires steps at the mobile device as well, such as use of an enrollment code, or other linking code information for providing the link between the system 102, the system user record 142, and the actual mobile device 104 to be monitored.

Field 322c of the interface 320 illustrates the enrollment status or linked status of a device. If the mobile device has been properly linked or enrolled with the system 102, the field 322c might indicate "Enrolled", as shown in the Figures. Alternatively, if a device has been entered through interface 320, but has not yet been linked or enrolled, an enrollment code might be displayed, as shown in field 322c for the devices "Greg's phone" and "Mindee's phone".

FIGS. 7A-7E also illustrate an embodiment of the invention, wherein various message notification features might be enabled for one or more of the current devices that are linked/enrolled and being monitored. Referring to FIG. 7A, interactive fields 326 are provided in the dashboard interface 320 for the purpose of selecting a messaging feature and messaging notifications, such as emails, or text messages, to be associated with one or more of the current registered devices of field 322. Then, when a mobile device is used with the invention, certain notifications or messages are sent for certain transactions that are detected, such as status changes or device interactions. For enabling a notification feature of the invention, information is provided through the interactive fields 326 so that the user record will include, for example, one or more email addresses, one or more mobile phone numbers, or other identification information providing a destination for message notifications that are associated with one or more monitored mobile devices in accordance with the invention. The information entered is utilized by the monitoring application 132 to notify one or more system users regarding different device transactions, such as the status of the registered and monitored devices and/or device interactions, such as with a beacon. The notifications are provided to a system user, such as through an email or text. Furthermore, certain messages and message information are also logged and reported as a transaction, and may be displayed in an interface, along with operational status information and other information for review by a system user.

Figure 7D:
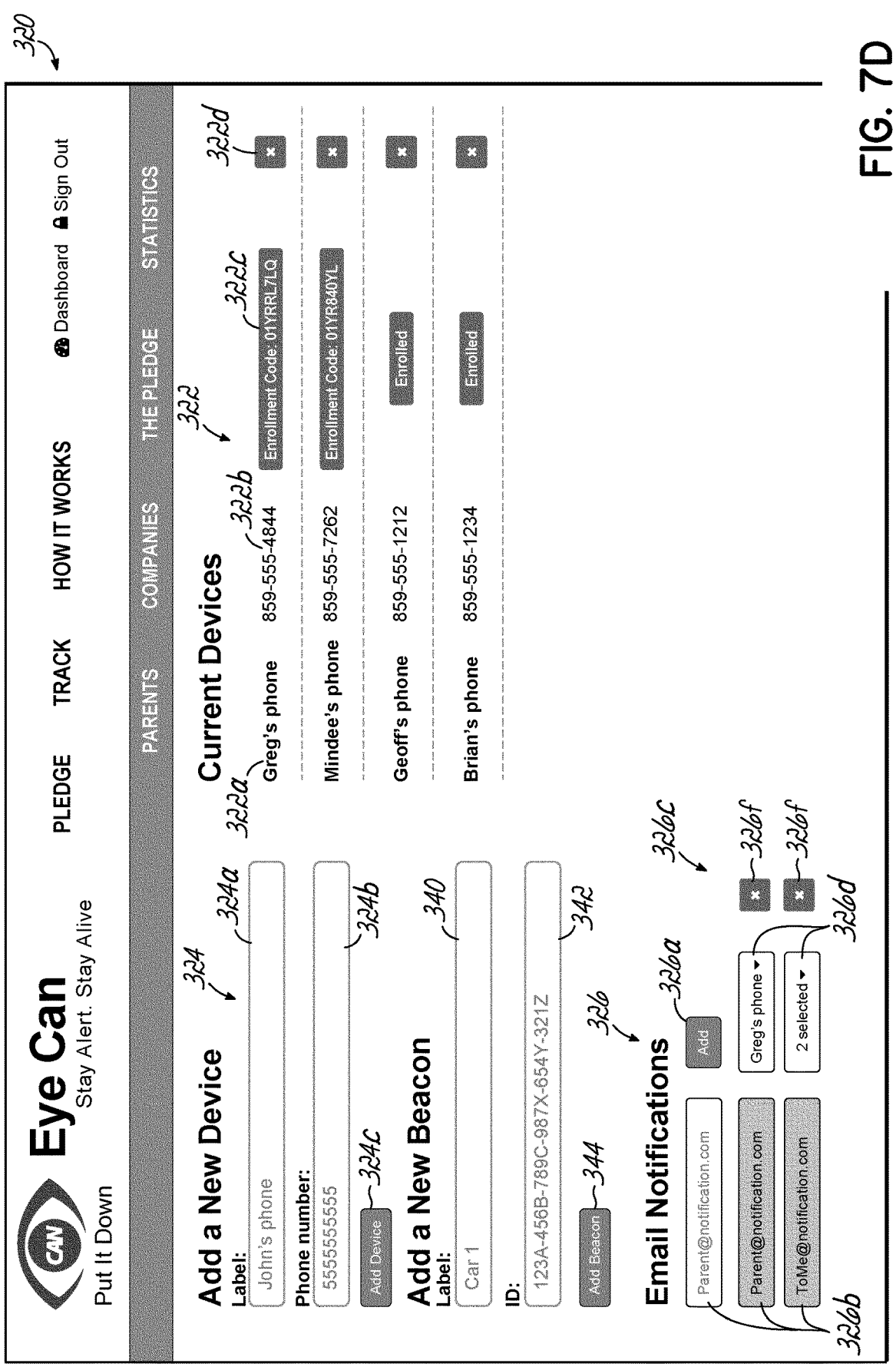

FIGS. 7A-7E illustrate an exemplary embodiment, wherein email notifications are provided to notify and assist the system user. Of course, other notifications, such as text message notifications or other notifications, might also be provided in accordance with the invention, and the invention is not limited to a particular type of notification. Referring to FIG. 7A, to select or activate a notification feature of the invention, the "Add" field 326*a* might be engaged and then an email address might be added via field 326*b* of the graphical user interface 320, as a destination for a notification. Once an email address or other address is added, a drop-down menu 326*c* is provided with a field 326*d* displaying which of the current devices registered for the system user and their user record are selected for the messaging feature using the email address 326*b* for generating various notifications. Devices may be selected by a user, and the selected devices are thereby associated with the email address of field 326*b* (See FIGS. 7B-7C). Initially, field 326*d* will indicate that no devices are selected (FIG. 7B). However, when the system user engages or selects field 326*d*, a drop-down menu 326*e* appears (FIG. 7C). The user selects one or more of the displayed devices through menu 326*e*. The one or more selected devices are indicated in field 326*d* (See FIG. 7D). When one device is selected for an email address, the label or name of the device is shown in field 326*d*, as illustrated in FIG. 7D. If more than one device is selected for a particular email or notification address, the number of devices that are selected (e.g., 2 selected) is indicated, as illustrated in FIG. 7D. Various fields and devices may be appropriately selected and checked, such as through the use of a mouse, touch screen, keyboard, or other input device of a client device 106. Once the email address or notification destination has been added as shown in FIGS. 7A-7E, the notification addresses will be shown in fields 326*b*, along with the number of devices associated with that email address in field 326*d*. As shown in FIG. 7D, multiple notification addresses may be utilized, and each may be associated with certain selected mobile devices that have been entered and/or enrolled. For example, as shown in FIG. 7D, one address has a single device associated therewith wherein the other address has two devices that have been selected and are associated therewith. Once such email addresses or other message notification information is provided through the interactive fields 326, the information is part of the system user record, and will be appropriately associated with and linked with each of the selected devices for notification purposes, as discussed herein. If there is a desire to drop an address, one or more fields 326*f* might be engaged. In that way, one or more notifications are provided for a device for one or more notification destinations.

Also, in accordance with one embodiment of the invention, one or more beacon devices or beacons may be registered and added to the system user record, and associated with one or more of the devices of that user record. The beacons can be used to prompt a mobile device user to change the operational status of their device, in accordance with the invention. Referring to FIGS. 7A-7E, appropriate interactive fields 340, 342 are provided for adding beacon information and registering one or more beacons, and linking a specifically-labeled beacon with proper identification data. Specifically, by engaging field 340 to add a beacon, the label or name of the beacon, such as "CAR 1" may be entered through field 340. The label might indicate the location of the beacon, for example, to note that the beacon is located in a vehicle referred to as "CAR 1". Identification information for the beacon, such as an identification number, serial number, or some other identification number, is also entered in field 342 or other related fields. While some figures illustrate one field 342 for ID information, alternative interfaces, such as that shown in FIG. 7E might provide other fields 346, 347 for additional information. In one embodiment, information such as UUID (342), a major ID (346), and a minor ID (347) might be used to register a beacon and might be entered using one or more appropriate fields. As such, the invention is not limited to the type of beacon information used to register a beacon with system 10. Such beacons are then as associated with and generally registered to all the various current mobile devices that are listed and enrolled and associated with the system user and the user record, as shown in fields 322. That captured beacon information in system 102 is conveyed to the one or more mobile device of the particular system user record, once those mobile devices are successfully linked with system 102 and with the monitoring application 132. Using that beacon information within the status monitoring application 170 of a mobile device 104, the mobile devices will be able to identify specific beacon signals received from the one or more added beacons that have been associated with a particular mobile device, and will process those beacon signals in accordance with the invention.

As discussed further hereinbelow, when a beacon is detected by a mobile device at one or more particular locations, in accordance with the invention, the beacon detection or interaction is reported to the monitoring application and/or to the mobile device. For example, a message is sent to the device regarding beacon detection. Furthermore, the information regarding the detection is reported to the monitoring application, and logged as a transaction and/or reported as a transaction on a monitoring dashboard or other screen associated with the device. The label that is given to the unique identification number is utilized so that both a system user, and a mobile device user, will know which beacon is referred to, and has been detected. As noted herein, the beacon might be reported to the mobile device when it is detected, and also may be reported to the system 102, and displayed in a dashboard associated with the mobile device so that a system user can see which beacon was detected by the mobile device.

Referring again to FIGS. 7A-7E, the information entered in fields 340, 342, 346, 347 will define the various beacons that are to be associated with a particular device. Generally, if a number of devices have been selected for monitoring, for example, all the devices of members of a family or all devices in a company, then the noted beacons will be associated with each of those devices. For example, in the user records associated with a particular system user, the various beacons which have been entered or set up, along with their labels and identification numbers, will be stored and can be provided to the various registered mobile devices by system 102, through the operation of the monitoring application 132. The mobile devices running the status monitoring application 170 will scan for Bluetooth® signals, or other wireless signals of the beacons, to detect any beacons close to the particular mobile device. When a particular device detects a registered beacon, the mobile device displays a message that a particular beacon was detected. In accordance with another aspect of the invention, the mobile device instructs the device user to put the phone in a disabled mode, which disables certain communication features. The mobile device also logs the transaction, and provides the information regarding the detection of the beacon to system 102, which provides a transaction message in a dashboard associated with the device, as discussed herein. Generally, a beacon detection indicates that the device user/device is in a location where the device user should not be distracted. Using an example of a family, each of the family cars might be equipped with a beacon, and thus, a mobile device associated with drivers of the family will identify beacon signals that are received when the mobile device is brought in proximity to the beacon, such as a driver getting in the car to drive with their mobile device. As noted further below, the beacon information, and specifically the label information entered in field 340, is utilized to display information on the mobile device that a beacon signal has been received, and also to display appropriate information on the dashboard screen of a system user to indicate which of the mobile devices that is being monitored has received a beacon signal, or otherwise interacted with a beacon, and when they received that signal. Therefore, the information entered in the interface 320 is used by the invention to provide notification of a mobile device interaction with a specific labeled or named beacon.

Once information has been added and a system user wishes to sign out of log out, a field 307 in interface 320 may be used. Field 305 allows a user to return to their dashboard from other interface screens.

When a mobile device is added for a registered system user and associated with a user record and the information therein, a registered system user will be provided by the monitoring application 132, in one example, with an enrollment code or other information that will be used to link one or more mobile devices with the monitoring system 102 and with the user record 142 associated with a registered user. The mobile device 104 runs a status monitoring application that uses the enrollment code to link with and communication with the system 102 so the mobile device may be monitored. At the mobile device, the status monitoring application 170 might be downloaded to the device, such as through an appropriate interface, like an online application store. It might be downloaded in other ways as well. Upon downloading the status monitoring application 170 to the mobile device and opening the application, fields are provided on the screen of the mobile device for entering the enrollment code that was provided by monitoring application 132 and other information.

FIG. 8 provides an example illustration of a graphical user interface screen 360 that may be generated by the mobile device 104 executing the status monitoring application 170 of the invention. The status monitoring application might be loaded onto a device 104, such as from an application or "app" store online, or some other appropriate way. The mobile device application may then be opened, such as by touching or engaging an appropriate icon 504 on a device home screen (See FIG. 16A), to run and provide monitoring, as discussed herein. In this example, a user links the mobile device 104 to the system 102 and with the monitoring application of system 102 and an associated user record by inputting an enrollment code that is provided by monitoring application 132 upon registering a device (See FIGS. 7A-7E). The code or other linking data that is provided is then entered in an interactive field 362 included in the graphical user interface 360 of the mobile device application 170. The system user may actually provide the enrollment code for enrolling another user's device, such as a child's telephone device, to ensure that the device may be properly monitored in accordance with the invention. Of course, the enrollment code might be provided from the system user to the actual device user for the device user to use when linking their device to the monitoring application and monitoring system 102. A phone number for the device or some other identifying information associated with the particular mobile device is also entered, such as in a field 364 of the interface 360, to provide a further link with the device and the system 102 and a user record.

Once the proper enrollment code is entered and the necessary control field 366 of interface 360 engaged to complete enrollment, the mobile device communicates with system 102 over an appropriate network, and is officially linked with a system user record and application 132 and system 102, and may be monitored by the system and a system user. Specifically, as discussed herein, the mobile device is monitored to determine the operational status of the mobile device and to detect if a change occurs in the operational status to determine if a person is using their device and may be distracted. As noted, as illustrated in FIGS. 7A-7E, once a new device is added, program 132 graphically illustrates the devices that are currently selected, and may show an associated enrollment code for the system user through the user interface, or once enrolled, the devices are shown as "Enrolled".

The enrolled devices are monitored and specifically the operational status of an enrolled device is monitored for detecting if a change occurs in that operational status. The change in status is reported to the monitoring application of the system 102 and the status change information may be displayed, such as in a suitable graphical interface from a client device.

Figure 13:
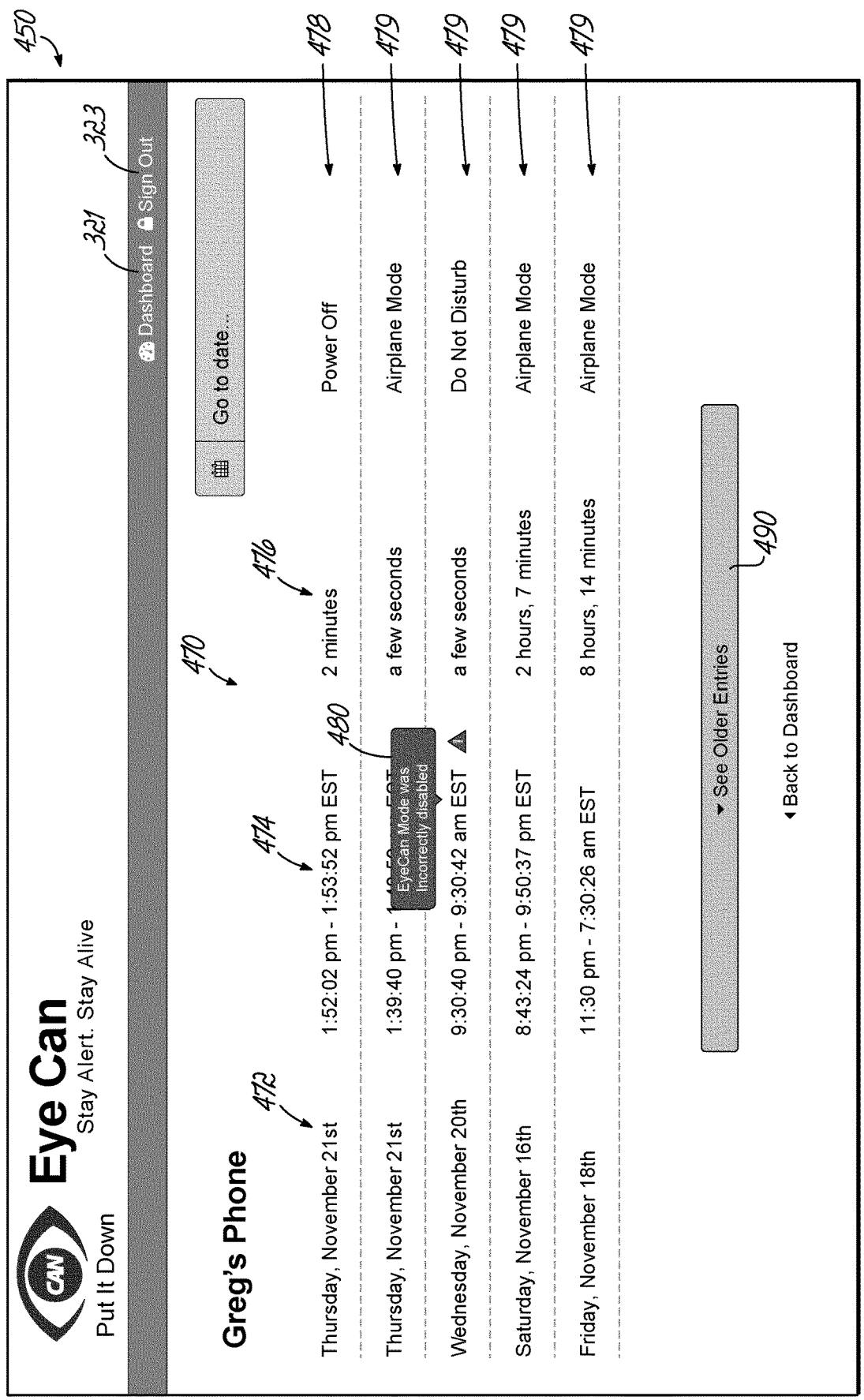
FIG. 13 is an exemplary dashboard screen reporting a device transaction, in accordance with the invention.
Figure 14:
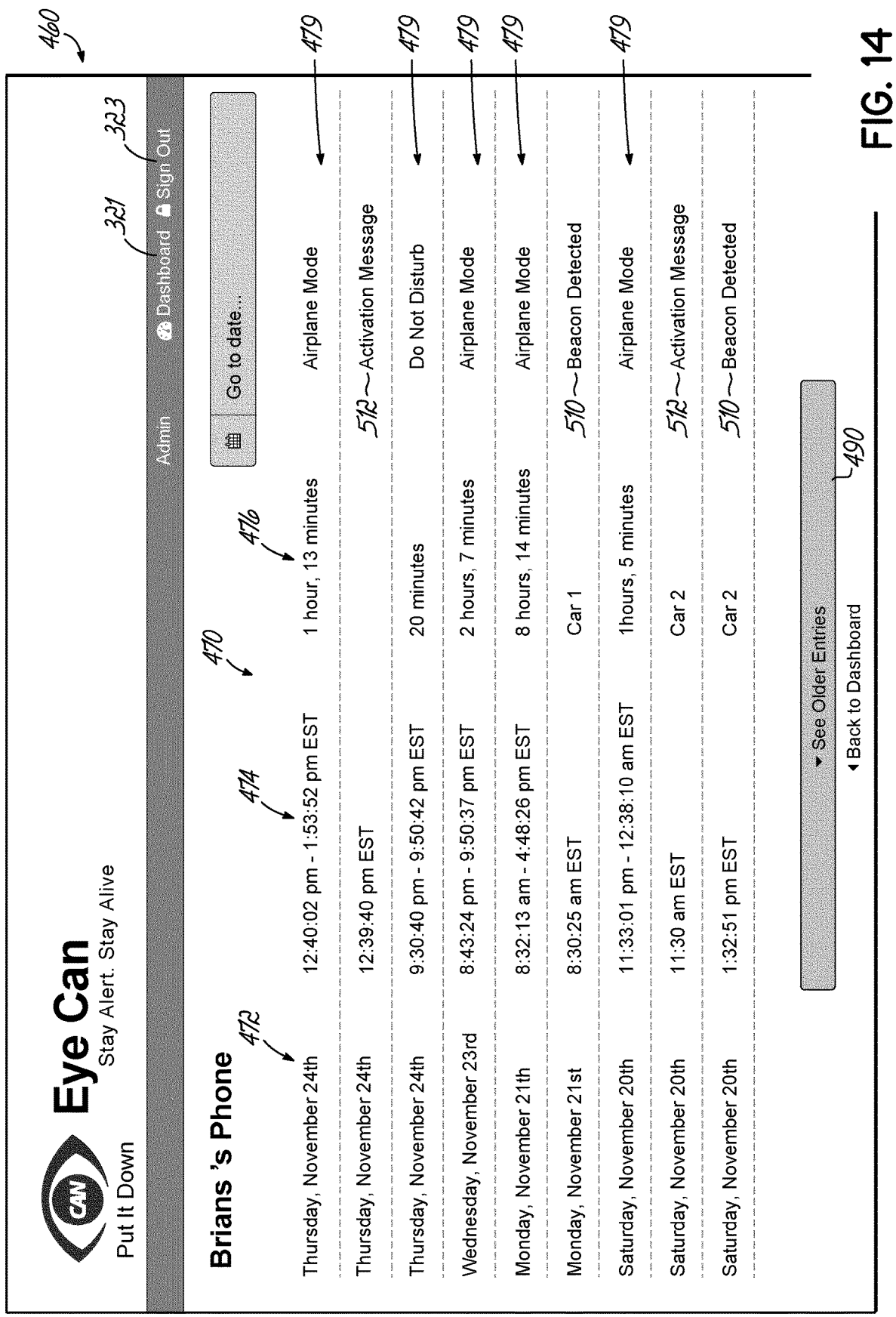
FIG. 14 is another exemplary dashboard screen reporting a device transaction, in accordance with the invention.
Figure 15:
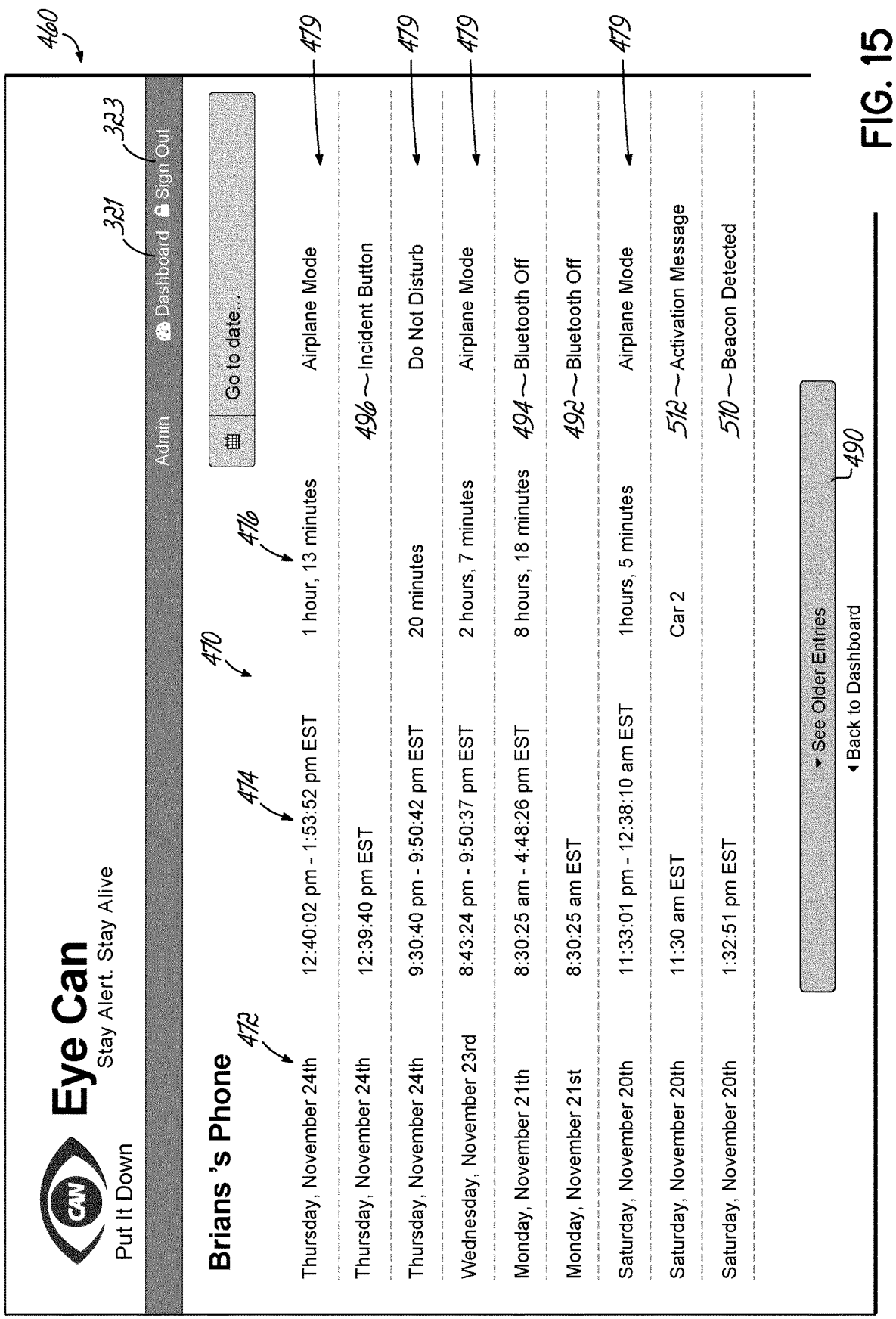
FIG. 15 is another exemplary dashboard screen reporting a device transaction, in accordance with the invention.

FIGS. 13-15 illustrate exemplary graphical screen interfaces with various dashboard entries for a device entitled "Greg's Phone", or "Brian's Phone". Such interfaces might be displayed on a client device. In an alternative embodiment, the client device used for displaying the information might be the same as the mobile device that is being monitored. That is, the graphical interface and status information might be displayed directly on the mobile device that is being monitored, as discussed below. A mobile device user could then actually check the status information of their mobile device right at the mobile device. As discussed below, the mobile device user might have different reasons to know how their status information is being reported. In still other embodiments of the invention, when the status of a device has changed, a notification message may be sent (e.g., email or text message) to a system user that had selected a mobile device to be monitored (See FIGS. 7A-7E, 18).

To activate the status monitoring application 170 and to begin the monitoring process for a mobile device, the application 170 on the device has to be opened. This may be done voluntarily at appropriate times by a device user, or might be driven by a device interaction, such as the detection of a beacon by the mobile device, as discussed herein. FIGS. 9A and 9B provide example illustrations of graphical user interface screens that may be generated by the mobile device 104 executing the status monitoring application 170 in response to a user opening the application 170. The screens might be automatically presented when a user provides a valid enrollment code, and a valid link process has occurred with the mobile device application 132 and system 102. Alternatively, in a previously-linked device, an icon on a home screen, such as icon 504, in interface touch screen 500 of FIG. 16A, might be engaged.

In the example of FIG. 9A, the graphical user interface 380 provides printed instructions on the screen to the mobile device user regarding one or more desired operational modes or states that should be entered, in accordance with starting or activating the application 170 and the monitoring features of system 102. For example, such an operational mode might be a disabled operational mode. Then, once in the desired operational mode, a change to another operational mode is detected as a change in the operational status of the mobile device. FIG. 9B illustrates another exemplary embodiment of a graphical interface 390 for activating the application 170. Specifically, the interface 380, 390 may include written instructions 382, 392 for activating and deactivating the monitoring that is provided in accordance with the invention.

For example, since it is desirable to limit device use and distractions, the appropriate disabled operational mode, such as Airplane mode as illustrated, might be entered when a device user is driving or engaging in some other activity where their attention should not be distracted by texting or some other use of the mobile device. As noted, there may be other operational modes or states with one or more disabled features or disabled communication features (Do Not Disturb, Power OFF, etc.) that might be instructed to be activated or entered according to the operation of the mobile device and the functionality that is to be disabled.

Figure 10:
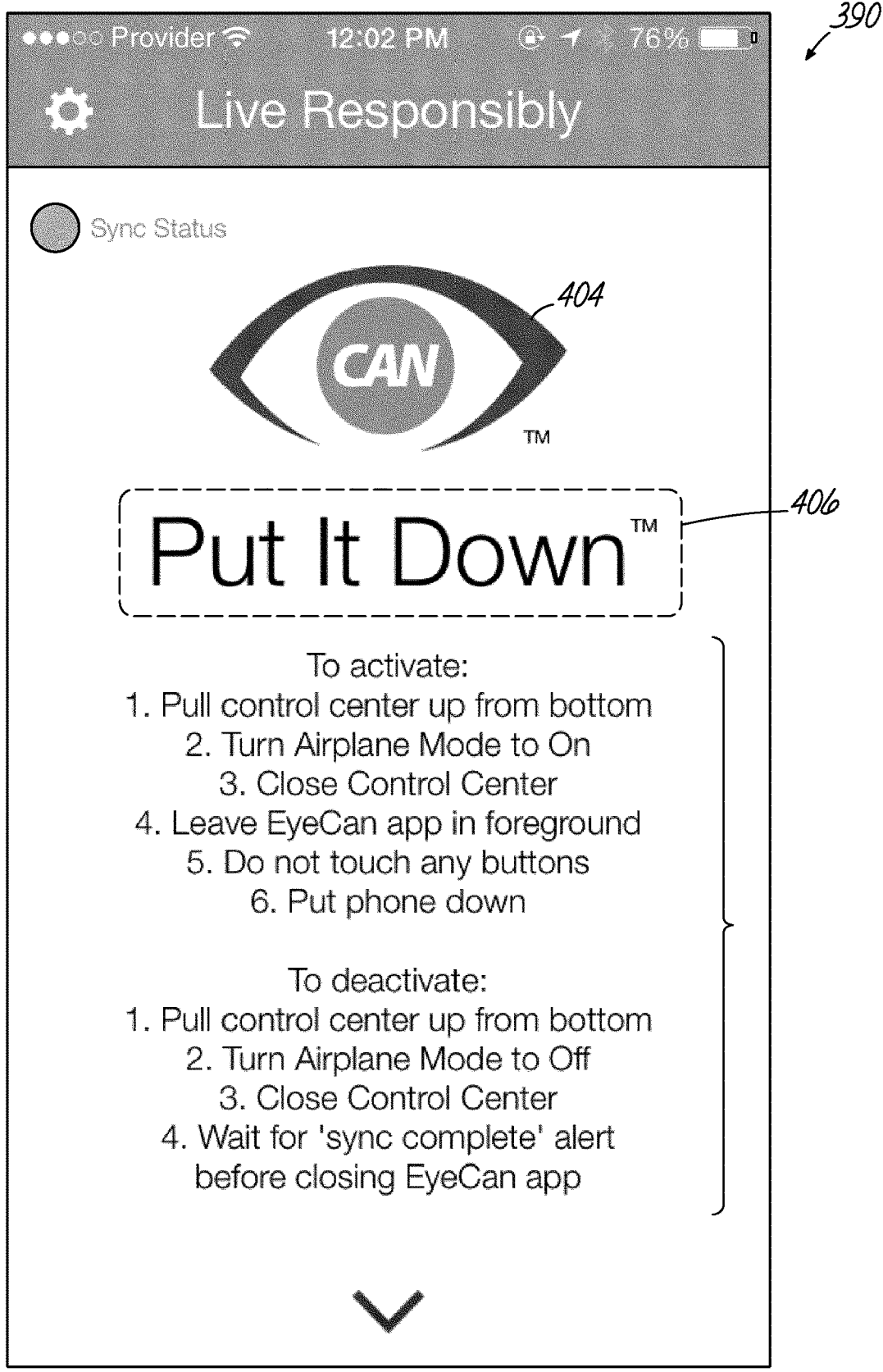
FIG. 10 is a diagrammatic view of an example graphical user interface that may be output on a display of a mobile device of FIG. 1 for engaging the mobile device, in accordance with the invention.

In another embodiment of the invention, rather than having written instructions 382, 392, or only written instructions, video instructions might be implemented. For example, as illustrated in FIG. 10, an icon 404 or 406 might be selected. The mobile device application 170 would then play or display a video (not shown) on the device screen giving a device user video instructions on how to disable the device or put it into a disabled operational mode, activate the application 170, and start the monitoring process of the invention.

Figure 11:
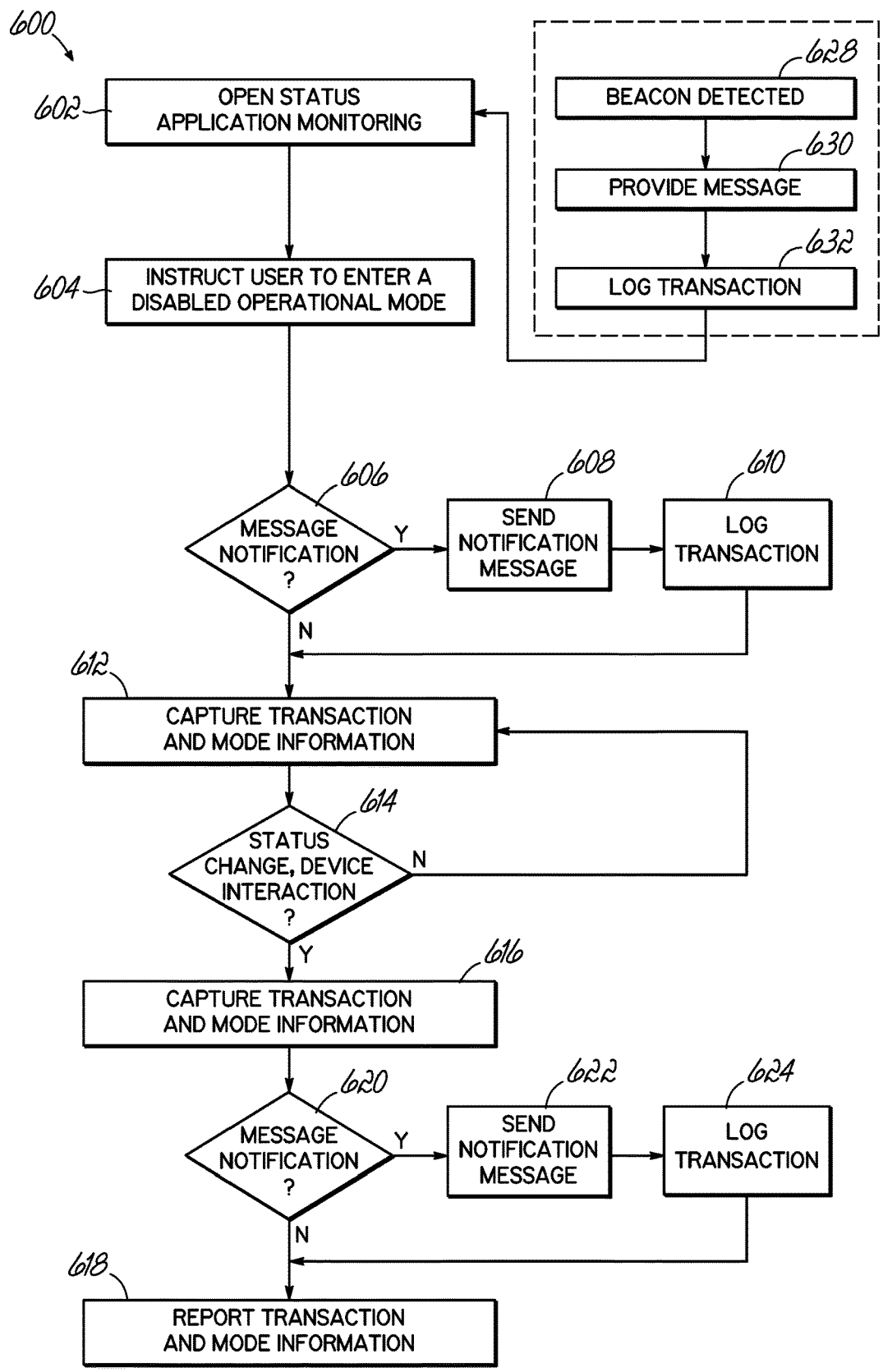
FIG. 11 is flow design illustrating a sequence of operations that may be performed by the systems and devices of FIG. 1 consistent with embodiments of the invention to monitor an operational status of one or more mobile devices.

FIG. 11 illustrates a flow diagram of one exemplary process of the invention, wherein the process 600 is initiated by opening and/or activating the status monitoring application on a mobile device 602. A device user may open the status monitoring application of the device voluntarily, or might be instructed to do so based upon the detection of a beacon 628, as noted below. Once the status monitoring application is opened on the device, the device user is instructed, by text or video, on how to further activate the application and the status monitoring process by changing the operational mode of the mobile device. Generally, a user will be instructed to enter a disabled operational mode 604, wherein one or more communication functions of the device are disabled. Again, for the example, that desired disabled operational mode might be the Airplane mode.

In one aspect of the invention, a message notification feature may be activated, and a notification message might be sent by a device user to indicate that the status monitoring application 170 has been opened, and is to be started or activated for a mobile device. As illustrated in FIGS. 7A-7E, a system user may desire the option of receiving certain email or text messages for certain transactions during monitoring of a device. Therefore, they may enter contact information (e.g., an email address) for that purpose to activate the message notification feature. Such a notification message or activation message may be automatic from system 102 or device 104, or may be optional. If selected/activated, when the application 170 is opened and a determination is made regarding whether the message notification feature is active (606), the mobile device may give the user the option of sending a message that the status monitoring application is being activated 606.

Referring to FIG. 9C, an alternative interface 390 is illustrated that provides a pop-up message field 394, asking a device user whether they wish to send an activation message or not. This will occur if message communication information (e.g., email address) had been entered for a user record (FIGS. 7A-7E). The device user can answer YES or NO. If they answered YES, the mobile device 104 communicates with system 102 to determine what messaging information is associated with the device, and the user record associated with the device. For example, system 102 and the user records 142 will indicate if the device had been selected for message notifications, and the specific destination information, such as an email address, or a mobile phone number, or other information that is associated with the device. For example, referring to the exemplary embodiment illustrated in FIGS. 7A-7E, a particular device might be associated with one or more email addresses. If a device user selects that they wish to send an activation message and answers YES appropriately in field 394, an activation message or other notification message is sent to one or more destinations (e.g., one or more email addresses) 608. FIG. 12 illustrates one exemplary embodiment of an activation message with text 396 that that might be sent in the form of an email to one or more addresses and recipients. Such an activation message provides an indication to one or more system users that the device user of the mobile device has opened the monitoring application 170, and is in the process of activating the status monitoring application 170 on their device. In the example, the message notes "activating Eyecan" as an example, but other messages, such as "activating Airplane mode" or "activating Do Not Disturb mode" might be used as well to note to a system user or other monitoring party that the mobile device user is going to activate the application. Such messaging provides a visual and real-time indication to the system user that a device user has opened the application and should then be activating the status monitoring application 170. As discussed below, when message notification features are active, a transaction associated with the notification might also be logged or captured by the device and system 102, and ultimately reported at an interface screen 450 as a transaction 610 (See FIG. 14).

Figure 9D:
Figure 9E:
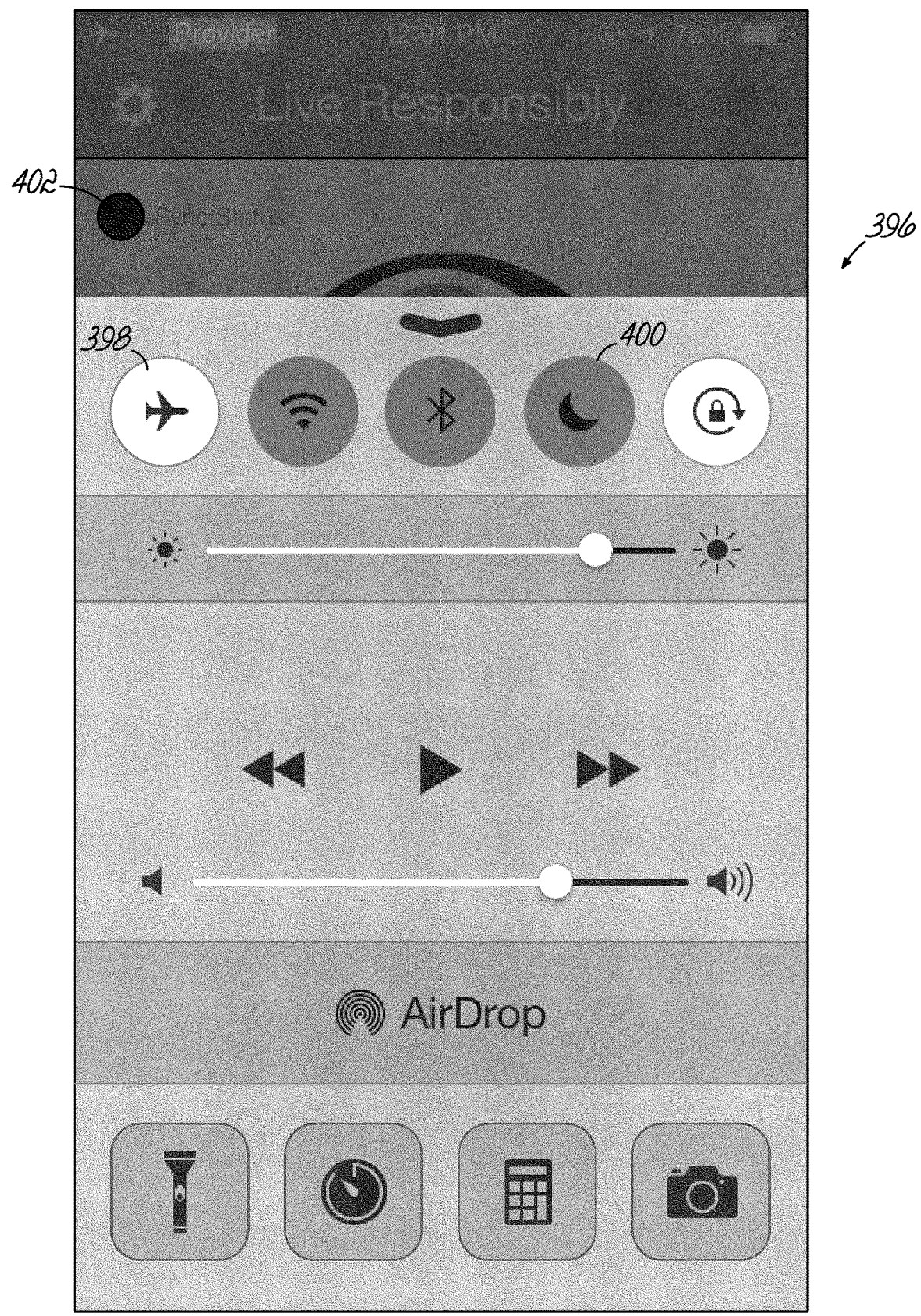

Referring to FIG. 9D, the status monitoring application can be activated by switching the device to a specific disabled operational mode, such as Airplane mode. To that end, FIG. 9D illustrates the engagement of a control center or control screen 396 in a mobile device. The control screen has various icons which allow a device user to engage certain functionality, and to chose various disabled device modes. For example, icon 398 might be engaged to put the device into an Airplane mode. Alternatively, icon 400 might be engaged to put the device into a Do Not Disturb mode. Once a particular mode has been selected, such as the Airplane mode as illustrate in FIG. 9E, the control center screen 396 may be closed, and the status monitoring application 170 is considered activated. Thereafter, changes in the operational status of the device will be reported to the monitoring application and system 102, and may be reviewed by one or more parties, such as through a client device 106. For example, if the device user leaves Airplane mode, and goes back to a normal operating mode, it will be reported.

Figure 9F:
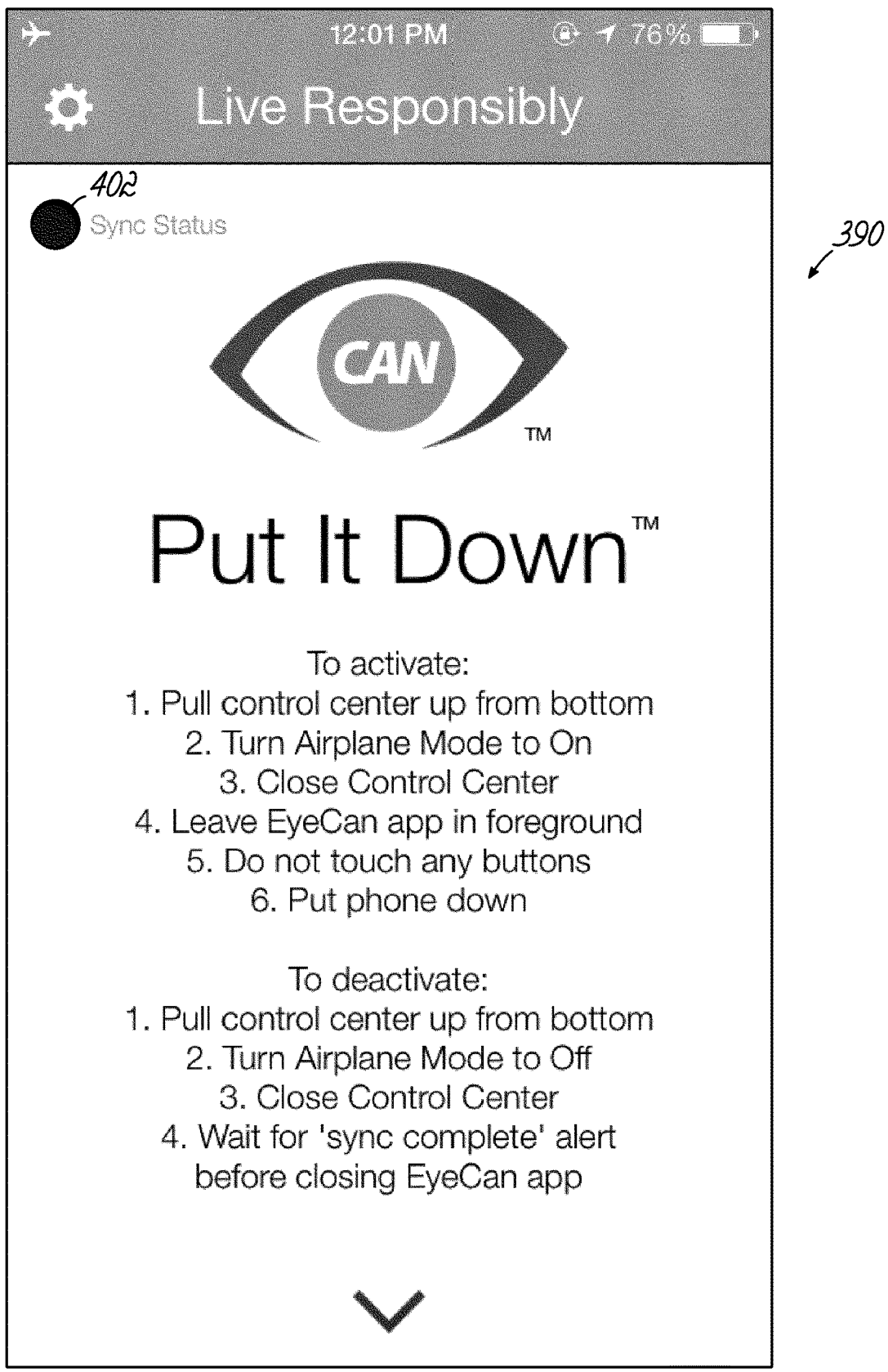

FIG. 9F illustrates a foreground screen 390 that indicates activation of the status monitoring application of the invention, and is displayed while the application is active. As noted herein, in certain embodiments of the invention, the activation screen 390, as illustrated in FIG. 9F, should remain in the foreground to indicate that the application is operating in the foreground of the device, and that certain features are disabled to prevent distraction. Screen 390 includes a display field 402 in the form of a synchronization status or "sync status". Such a sync status field 402 may change colors to indicate activation of the status monitoring application and the disabling of one or more of the communication functionalities of the device. For example, when the device is functional to communicate (e.g., not in Airplane mode), the element 402 might be one color, such as green. However, once the application has been activated and the device has been disabled in some way, element 402 may change to a different color, such as red, to indicate that the device is not able to communicate, or is not communicating, thus, stopping or significantly reducing the connectivity of the device to distractions, such as emails, texts, and/or telephone calls. Other colors might be used for different modes: For example, red for Airplane mode and yellow for Do Not Disturb mode, etc. Once the status monitoring application 170 has been activated, the device can then be put down and not used by the user, leaving the screen of FIG. 9F in the foreground.

Once the mobile device is linked to the monitoring application 132 and monitoring system 102 and the status monitoring application 170 is running on the device, and the mobile device user has switched the device to the appropriate desired operational state or mode as instructed, the mobile device is monitored. Upon initially entering a disabled device mode, time stamp and date information is captured by the status monitoring application of the mobile device. Particularly, the operational status of the mobile device is monitored to detect if and when a change occurs in that operational status, such as moving from the disabled operational mode to an enabled or normal mode. In the noted example, the device is put into a disabled mode, such as Airplane mode, as part of activating the status monitoring application. This allows a user to focus on driving or some other task without being distracted. However, the user might try to again use the device and be distracted. In the illustrated example, the status monitoring application 170 detects when the mobile device leaves or exits the disabled mode, Airplane mode, or other monitored disabled operational mode. Application 170 will then capture time stamp and date information, and report the detected change in the operational status of the mobile device from the device to the monitoring application 132 of system 102, along with other data, such as time/date information.

For example, the mobile device and application 170 captures and reports data regarding the device status that includes the particular disabled mode selected, time stamp and date stamp information of when the application was activated on the mobile device (e.g., device enters Airplane mode) and time/date information of when the application was deactivated (device exits Airplane mode). Then, through the appropriate monitor interface applications 134, 190, the system 102 receives the transaction information from the mobile device, and the reported status change may be illustrated or displayed as one or more reported transactions in an appropriate graphical interface at a client device 106, such as a computer. In that way, the overall system user, such as a parent, supervisor or some other entity, may monitor the mobile device and its use by another party or user, such as a child, or a worker under the supervision of the supervisor. The application 170 of the device captures transaction and mode data 612, and may report the initial data to system 102 before the device goes into a disabled mode. Alternatively, the data might all be reported to the system 102, when the device is again enabled (e.g., exit Airplane mode). The disabled operational mode may prevent the device from communicating with system 102.

Figure 9G:

To change the operational status of the mobile device, the device user may directly change the mode of that device. For example, once they are done with a task (e.g., driving), a user may wish to use their device again. As noted, in referring to FIG. 9G, the control center screen 396 might again be engaged to display various mode icons, such as the Airplane mode icon 398. Then, the device may be taken out of the disabled mode or Airplane mode, and the control screen 396 closed, with the device again displaying the foreground screen 390. When the device detects that the operational status or mode is changed 614, the status monitoring application of the mobile device captures additional mode and transaction data and information 616, such as the date/time stamp of when the mode change occurred, and the mode the device was in, and the mobile device then reports data to system 102, such as the time and date information regarding the change of the operational status associated with entering and exiting of Airplane mode 618. Additional messages might be sent as well indicating deactivation of the program 620, 622, and that a device user has again enabled the device to communicate. The transaction of leaving Airplane mode or the status change might be logged as well for reporting to a system user (624) See FIG. 11.

Figure 9H:
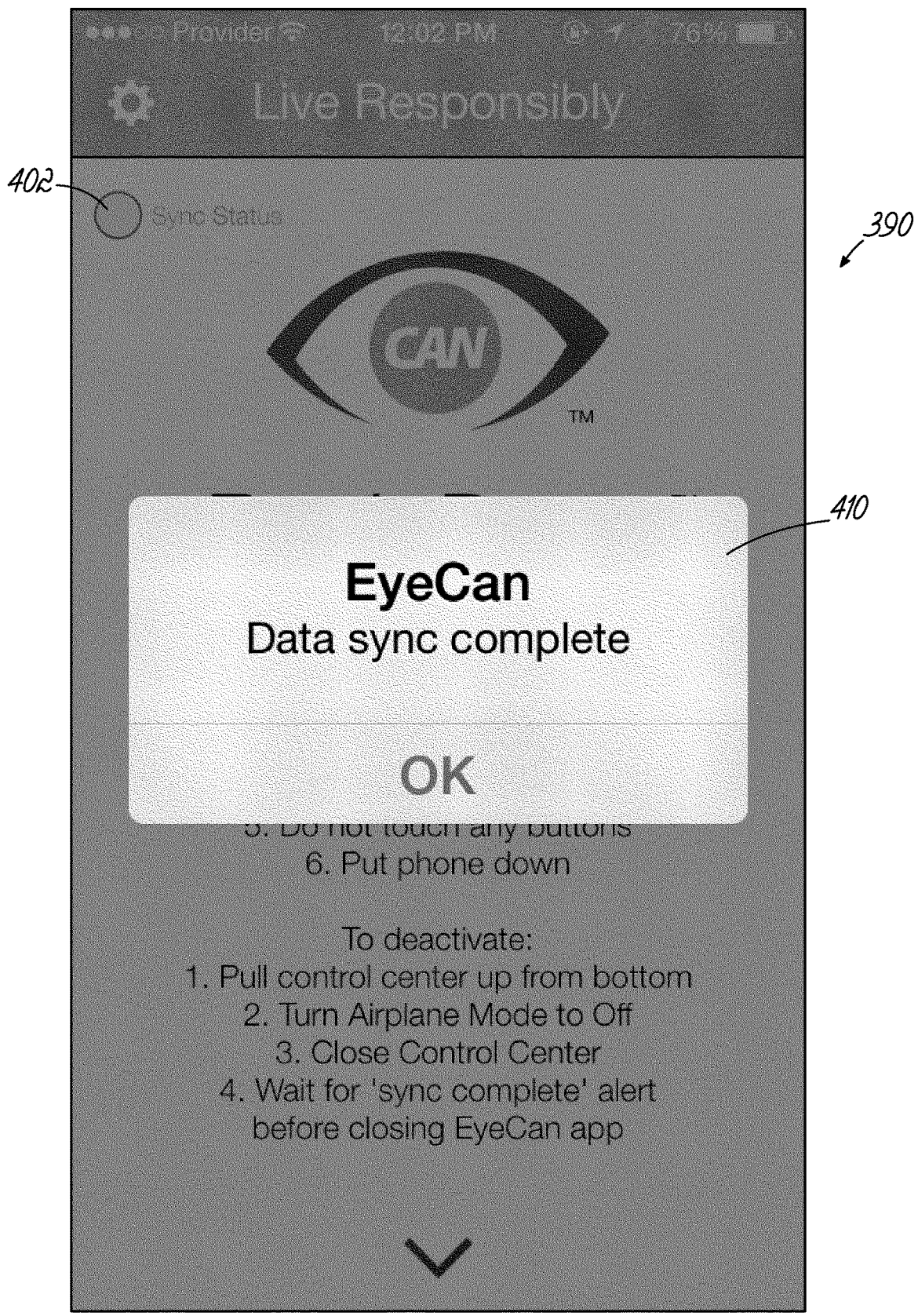

For proper exchange of information between the device and system 102, the data synchronization and communication between the mobile device and system 102 must be completed before the status monitoring application is closed, the device turned OFF, or functionality otherwise changed, which may affect the reporting of data by the mobile device to system 102. For example, in the instructions 392, as illustrated in FIG. 9B, a device user might be instructed to wait for a message from the device that the data synchronization has been completed. Referring to FIG. 9H, a pop-up screen or other field 410 might be utilized to indicate that transaction and mode information or data have been sent to the system regarding the change in the operational status of the device, in accordance with the invention. The user can then answer "OK", returning to screen 390, and the deactivated application 170 may be closed, such as by going to a home screen or to some other application of the device. The mobile device can then be used to make calls, text, email, or otherwise communicate.

Depending upon the specific operation of the mobile device and its operating system, the change in the operational status of the mobile device might be detected in various different ways. In one straightforward example, as noted above, just as a device user controls the mobile device to enter a specific desired disabled operational mode, such as Airplane mode, to activate the monitoring application, that device user might also exit that state or mode, and thus, would change the operational status directly. Such a direct change of status would then be detected at the mobile device through the status monitoring application 170 and then the data reported to system 102. However, other conditions may be monitored as well to detect a change in the operational status. That is, based upon detecting a specific action or condition at the monitored mobile device 104, the status monitoring application 170 might make a determination that the operational status at the mobile device has changed regardless of whether it actually was directly changed, such as by a user. In such scenarios, the status monitoring application or the system 102 and application 132 would make a determination that based upon the one or more other monitored conditions, the user of the mobile device is or may be seeking to bypass the purpose of the invention, and to enable certain disabled features, and thus, begin operating the device, such as to text or to make a phone call. That is, based on the other conditions at the mobile device, the user is essentially trying to change the operational status of the device, although indirectly.

For example, in one embodiment of the invention, such as where the mobile device operates according to an Android operating system, the monitoring application 170 of the device can be accessed at a home screen of a device with an icon, and then opened to run on device 104, assuming the application 170 has been downloaded on the device. After the application 170 is opened, interface screen 380 of FIG. 9A might appear to instruct a user to enter one or more disabled modes. The application 170 is activated by then entering the disabled mode and information/data is logged regarding entering the disabled mode. The program 170 monitors the status of the disabled device, and can determine or detect directly whether the operational status has been changed. That is, data is logged regarding the mobile device exiting the disabled mode. The application 170 will report the status change information to the system 102, as noted. For example, if a user is instructed to place the mobile device into an Airplane mode or some other desirable disabled mode (e.g. Power Off), to activate the invention, then once that desired mode has later exited or the device has been taken out of the particular desired operational mode (Airplane mode OFF, or Power ON), the mobile device is again enabled and the status monitoring application 170 can detect that operational status change, and will communicate or report a change in the operational status of the mobile device to the monitoring system 102. The change in the operational status might be reported from the mobile device to system 102, and then accessed by a client device 106. The change in operational status might also be reported and displayed through a graphical user interface provided by a client device 106, such as a computer or reported through a message (e.g., email or text message) (See FIGS. 13, 14, 15).

In an alternative embodiment of the invention, such as with a mobile device that operates according to an iOS operating system, such as an Apple product, the determination of a change in the operational status of the mobile device might be made in a more indirect fashion. In such systems (e.g., an iOS operating system) the status monitoring application might be opened, such as through an icon on the device home screen. An interface screen, such as 390 shown in FIG. 9B, for example, might provide instructions on how to activate the application and put the mobile device is a disabled mode (e.g., go into Airplane mode, Power OFF, etc.). Once the program is activated (device disabled), the application will monitor the mobile device for status changes. If the device is directly changed from Airplane mode or another disabled mode to then again enable functions of the device, the application will capture data and report the status change to system 102, as discussed herein. However, a user might take other steps to make a device functional again, such as not simply exiting a disabled mode, without those steps being directly detected as a direct change in the operational status. Or they may try to use the device is some other distracted way while they should not. Accordingly, the status monitoring application 170 of such a device in those various scenarios will evaluate one or more of the other activities and conditions of the device, and determine that the operational status was changed or disabled (614). These other conditions may be detected and logically processed as an operational status change, and can be reported as a change in the operational status to a system user.

For example, in typical usage of the invention, to put a device into a desired disabled state and to activate the status monitoring program, the iOS Control Center is pulled up, and the airplane icon may be engaged. Once that is done and the disabled mode selected, the iOS Control Center may be closed, or the Control Center screen closed, and the status monitoring application 170 is now activated. Generally, when activated, the status monitoring application will keep the mobile device awake at all times so that the status monitoring application remains active. Then, to directly change the operational status, the iOS Control Center screen might again be engaged, with the airplane icon tapped to disable the Airplane mode, and deactivate the status monitoring application before leaving the iOS Control Center screen (see FIGS. 9A-9H). For such a direct change in operational status, the status monitoring application will then report the change so that the operational status change might be displayed, messaged, or otherwise conveyed to the system user of the client device 106.

However, in accordance with one aspect of the invention, other conditions might also be monitored to determine and detect if the operational status of the mobile device has changed. For example, with an iOS operating system, once the desired disabled operational state or mode has been entered (e.g., Airplane mode) the mobile device user might go away from the monitoring application by engaging the "Home" button, and taking the device to a "Home" screen. That is, the user might not keep the status monitoring application and screen (FIG. 9F) in the foreground. In such a case, the status monitoring application 170 will report a change in the operational status of the mobile device.

Still further, if a mobile device user shuts down their mobile device or turns it OFF after activating the desired operational mode or state where it is being monitored, the status monitoring application may detect the event as a status change and may report a change in the operational status. However, in other embodiments of the invention, powering the device OFF is not treated or detected as a status change.

Other conditions or events that might be monitored by the status monitoring application, in accordance with embodiments of the invention, and detected as a status change, might not be permanent changes, such as turning the device OFF. Rather, the status monitoring application 170 might monitor other short-term events, conditions, or changes that extend past a time threshold. The threshold may be set appropriately to allow a mobile device user to quickly switch the device away from the active status monitoring application for a short period of time, but then quickly switch back. Generally, such a threshold would be determined so as to be a length of time that is too short for the mobile device user to take any steps that would be a distraction, such as sending a text. For example, in accordance with one embodiment of the invention, the time threshold might be five seconds.

In one embodiment of the invention, after activating the program and entering the desired disabled operational mode/state, a mobile device user might open some other application or screen, such as another application on the device. If the device user does not return to the status monitoring application and foreground screen within five seconds, the status monitoring application will detect the event as a change in the operational status of a mobile device and report it. Similarly, if the mobile device is in the desired operational state and the device user opens the Control Center for the operating system of the device, and does not return to the status monitoring application and foreground screen within five seconds, a change in the operational status will also be detected and reported. Still further, if a user opens the iOS Notification Center after they have activated the status monitoring application, goes to the desired state, and does not return to the status monitoring application and screen within five seconds, a change in operational status will also be detected and reported. As may be appreciated by a person of ordinary skill in the art, other conditions and events might also be monitored, and a determination made that an operational status change has occurred. Therefore, the present invention contemplates not only detecting a direct change in the operational status or a deactivation of the status monitoring application, but also monitors other more indirect conditions and events for detecting that a change has occurred in the operational status.

In still another embodiment of the invention, the status monitoring application and its associated screen must remain in the foreground on the user device during activation of the application. For example, at the Home screen of a device, such as a phone, an icon 504 indicative of the status monitoring application on the device might be engaged to begin the activation process for the status monitoring application (See FIG. 16A). Where the icon is engaged to open the program, an application interface screen, like that shown in FIGS. 9A and 9B, would then appear as the foreground screen of the device. The opening or foreground screen directs a device user how to activate the status monitoring application of the invention, such as by placing the device in a disabled mode. The user then engages another screen, such as a control screen of the device or a settings application of the device, to select and enter a particular disabled mode for that device to disable certain functions of the device. For example, a user might enter an Airplane mode, a Do Not Disturb mode, or may power OFF the phone to put it into the disabled operational mode. The user then returns to the status monitoring application screen. The status monitoring application then must operate in the foreground of the device, with the interface screen, as shown in FIGS. 9A and 9B displayed. If the device is turned OFF, it will have been turned OFF with the status monitoring application in the operational foreground of the device, and so the application would be considered as active. The status monitoring application then monitors the state of the device, and will detect any change in the operational status, such as a change in the state or mode of the device.

When the status monitoring application is deactivated by a mode change (e.g., back to a normal operating mode) or by powering the device back ON from an OFF mode, the status monitoring application of the device will indicate that there has been a change in the operational status, and will report that change and the operational status back to system 102. The time/date information of when the device was disabled and then enabled again will also be captured and reported to system 102. The information regarding the device transactions can then be accessed, such as with a client device, as discussed herein. When the device reports the operational status change back to the system, the type of mode selected by the device user for disabling certain features is also reported so that it might be displayed. As illustrated in FIGS. 13, 14, 15 for each operational status change transaction that is captured, logged, and reported, the type of mode might be reported. If the device is powered OFF, for example, and then powered back ON as an operational status change, one transaction might indicate that the user device was powered OFF for some period of time on a particular date. Alternatively, if the device remains powered ON, and one or more particular disabled modes are entered and exited (e.g., Airplane mode, Do Not Disturb mode, etc.), the user device might report the selected mode to the system 102 as well as the time period information of the disabled mode. The information can be graphically displayed as a transaction, and the system 102 would report the time information for how long the device was in that disabled mode (See FIGS. 13, 14, 15). The type of mode selected and time information is displayed on a suitable interface screen.

In one embodiment, the status monitoring application must remain in the operational foreground while the system is activated, and the device is in the disabled mode. Preferably, once the device is put into a disabled operational mode in accordance with the invention, the user just puts the device down then and does not use it. If a user engages a home button of the device to go to the device Home screen, the status monitoring program might report the event as a change in the operational status of the device. However, since it was not a typical change in the operational status, such as by exiting a particular disabled operational mode, the status monitoring application will report the data to the system, including the additional information as to how the status monitoring application was deactivated. As illustrated in FIG. 13, when such an event occurs, the dashboard interface will display that additional information 480, such as an error or other incorrect change in operational status or in deactivating the invention.

In one embodiment, when an error occurs in that way (improper deactivation/disabling of the application), the transaction will be considered a complete transaction and change in operational status and will be reported to the system 102 as a complete transaction, along with the error messaging. The transaction can be displayed with the additional error information 480 as illustrated in FIG. 13. If the device user then again returns to the foreground screen for continued operation, new transaction data is logged with time/date information of when the user returned to the foreground screen, and the device is disabled. This starts a new transaction. When the device user then later properly deactivates the application 170 (exits the disabled mode), that information is again logged and the second or new transaction is now a completed transaction and is reported to the system to be displayed. Therefore, with one or more errors based upon the device user improperly going away from the application foreground screen, what might normally be logged and reported as a single transaction, might be turned into multiple transactions that are logged and reported to the system.

Figure 23:
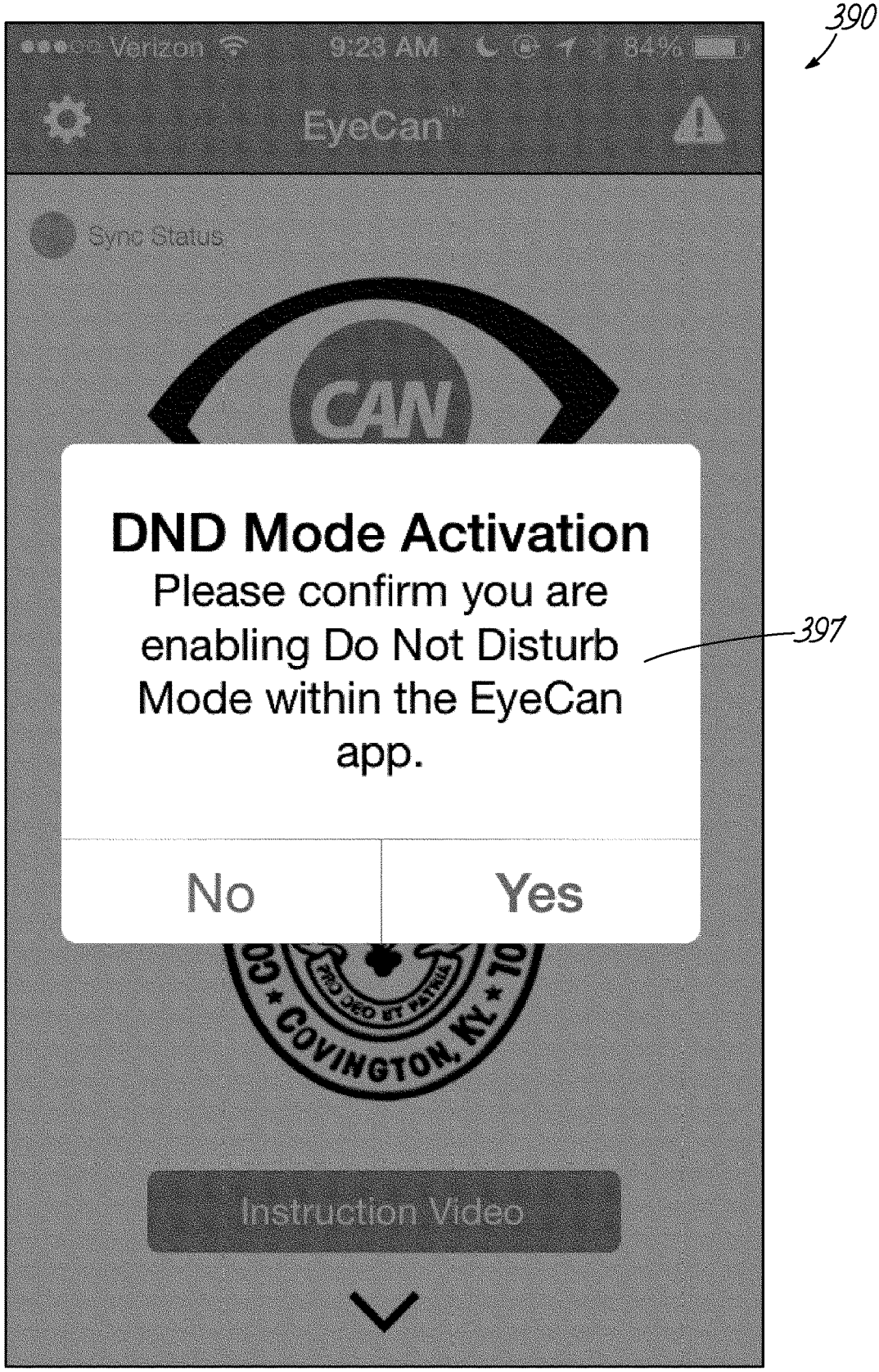
FIG. 23 is a diagrammatic view of another example graphical user interface that may be output on a display of a mobile device, in accordance with the invention.

In one embodiment of the invention, in certain disabled modes, certain communication aspects might be usable. If the device is placed in the disabled mode and then used, the use might be considered a change in the operational status, and reported as such. For example, referring to FIG. 23, if the disabled mode selected is a Do Not Disturb mode, the device user might be prompted with a message confirming that selection when the control center is closed. Interface 390 shows message 397 asking for user confirmation that Do Not Disturb mode is the selected disabled mode. In the Do Not Disturb mode, certain features are still available, such as the ability to make or receive phone calls. If a user answers an incoming call or makes a phone call while they are not to be distracted, the event will be considered a change in the operational status, and reported as such, as shown with transaction 479 and message 480 of FIG. 13. This is because the operational status change was done in some other way from the instructed or accepted way to change operational status.

Figure 24:
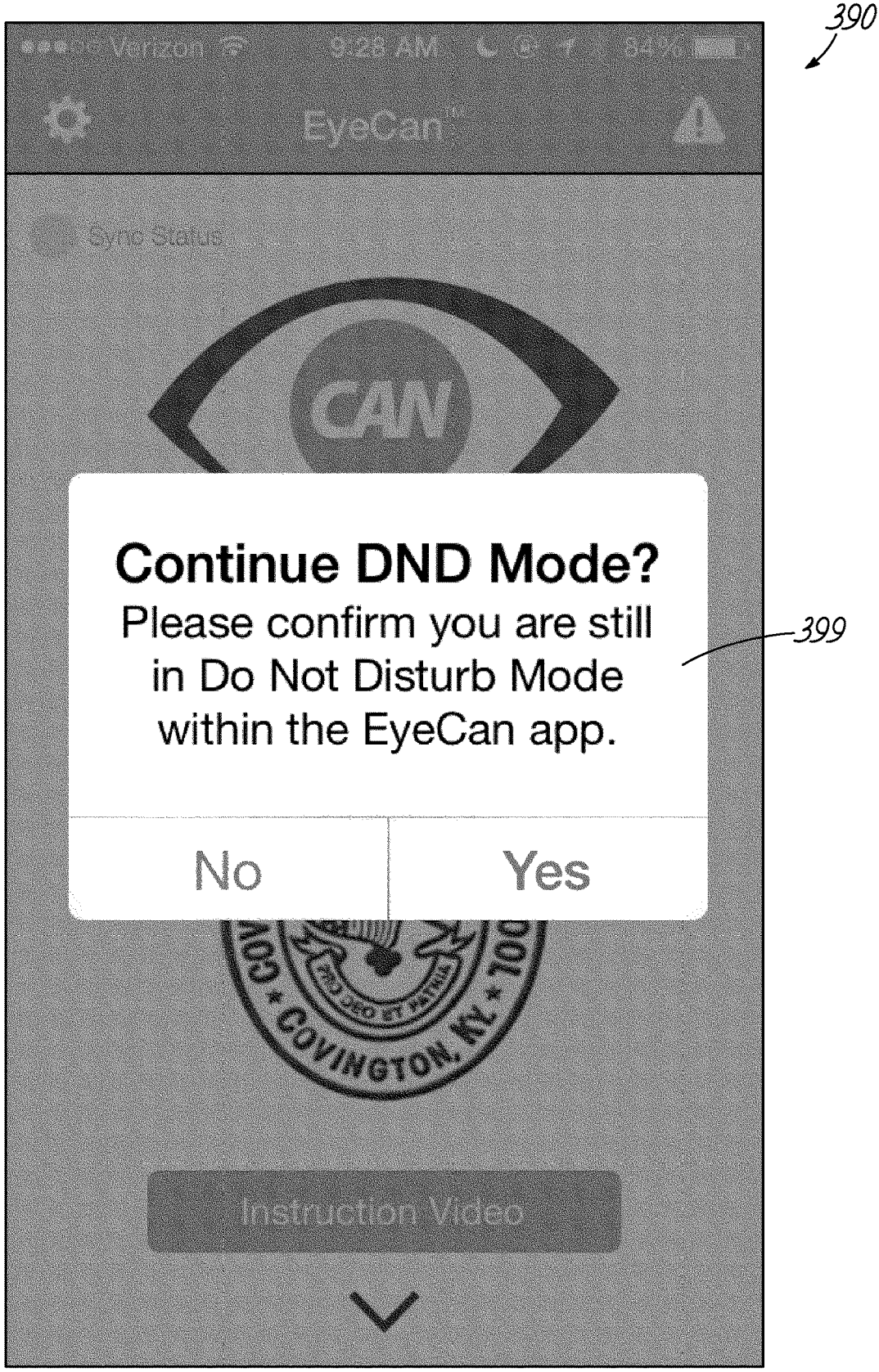
FIG. 24 is a diagrammatic view of another example graphical user interfaces that may be output on a display of a mobile device, in accordance with the invention.

When the user completes the call or some other communication and returns back to a home screen, they may still be in the Do Not Disturb mode. In such a case, monitoring might begin again, as part of a new transaction, to monitor for the next operational status change. In one embodiment, the device user might be prompted with a notification at the device to confirm that they are still to be monitored. Referring to FIG. 24, the interface 390 might provide message 399 for confirmation by the program. If the device user is still to be monitored and selects YES, the program of the invention will start a new transaction with capture of new time/date information, and will monitor for the next operational status change.

Figure 22:
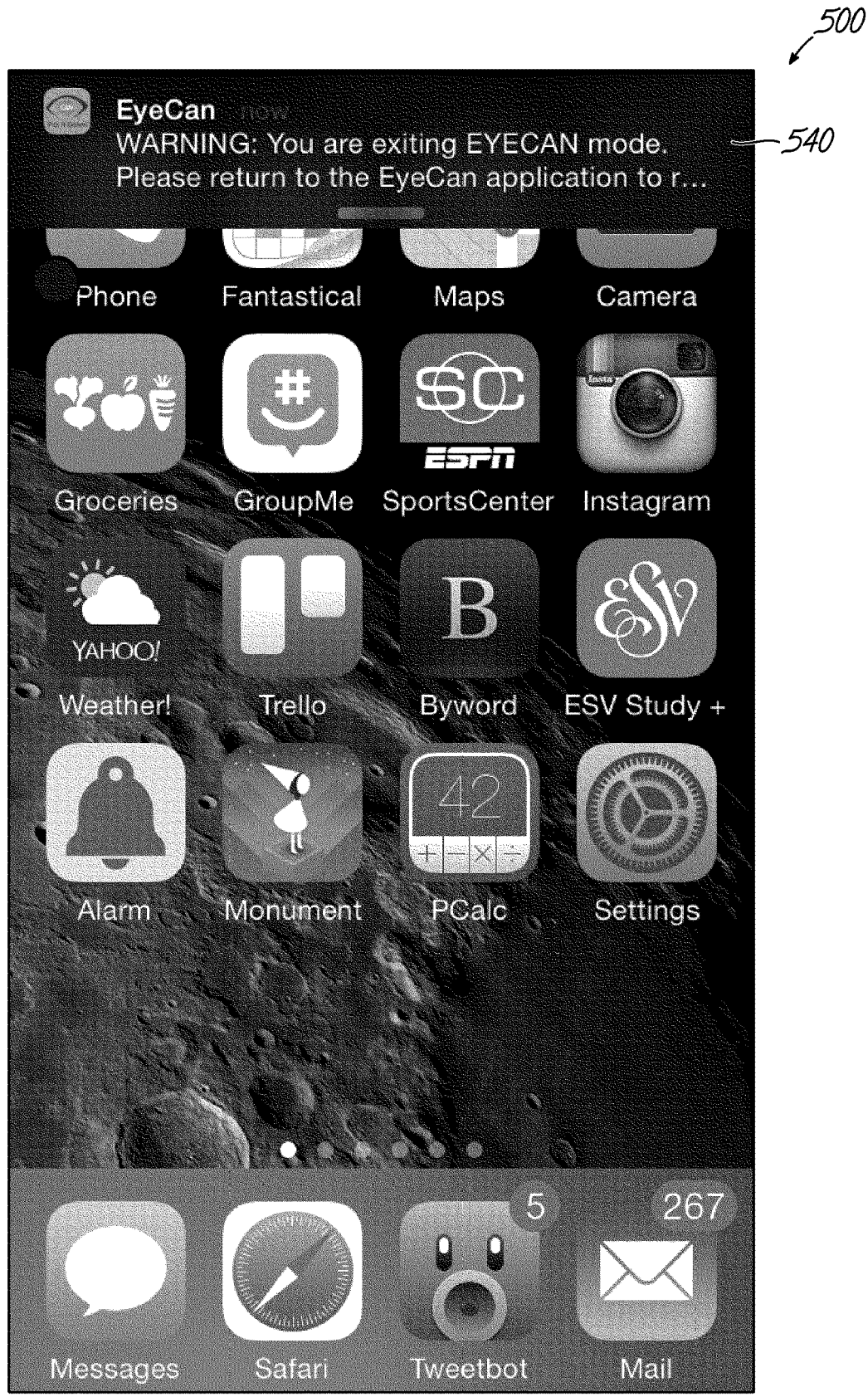
FIG. 22 is a diagrammatic view of an example graphical user interface that may be output on a display of a mobile device, in accordance with the invention.

In accordance with another feature of the invention, to prevent such errors in the activation and deactivation of the application 170, in one embodiment, if the user goes away from the foreground screen or takes some other action (e.g., going to some other application or screen) that would have the application 170 indicate an error, a message is displayed at the mobile device to warn the device user. For example, referring to FIG. 22, when a user takes the device to a screen such as screen 500 with various icons for other applications (e.g., a Home screen), then a warning message 540 may be immediately displayed that warns the device user that they are improperly leaving or exiting the application and should return to that application (i.e., return to the foreground screen and application 170). If the device user returns back to the foreground screen and application before a certain amount of time would elapse, such as a 5 second delay, then the application will proceed as usual and would not be reported as an error as noted herein.

In accordance with another feature of the invention, the mobile device might be put to SLEEP without affecting the operation of the status monitoring application 170. For example, to preserve battery life, the device can have the application 170 activated with the foreground screen displayed, the device placed in a disabled mode, and the device then put to SLEEP. The application will continue to function when the device is awoken from the SLEEP mode, the application 170 will still be activated and monitoring for a change in operational status. Therefore, battery life might be preserved without affecting the invention.

In accordance with another embodiment of the invention, the system 10 of the invention incorporates one or more beacons 220, 222, 224 positioned in different locations to remind a user not to be distracted, and also to allow the system to determine when a mobile device user is in a location or performing a task such that they should not be using a mobile device or otherwise distracted by such a device. The beacons, as shown in FIG. 1, communicate beacon signals to the mobile devices 104. Specifically, referring to FIG. 17, one or more mobile devices 104 are illustrated in the vicinity of one or more indicator beacons 220, 222, 224. Such indicator beacons are installed at various locations so as to indicate to the mobile device 104 and to system 102 that the mobile device user is currently engaged, or is about to be engaged in, a task, that requires their attention, and from which they should not be distracted. For example, beacon 220 as indicated is located within a vehicle 230 that may be driven by the user of the mobile device 104. The device user should not be distracted while driving. Alternatively, beacon 224 might be located in a building 232, such as a hospital, for example, where the user of the mobile device might be engaged in an important task, such as performing surgery, or otherwise providing healthcare to a patient. Again, the device user should not be distracted. Still further, beacon 222 might be located in some other location, or inside a mobile piece of equipment (e.g., construction equipment), where the user must be focused in their task, and not distracted. As may be appreciated, beacons such as 220, 222, and 224 might be implemented in a variety of different buildings, vehicles, or other locations, as appropriate, to indicate to a user that they should disable their mobile device and indicate to the system that the user of a mobile device is within proximity to a building, vehicle, or location, wherein they should not be distracted by their mobile device.

As illustrated in FIGS. 7A-7E and discussed herein, when a mobile device is registered with the system in order to be monitored, certain beacons can be added to the user record to be associated with that mobile device and/or the user of the mobile device. When the mobile device encounters one or more of the registered beacons 220, 222, 224, the information is captured and processed by the device and/or provided to system 102. With the information, the user can be directed by their mobile device to put their device into a mode or state which disables certain of the communication functions of the device (a disabled operational mode/state) to eliminate or reduce the distractions associated with the device when the user is in a location or situation proximate to one of the beacons. Furthermore, when the beacons are registered with a particular device, the system is able to display and monitor the status of the device and its interaction with one or more of its registered beacons, as discussed below.

Figure 17:
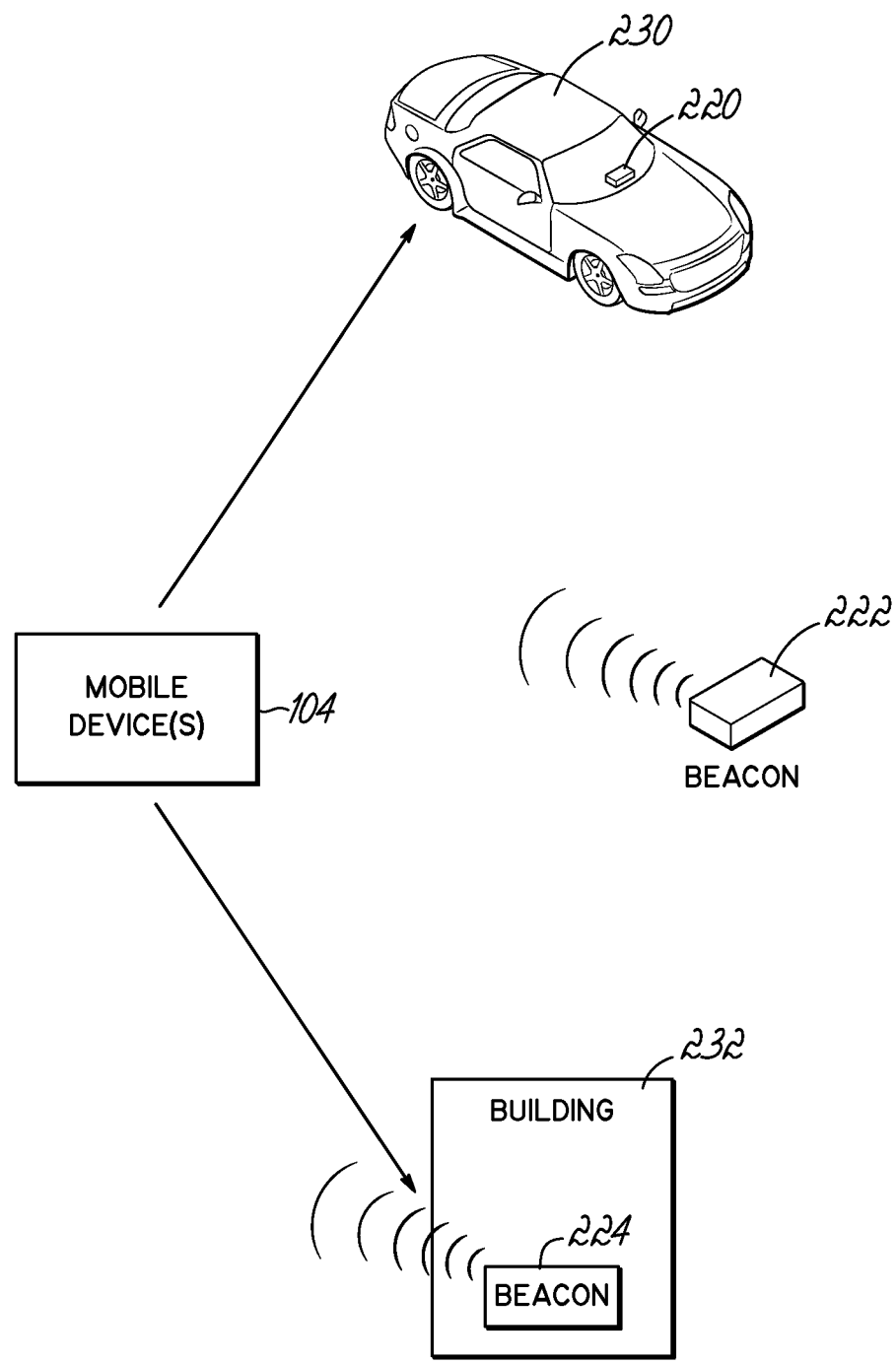
FIG. 17 is a block diagram of a portion of the system of the invention using beacon devices.

Generally, such beacons 220, 222, 224 are small devices and easily installable, such as within a vehicle or at some site in a building (See FIG. 17). They are battery-powered devices, which send out a Bluetooth® or other wireless signal which includes unique identification information, such as an identification number associated with the particular beacon. For example, one particular beacon suitable for use in the invention is a beacon device available from Estimote, Inc of New York, N.Y. The mobile device running application 170 of the invention scans for the beacon, and receives the beacon signals when in proximity to a beacon. The Bluetooth® signal, or other signal from the beacon, is processed by the status monitoring application of the device. Beacon information may also be sent to system 102. If the beacon is a registered beacon for the device and associated user record, it will be logged, and the beacon interaction displayed and reported, as discussed herein. If the beacon is not registered for the device, it will be ignored. The mobile device, having functional Bluetooth® capabilities for example, will periodically scan for beacons in close proximity to find registered beacons, in accordance with the invention. Therefore, the present invention can control when the device user is directed to disable their device.

The change in operational status and other related transaction and mode information may be accessed by a system user from system 102 using a client device 106. FIGS. 13-15 provide example illustrations of a graphical user interface screens 450, 460, or dashboard screens that may be generated by the monitoring system 102 and accessible by the system user through a client device 106 to monitor and display the detected changes in the operational status of one or more registered devices. In this example, the dashboard interface 450 includes an information field 470 that displays various different status change transactions and other related information for a mobile device (in this example "Greg's Phone") linked to a particular registered user. Referring to FIGS. 7A-7E, a system user, after registering one or more devices, might choose the Dashboard icon 321 to review status. Generally, the status monitoring application 170 of the mobile device will detect if a change occurs in the operational status of the device, such as by changing from one operational mode or state to another operational mode/state. As part of that monitoring, as noted, date and time-stamp information might also be monitored and acquired for the date and time when the change in the operational status occurs 612, 616. Such transaction information is provided to system 102, and available to one or more client devices communicating with system 102. As such, the dashboard interface 450 of FIG. 13 might illustrate the date information 472, and the time information 474 (with time zone) in the form of a dashboard transaction entry. When the application is first activated and running and the mobile device user enters the desired disabled operational state or a first state (e.g., Airplane mode), the data and time-stamp information may be captured and stored by status monitoring application 170 for the device. Then, when an operational status change occurs, such as when the device exits or leaves the disabled Airplane mode or moves to some other second mode, such as a normal operating mode, similar date and time-stamp information might be captured and stored for that event. Therefore, effectively, a start time/date and stop time/date is captured and logged for the device when it enters and exits a disabled mode that disables certain communication features or prevents some distracted usage. The time period in the desired disabled state or mode is calculated from the start and stop time endpoints. When reporting the information through dashboard interface 450, the elapsed amount of time between a start time and first state (i.e., Airplane mode ON) and a stop time or second state (i.e., Airplane mode OFF) might be determined and indicated appropriately, such as in the fields 476 shown in FIG. 13. In that way, a system user may quickly determine at a glance of an interface dashboard 450 how long, and for what period of time, the mobile device user was not using their disabled phone or other device as a distraction.

Furthermore, the status monitoring application 170 may provide additional information to system 102 regarding the change in the operational status of the mobile device so that the additional information may be reported. For example, a change in the operational status of the mobile device may occur in a number of different ways, as discussed herein. For example, a user of the mobile device may go from being in Airplane mode or Do Not Disturb mode to then directly exiting the Airplane mode or Do Not Disturb mode. Such a direct change in the operational status may be indicated appropriately as a direct mode change, as illustrated in field 479, as shown in FIG. 13. Alternatively, if the mobile device is simply turned OFF to enter a disabled mode and activate the status monitoring program, when the device is again turned back ON, that change in the operational status might also be appropriately indicated, as shown in field 478. To that end, FIG. 13 only provides an example illustration of some of the various different designations or transactions that might be reported and displayed indicating the type of change in the operational status that occurred at the mobile device for the purposes of displaying a status change in a graphical interface, as shown in FIG. 13.

As illustrated by pop-up field 480, other information captured by the status monitoring application 170 might be provided, such as an error message or the fact that the status monitoring application was incorrectly deactivated, or that the desired operational state or mode was incorrectly disabled, and thus indicated as a change in the operational status. For example, if a particular mode was exited in some way other than as directly instructed by the mobile device and status monitoring application, the noted transaction might be indicated as a status change with additional information 480 that the application was improperly disabled or deactivated (See FIG. 22). A greater or lesser amount of transaction information as that illustrated in the example of FIG. 13 might also be captured by the mobile device system and be provided in the reporting interface 450, 460. Generally, it would be desirable to provide a display of the status change transaction along with associated time and date information.

In alternative embodiments of the invention, additional information might be provided to a system user or other monitor in the form of a notification message, such as an email message or text message that the device user is activating the status monitoring application, or that a change in operational status has occurred, or that a transaction has been completed. For example, a mobile device user may have deactivated the application 170 because they are done driving or performing some particular task. As noted with respect to FIGS. 7A-7E, when a device is selected for monitoring by the status monitoring application 170, a system user may select or indicate that they wish to have a notification message sent for one or more of the particular monitored devices. The system user can also select one or more email addresses, mobile phone numbers, or other destinations for such a notification message. In the disclosed embodiment, an email address is provided, and appropriately associated with one or more of the selected devices. Multiple destinations (e.g., multiple email addresses, multiple telephone numbers, etc.) might be associated with each selected device. Alternatively, multiple devices might be associated with a message destination, such as an email address. In that way, upon a mobile device user deactivating the application 170 or changing a particular state or mode that is being monitored, a notification message may be sent to the selected message destination.

Referring to FIGS. 11 and 18, an email message is sent indicating that a mobile device user (Brian's Phone) or a particular mobile device has changed status. When a status change has occurred, the application 170 of the mobile device, in addition to reporting information 618, might also determine 620 if message notification was enabled for the system user record and device. If message notification is enabled for a device, a notification of the status change is sent as a message 622. Furthermore, as discussed below, a message transaction might also be logged 624 to then also be displayed in a dashboard interface 450, 460, when reporting information to a system user.

In the example shown, a notification might be indicated by text 370 in the email message of FIG. 18 that the mobile device or the associated user of the device is back online, or has "checked in", or, in other words, has deactivated the status monitoring application, and currently now has an enabled device after a certain period of non-use, or being "checked out". Of course, other messages might be implemented to indicate the change in status, such as "User's device now enabled". Furthermore, additional information might be provided in the email message of FIG. 18, such as the length of time that the device user or device was in a particular state or mode. Referring to FIG. 18, the additional information 372 indicates an amount of time in the disabled mode or state, similar to the information set forth in fields 474, 476 of FIG. 13. As illustrated by the email addresses, multiple email addresses or message destinations might have been indicated for the particular device, and thus, a notification message would be sent to those addresses. That can provide a system user, or other monitor, desired information, and/or peace of mind with respect to the user of the device. For example, a device user may have been traveling to a particular destination, and thus, entered into a disabled operational mode preventing distractions, such as texting and text messages, email messages, or other distractions. It would be desirable for a monitor, such as a parent or employer, to know that they arrived safely, have checked back in, and were not distracted while driving. Therefore, in addition to the information on interface dashboard 450, notification messages might be implemented for a system user, as desired for one or more devices to report the change in operational status for different devices and users.

Generally, notification messages are handled by the system 102, and may be directed out to various client devices 106, or mobile devices 104, depending upon the selected destination for the notification message. In an alternative embodiment, a mobile device 104, which is being monitored, might also send such notifications directly. For example, through the interface between the mobile devices 104 and the system 102, the necessary user record information for one or more user records 142 might be provided to one or more mobile devices 104. Such a mobile device, such as a telephone, or a pad device that has the ability to provide email messages, text messages, or other messages, might send such messages directly to the destinations that had been selected by a system user or monitor, as illustrated in FIGS. 7A-7E, when various devices are selected to be monitored. So, in addition to reporting data on the status of the mobile device 104 to the system 102, the device 104 might use the status change information directly to send notification messages.

While the graphical user interface 450 of FIG. 13 might provide a limited number of incidences or transactions associated with changes in the operational status of the mobile device, field 490 might provide the ability to see older information associated with a status change. Furthermore, the graphical user interface 450 provided by the monitoring system 102 through one or more client devices 106 might have other pages, such as other dashboards or pages (not shown), wherein all of the devices to be monitored are displayed and might be selected for viewing the status change information, as illustrated in FIG. 13. Accordingly, the present invention is not limited to only the specific graphical user interfaces shown in the figures for displaying status information.

In accordance with further features of the invention, the system implements components for notifying a mobile device user that they should activate the application, and thus, disable their mobile device from various communication aspects and functions. The beacon components may let the device users know that they are in a particular location, wherein a specific task is likely to be performed, and thus, they should not be distracted. The user is then instructed by the status monitoring application to activate the application, and thus, disable some of the functionality of the mobile device that would allow such distractions, such as phone, texting, or email features. As noted herein with respect to FIGS. 1 and 17, one or more beacon devices 220, 222, 224 might be implemented in the system. Those beacon devices are implemented in locations, such as a car, where driving should not be distracted, in a building, wherein a particular task, such as providing healthcare, is to be executed, or some other location where a mobile device user should not be distracted by their mobile device. The present invention is not limited to the areas where a beacon might be implemented. In accordance with one aspect of the invention, in referring to FIGS. 7A-7E, when different devices are registered with system 102, such as through the dashboard interface 320, one or more beacons might be designated for the registered mobile devices. System 102 then communicates the beacon information, including a label for the beacon as well as the identification information, to each of the mobile devices. The status monitoring application 170 of the mobile device is operable for scanning for particular registered beacons that might be associated with the device using Bluetooth® or other wireless technology. In that way, the mobile device reacts to only those registered beacons with which it has been associated through the system 102, and not to all beacons it may encounter.

In one implementation of the system including beacons, a beacon device might be placed in each car of a family, and given a particular label. Alternatively, a beacon device might be associated with a building, such as a hospital building, or a surgical center. As noted, the present invention is not limited to the specific locations or installations of desirable beacons. The invention will recognize one or more associated beacons, and will utilize the captured information regarding the beacon identification and the label associated with that beacon identification to inform the mobile device user, as well as a system user, that a beacon has been detected by a specific mobile device.

Figure 16A:
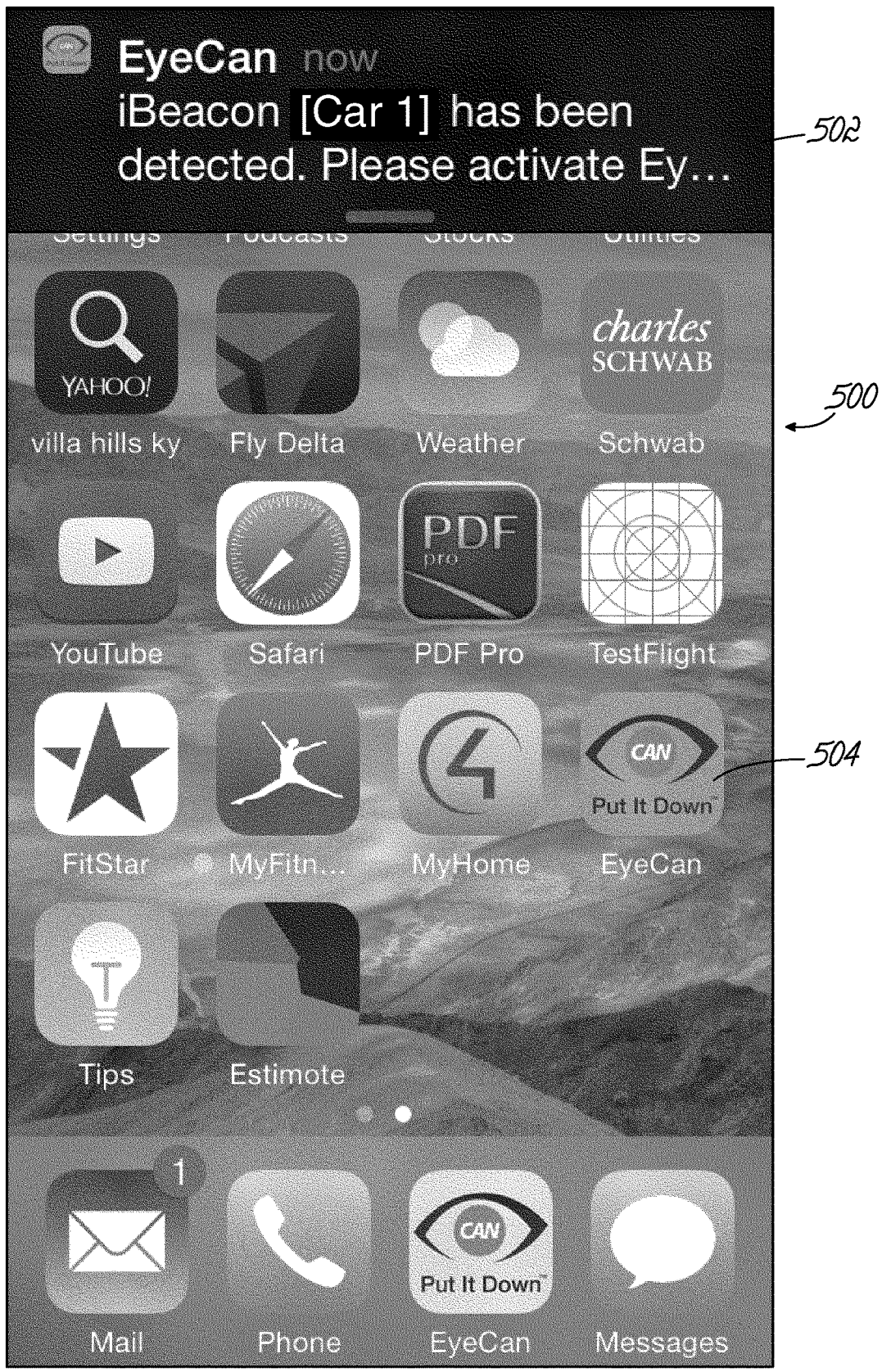
FIG. 16A is a diagrammatic view of an example graphical user interface that may be output on a display of a mobile device in accordance with the invention.
Figure 16B:
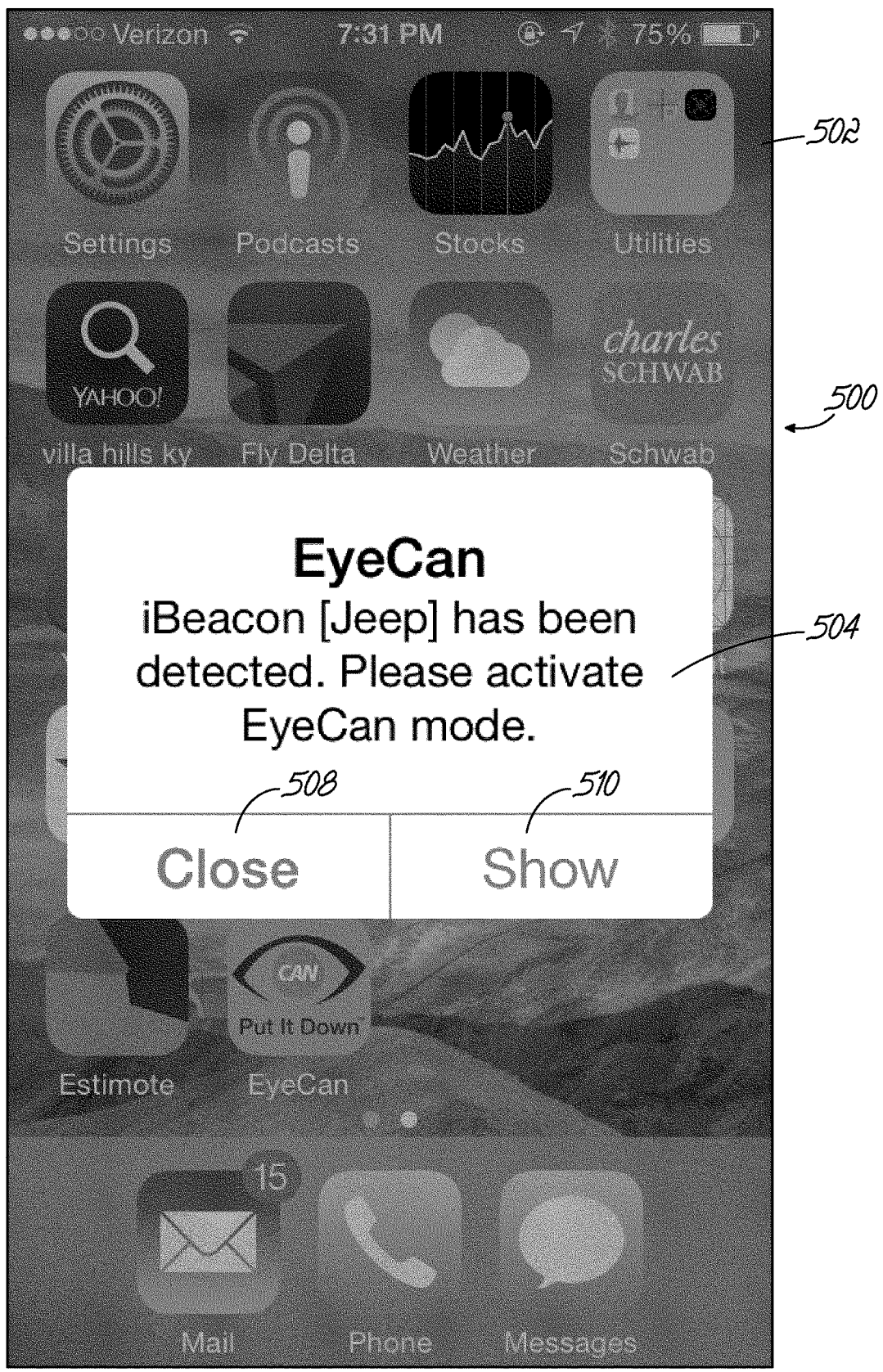
FIG. 16B is a diagrammatic view of an example graphical user interface that may be output on a display of a mobile device in accordance with the invention.

Specifically, once a mobile device detects a registered beacon, the status monitoring application provides a message or alert, such as on the screen of the mobile device, that a particular beacon has been detected. The name of the beacon is displayed. The device user will also be directed to open and activate the status monitoring application. Referring to FIGS. 16A, 16B, and 17, when a beacon is detected 628, a mobile device screen 500 will display a message 502, such as on a separate pop-up screen, that a beacon has been detected 630. For example, in FIG. 16A, a beacon associated with a car, such as a CAR 1, is indicated by message 502 as having been detected. The message 502 further instructs the mobile device user to activate the status monitoring application 602 on the mobile device. For example, the activation might be done by engaging icon 504 on the screen to open the application, and then putting the device into the disabled Airplane mode. The message might remain on the screen for some time to be seen by a device user, and then may time out and disappear. Generally, a beacon that is part of the system, and is registered and associated with one or more mobile devices, is provided in a location that coincides with a task to be performed. As noted, if the location is within a car, generally, the task to be performed is driving. The present invention thus discourages inappropriate use of the mobile device while the mobile device user is driving. In another example, if a beacon device is located in a hospital, the message 502 from the mobile device will instruct a mobile device user, such as a doctor or other caregiver, to activate the status monitoring application, and thus, disable certain functional features of their phone. With such a beacon device, the invention thus, discourages the caregiver from being distracted by their mobile device while they are providing care to a patient. Various other distraction scenarios might also be addressed by the implementation of a beacon device in accordance with the invention.

FIG. 16B illustrates another message 506 associated with the detection of a beacon. Message 506 is in the form of a pop-up screen that advises a beacon has been detected, and has selectable fields 508, 510. Rather than disappearing automatically like the message 502 in FIG. 16A, the message 506 might remain on the screen until it is closed, such as by engaging field 508. Alternatively, if message 506 is provided, in addition to instructing the device user to activate the status monitoring application, the application might actually be activated by engaging field 510, which would then open the application 602, and take a device user to the application screen, such as those shown in FIGS. 9A-9C. Therefore, the user would not have to otherwise open the status monitoring application, such as through an icon 504, but it would be opened automatically from the message displayed.

In accordance with another aspect of the invention, the dashboard interface 460 might report to a system user other related transaction or device interaction information, such as that a notification is sent, or that an interaction with the beacon has occurred for a particular mobile device. As such, an engagement with the beacon by the mobile device is captured or logged as transaction data 632, and may be communicated or reported from the mobile device to system 102. The logged beacon information can be accessed, such as through a dashboard interface accessed through a client device 106. The system 102 might display a transaction message for a particular beacon. Referring to FIG. 14, the dashboard interface 460 illustrates a number of different system transactions indicating that a mobile device was disabled in some way, in accordance with the invention. In addition to a conventional displayed transaction 479 indicating the particular disabling mode that was entered and exited, such as Airplane mode, and the date and time information of a typical transaction, other logged transactions might indicate other related information, such that the mobile device has detected a beacon. Still another displayed logged transaction might be an activation message that the user has opened the application 170, and is getting ready to activate it (See FIG. 11, 610), as noted above. Different combinations of captured or logged transactions or interactions are displayed, depending upon how the device user actually activated application 170 to monitor a device.

As illustrated by the transactions 510, when a beacon is detected, the logged transaction information is displayed as a transaction, including the date and time information associated with the beacon detection, as well as the label associated with a specific beacon that has been detected. FIG. 14 illustrates the detection of beacons associated with cars (e.g., CAR 1, CAR 2, etc.). Generally, upon detection of a beacon, the mobile device user is instructed to activate the status monitoring application (FIGS. 16A, 16B). Once that application is activated, the mobile device will be disabled to some extent, and the device user will not be distracted.

Referring again to FIG. 14, if the notification feature has been selected for the particular device, such as by registering one or more email devices, phone numbers, or other contact information, as illustrated in FIGS. 7A-7E, an activation message, as shown in FIG. 11, might be sent and might be reported and displayed as a transaction in the dashboard interface 460. Specifically, as illustrated in FIG. 14, transaction messages 512 indicate that an activation message was sent, and that the device user has opened the application on the device. As illustrated in FIG. 9C, if the device user indicates YES to send an activation message, in addition to sending the actual message, such as by email, as illustrated in FIG. 11, the messages transaction is logged, and the transaction 512 is also reported in a dashboard interface 450, 460, as seen in FIG. 14. The transaction 512 for the activation message indicates the date and time of the activation message being sent (See FIG. 12).

Similarly, when a user deactivates the status monitoring application and a notification message is sent as in FIG. 18, that message transaction might also be logged for the device (See 624, FIG. 11), and the logged transaction might also be displayed by the system in a dashboard interface similar to transaction 512. However, since the deactivation of the program (i.e., device again enabled) will generally result in a complete transaction that is separately displayed as an operational status transaction 479, such a deactivate or "checked-in" transaction might not be reported or separately displayed in an interface 450, 460 for a client device, but may only be part of a separate notification message (FIG. 18).

As may be appreciated, depending on uses of beacons, different transaction combinations may exist and be displayed. In accordance with another aspect of the invention as illustrated in FIG. 14, a system user who is monitoring one or more devices can track the various transactions in the interface dashboard 460, and determine how the mobile device is being used and/or disabled. For example, referring to the "Saturday" entries of FIG. 14, when a beacon has been detected, the device user is instructed to activate the status monitoring application for the mobile device (see FIGS. 16A, 16B). That beacon detection creates a message (FIGS. 16A, 16B), and is also displayed as a logged transaction 510 (See FIG. 14). When the mobile device user then goes to open the status monitoring application, pursuant to the beacon detection, they are given the chance to send or not to send an activation message per FIG. 9C. If they do choose an activation message, that activation message is sent (FIG. 12), and the logged transaction 512, then is reported and follows, in time, the displayed beacon detection transaction 510. Finally, when the mobile device user activates the status monitoring program, such as by placing the mobile device in Airplane mode, some other mode, or powering the device OFF, the mobile device captures appropriate date, time, and mode information to system 102 for the purposes of monitoring the mobile device. When status monitoring application has been activated, certain functionality of the mobile device is disabled, and the device user is not distracted. When the device user deactivates the status monitoring application and completes the operational status transaction, the appropriate date, time, and mode information is again captured, and the complete transaction and mode information is sent from the device to the system 102. The system processes the information and provides a display of the transaction 479 at an appropriate dashboard interface 450, 460. The transaction 479 in FIG. 14 follows the beacon transaction 510 and activation transaction 512.

Therefore, one sequence of displayed transactions will be indicated as beacon detected 510, activation message 512, and then completed Airplane mode transaction 479. As may be appreciated, other combinations are possible. For example, for the Monday transactions in FIG. 14, a beacon might be detected 510, but then no activation message sent prior to a device user activating the status monitoring program (e.g., NO in FIG. 9C). Then, the next displayed transaction is the completed Airplane mode transaction 479.

Still further, as indicated by the Wednesday and Thursday transactions in FIG. 14, the completed transactions (e.g., Airplane mode, Do Not Disturb) might be completed by a device user without being prompted by a beacon, and also without sending any sort of activation message. In the transactions of Thursday in FIG. 14, a user might open the status monitoring application, send an activation message 512, and then complete the transaction using Airplane mode 479. Therefore, various different transactions might be displayed in the interfaces 450, 460.

The information provided in the dashboard interfaces 450, 460 can be interpreted by a system user to determine how a mobile device is being used. For example, if a beacon has been detected, the system user would normally expect a completed transaction 479 to follow shortly thereafter if a device user did as instructed, and disabled their device. Similarly, if an activation message transaction 512 is displayed, the system user might also expect a completed transaction 479 to follow in a related time frame.

Therefore, a system user can see that a beacon was detected, and that the user responded by going to activate the status monitoring program on the mobile device. Furthermore, following the activation message transaction 512, the system user can also see that the device was disabled according to some selected disabled mode for a period of time following the detection of the beacon. As may be appreciated, the status monitoring application on the mobile device does not have to be activated pursuant to detecting a beacon, but can be activated at any time the user decides. Accordingly, there may be certain transactions 479 on the dashboard interface 460 that are not preceded by a beacon detection transaction 510. Similarly, if the user opens the foreground screen of the application, as illustrated in FIGS. 9A, 9B, but chooses not to send an activation message, no activation message transaction 512 will precede the transaction 479. Accordingly, various different combinations of transactions may be reported on dashboard interface 460 depending upon how the mobile device is implemented and how the status monitoring application is activated and deactivated.

In order for the beacon features of the invention to be used, the application is configured to detect if wireless connectivity is turned off in accordance with another aspect of the invention. More specifically, for Bluetooth® connectivity, in one example, the status monitoring application 170 can detect when the Bluetooth® functionality of the mobile device 104 has been turned off. As may be appreciated, because the system 10 may rely upon one or more beacons 220 which are detected utilizing a wireless standard, such as Bluetooth®, it is important to inform a system user, parent, or other supervisor that a user may have turned off the Bluetooth® functionality or other wireless functionality of their mobile device.

Accordingly, the application 170, in the illustrated example, once it has been downloaded onto the mobile device and opened at least once, will periodically run a check on the mobile device for the Bluetooth® functionality. The application 170 logs the appropriate data associated with the Bluetooth® settings of the mobile device. If the application 170 detects that the Bluetooth® functionality is turned OFF, the application will capture information associated with the date and time of that detection. The application will log the date and time information as one end point of transaction data and will report the date/time information to monitoring system 102. The logged Bluetooth® data can then be reported as a transaction, such as in a dashboard interface, as illustrated in FIGS. 13 and 14. The application 170 might operate to periodically have a device interaction (FIG. 11, 614) to determine if there is a Bluetooth® transaction or some other transaction to report.

More specifically, referring to FIG. 15, a dashboard interface 470 is shown having reported transactions or interactions associated with the Bluetooth® detection features of the invention. Specifically, if the application 170 has a device interaction and detects that the Bluetooth® functionality is turned OFF, it will report the logged data as illustrated in transaction 492 with a "Bluetooth Off" message, along with the date/time information that was logged by the application. In that way, a system user will see that the beacon feature of the invention may not be implemented because the mobile device user cannot detect one or more registered beacons. They might then inform the mobile device user to turn the Bluetooth® functionality back on, such as with a message on the device (See FIGS. 16A, 16B, for example). Additionally, in accordance with another feature of the invention, a message informs the mobile device user that the Bluetooth® functionality is OFF and that it should be turned on, such as to use the beacon features of the invention. For example, referring to FIGS. 16A-16B, a specific message (not shown) might be displayed on the device interface screen noting "You have turned OFF Bluetooth®, please turn Bluetooth® ON to enable full functionality of the application". The message might be temporary or may be in the form that requires action by the user to respond and make it disappear from the screen.

The application 170 will continue to monitor the Bluetooth® functionality for the purpose of verifying that the Bluetooth® functionality has been restored. Once the Bluetooth® functionality is restored or turned ON and once the application 170 logs information regarding the mobile device having that functionality turned back on, the application then reports the logged information as a completed transaction, as illustrated by reference numeral 494 in FIG. 15. As noted, the reported transaction 494 notes "Bluetooth Off" and sets forth suitable time/date information regarding the transaction to illustrate that Bluetooth® is back on, and how long the Bluetooth® functionality may have been turned off.

Therefore, the status monitoring application of the invention detects if the Bluetooth functionality had been turned off and alerts a system user to such information 492. The application 170 continues to scan or detect that feature for the mobile device, and also reports when the Bluetooth® functionality is turned back on or otherwise restored so that the beacon devices of the invention may be detected. The length of time that the functionality was off is reported as well 494.

In accordance with another feature of the invention, if the application 170 detects that the Bluetooth® functionality is off, it will record the time/date information and report the transaction, as illustrated 492 in FIG. 15. While the application 170 continues to monitor or poll the mobile device to determine if Bluetooth® functionality has been restored, until that functionality is restored, it will only report the single OFF transaction 492, even though it is detecting that the Bluetooth functionality is still off. In that way, the dashboard interface 470, as illustrated in FIG. 15, is not overloaded with (Bluetooth "OFF" transactions). Once Bluetooth® is restored, a completed transaction 494 is reported.

In accordance with another feature of the invention, status monitoring application 170 on the mobile device 104 allows the mobile device user to record an incident that occurs during use of the invention, such as an emergency incident. The incident is recorded so that it might be reported as a transaction to a system user. One particular use might be to provide an indication that something out of the ordinary has occurred, such as an accident, and thus a mobile device user will be deactivating the status monitoring application 170 and again restoring communication connectivity to the mobile device. For example, since the invention is particularly useful to prevent distracted driving, it may occur that a mobile device user is involved in an accident. As such, the user may want to use their phone to make one or more phone calls, such as an emergency 911 call or a call to a parent.

Figure 21:
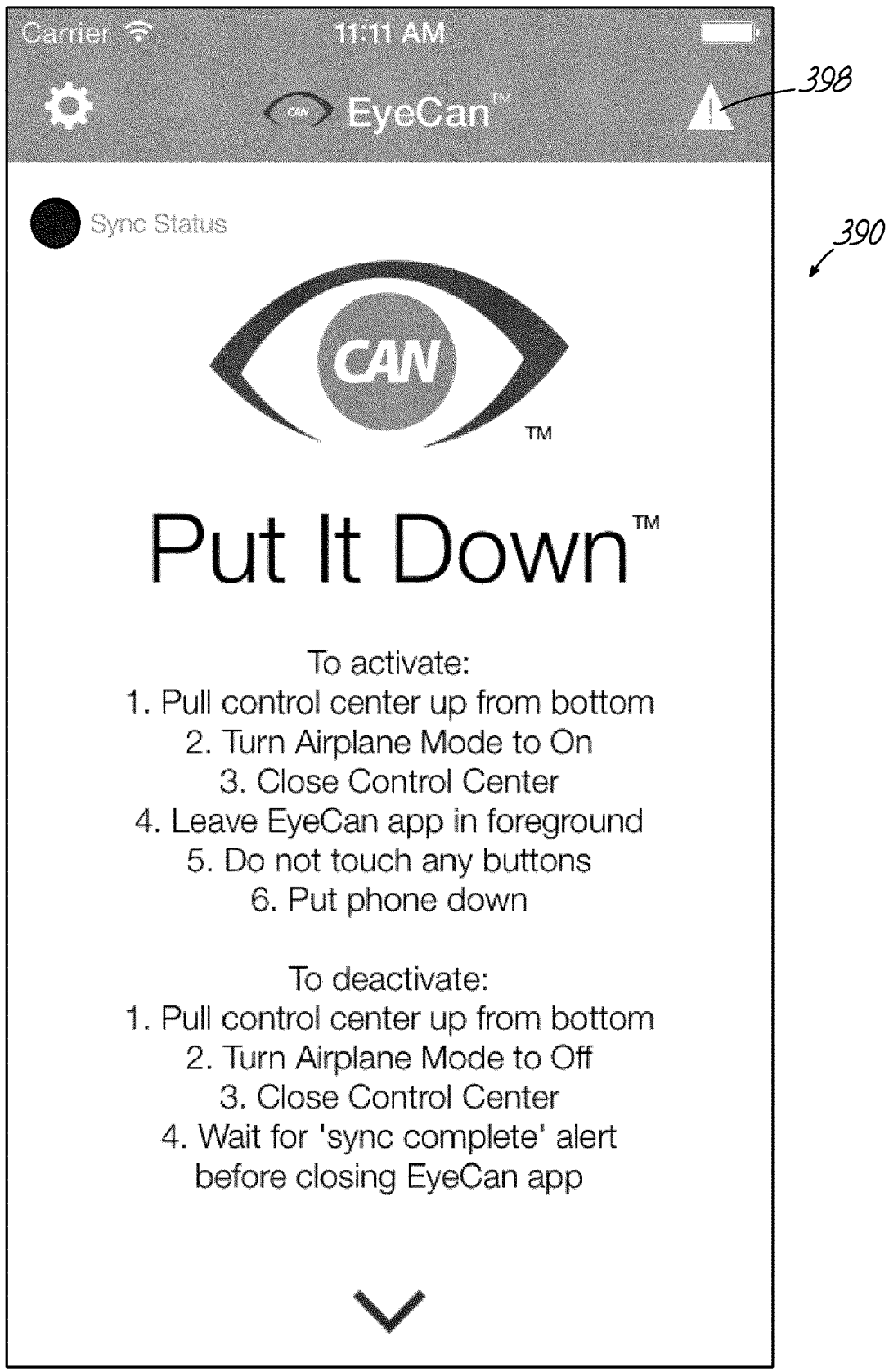
FIG. 21 is a diagrammatic view of another example graphical user interface that may be output on a display of a mobile device of FIG. 1, in accordance with the invention.

As illustrated in FIG. 21, the mobile device interface screen 390 might provide an incident icon or field 398 on the touch screen (incident button). That incident button 398 may be engaged by the mobile device user when they are using the invention and have an activated application that is monitoring the device for an operational status change. Once the button 398 is engaged, the application 170 captures time/date information regarding the incident and the engagement of the button. Such information is logged as transaction data for the incident.

Referring again to FIG. 15, the "incident" transaction may also be reported, such as in the dashboard interface 470. When the incident transaction data is logged, it will be reported to system 102 once the communication connectivity is restored, such as upon deactivating the status monitoring application 170 and again enabling communication functions of the mobile device. As discussed herein, upon deactivating the application 170, a completed transaction 479 will have been logged and reported (see FIGS. 13-15). In accordance with the invention, prior to reporting the completed transaction 479, the incident transaction is reported and is illustrated in FIG. 15 at 496. The incident transaction 496 might then be followed by the reporting of the completed transaction 479. Specifically, the transaction 496 reports the engagement of the incident button 398 and the time/date information associated therewith. This illustrates to a system user that the mobile device user experienced some incident and deactivated the application 170 and restored device connectivity pursuant to the occurrence of that incident, such as an accident or some other emergency wherein the use of the mobile device was required.

As another feature of the invention, a message screen similar to those illustrated in FIGS. 9C, 16B and 18 might be provided on interface screen 390. The message might state "Do you want to record an incident" and may give the mobile device user the option of answering "YES" or "NO". If they choose "YES", the application 170 will proceed as noted herein. If "NO", the interface screen 390 may return to the foreground screen, as illustrated in FIG. 9B. This prevents inadvertent engagement of the incident button 398.

Figure 20:
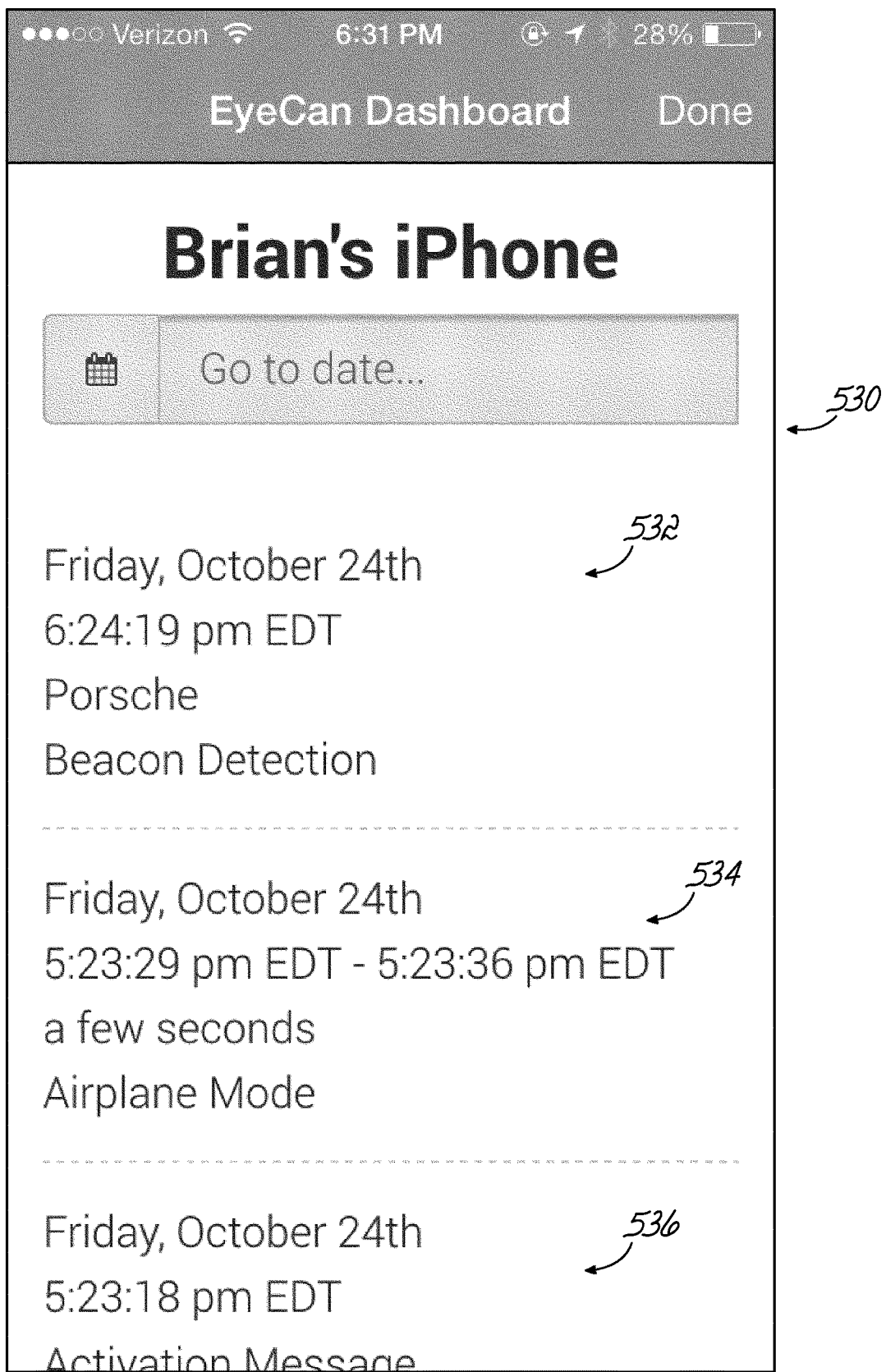
FIG. 20 is an exemplary dashboard screen for a mobile device, in accordance with the invention.

While FIGS. 13-15 illustrate system interface screens/dashboards 450, 460 that might be provided on a client device for reporting the status change in one or more devices, the user device itself might also be utilized effectively as a client device. Particularly, the status monitoring application 170 of a user device is functional to access status information associated with that user device, and display the status information, such as through an appropriate interface screen 450, 460. To that end, a field might be provided on the application screen 390 of the device for accessing a dashboard display. When that field is engaged, the status monitoring application 170 of the user device provides a direct link to system 102, and the status information associated with that particular user device. Referring to FIG. 10, icon fields, such as shown in 404 and 406 might be configured and functional when engaged to provide such a direct link to displayed status information associated with the user device. Once those fields are engaged, a dashboard similar in some ways to 450, 460 shown in FIGS. 13-15 might be displayed on screen 390, as shown in FIG. 20. In that way, a person who is interested in a particular user and their distractions, might obtain the user device directly from the user's device, and then, through interaction with field 404 or 406, obtain immediate access to reported status information about the user of that device through an appropriate dashboard screen. In that way, the monitoring party would not have to go to a separate client device, and log in to view status information regarding the user device. Rather, the user device itself provides the link to system 102, and provides the necessary direct connection to view a dashboard screen, as illustrated in FIGS. 13-15. FIG. 20 illustrates a suitable dashboard screen 530 on a mobile device. Screen 530 might display various transactions like a beacon detection transaction 532, a disabled mode transaction 534, and/or an activation message transaction 536.

Figure 19:
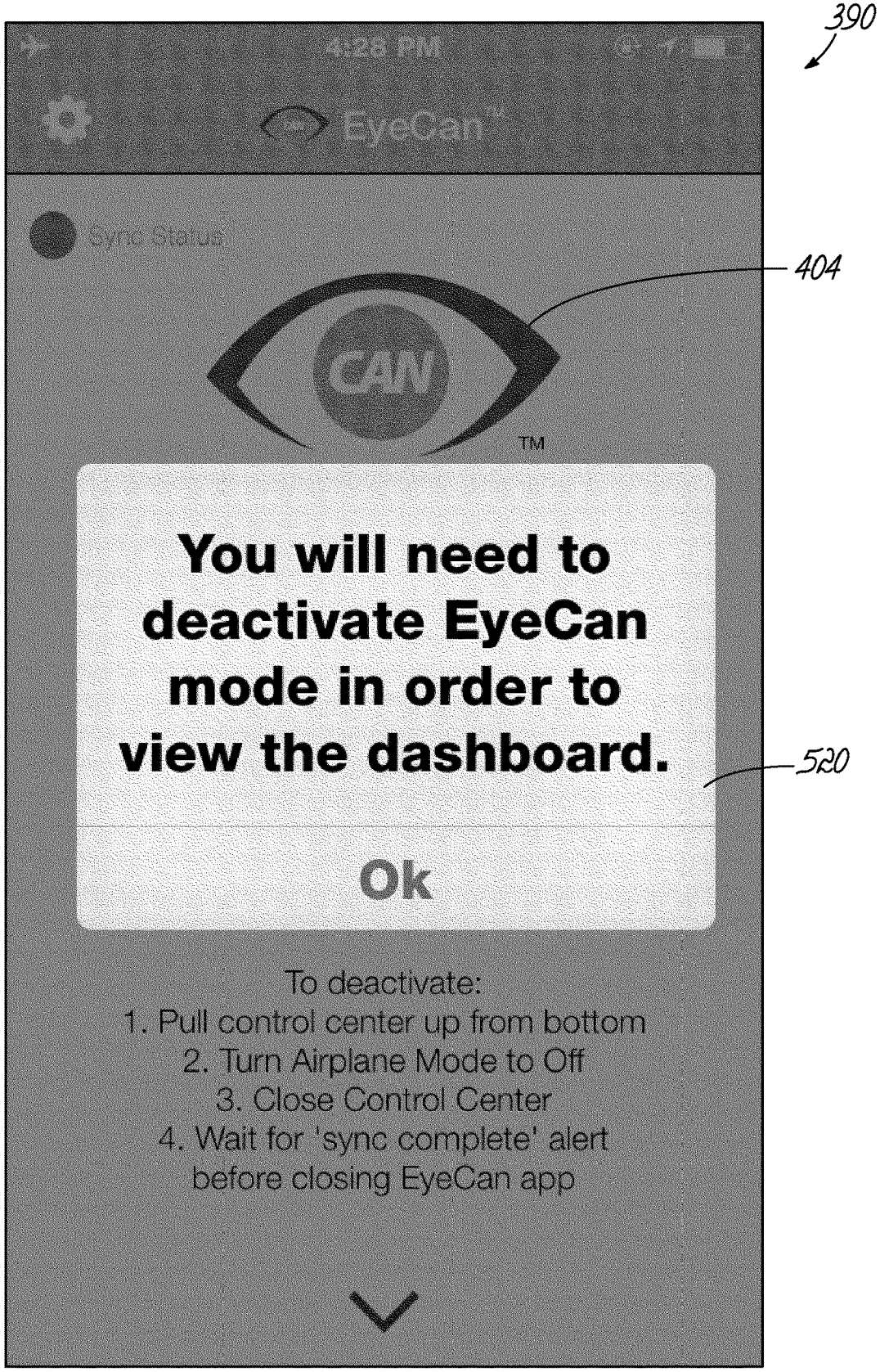
FIG. 19 is a diagrammatic view of an example graphical user interface that may be output on a display of a mobile device, in accordance with the invention.

As may be appreciated, if the user has activated the status monitoring application 170 and the user device has been placed in a disabled mode, the user device may not be able to access system 102 and the necessary status information for the report. Therefore, if the fields 404, 406 are engaged while the user device is in a disabled mode, the person seeking status information will be advised on screen 390 through a message 520 that they will need to deactivate the status monitoring application, and leave the disabled mode, in order to view a suitable dashboard screen to see the reported status information. Referring to FIG. 19, upon seeing the message 520 on screen 390, a person may select OK, and then return to the program screen, as shown in FIG. 9A, 9B, or 10 in order to deactivate the status monitoring application appropriately.

In accordance with another aspect of the invention, if the device is locked and an incident occurs, the device can be unlocked to report the incident. The incident button may then be engaged (and confirmed if necessary) and then the status monitoring application can be deactivated, such as by enabling the device again, so that the incident is reported appropriately to a monitoring system 102 as illustrated in FIG. 15 at 496. This now provides immediate proof that the incident was not caused by a device distraction as the time information of the recorded entry provides will reflect the disabled status time.

In accordance with another embodiment of the invention, the status monitoring application 170 on the device is running even when not open and can track and report on the operational status of the device even if the application 170 is not opened on the foreground screen of the device. Therefore, various actions may be taken to disable the device and the operational status of the device may be reported with time information even when the status monitoring application 170 has not been specifically opened and brought to the foreground on the device, such as through a touch screen engagement with an icon/field. This provides further flexibility in the use of the device. In one example, such an embodiment might be implemented with a device running the application 170 with an Android operating system.

Figure 25:
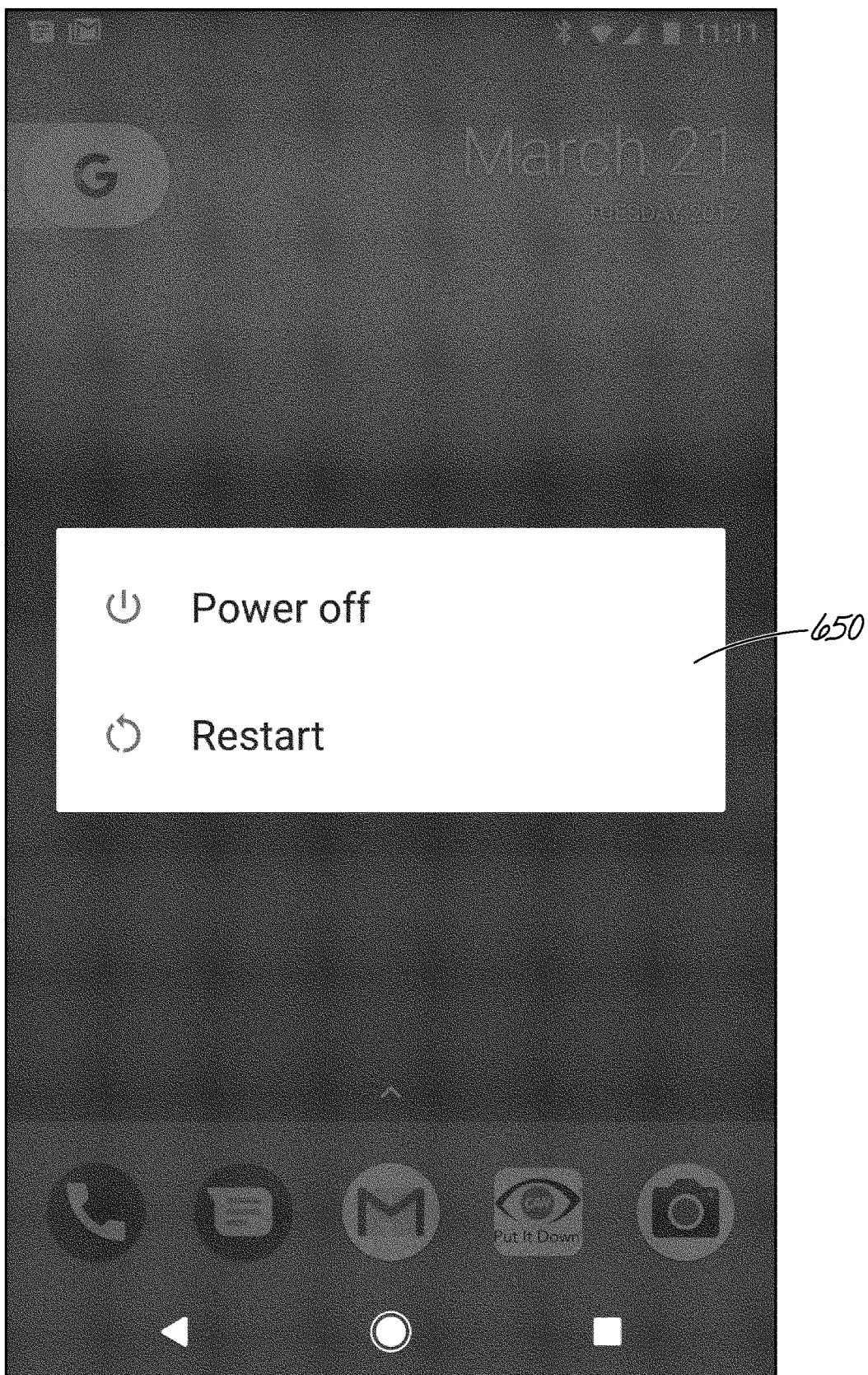
FIGS. 25 and 27 are diagrammatic views of example graphical user interfaces that may be output on a display of a mobile device for powering Off the device, in accordance with the invention.
Figure 26:
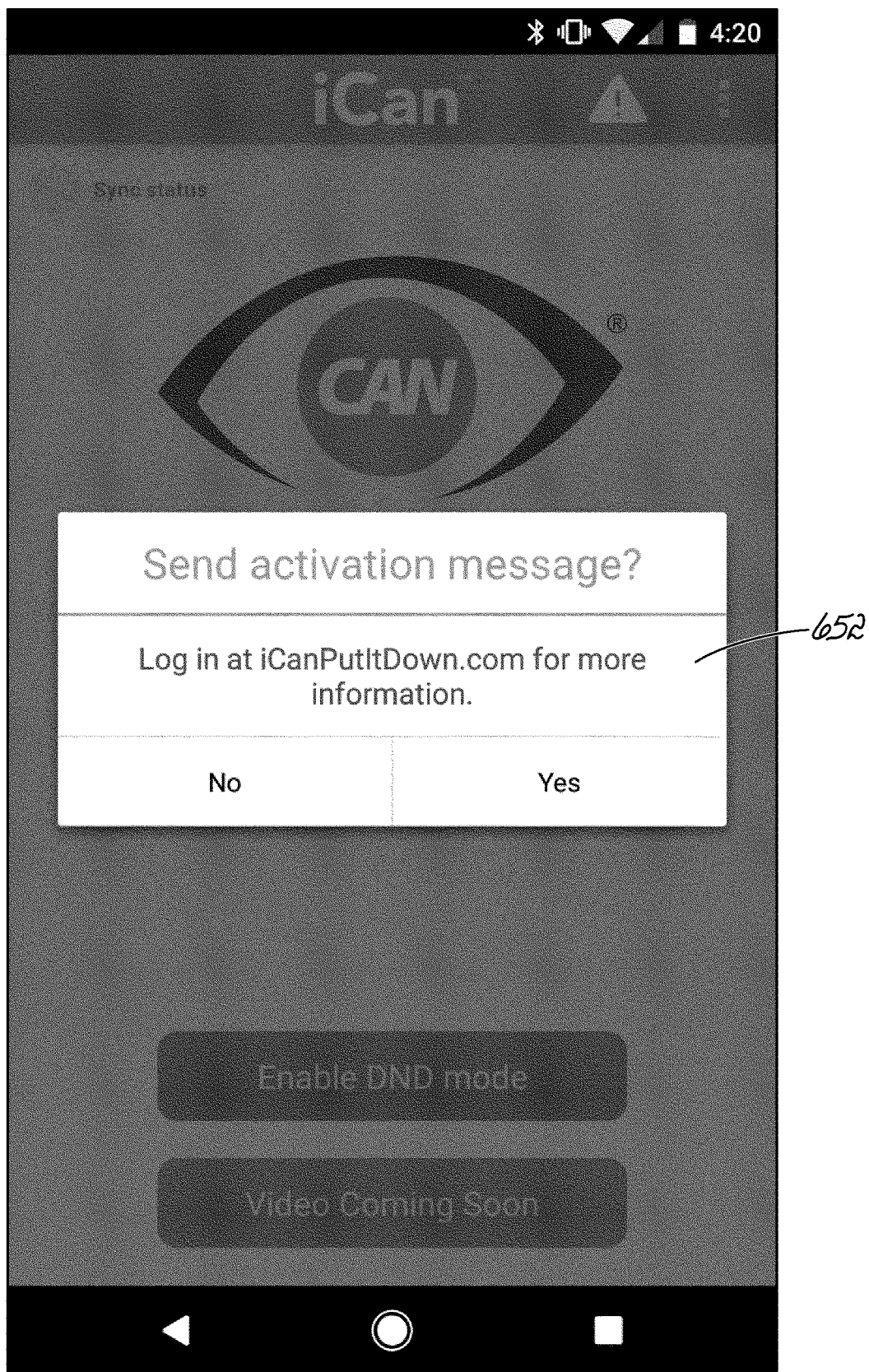
FIGS. 26 and 29 are diagrammatic views of example graphical user interfaces that may be output on a display of a mobile device for a device placed in a disabled mode, in accordance with the invention.
Figure 27:
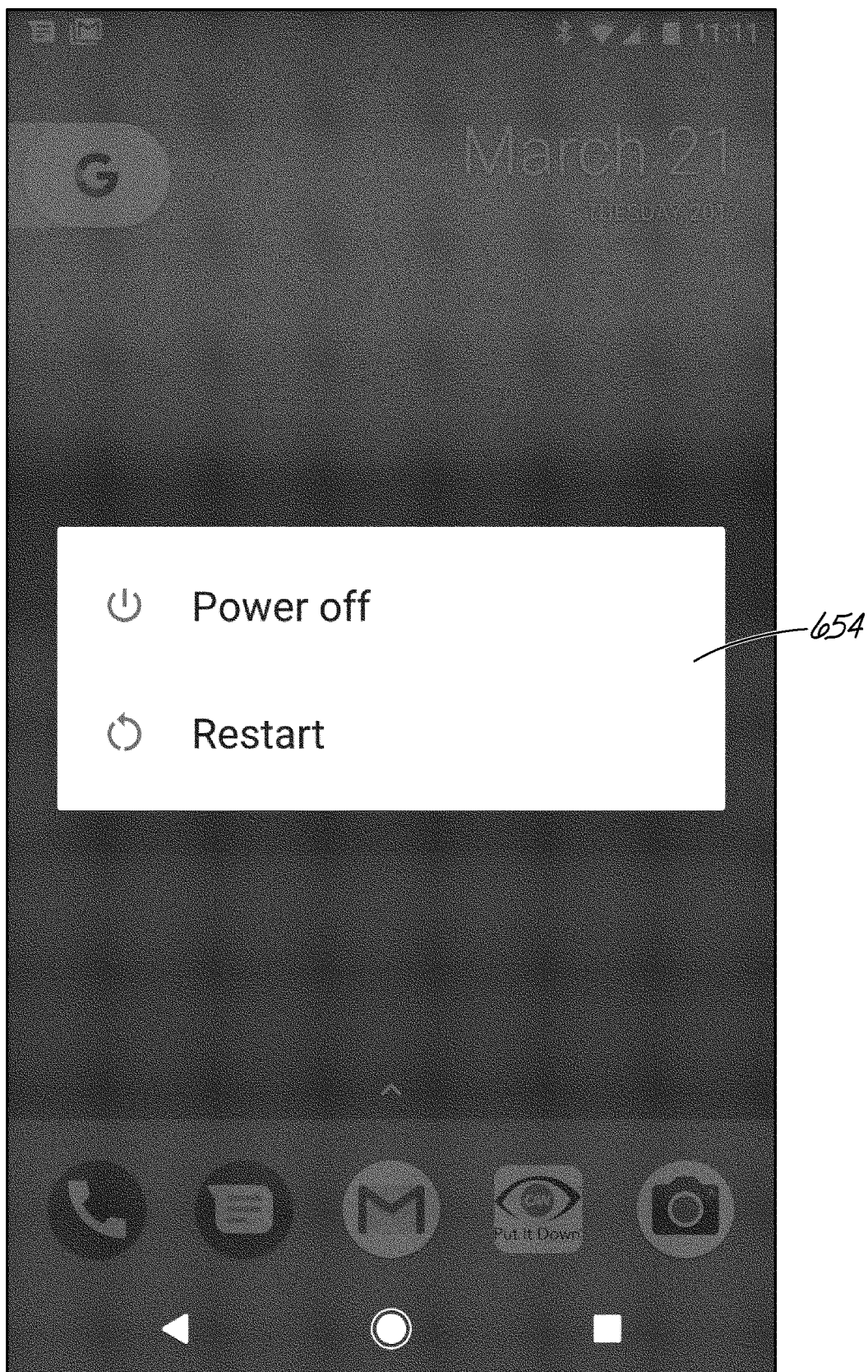

In accordance with another feature of the invention, the device might be placed in a disabled operational mode by being turned Off, either with the status monitoring application open or not. Referring to FIG. 25, a selection might be made through an appropriate field 650 to power Off the device without opening the application 170 on the device. Alternatively, the status monitoring application 170 might be opened as illustrated in FIG. 26. In such a case, the application 170 of the device might provide a message field 652 as illustrated in accordance with a messaging feature of the invention for indicating the device will be placed in a disabled operational mode. As such, the device can then be powered Off through engagement with field 654 as illustrated in FIG. 27.

Figure 28:
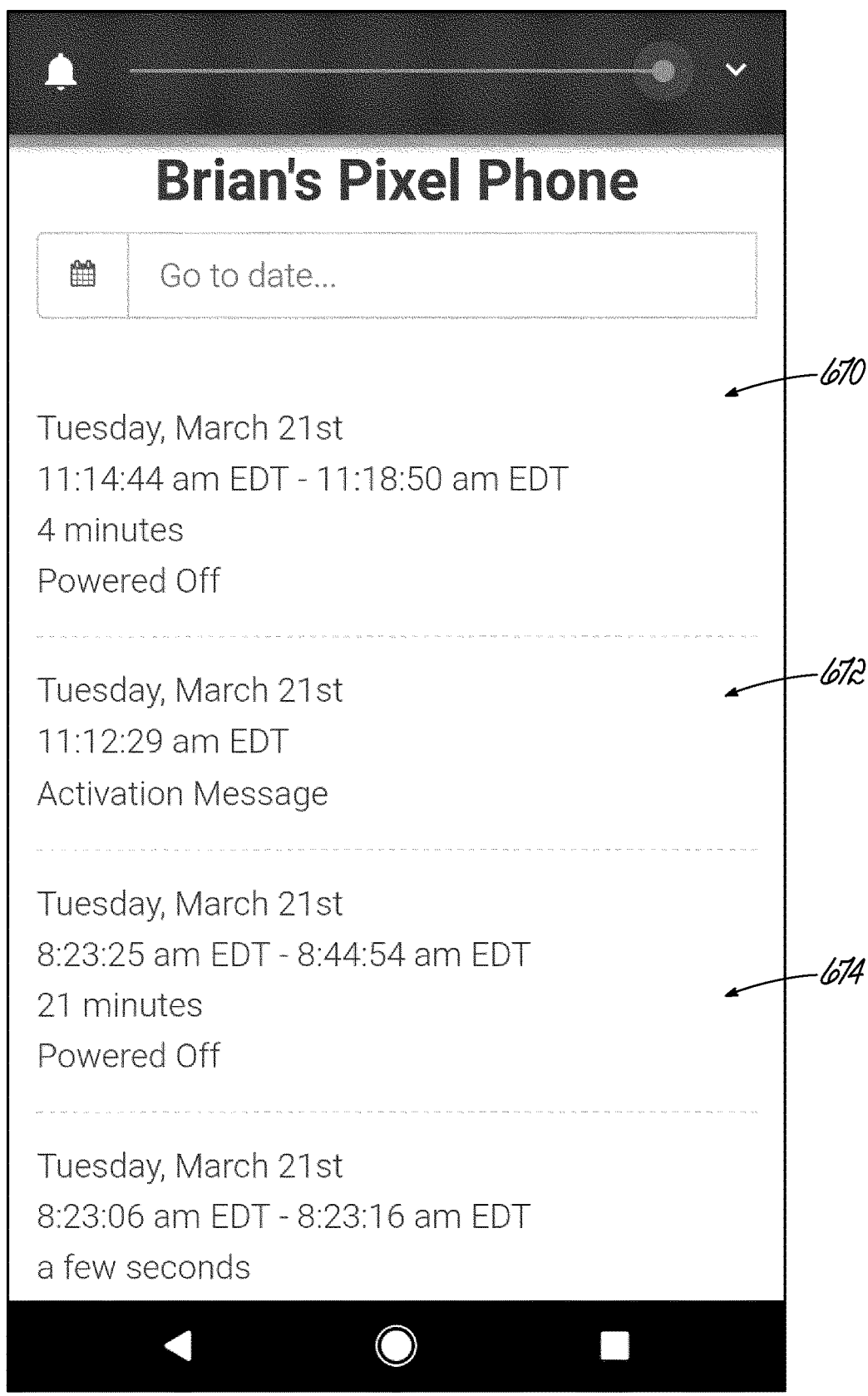
FIG. 28 is an exemplary dashboard screen for a mobile device, in accordance with the invention.

FIG. 28 illustrates a dashboard screen 656, such as on a device that is also running a monitor interface application, for providing status reporting for the device. As noted, status might be reported and accessed from another computer or is also available on the device itself, such as through an icon/field. As illustrated if FIG. 28, the entry 674 indicates the device had been in a Powered Off mode for some period of time on the noted date, such as when the monitoring application 170 was not opened but the device was powered Off. Alternatively, the entries 672, 674 indicate the device being powered Off after the application 170 was opened as in FIG. 26 and an activation message sent. In both cases, the operational status change, such as the device being powered back on, was reported.

In accordance with another feature of the present invention, while several of the examples note selection of a particular disabled operational mode, such as Do Not Disturb or Airplane mode for providing a change in the operational status of the mobile device, once the application 170 is activated and opened on the device and brought to a foreground screen, such modes might be engaged to put a device in a disabled operational mode without directly opening the application 170. This provides greater flexibility in monitoring a user and in the use of the invention.

For example, in one embodiment, the Airplane mode might be selected in the way previously described for initiating the status monitoring application. That is, the status monitoring application is opened or engaged and brought to the foreground screen and then the control center for the device might be opened for selecting an Airplane mode and then the control center is closed. In such a scenario, the monitoring application is active and in the foreground for the device, and the device is in the Airplane mode. The monitoring application can be left in the foreground screen and visible or the phone might be locked. Once the phone is to be active again (with the application in the foreground) and in order to end the status monitoring application, the control center can be opened and the Airplane mode deactivated. Then the application can be closed. If the device screen is locked, in one embodiment, the user can go directly to the control center without bringing the status monitoring application to the foreground and then deselect airplane mode and close the control center to complete the reporting entry.

Figure 29:
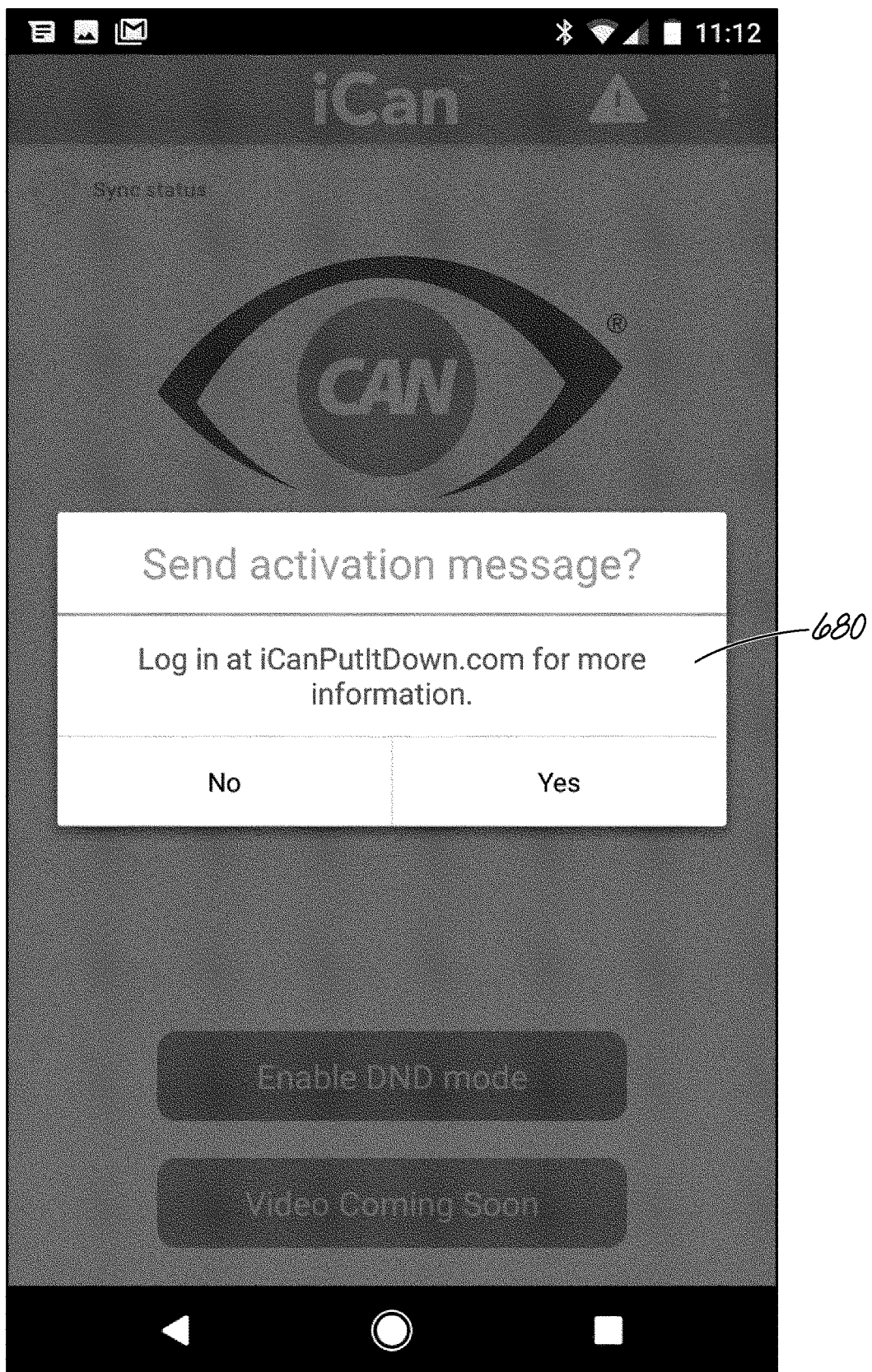
Figure 30:
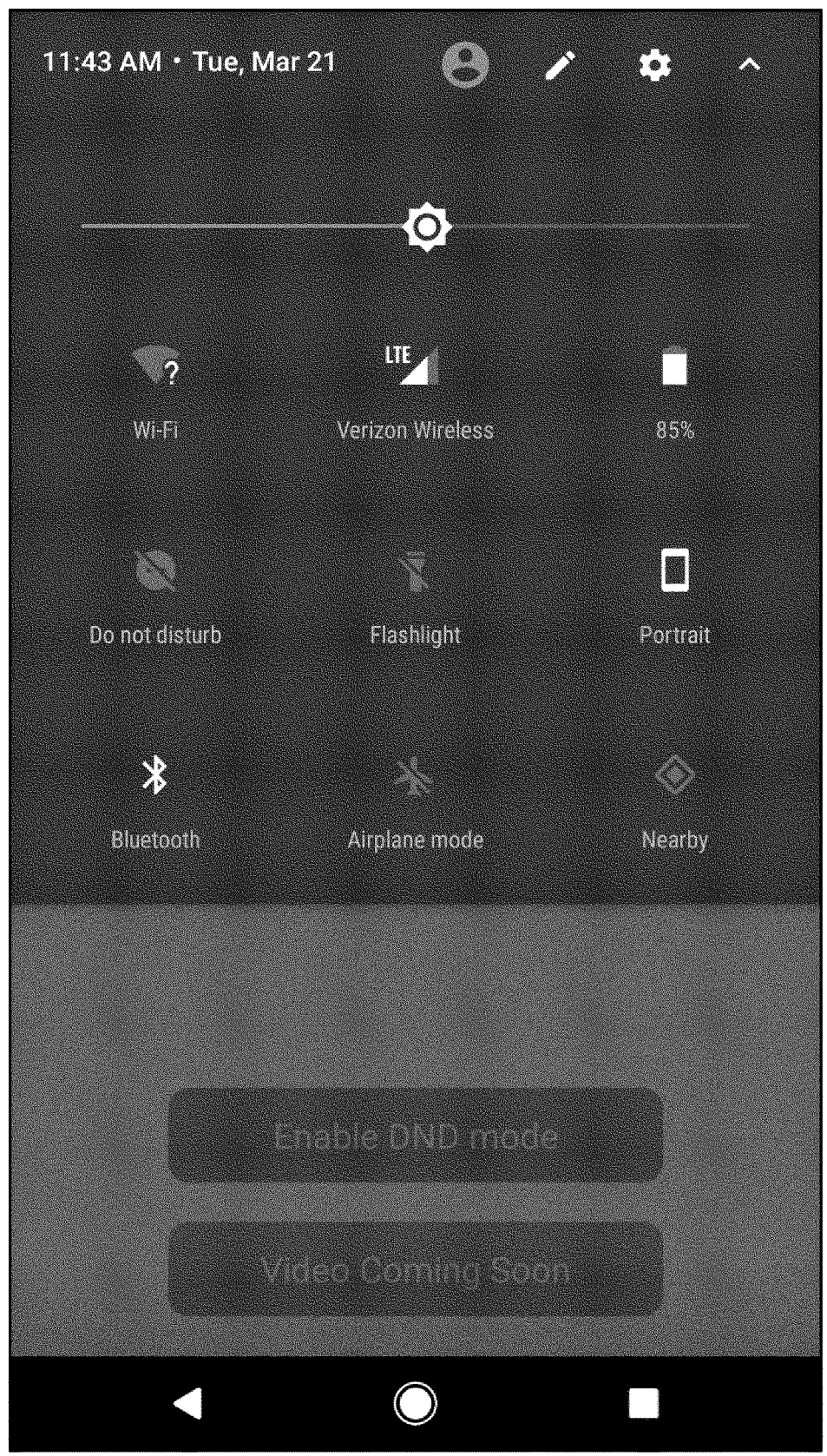
FIGS. 30-32 are diagrammatic views of other example graphical user interfaces that may be output on a display of a mobile device for a device placed in a disabled mode, in accordance with the invention.
Figure 31:
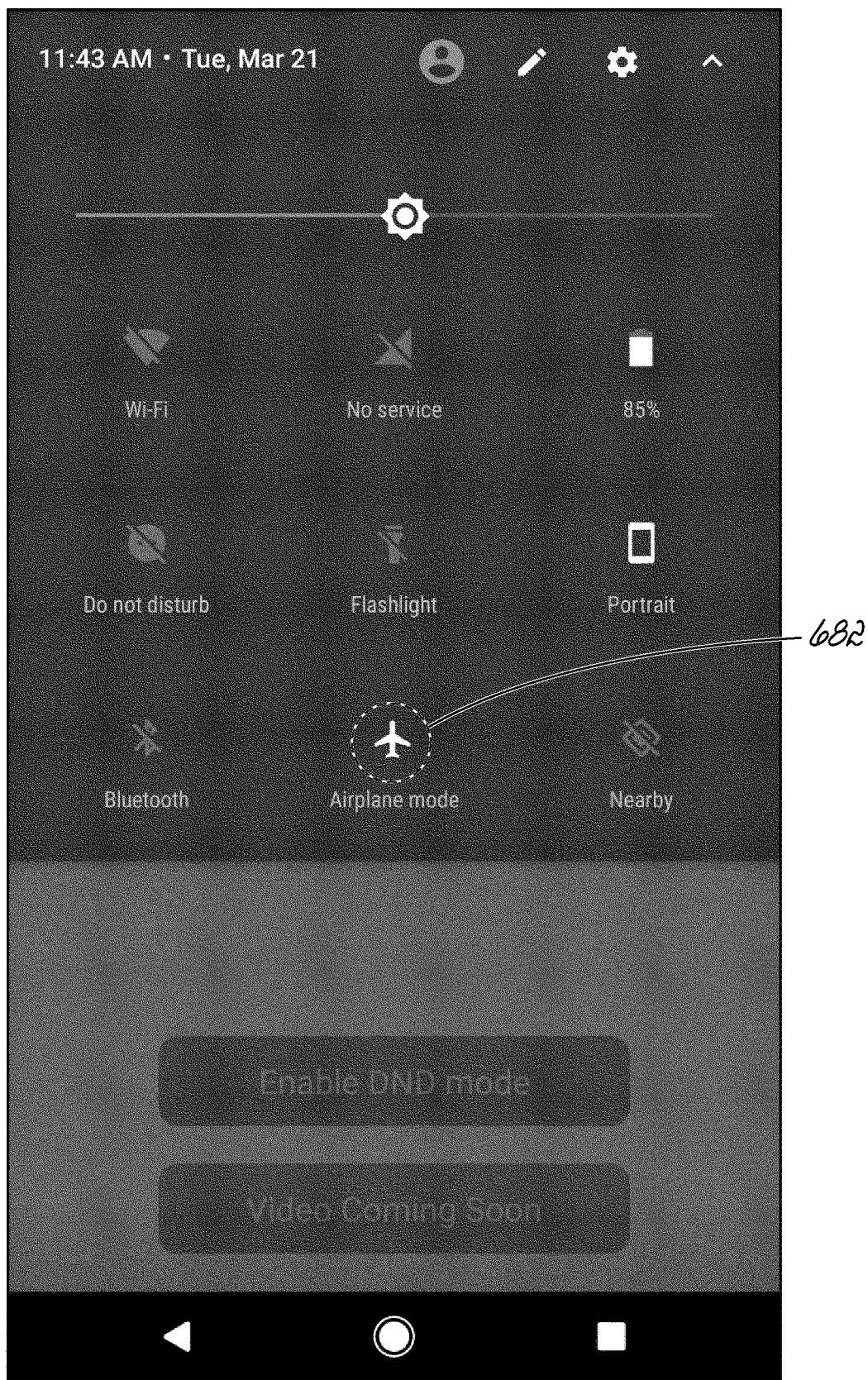
Figure 32:
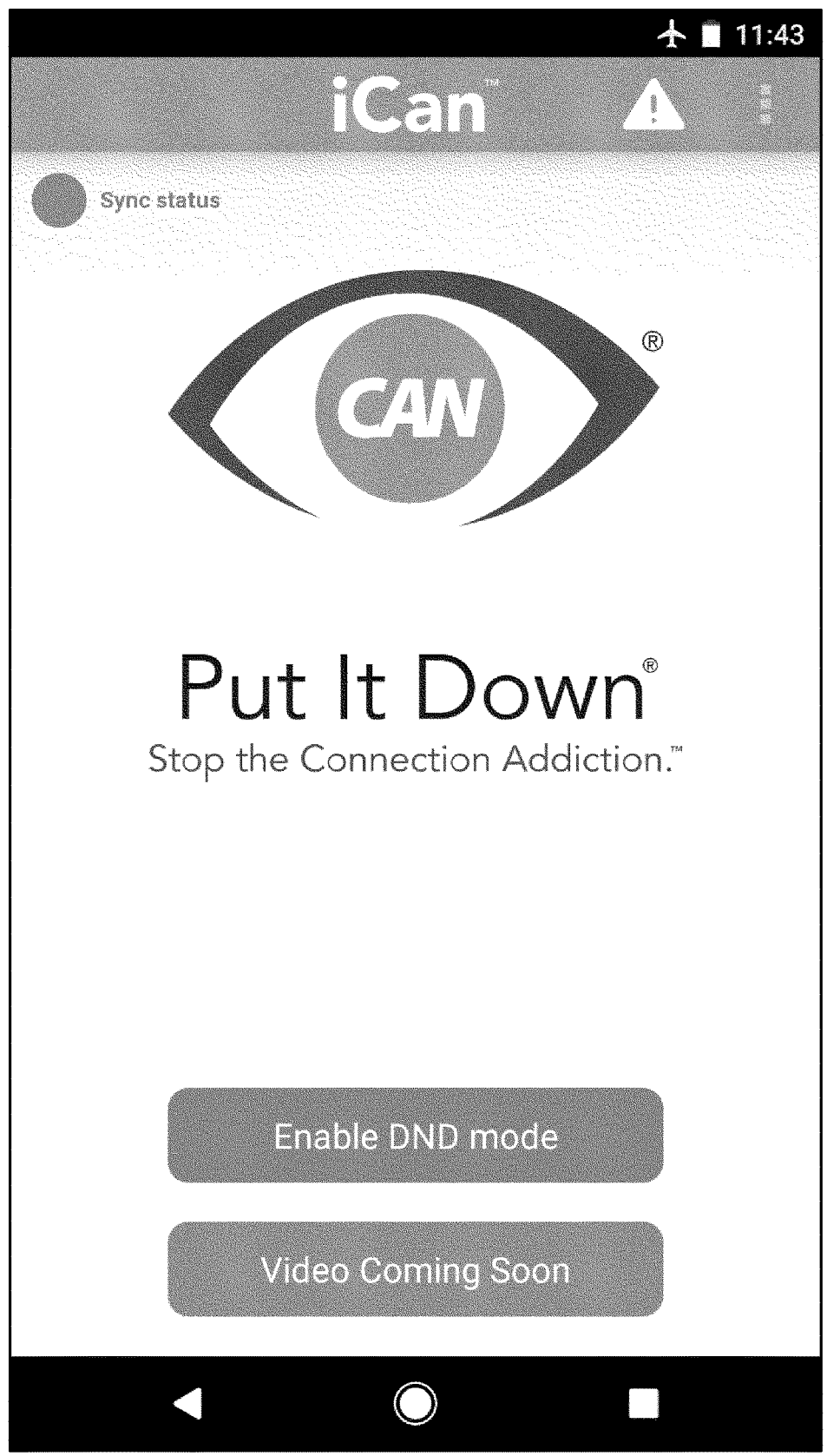

Referring to FIG. 29, the application can be opened and an activation might be sent through engagement with field 680, such as when the application has been enabled to send email or other alerts/messages to others. Then the control center can be opened as illustrated in FIG. 30. The airplane mode can be selected as indicated by the icon and field 682 in FIG. 31. Then the control center can be closed as illustrated in FIG. 32. The status monitoring application screen as shown in FIG. 32 can be left in the foreground as the device is put down or put aside to limit distractions. Alternatively, the phone might be locked as discussed herein. Then once the operational status changes, such as when a user goes to use the device for a distracting activity, the change in status is reported. Referring to the device reporting dashboard of FIG. 37, the change in operational status, from an Airplane mode, might then be indicated on the dashboard board at the entry 685. Similarly, such an entry could be indicated on the dashboard of another computer that is monitoring that particular device as shown in FIGS. 13-15.

Figure 33:
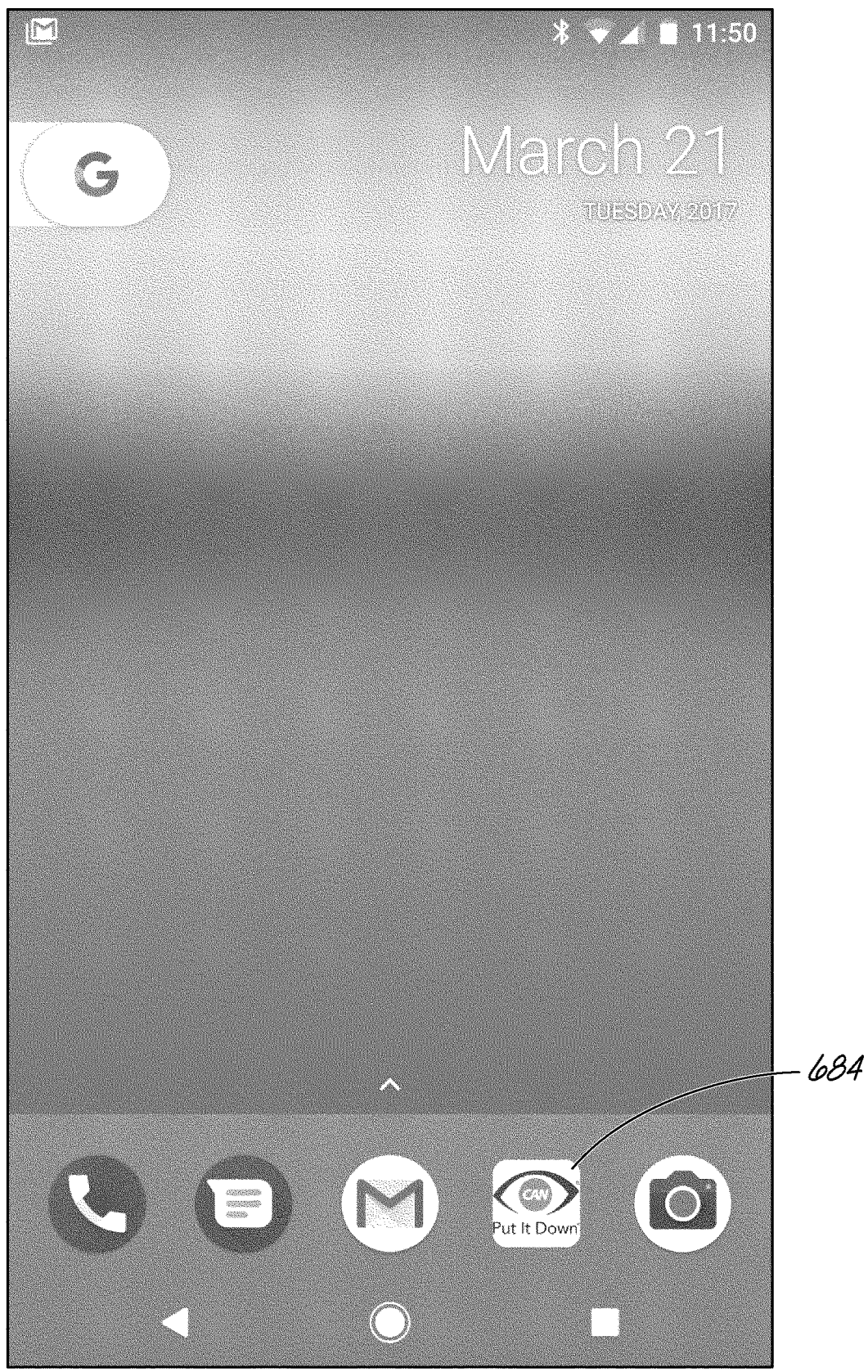
FIGS. 33-36 are diagrammatic views of other example graphical user interfaces that may be output on a display of a mobile device for a device placed in a disabled mode through a control center of device, in accordance with the invention.
Figure 34:
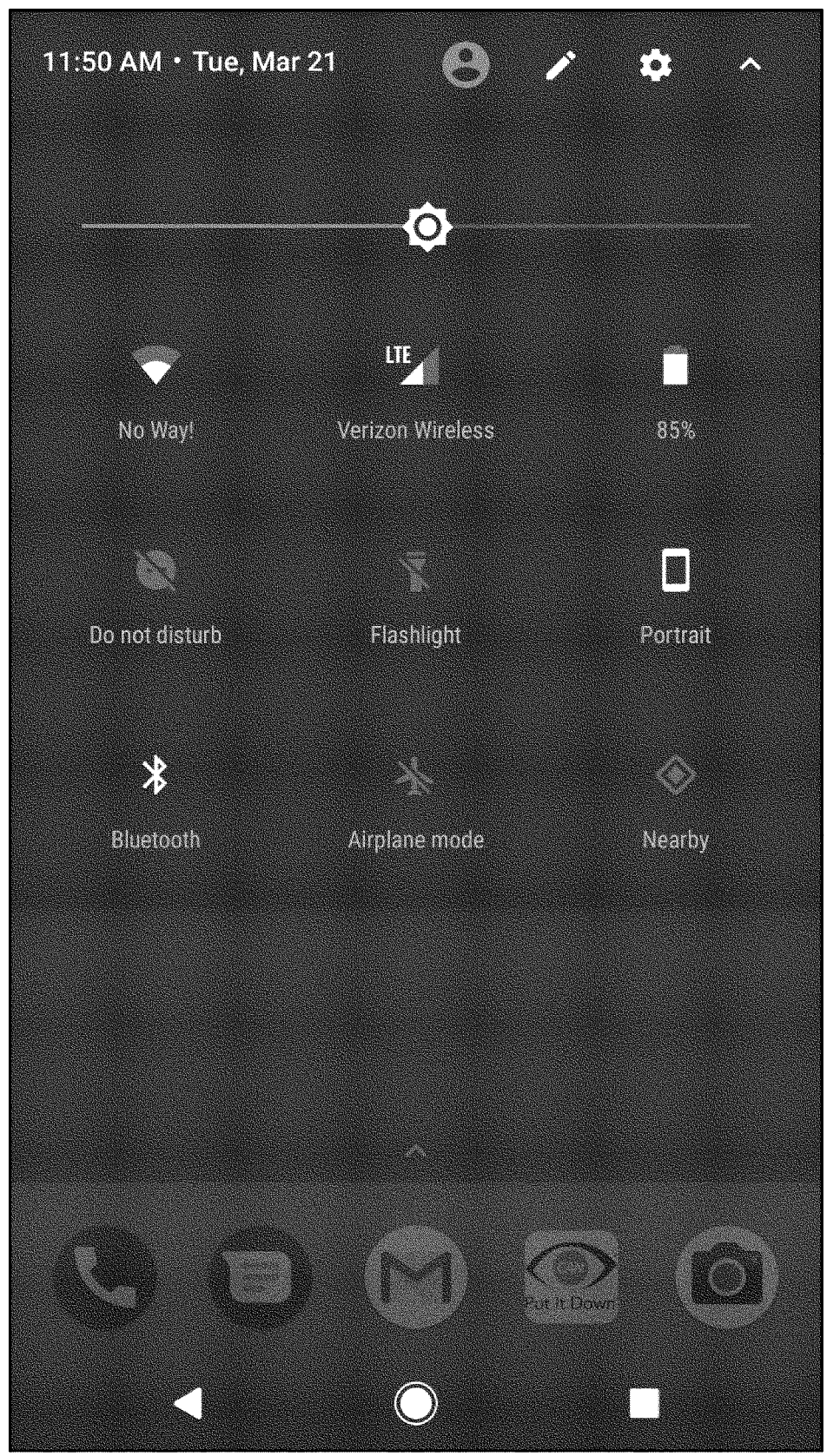
Figure 35:
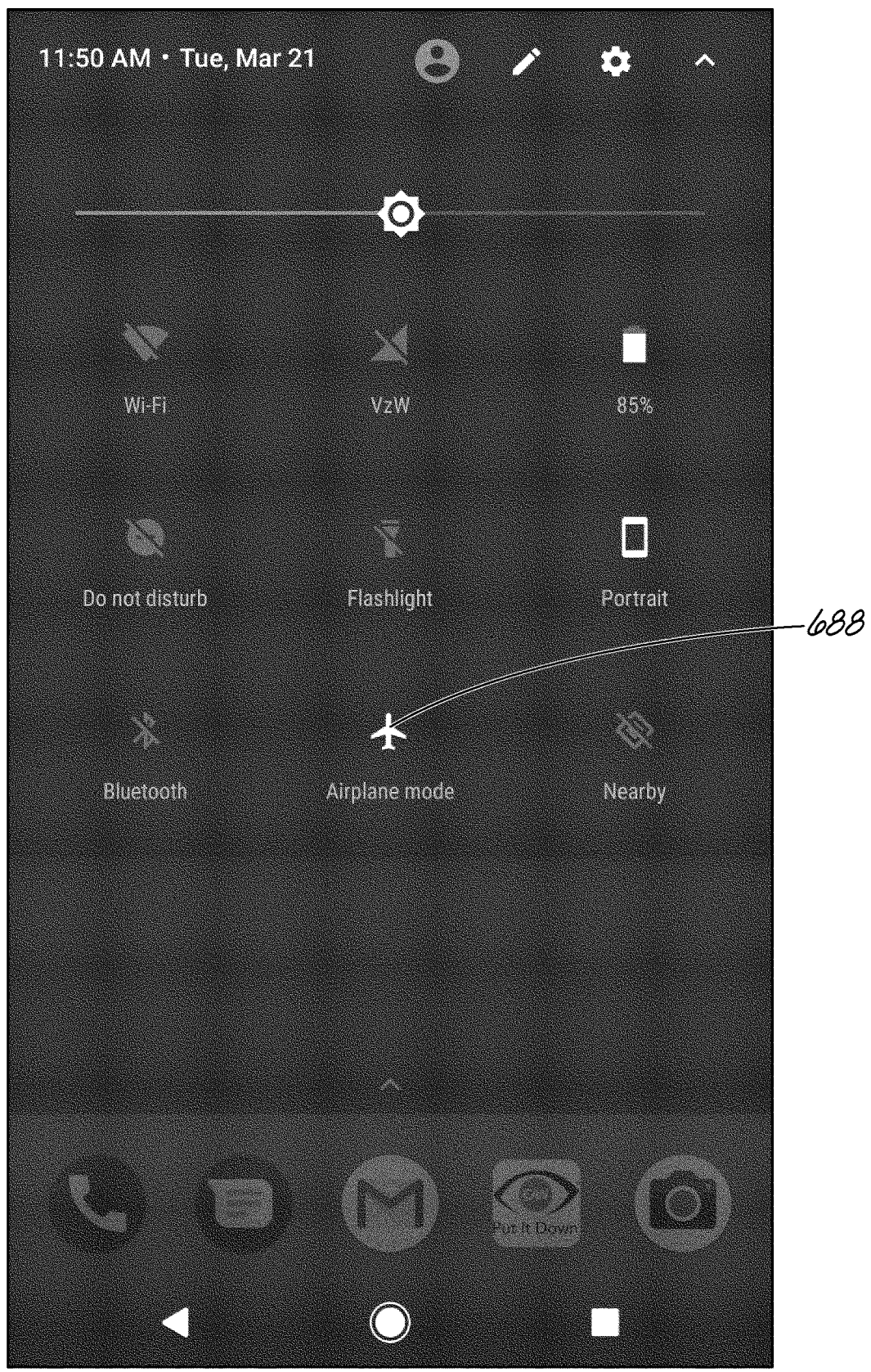
Figure 36:
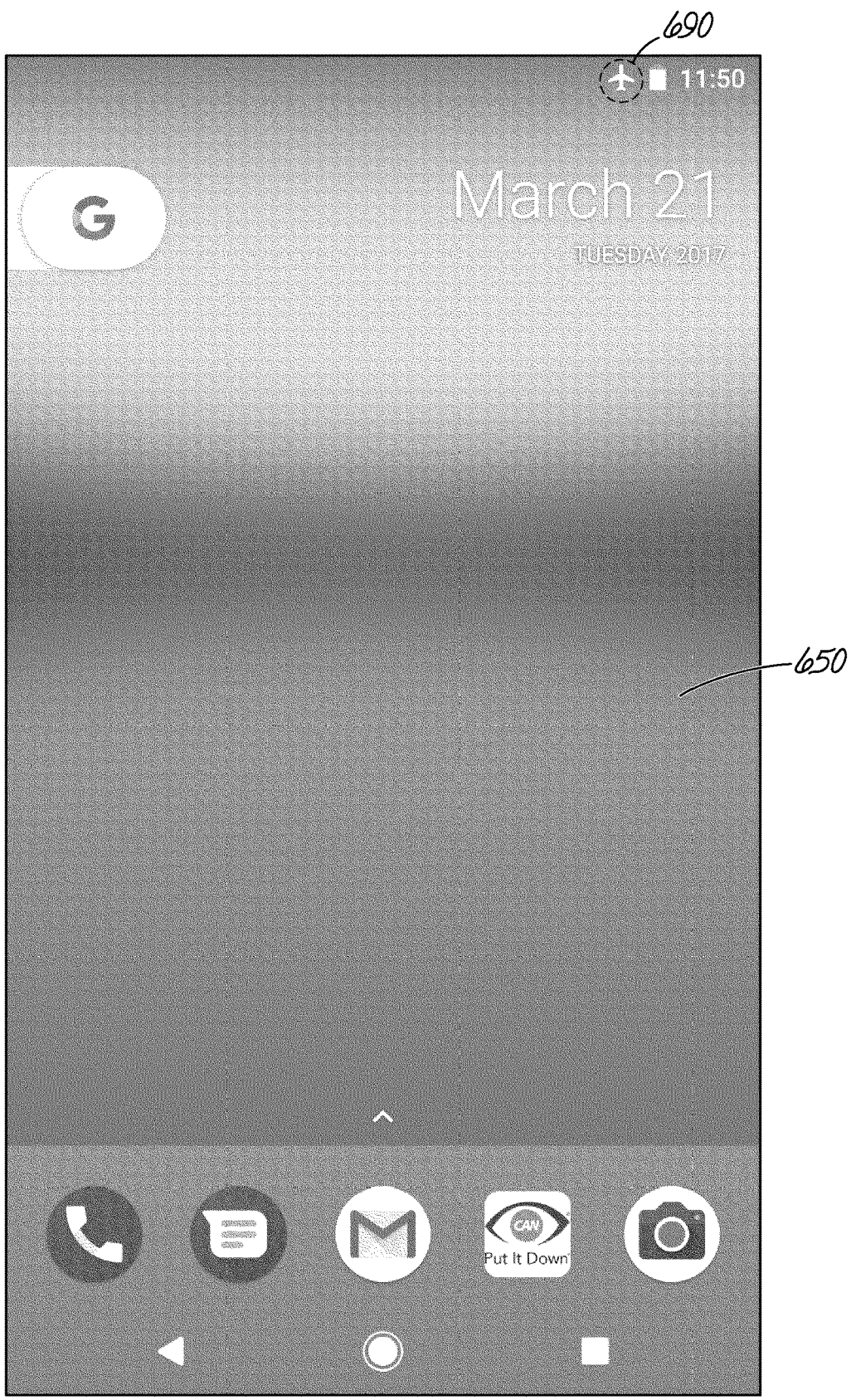

In accordance with another feature of an embodiment of the invention, the device might be put into the Airplane mode directly through the control center without opening the status monitoring application 170 and bringing it to the foreground. If Airplane mode is selected in that way, the device is in what might be considered a non-restricted Airplane mode. Since the status monitoring application 170 is loaded on the device, in accordance with one feature, the selection of a particular disabled mode through the control center will activate the status monitoring application even though the application 170 is not opened directly and is not brought to the foreground screen. For example, referring the FIG. 33 and as seen by the icon 684 on the phone screen, a monitoring application is loaded on the device, but is not directly opened or activated. The user can directly engage the control screen as illustrated in FIG. 34, and then activate or select the Airplane mode as indicated by the icon and field 688 in FIG. 35. Then the control screen can be closed to reveal a screen 650 without the status monitoring application screen in the foreground as indicated by FIG. 36. The device is in the Airplane mode as shown by icon/field 690. The application 170 is not directly open and displayed but is functioning and the device user might then be able to use the device in various ways allowed by the Airplane mode that do not require connectivity. Such use will not be considered by the application 170 as a change in operational status. For example, if a user is listening to music on the device, they might be in the disabled operational mode but still be able to manipulate the device for controlling their music. As such, the device is in what may be considered an unrestricted disabled mode, and may be used in some ways without such use being reported as a status change. This use is only allowed in Airplane mode where the device has no connection to a network. However, any change in the operational status, such as being taken out of the airplane mode, will be reported in accordance with the invention.

Figure 37:
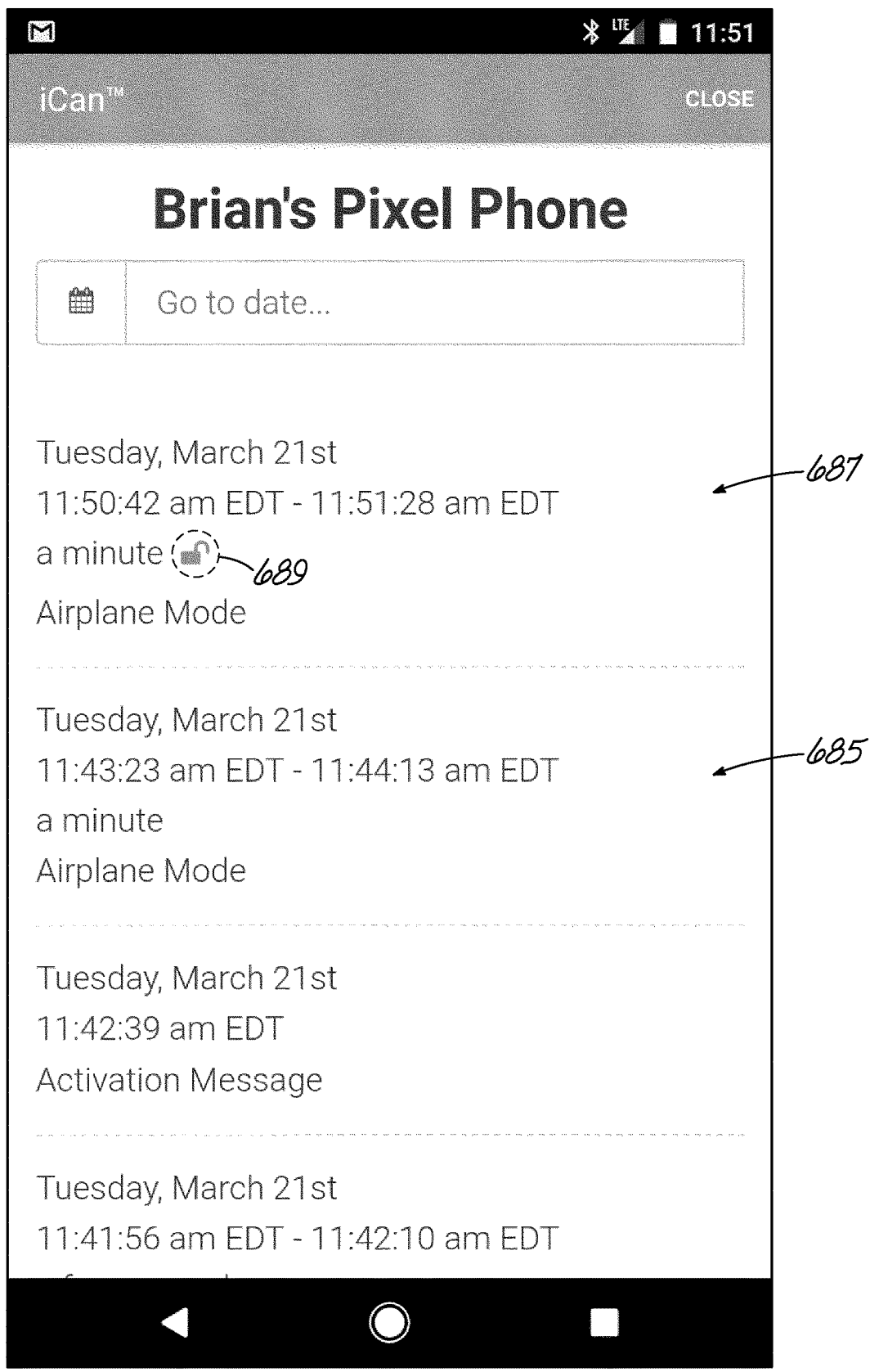
FIG. 37 is an exemplary dashboard screen for a mobile device, in accordance with the invention.

In accordance with one feature of the invention, it might be desirable, from a monitoring standpoint, to know that the user had their device in such an unrestricted mode and the application 170 had not been opened directly and in the foreground. That is, such use might still be considered distracting and therefore, a monitor or supervisor may desire to know the situation based on the device being unrestricted. Therefore, the monitoring application 132 might provide additional information in a dashboard entry indicating that the device was in a particular mode, like the unrestricted Airplane mode, for the time noted. Referring to FIG. 37 which shows a dashboard screen displayed on a device, if the Airplane mode was entered without opening the Application directly and bringing it to the foreground screen, as noted above, when the status change is reported to the dashboard, the entry might read as in entry 687 with a separate icon 689 showing the mode was an unrestricted mode and the user could have been doing other things with the phone. In this case, the icon is an unlocked padlock. Other icons could be used as well to indicate an unrestricted mode. As noted, the application will be working in the background even though not directly opened and brought to the foreground screen.

Figure 38:
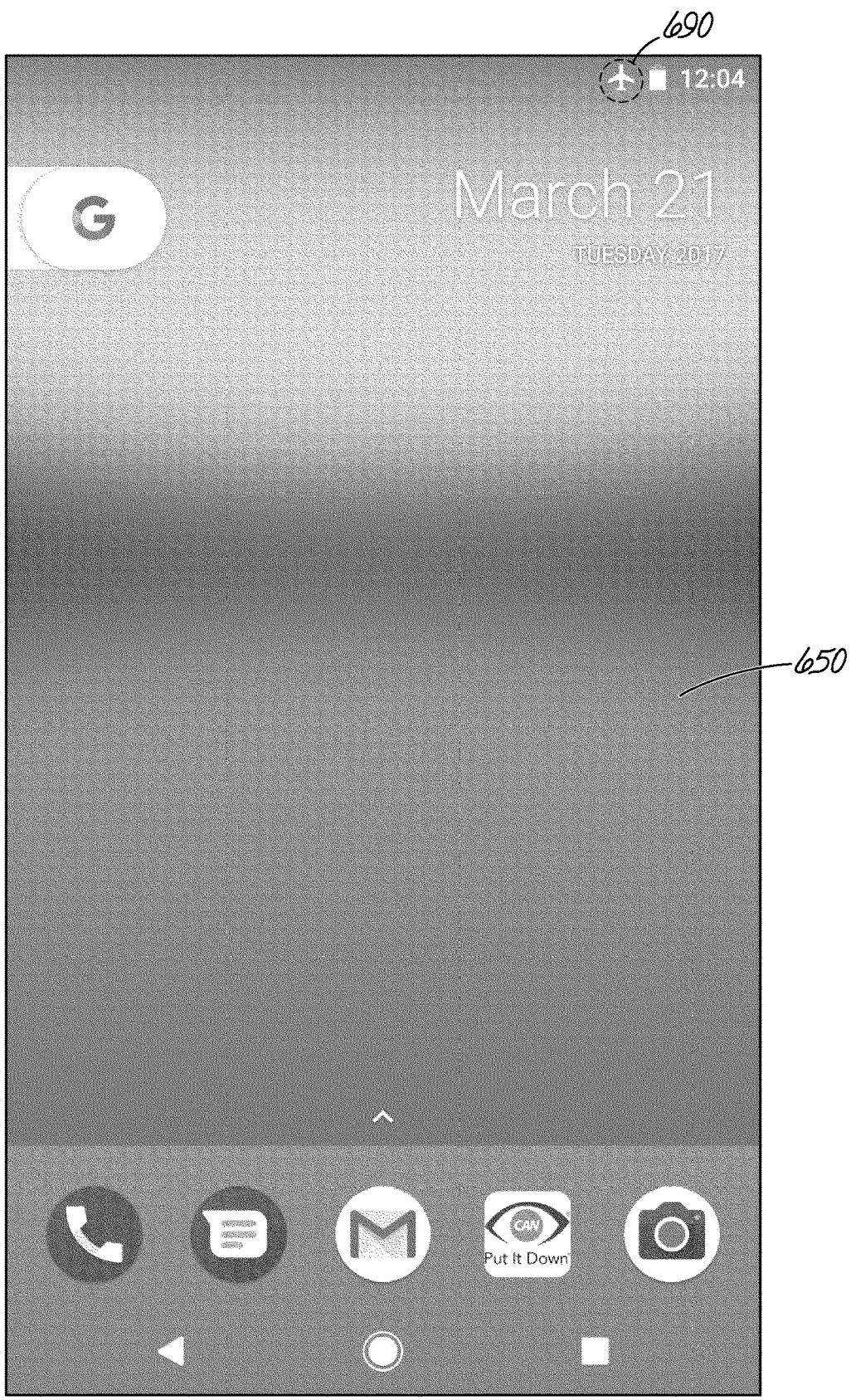
FIGS. 38-41 are diagrammatic views of other example graphical user interfaces that may be output on a display of a mobile device for a device to be activated through a control center of device, in accordance with the invention.
Figure 39:
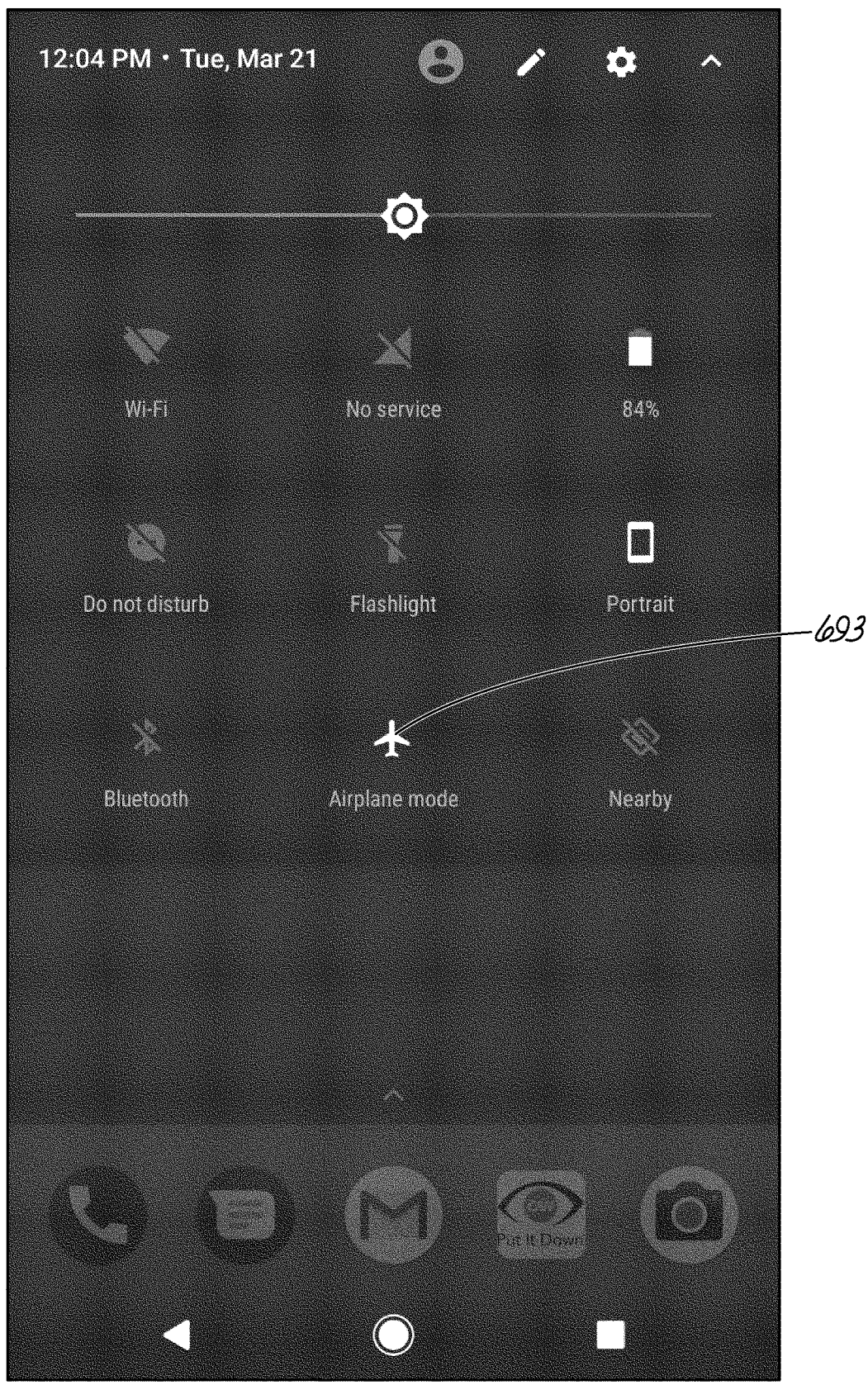
Figure 40:
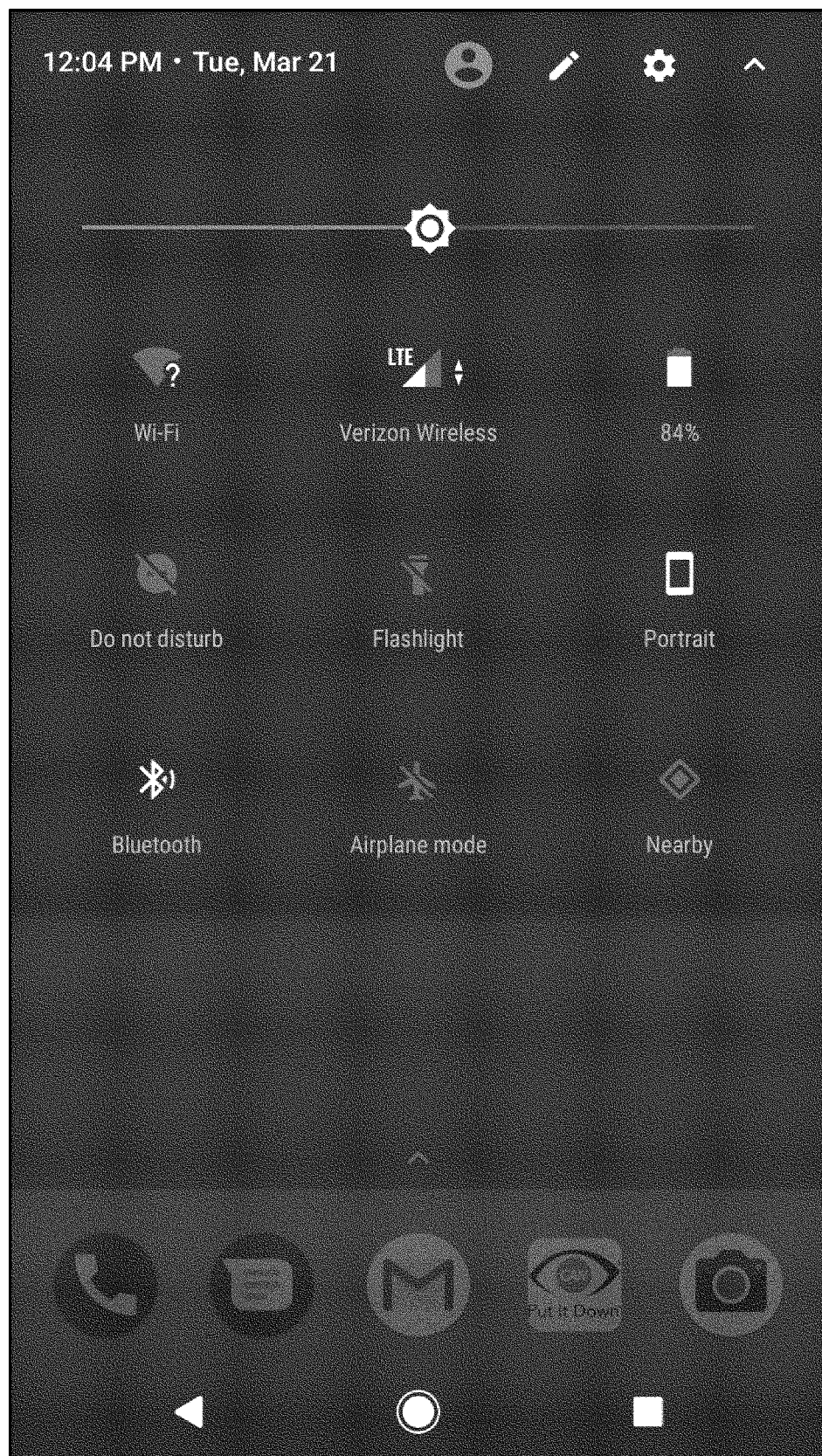
Figure 41:

Once in Airplane mode in such an embodiment, the device might be taken out of that disabled operational mode or the mode may be deactivated or changed in certain ways. In one way, the control center may just be opened, the Airplane mode turned Off and then the control center closed. Referring to screen 650 of FIG. 38, as noted by icon 692, the device is in Airplane mode. From the screen shown in FIG. 38, the control center may be accessed as shown in FIG. 39. The Airplane mode field/icon 693 is engaged to deactivate the mode and restore operational service as shown in FIG. 40. Then the control center may be closed (FIG. 41). The device has thus had its operational status changed and is active and can be used in a distracting manner.

Figure 42:
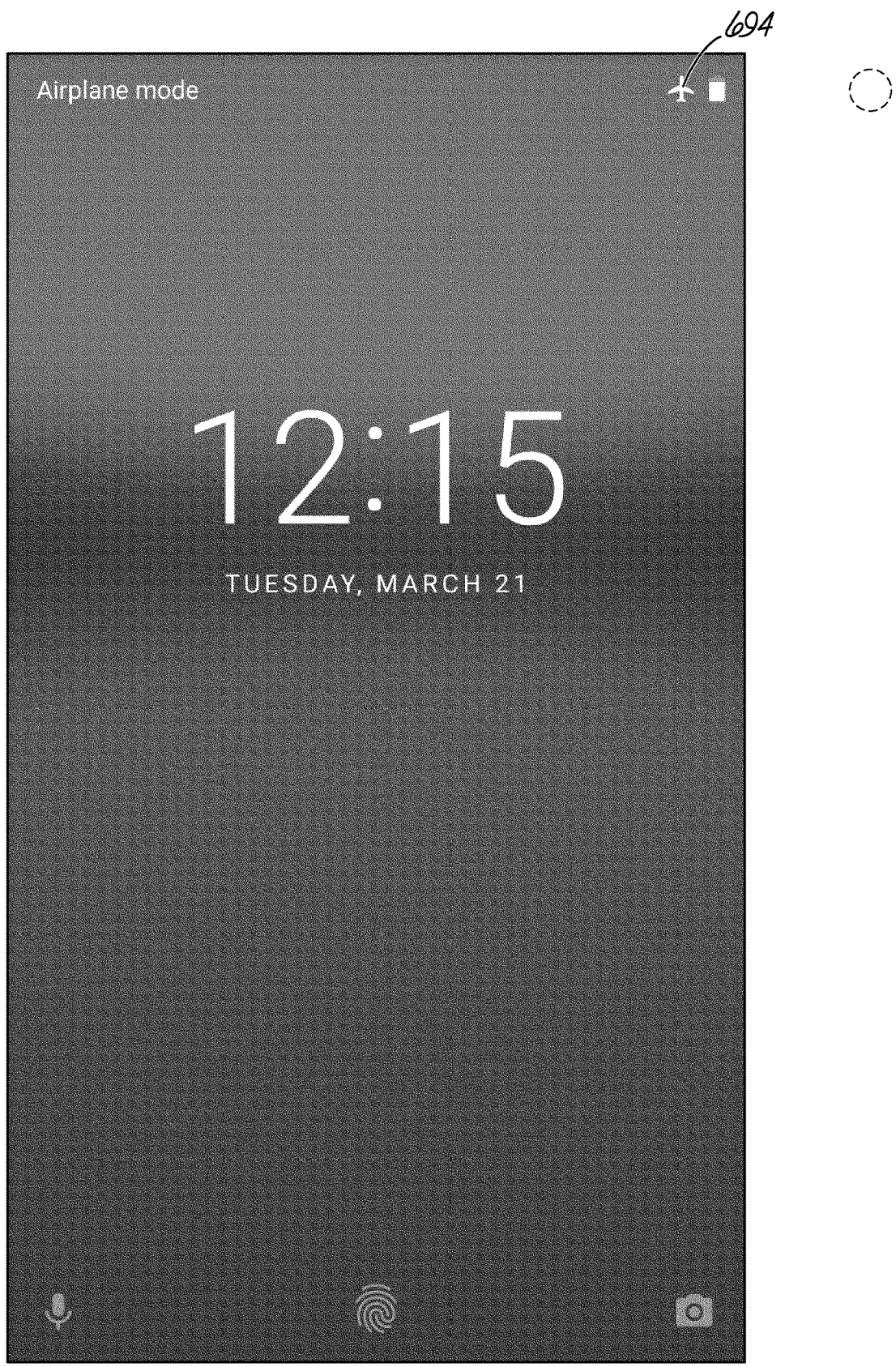
FIGS. 42-47 are diagrammatic views of other example graphical user interfaces that may be output on a display of a mobile device for a device to be activated through a control center of device, in accordance with the invention.
Figure 43:
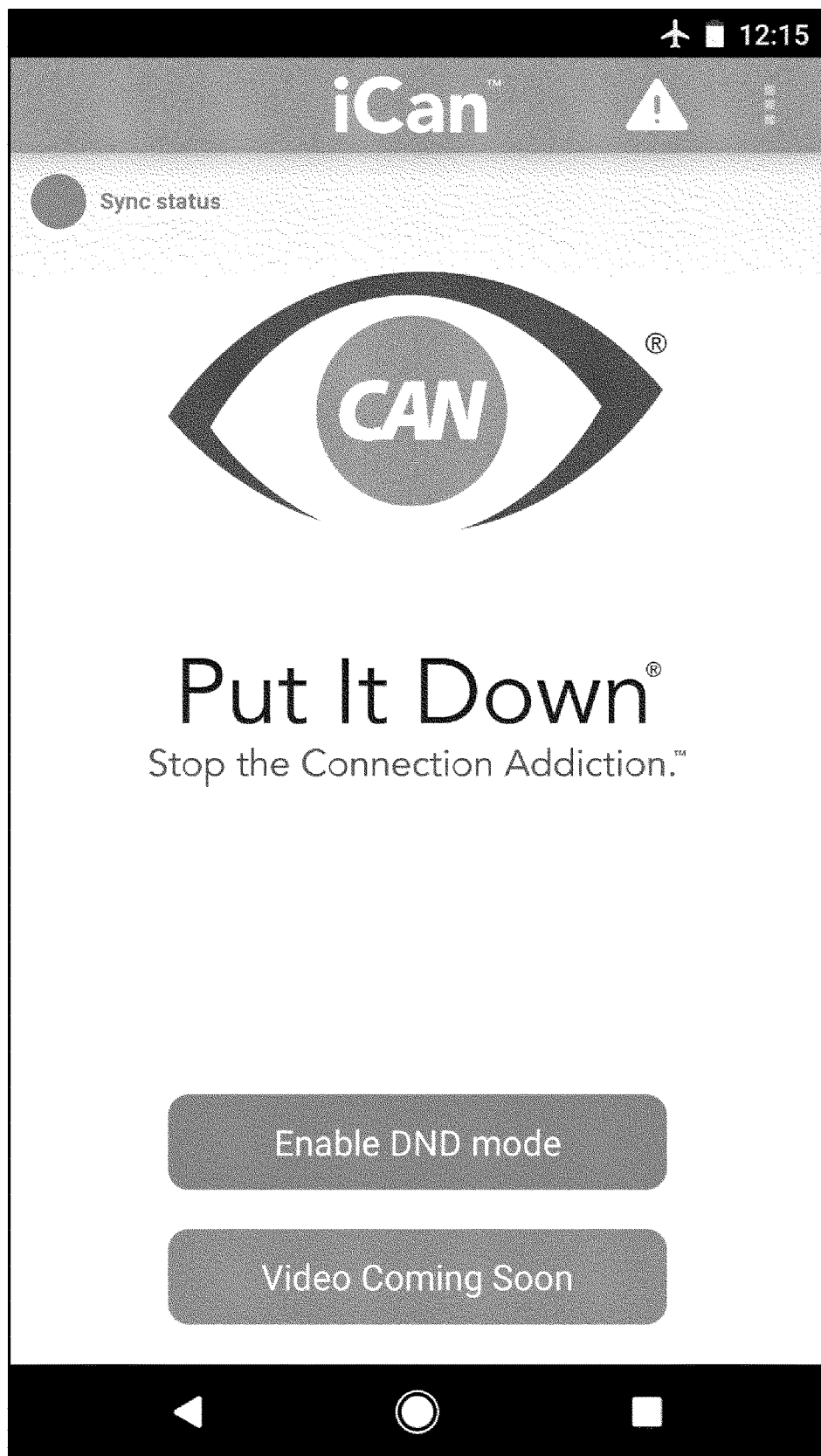
Figure 44:
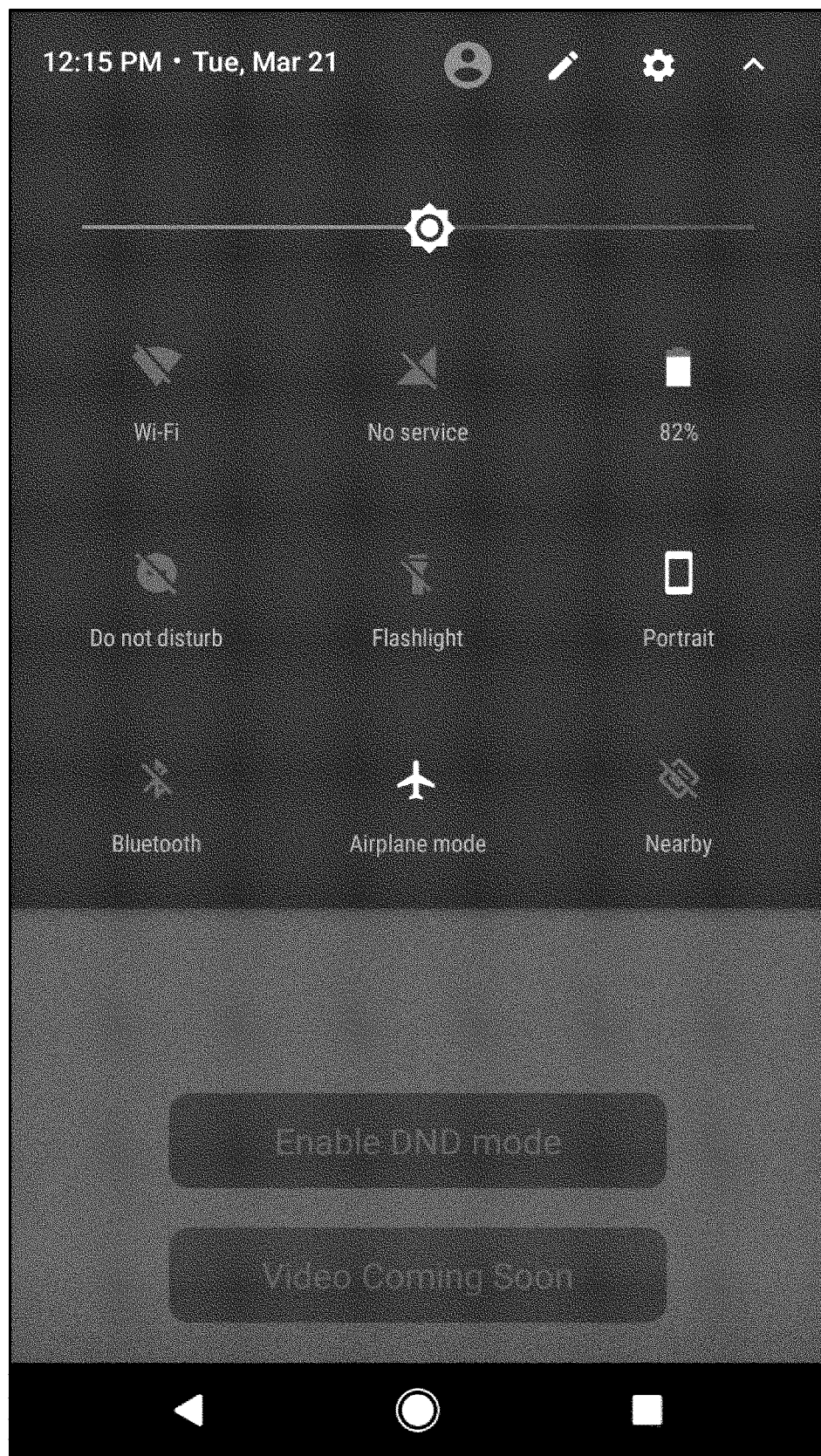
Figure 45:
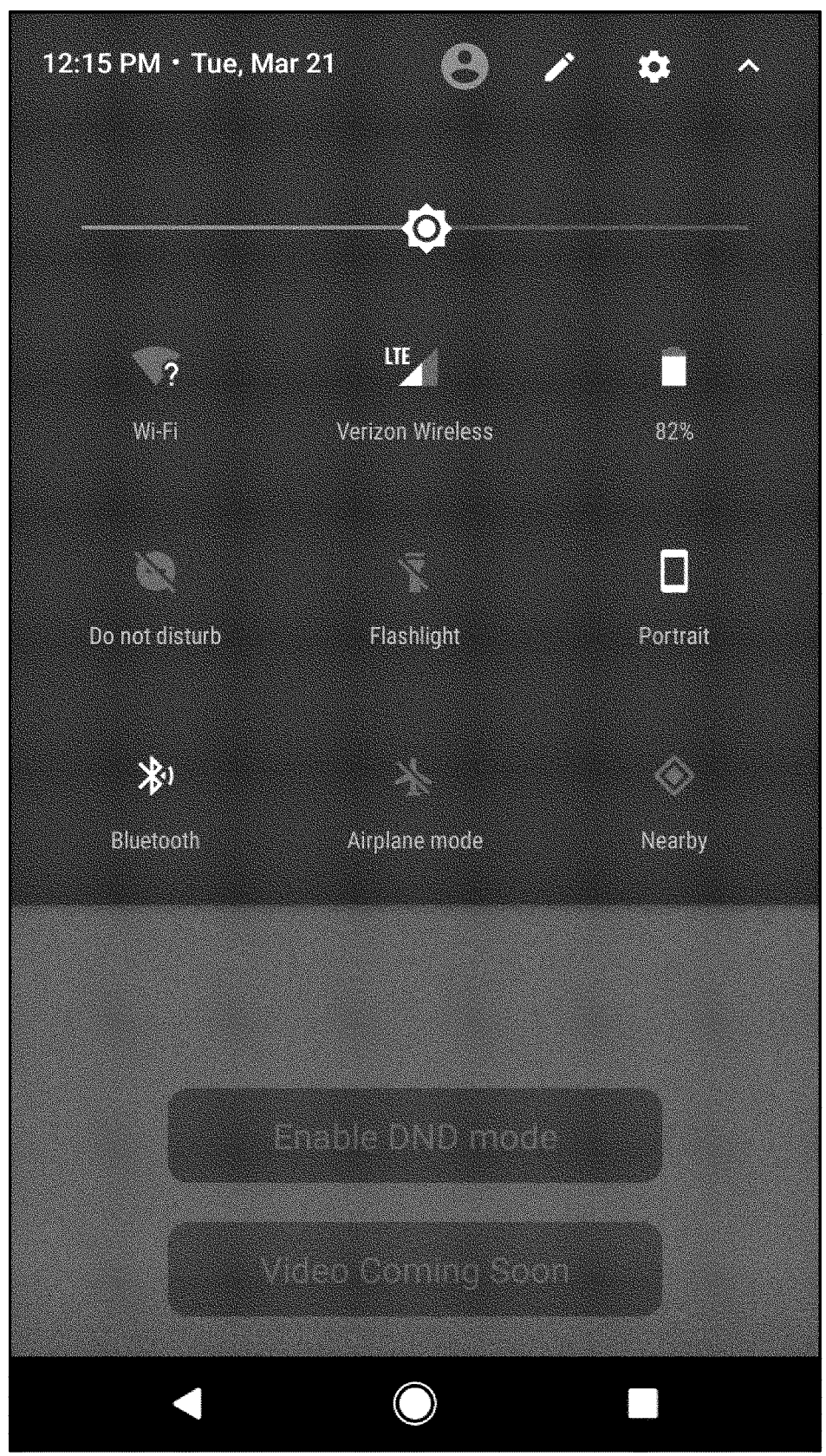
Figure 46:
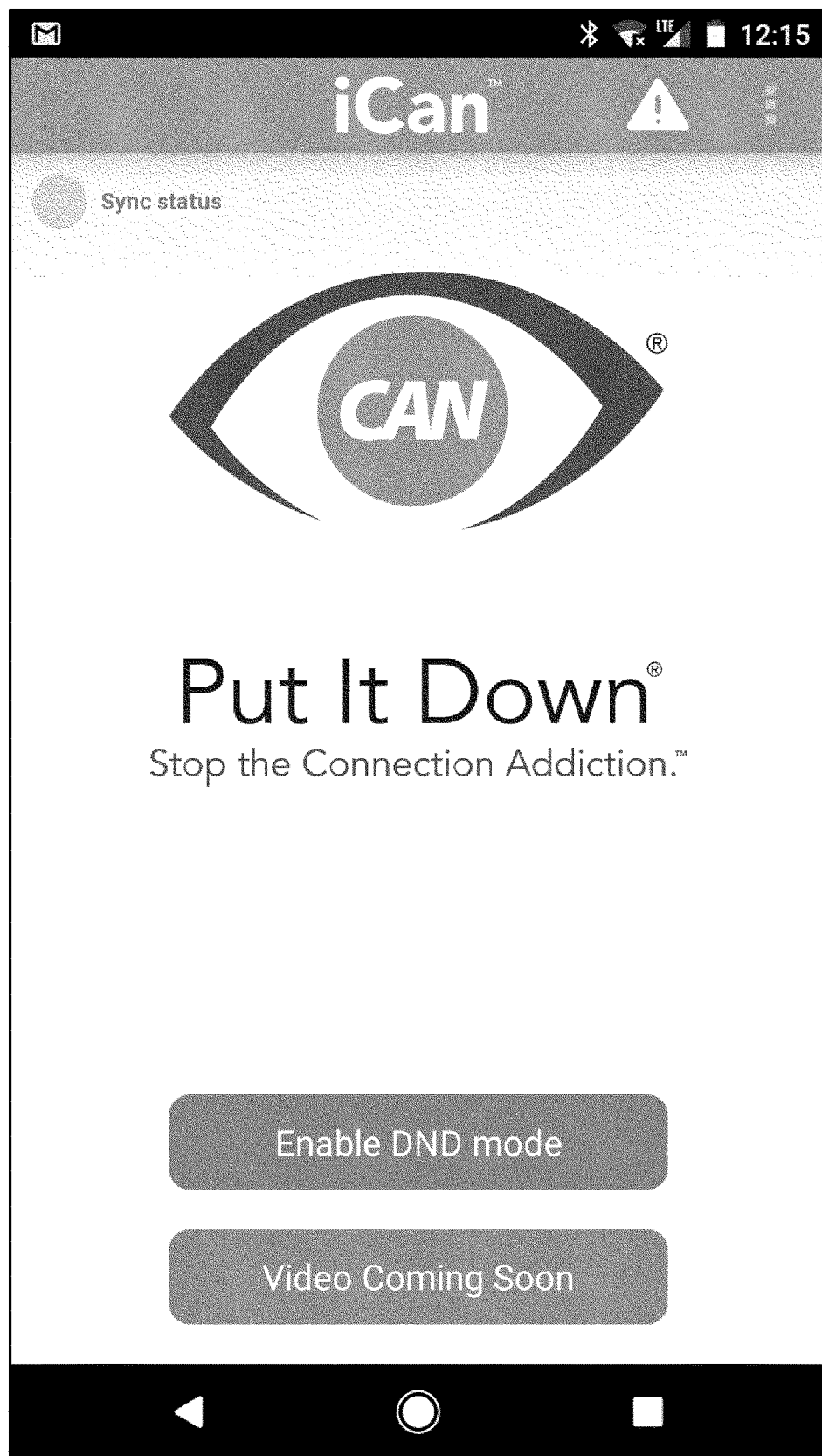
Figure 47:
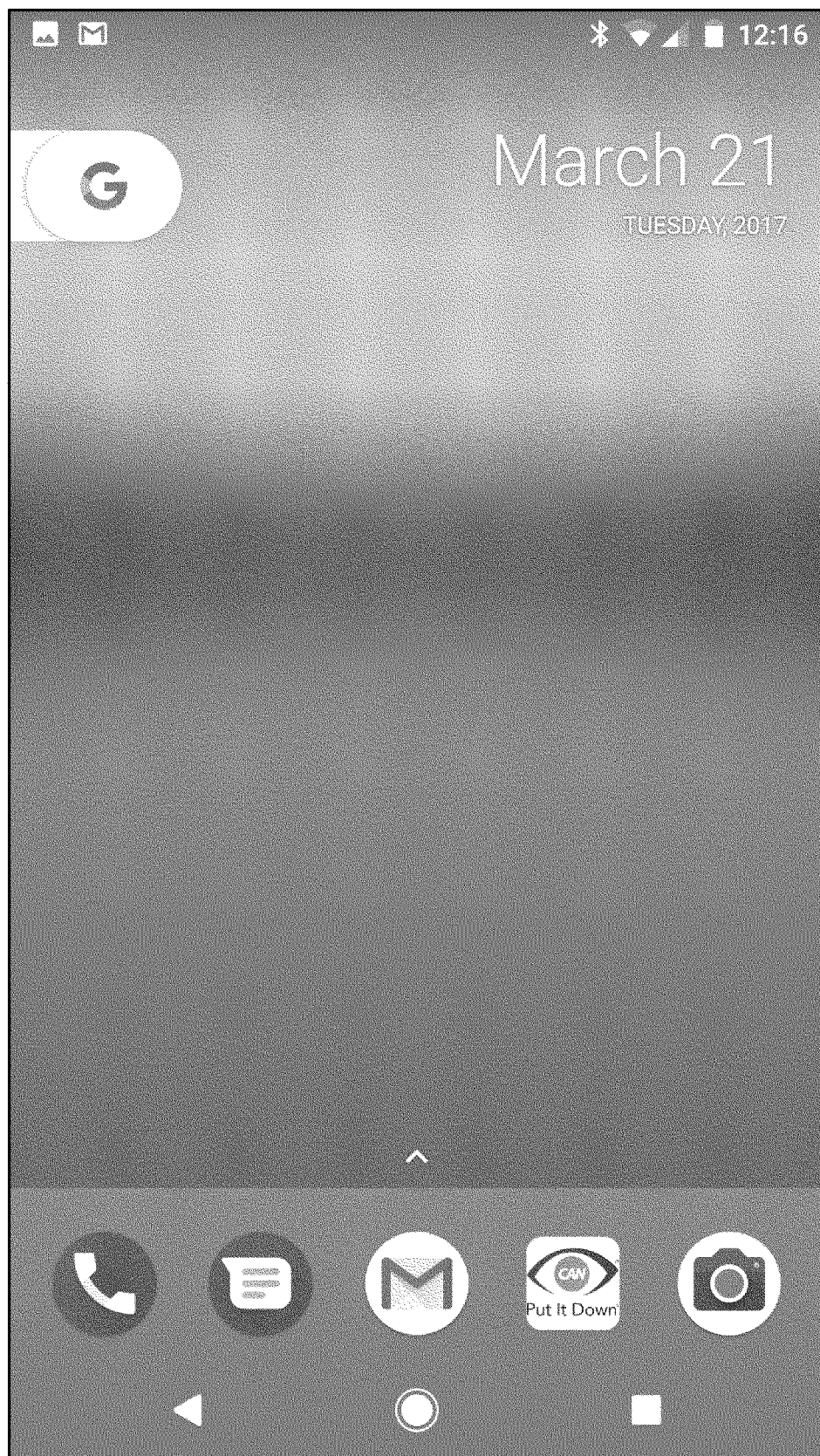

In another way, when the application 170 is open and in the foreground, the control center is engaged from the opened application, and then the airplane mode is turned Off and the control center closed. Then the status monitoring application 170 is closed. Referring to FIG. 42, a device with a locked screen is shown, and as noted by icon 694, the device is in Airplane mode. The unlocked screen of FIG. 43 shows a foreground screen of the open status monitoring application 170. From there, the control center screen can be opened (FIG. 44). Airplane mode may be turned Off by engaging the appropriate field/icon, with the deactivated Airplane mode shown in FIG. 45, and then the control center may be closed (FIG. 46). The monitoring application can be closed or turned Off as well to take the application screen out of the foreground as shown in FIG. 47.

As noted herein, there may be various disabled operational modes for a device, such as an Airplane mode or a Do Not Disturb or DND mode. As such, the status monitoring application 170 will evaluate changes in the operational mode associated with the device being originally in such a disabled operational mode and then being brought back into a usable or enabled mode, which is considered a change in the operational status. In accordance with one embodiment of the invention as discussed herein, once the status monitoring application has been selected or opened and brought to the foreground screen, the user can proceed or is instructed to proceed to the control center for the device in order to select a disabled operational mode and thus activate the monitoring application to begin monitoring the device.

In accordance with another embodiment of the invention, the disabled operational mode might be selected in other ways. For example, the device might be put into a disabled operational mode directly from the screen associated with the opened status monitoring application 170 rather than proceeding to the control center. The monitoring application then monitors the device for a change in the operational status. That is, a device may be operating under an operating system wherein the monitoring application is active in the background without being opened and brought to the foreground screen. This provides additional ways for putting the device into and out of a disabled operational mode for monitoring purposes. For example, a monitoring application operating with an Android operating system might be used to implement such an embodiment. The device might be placed in a disabled operational mode without having to engage the control center for the device. Rather, the device might be placed into such a mode directly from the status monitoring application 170 and an open or foreground screen associated therewith.

Figure 48:
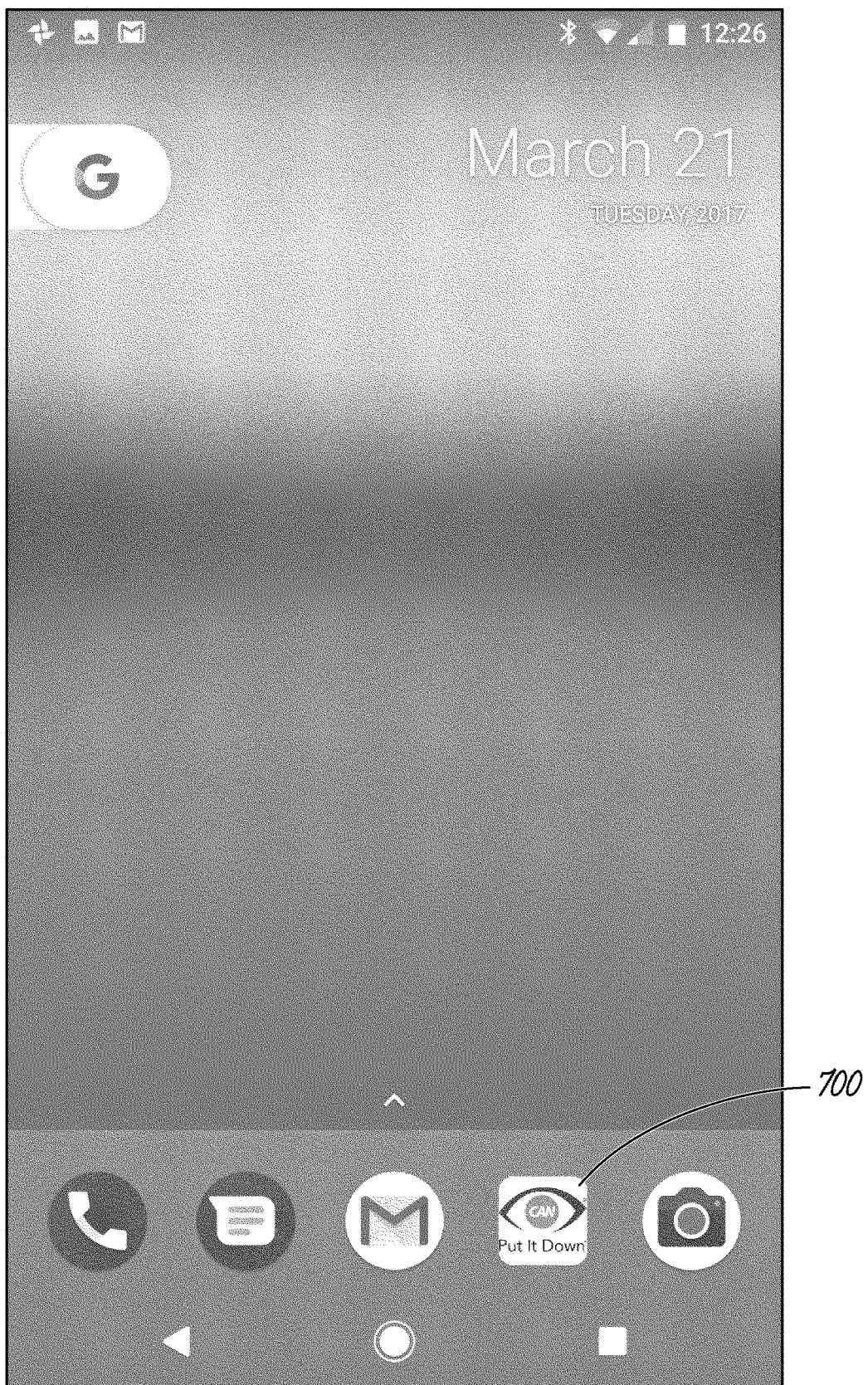
FIGS. 48-51 are diagrammatic views of other example graphical user interfaces that may be output on a display of a mobile device for a device placed in a disabled mode through a screen, in accordance with the invention.
Figure 49:
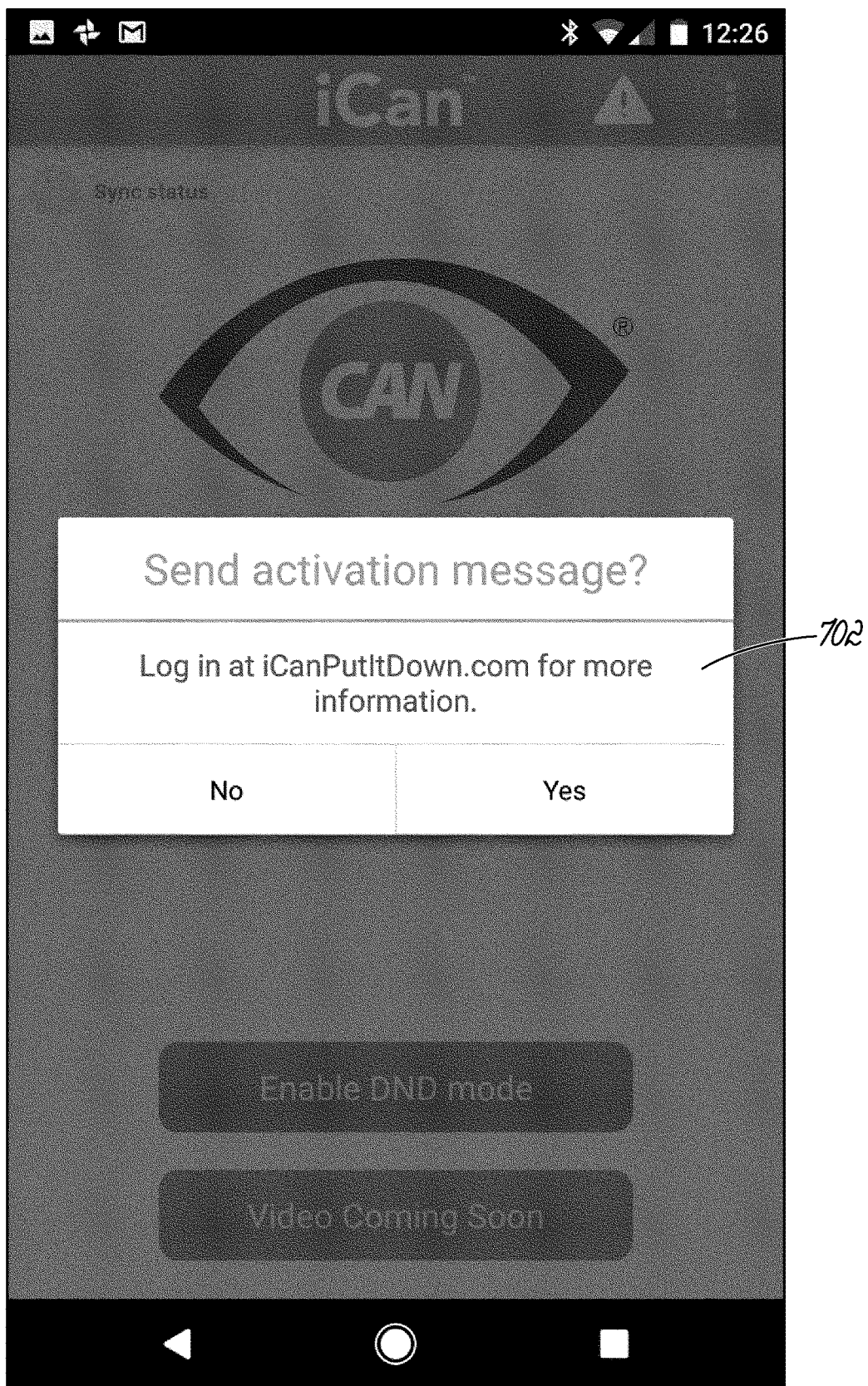
Figure 50:
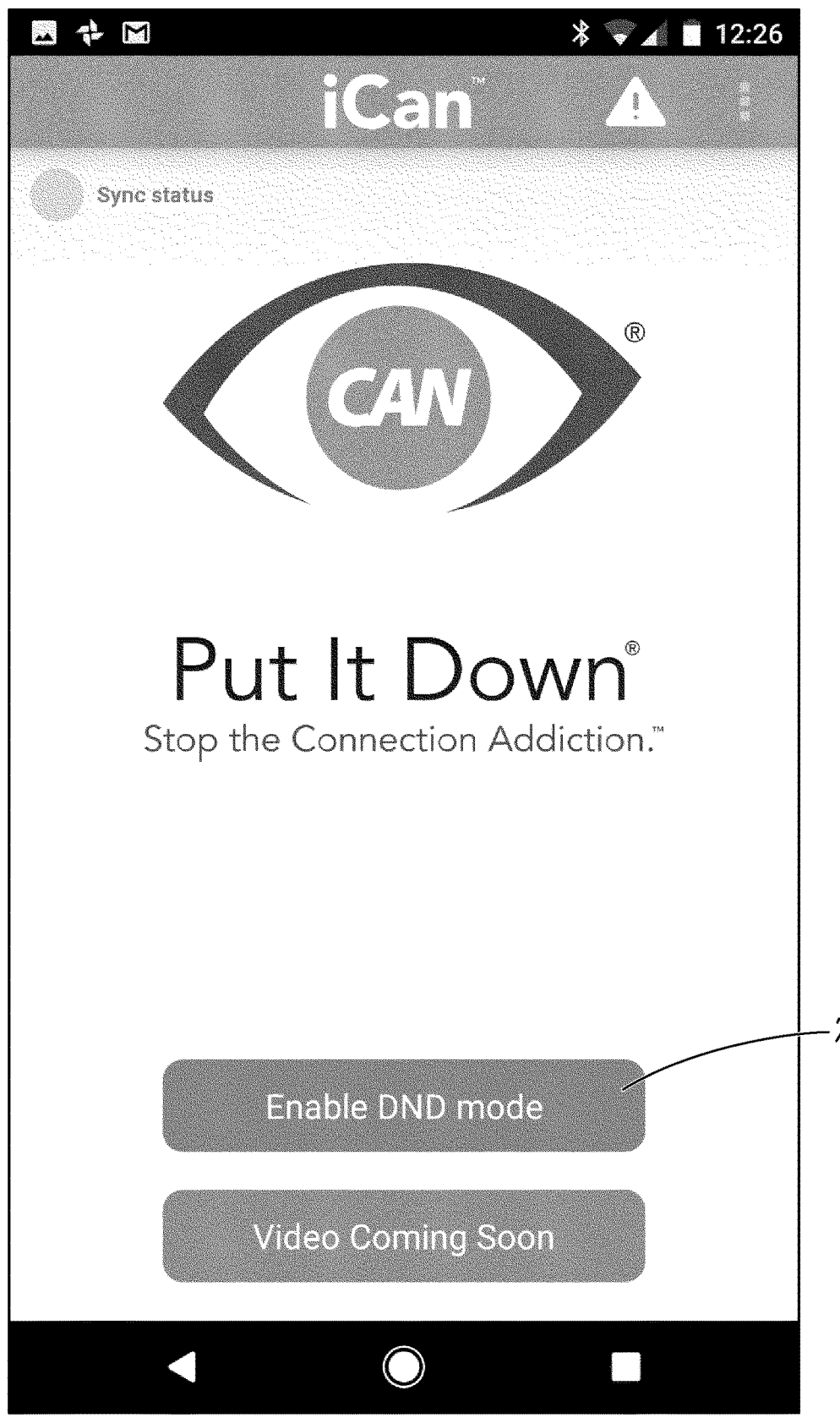
Figure 51:
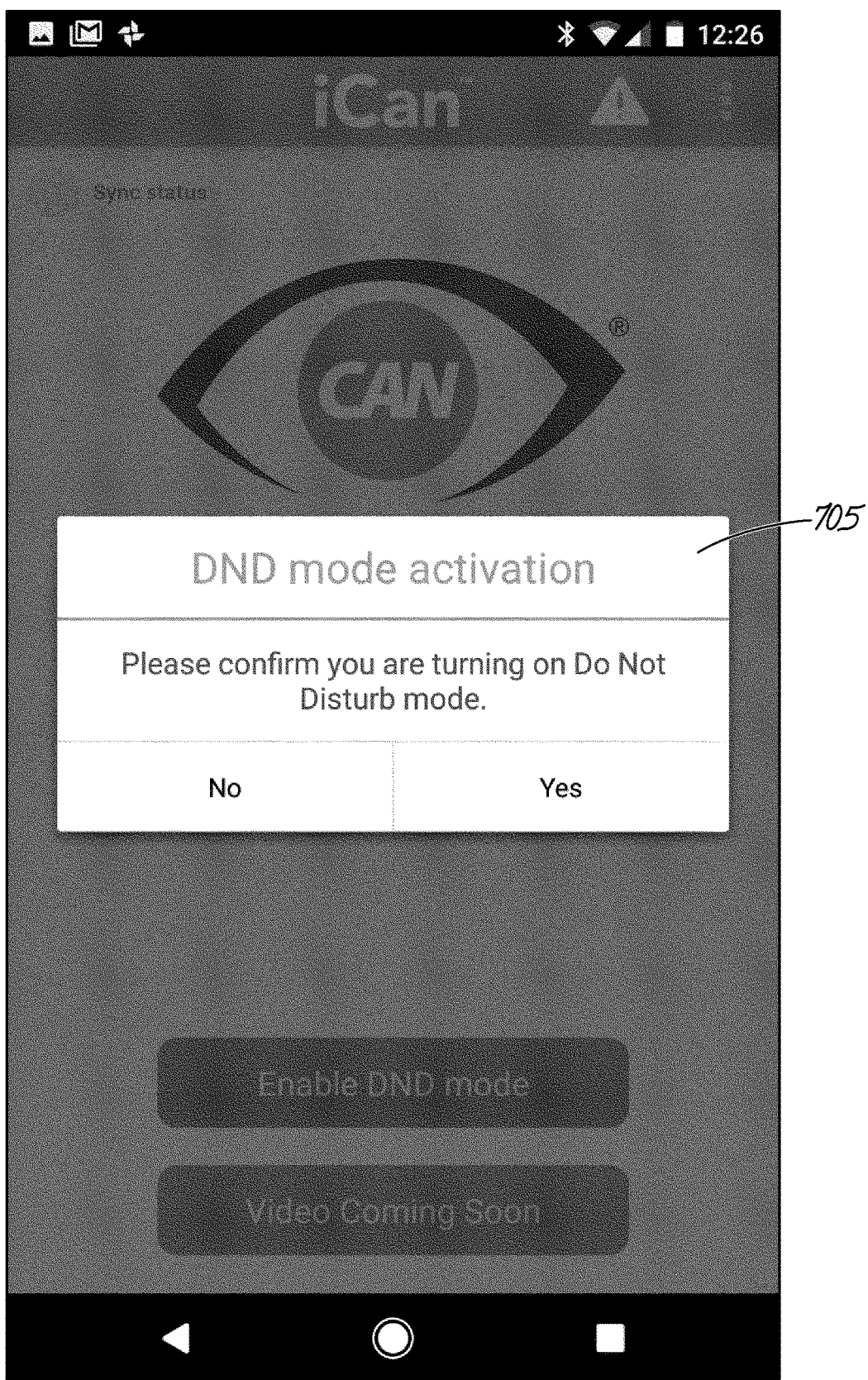
Figure 52:
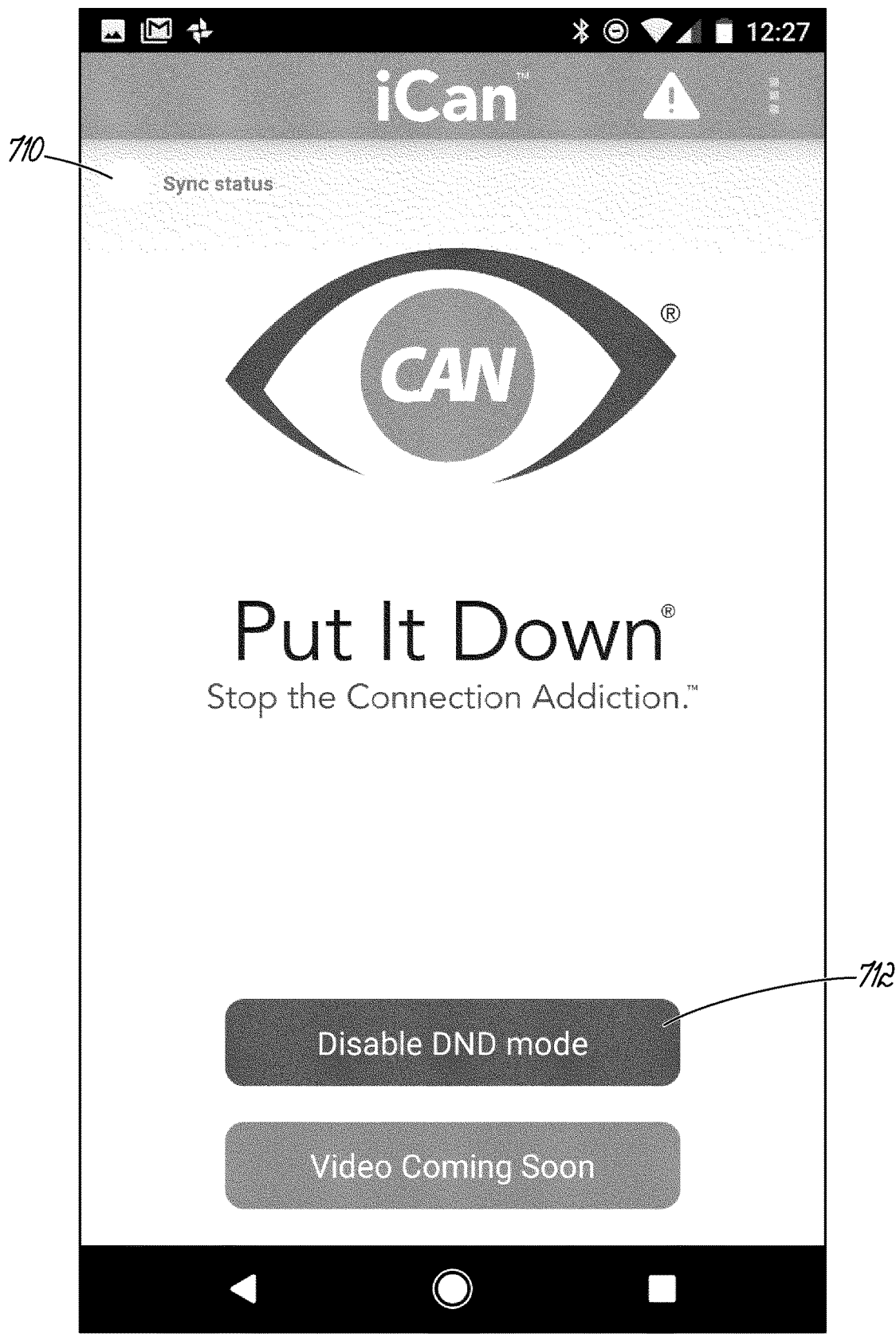
FIGS. 52-53 are diagrammatic views of other example graphical user interfaces that may be output on a display of a mobile device for a device to be activated through a screen, in accordance with the invention.
Figure 53:
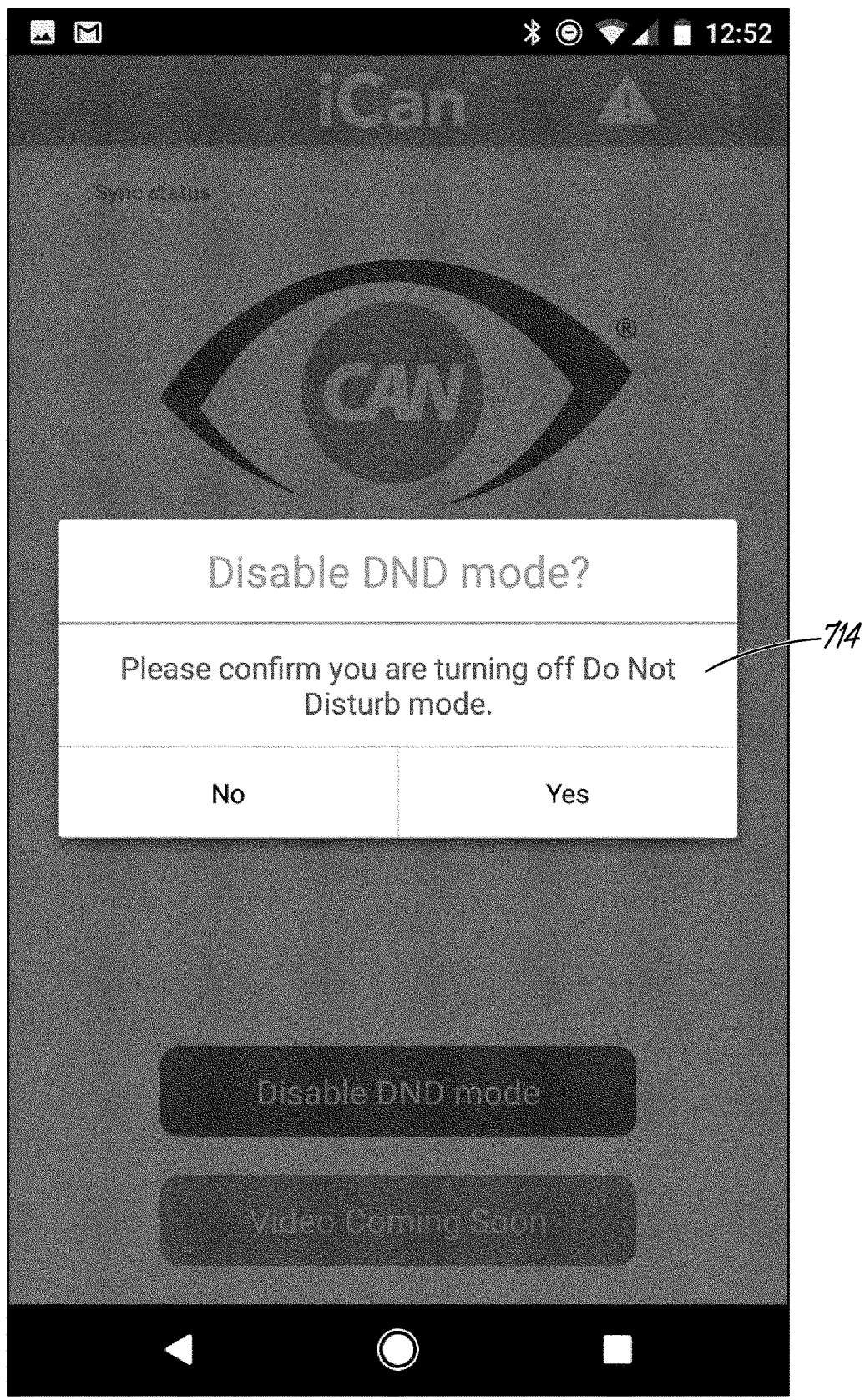

Turning to FIG. 48, a screen is shown for a device where the monitoring application is available as shown by icon/field 700. The icon 700 might be engaged to open the application 170 and thereby monitor the device in a disabled operational mode and report a change of status in accordance with features of the status monitoring application 170. After the status monitoring application is opened as illustrated in FIG. 49, a user might be given a message or prompt through field 702 to send an activation message as earlier noted, such as in FIG. 9C, in accordance with one feature of the invention. FIG. 50 reflects a foreground screen for the open status monitoring application (such as after sending an activation message) and provides a selectable field 704 for enabling a disabled operational mode for the device. That is, the device may be placed in a disabled operational mode or disabled right from the status monitoring application screen. In the illustrated embodiment, the Do Not Disturb (DND) mode for the device is shown. By engaging the field 704, the device is placed in the DND mode and the status monitoring application is activated to note the change in status and a time and then subsequently to report any change in the operational status of the device. Confirmation of the disable step might be required and screen FIG. 51 shows a message 705 for confirmation of selection of the disabled operational mode such as the DND mode. FIG. 52 illustrates a screen that indicates that the application is activated and in DND mode and the sync status field 710 and a changed color thereof might reflect the activated status monitoring application and another disabled operational mode, since it is in DND mode rather than Airplane mode. Also, field 712 is provided and might be engaged to take the device out of the disabled mode (DND mode). Therefore, the device may be disabled and again enabled from the application 170. If field 712 is engaged, the device is taken out of DND mode. This will result in a change in operational status in the invention and is reported as such. The user might be given a notification as shown in field 714 of FIG. 53 to confirm that the device is to change operational status. In this case, the DND mode is being turned Off. If DND is turned Off, the screen returns to the screen of FIG. 50. The change in status is reported appropriately in accordance with the invention.

Figure 54:
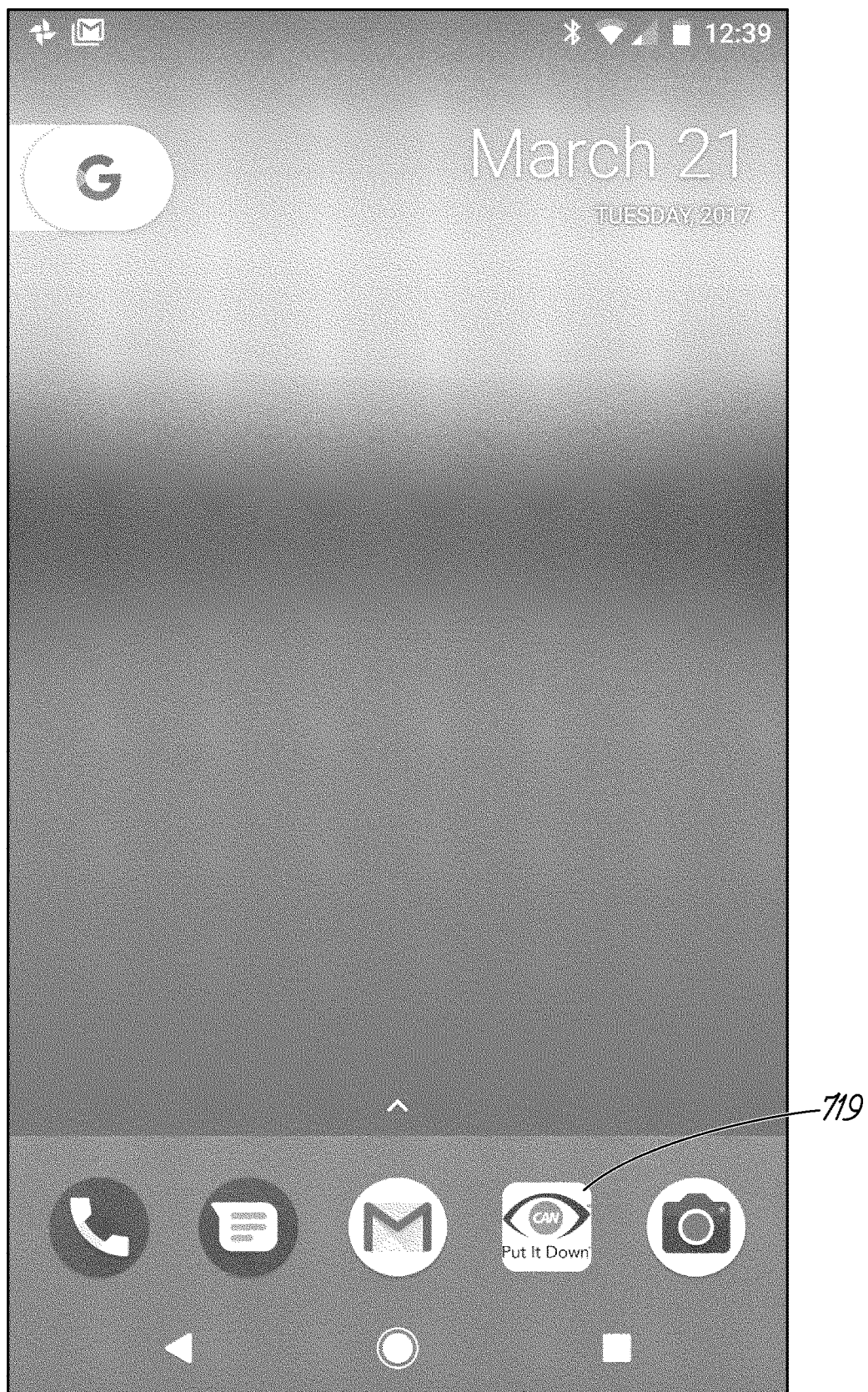
FIGS. 54-58 are diagrammatic views of other example graphical user interfaces that may be output on a display of a mobile device for a device placed in a disabled mode through a control center of device, in accordance with the invention.
Figure 55:
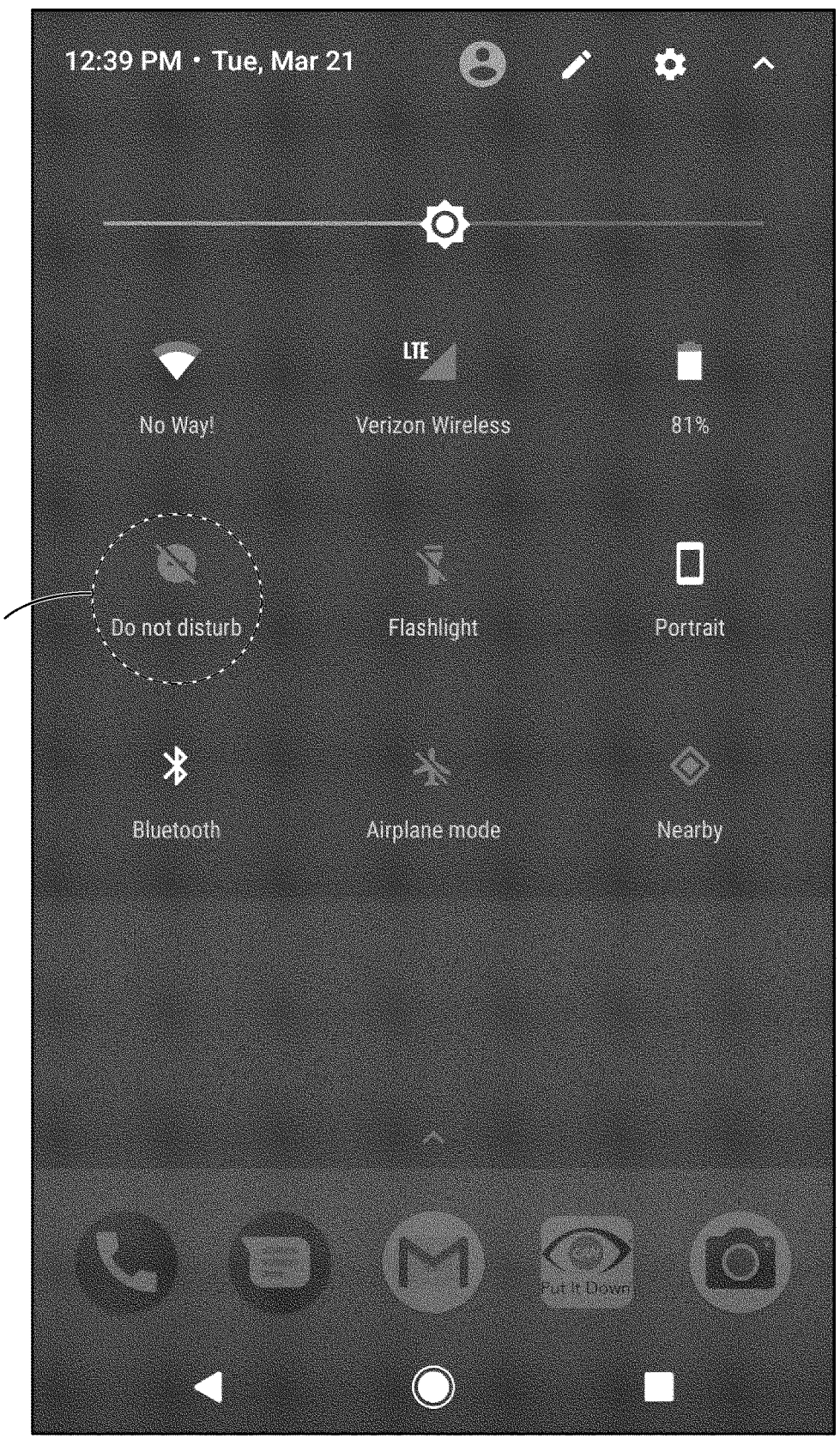
Figure 56:
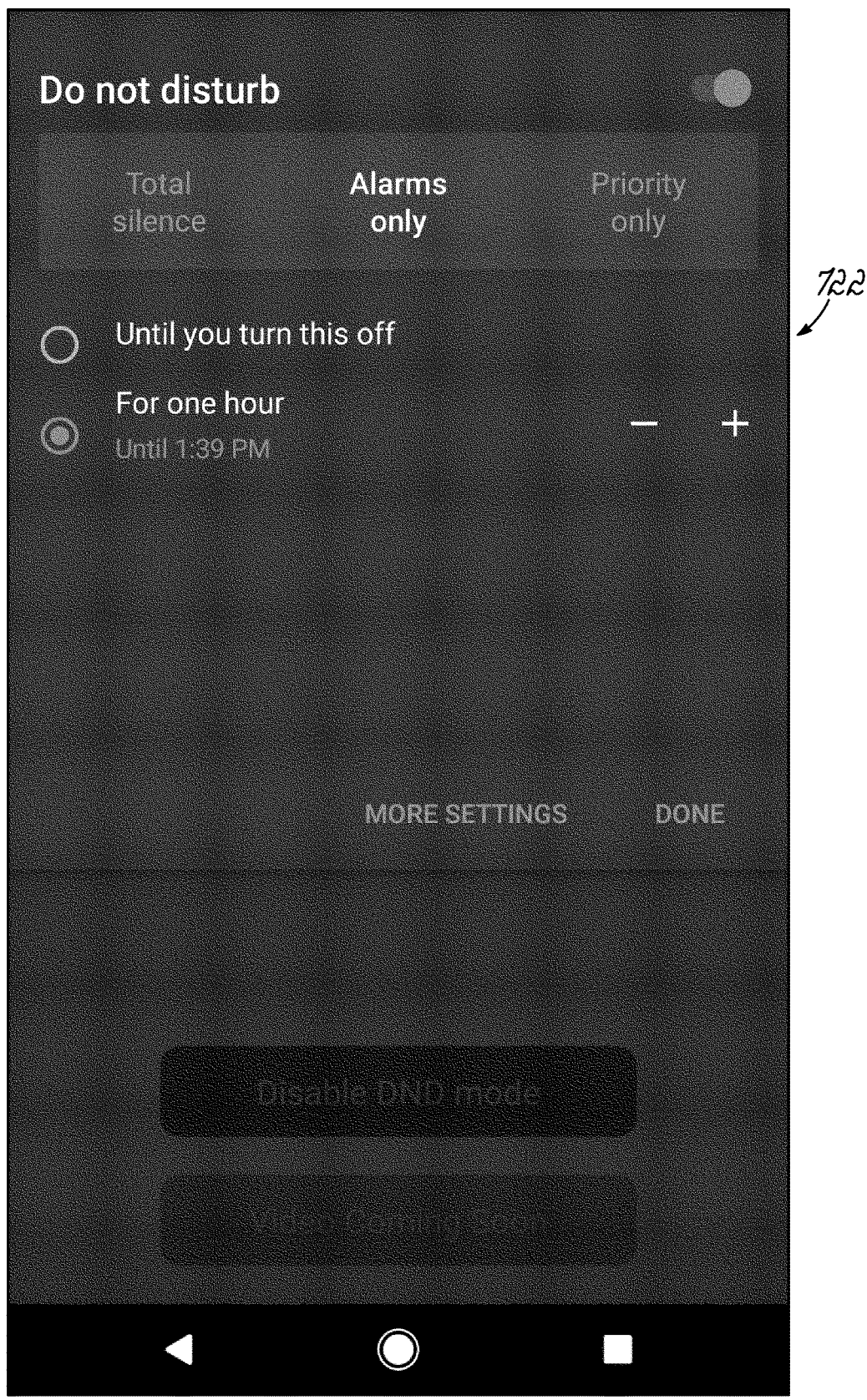
Figure 57:
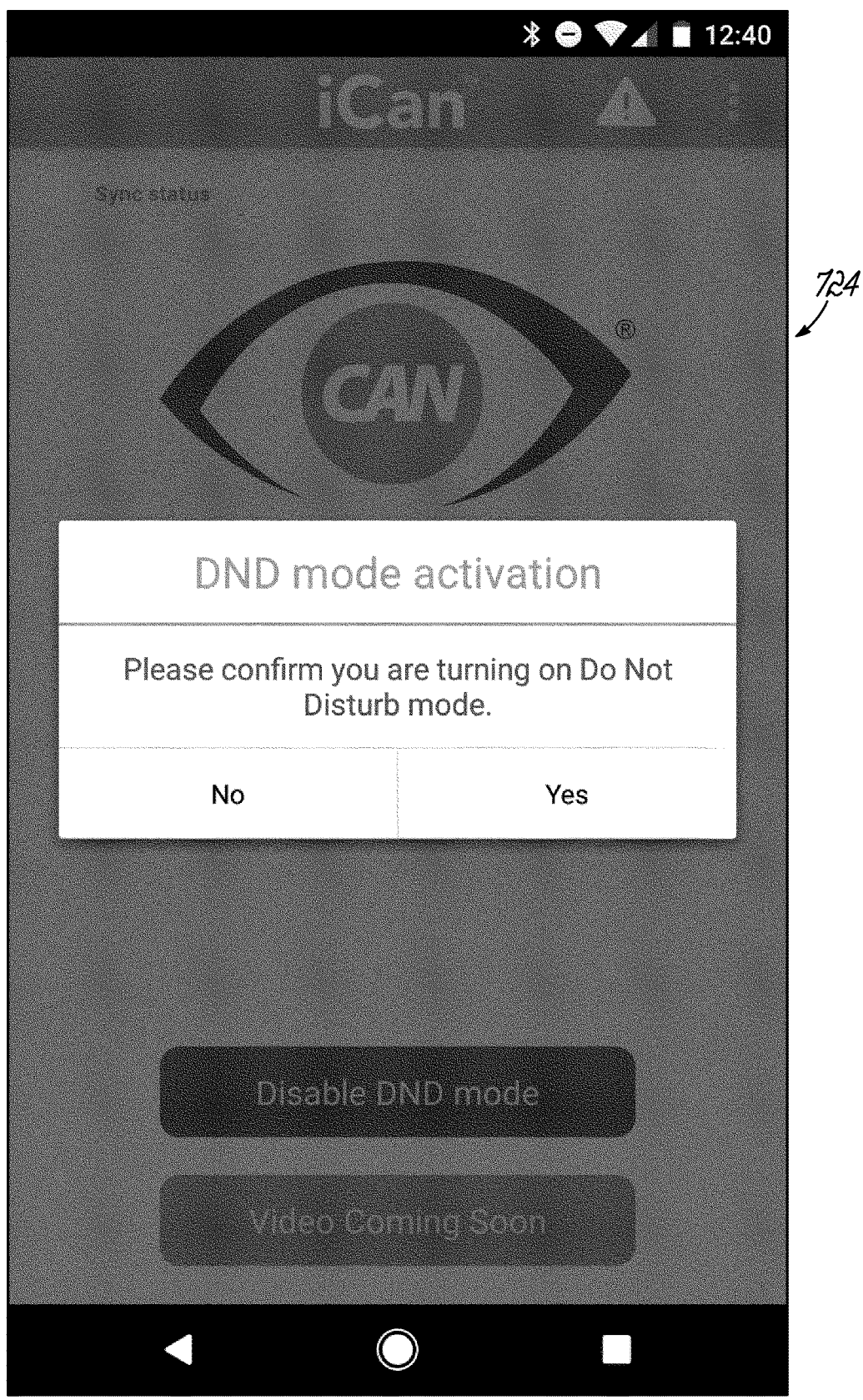
Figure 58:
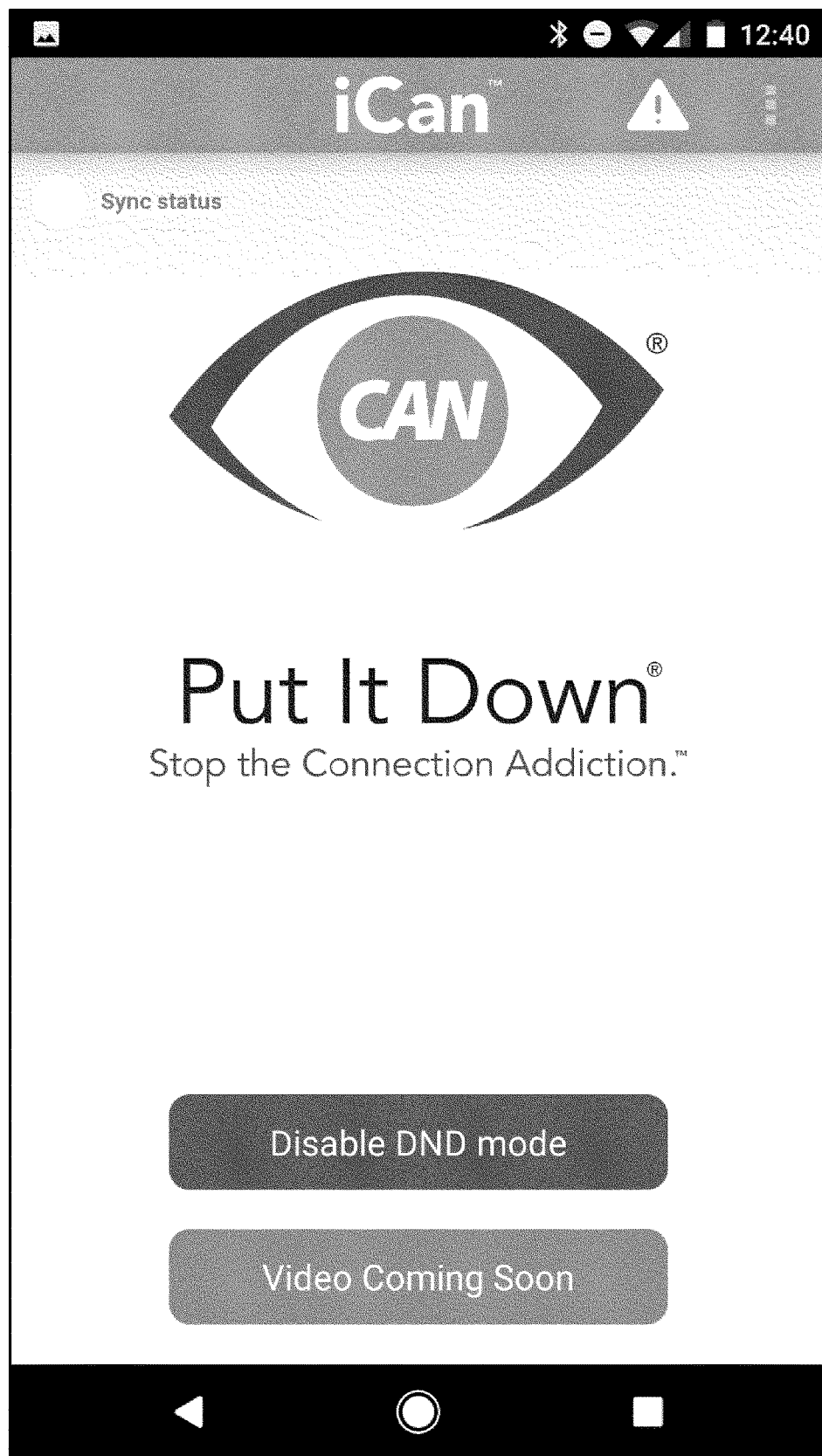

In still another embodiment, the DND mode might be another disabled mode that might be selected directly from the control center. Referring to FIG. 54, the device screen is shown and has the status monitoring application 170 thereon as illustrated by icon/field 719. In that case, rather than going to the status monitoring application and putting the application in the foreground screen as shown in FIG. 50, the user might go directly to the control center as illustrated in FIG. 55. The DND mode might be activated by engaging field 720. Then depending on various selectable DND submodes 722, a particular submode might be selected as illustrated in FIG. 56 to activate the DND mode. The DND submodes might provide for different connectivity depending on the device. For example, "Total Silence" will block everything, whereas the submode "Alarms only" might block everything except for a phone call. The submode "Priority Only" might block everything except a phone call from a programmed list of callers. Then the control center can be closed as illustrated in FIG. 57. A confirmation message with selectable field 724 might be displayed to confirm the enablement of a DND mode as shown in FIG. 57. After confirmation, the screen similar to the screen of FIG. 58 is displayed and indicates that the application is activated and in DND mode, with the DND mode having been selected through the control center.

Figure 59:
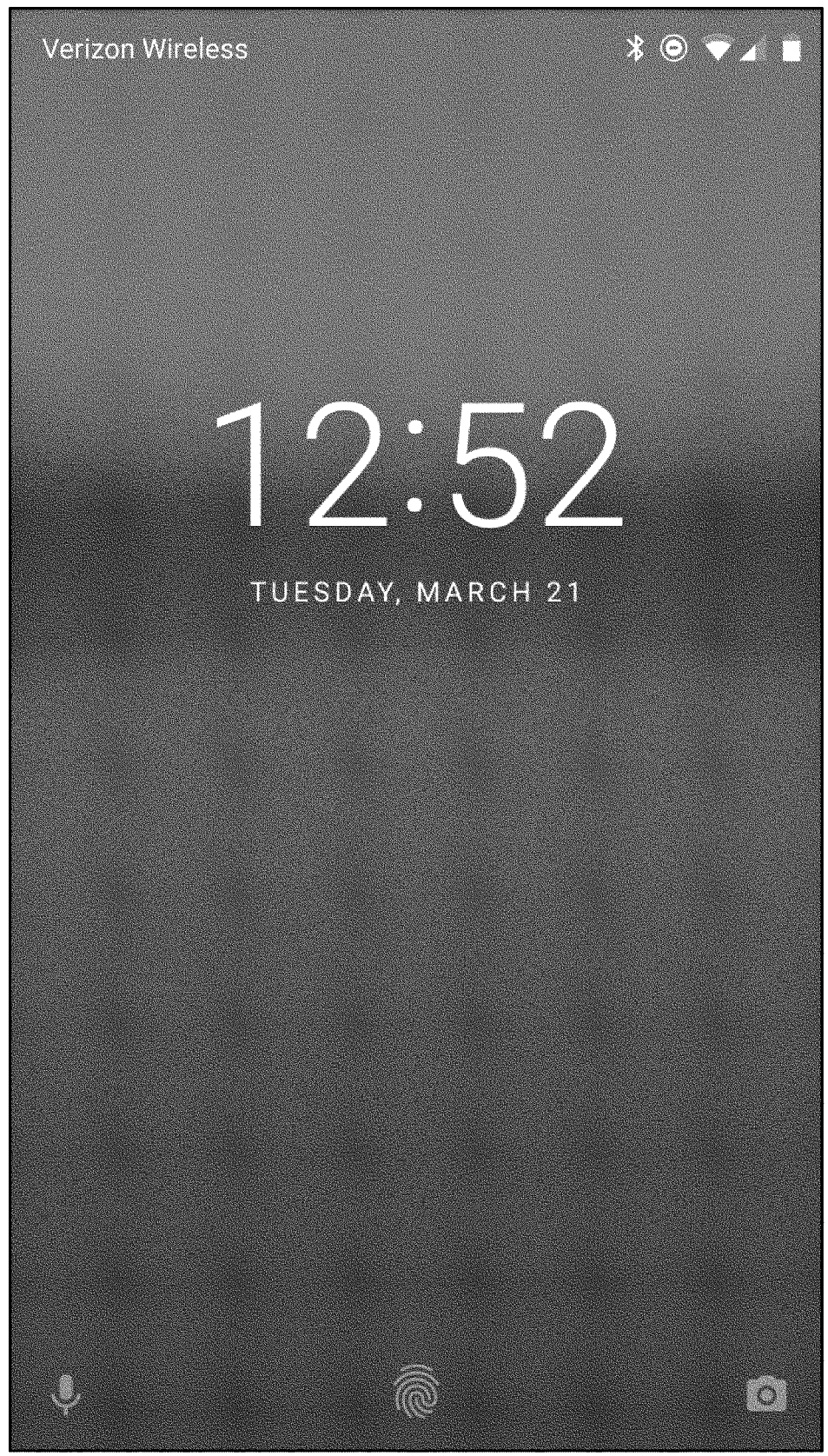
FIGS. 59-62 are diagrammatic views of other example graphical user interfaces that may be output on a display of a mobile device for a device placed in a disabled mode through a screen, in accordance with the invention.
Figure 60:
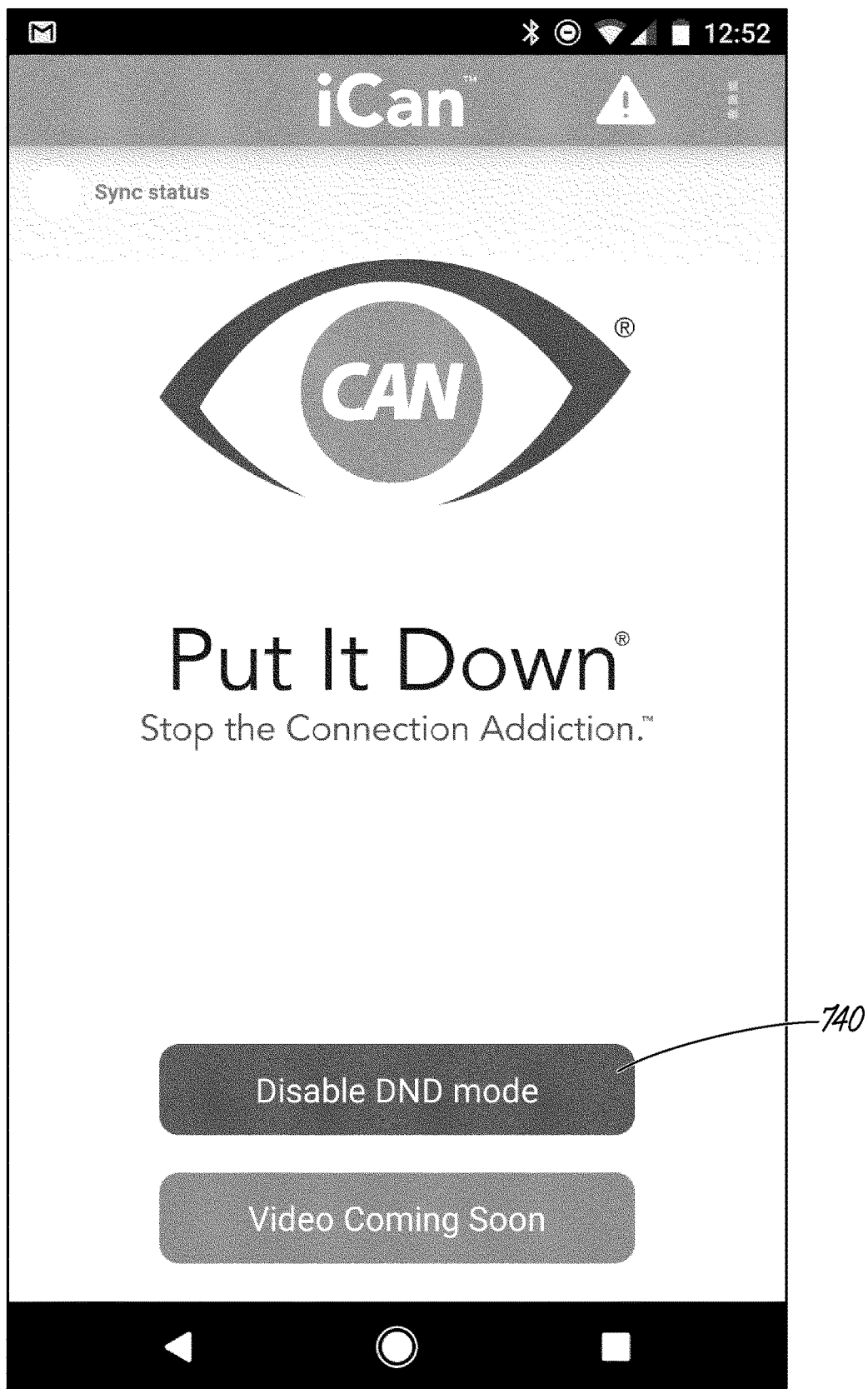
Figure 61:
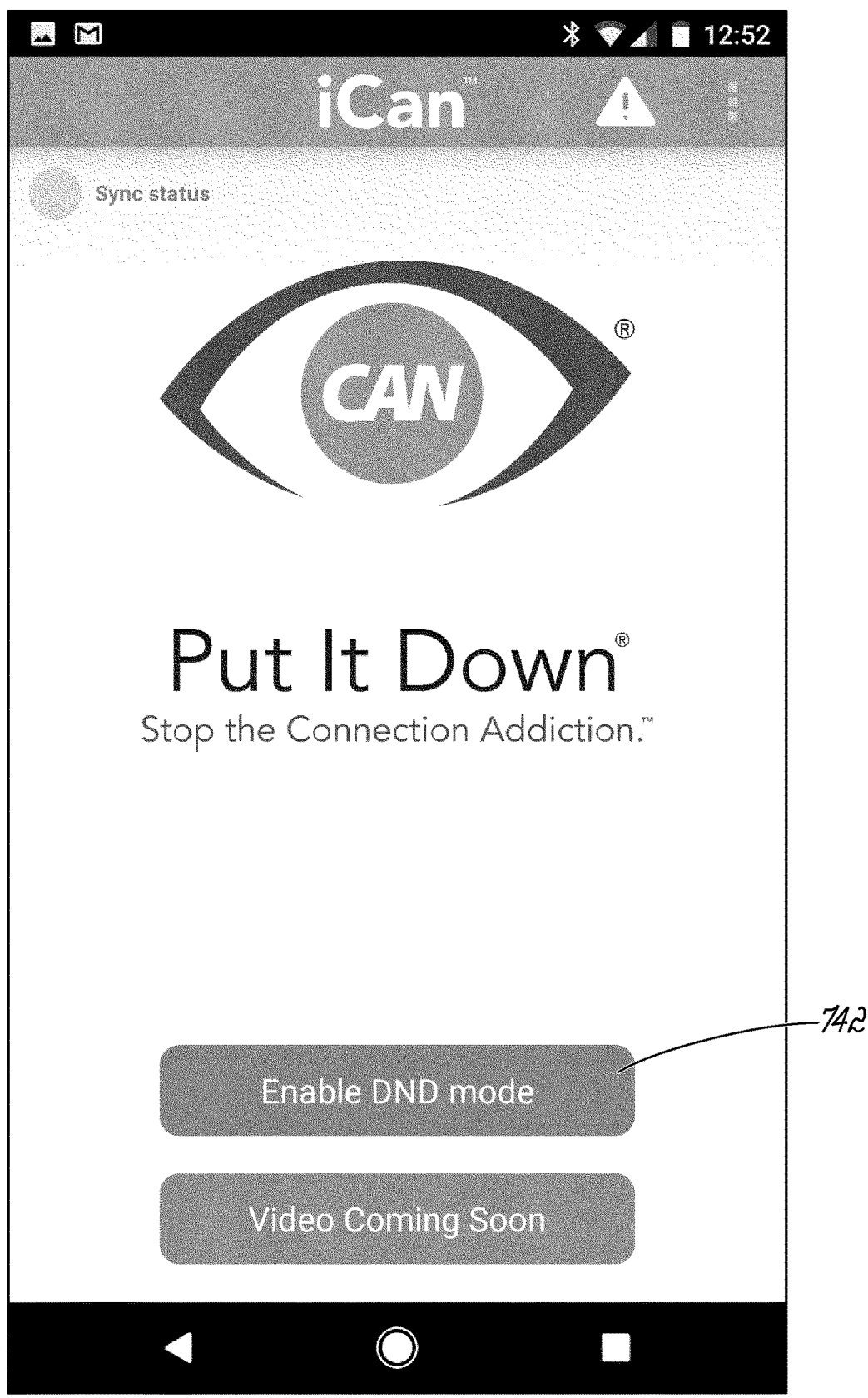
Figure 62:
Figure 63:
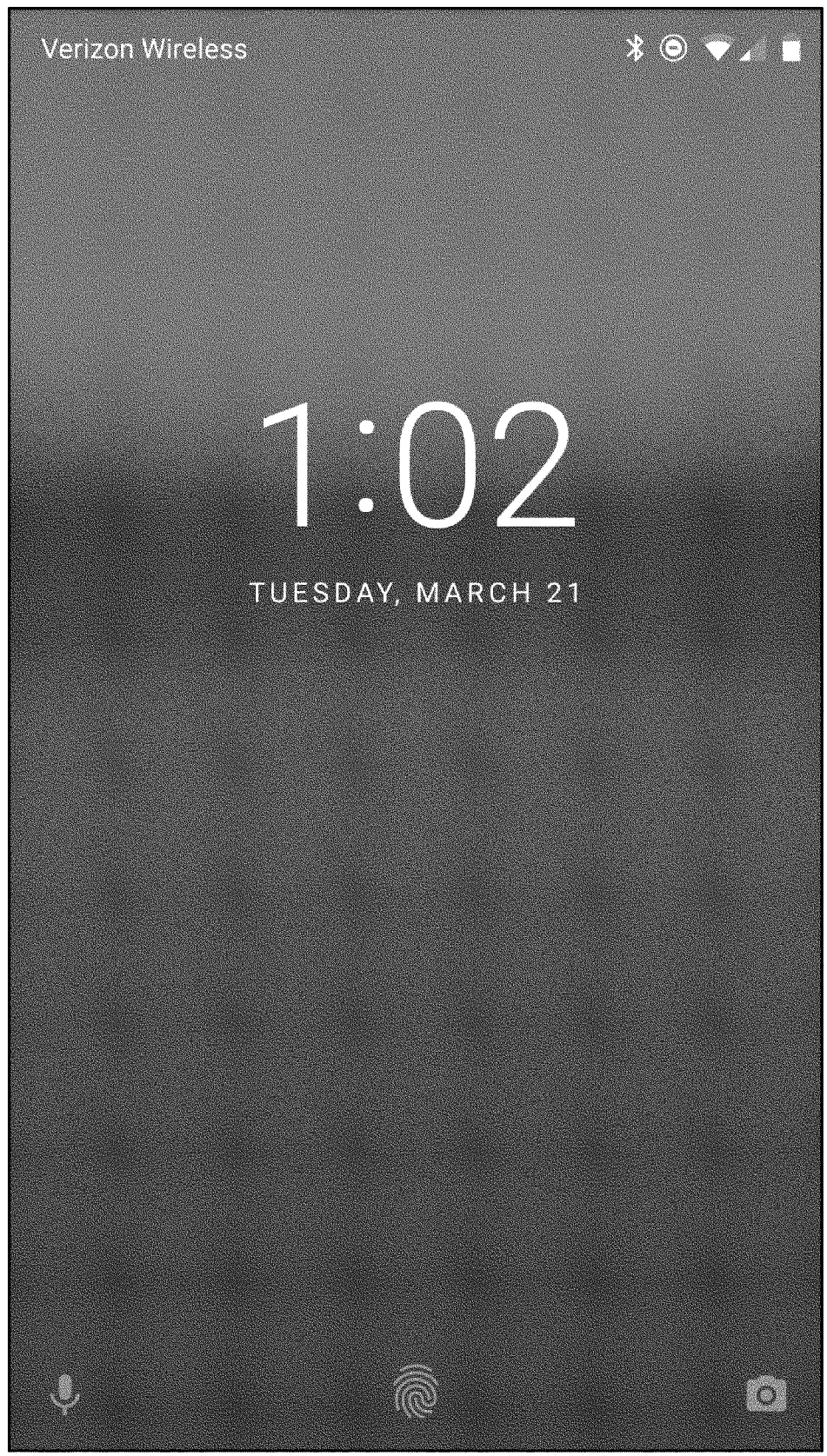
FIGS. 63-68 are diagrammatic views of other example graphical user interfaces that may be output on a display of a mobile device for a device to be activated through a control center of device, in accordance with the invention.

In order to deactivate the DND mode, there are several ways that might be accomplished, either through the monitoring application screen interfaces or through the control center directly as disclosed herein for entering the DND mode. Referring to FIGS. 59-62, the device might be locked as shown in FIG. 59, and can be unlocked thereby showing the screen if FIG. 60 with the opened or foreground status monitoring application screen illustrated. Then the user can select Disable DND mode as in field 740 of FIG. 60. A message with fields requiring confirmation of the mode change might be provided as in FIG. 53. If the mode or status change is confirmed (select Yes in FIG. 53) the screen of FIG. 61 shows the status change on the monitoring application screen, (e.g. field 742) that may have different text of a different color than in the screen of FIG. 60. The change in operational status is also reported accordingly. Then the status monitoring application can be closed or taken out of the foreground. As noted, in certain embodiments, it will still be running in the background. (FIG. 62).

Figure 64:
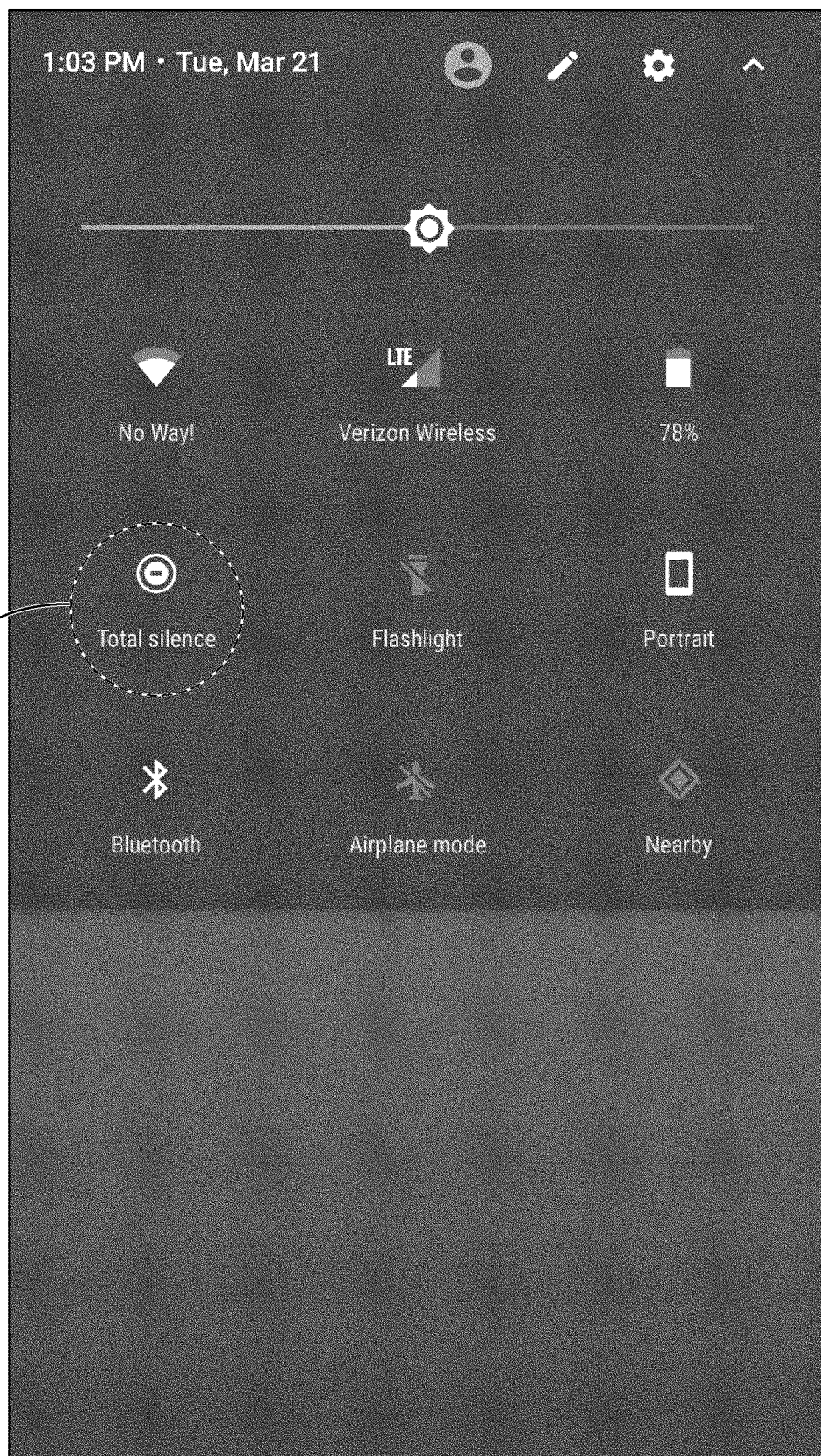
Figure 65:
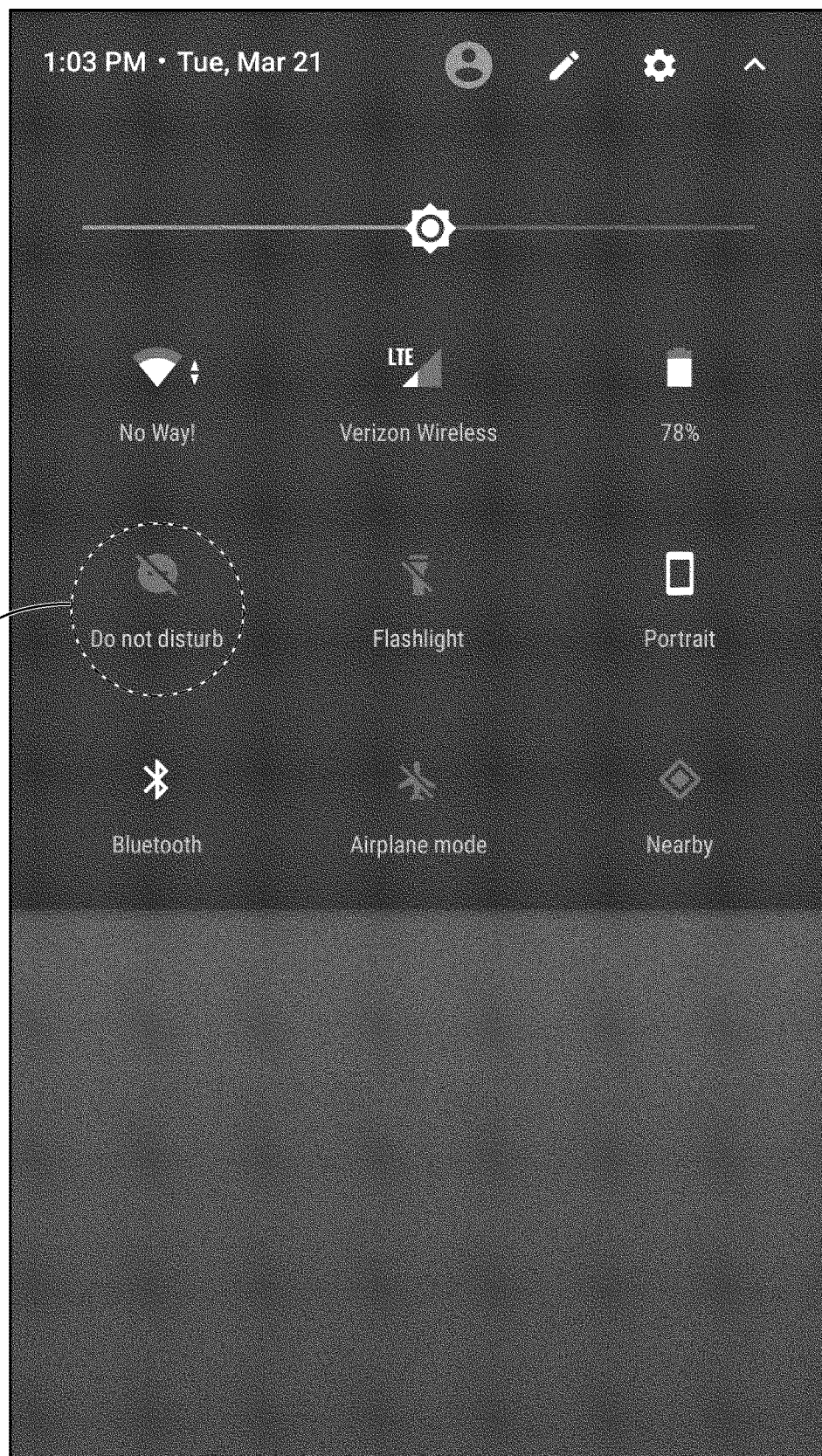
Figure 66:
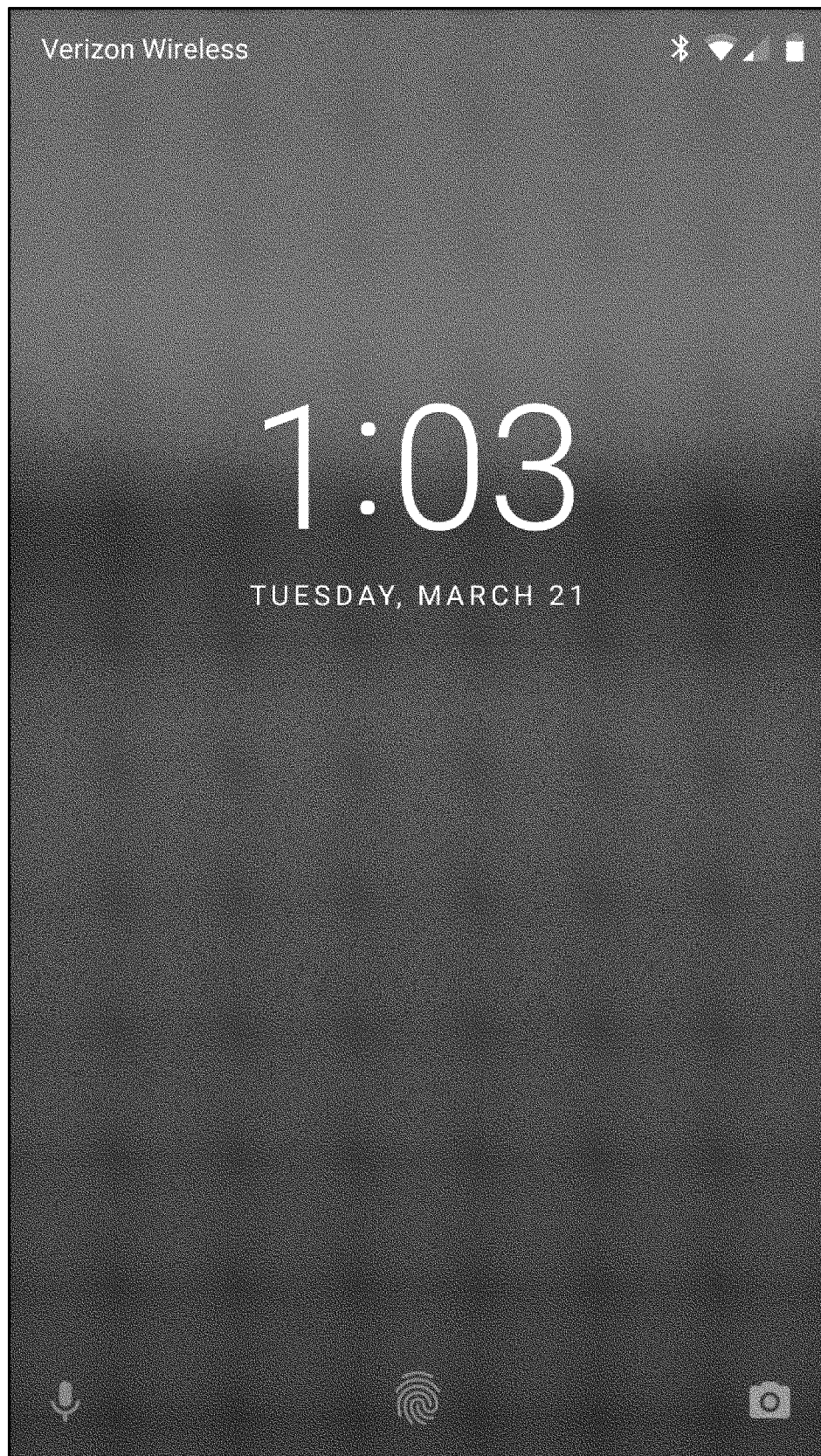
Figure 67:
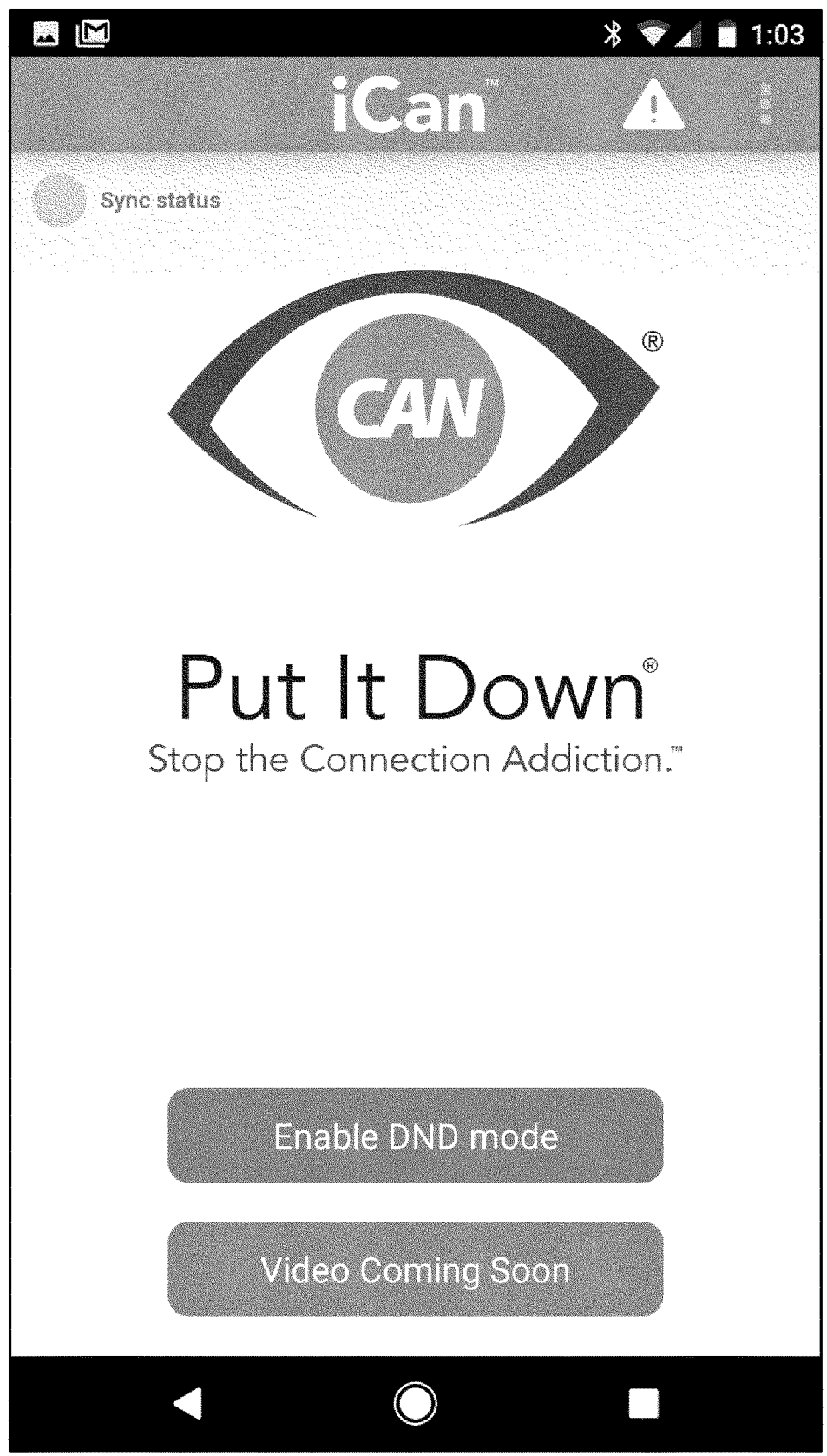
Figure 68:
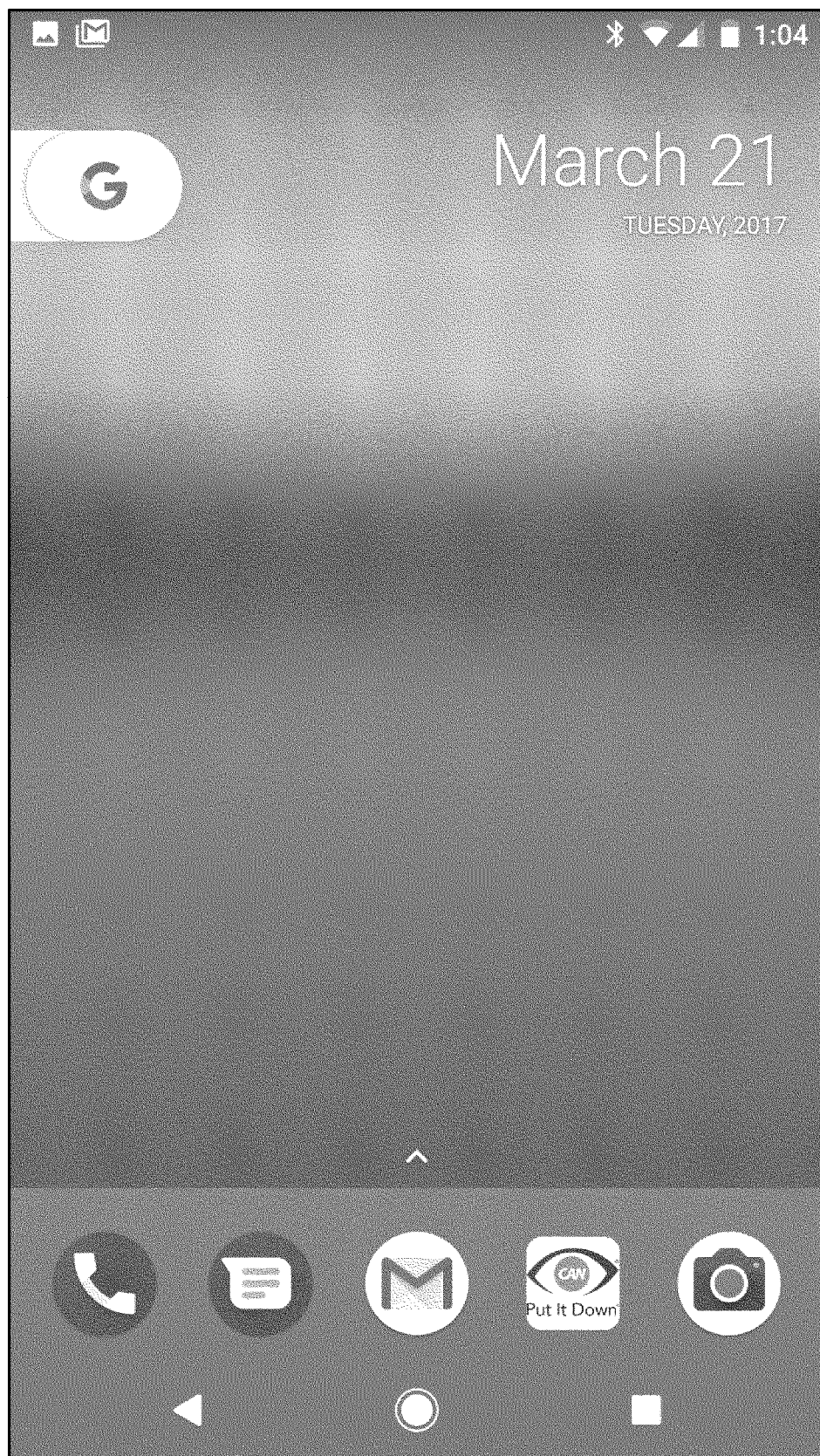

Alternatively, if the application is active but with the device in a locked screen, the control center might be opened to deactivate the disabled DND mode directly and bring the device to an operational status, thus triggering the reporting of the status change, without opening the monitoring application. Referring to FIGS. 63-68, from the locked device screen of FIG. 63, the control center can be brought up (FIG. 64). The device is in a DND mode as illustrated by icon/field 746. The DND mode can then be disabled (such as by selecting a "Total silence" field 746 for example) as shown in FIG. 65 where DND is disabled. Then the control center might be closed (FIG. 66). In order to close the monitoring application, the device might be unlocked, thus revealing the screen of the monitoring application 170 (FIG. 67). The monitoring application might then be closed (FIG. 68).

In accordance with another embodiment of the invention, even when a device has been placed into a disabled operational mode, there may be some features of the device that are not disabled and are still active. In such scenarios, in addition to capturing information about a change in operational status to the monitoring application, the invention also captures data related to other activities that might be done with the device by a user. This data is collected even if a particular reportable change in operational status has not occurred and the device is still in a disabled operational mode. Then such additional data may be reported along with any change in operational status in a dashboard as discussed herein. That is the status monitoring application is operational to capture and report other information in addition to a change in the operational status of the application.

For example, in a DND disabled operational mode for certain devices, a telephone call may still be made or received without taking the device out of the DND disabled operational mode. Therefore, the invention captures data regarding a call and reports such activity in addition to reporting any change in operational status. In accordance with another feature, the activities that occur may be reported differently depending on the type of activity and the data captured.

Figure 69:
FIGS. 69-72 are exemplary dashboard screens reporting device transactions, in accordance with the invention.

Referring to the reporting dashboard of FIG. 69, the status monitoring application might be opened for a device in the various ways as noted herein, such as by engaging an application icon on the device screen. Then the user might be advised to put the device in a disabled operational mode and then the device may be put into a disabled mode, such as, for example, the DND mode on the device. An activation message might be sent to a selected recipient indicating that the status monitoring application is being activated or opened for monitoring of the device. That sent activation message might be reported as shown in entry 800. During the time the device is in a DND mode, the user may receive an incoming call, and the application 170 captures data about that incoming call. As part of the reporting, an entry 802 shows the incoming call and essentially the duration of same. The dashboard entry 802 for the incoming call, like other entries as discussed herein, contains date and time information and other information as appropriate for the data that was captured for that event and dashboard entry. During the call, the device is still in the disabled operational mode of DND for posting the entry 802, the device reports data to the monitoring application 132 and system 107 and using that data, the dashboard reports a stopped DND entry 804 when the incoming call was answered. That data entry and time thereof matches up with the start of the call. The call duration is noted as well in the entry 802 from the data captured from the device. Since the device is still in a DND mode, data regarding a new entry is captured and then a new DND entry 806 will reflect the end of the call as the beginning of that entry, once the entry is ultimately reported, such as when the device is taken out of DND mode. Such an entry similar to 802 is made when the incoming call is either a handheld call or a handsfree incoming call, such as through a vehicle Bluetooth system. The device remains in DND mode, as it was not taken out of that mode for the call. Rather, the entries 804, 806 on either end of the call entry 802 indicate the mode that the device is in, and remains in, during the incoming phone call. As noted, the final entry 806 will be made when there is a change in operational status, such as the device is actually taken out the of the disabled operational mode or DND mode eventually for normal use of the device. That information about the user being on the phone while the device was in the DND mode may be of interest to one or more parties concerned with the distraction of the device user.

Figure 70:
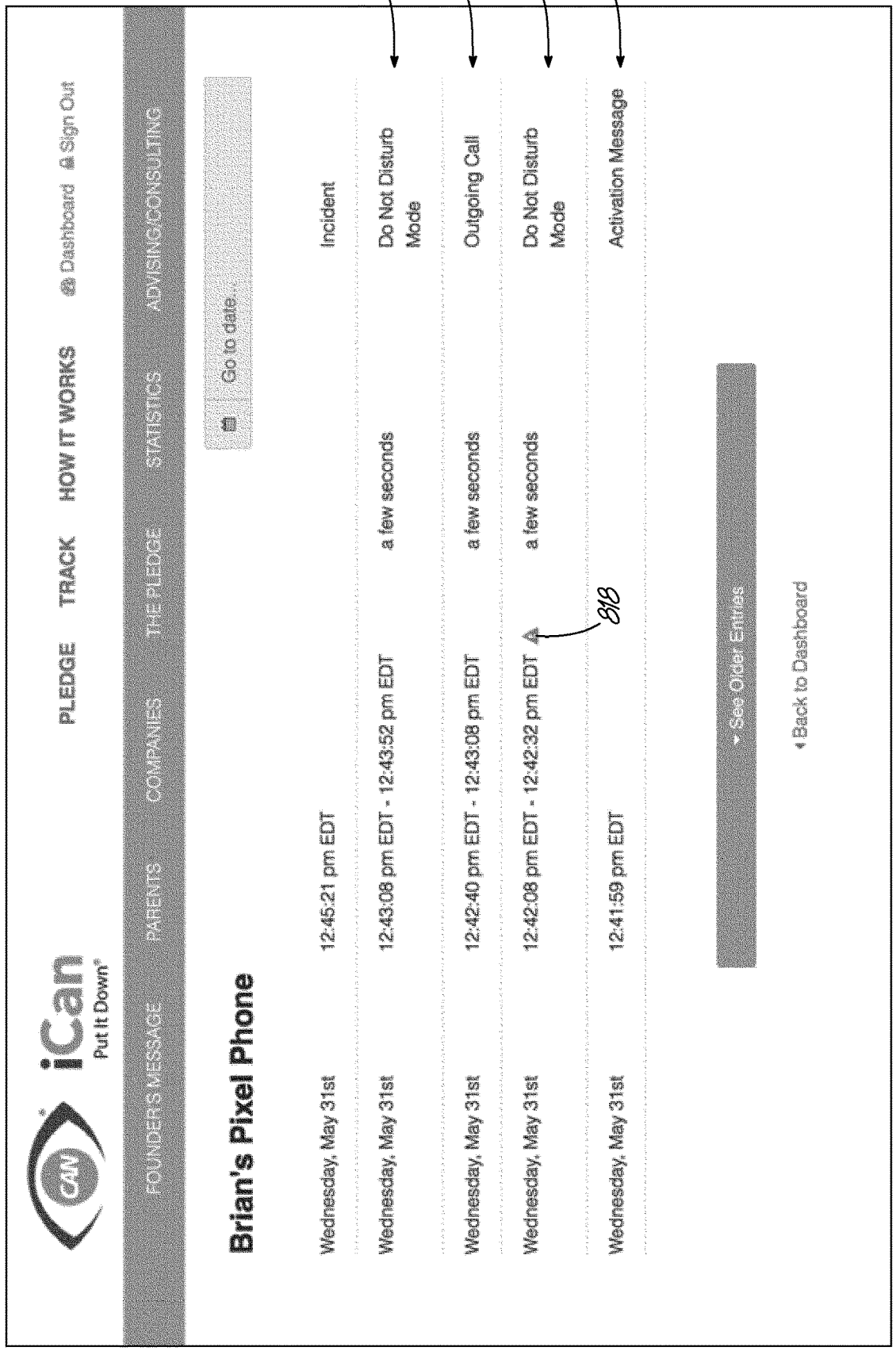

FIG. 70 illustrates a recordation of an outgoing call that is made while the device is in a disabled operational mode such as a DND mode reflecting the additional data and information captured by the device and then reported in accordance with the invention. For example, a call might be made from a handheld phone, rather than handsfree (such as through a vehicle Bluetooth system). Referring to the various entries shown, the application 170 may be opened and the device placed in the disabled operational mode by the user, with an activation message sent for the device as shown in entry 810. During the time the device is in a DND mode, the user makes an outgoing call such as with a handheld phone and the application 170 captures data about that call. As part of the reporting to the monitoring application 132, the call data is reported and an entry 812 shows the outgoing call and essentially the duration of same. During the call, the device is still in the disabled operational mode of DND, but for posting the entry 812, the dashboard reports a stopped DND entry 814 when the outgoing call was made that generally is close to the time of the start of the outgoing call. There might be some time discrepancy in the entries since there will generally be some lost time when the user is actually making the call and dialing and waiting before the entry for the outgoing call starts. The captured call data is reported in entry 812. Then a new DND entry is started at the end of the outgoing call with the time data matching the end of the call time, and that data will be reported as entry 816 and a change in status when the device is eventually taken out of the disabled operational mode.

In accordance with another feature of the invention, the type of activity that might occur in a disabled operational mode of a device might be categorized differently than other activity. For example, an outgoing call might be considered more distracting than an incoming as the user has to dial or take some other action rather than just answering. If the call is made from a handheld phone, that might be particularly true as discussed in FIG. 70. To that end, additional information regarding the use of the phone and the call mode (i.e., hands free or handheld) is captured by application 170 on the device and reported to the application 132. Then that additional information can be displayed. Referring to entry 814, since the call was handheld, the entry for the DND reporting right before reporting the outgoing call has additional activity information reported. In the illustrated example of FIG. 70, an icon 818, indicates the handheld nature or mode of the outgoing call. In FIG. 70, the icon is a red triangle with an exclamation point therein; however other icons or other fields of information might be used to report the additional captured call data and designate such possible distracted activity like a handheld outgoing call. In that way, a person monitoring a user and their device might again be able to process the additional activity data and information and know how to better assess the possible distraction. As noted herein, the device remains in DND mode, as it was not taken out of that mode for the call. Rather the call was noted and various entries at the front end and back end of the call are noted to reflect the DND mode that the device was in during such activity. The backend entry, again, is reported when the device ultimately is taken out of DND mode.

Figure 71:

FIG. 71 indicates further reporting of an outgoing call and reporting of data regarding the mode of the call. However, in that scenario, the call was placed through a handfree system, such as a vehicle or other Bluetooth system and additional activity data is captured reflecting how the call was made. As seen in FIG. 71, the device might connect to the Bluetooth system of a vehicle for example, and such an event is reported in the dashboard by entry 820. The application 170 on the device may then be opened. Then, an activation message might be sent indicating the opening of the application 170 and reported appropriately to program 132 for display as shown in entry 822. The device may then placed in the disabled operational mode by the user. During the time the device is in a DND mode, in the scenario of FIG. 71, the user can make an outgoing call. In this scenario, the call is made through the connected Bluetooth system and therefore could be a handsfree and additional activity information associated with the way the call is made is captured. As part of the reporting, an entry 824 shows the outgoing call and essentially the duration of same. During the call, the device is still in the disabled operational mode of DND, but for posting the entry 824, the dashboard reports a stopped DND entry 826 that stops when the outgoing call was made. After the call is complete, the device is still in DND mode. Then a new DND entry 828 is started that reflects the end of the outgoing call. The backend entry 828, again, is reported when the device ultimately is taken out of DND mode. Since the call was handsfree, albeit still outgoing, the application 132 can use the additional activity information that was recorded with the device and reported and make a determination to not add any additional information to the entry in this example. As such, the entry 826 before the outgoing call entry 824 does not have any icon or other information displayed since the call was handsfree. Since the handsfree operation may be less distracting since the user may not be looking at or dialing from the device, the program 132 treats the reporting differently. Of course, additional activity information, such as an icon, might be provided in entry 826 or another entry if that is desired in another embodiment of the invention wherein every outgoing call scenario is reported and displayed with additional activity information for a person to review and monitor.

In accordance with an alternative embodiment of the invention, rather than displaying separate entry noting a possible incoming or outgoing call while in a disabled operational mode such as DND mode, the additional activity information that is captured might be displayed in the form of an icon on the dashboard. In one embodiment, that additional information might be used or displayed with a dashboard reporting entry that is normally associated with a change in the operational status, such as an entry noting that the device was in a DND mode for a certain period of time. That is, when the device operational mode is changed and reported, additional activity information that is captured by the device regarding calls made will be reported in the form of an icon and will be displayed along with the entry to denote call activity while the device was in a DND or other disabled mode. Also, the initiation and completion of a call might act as the beginning of a particular entry or the end of an entry when the device status change is reported at the dashboard screen as discussed below.

Figure 72:
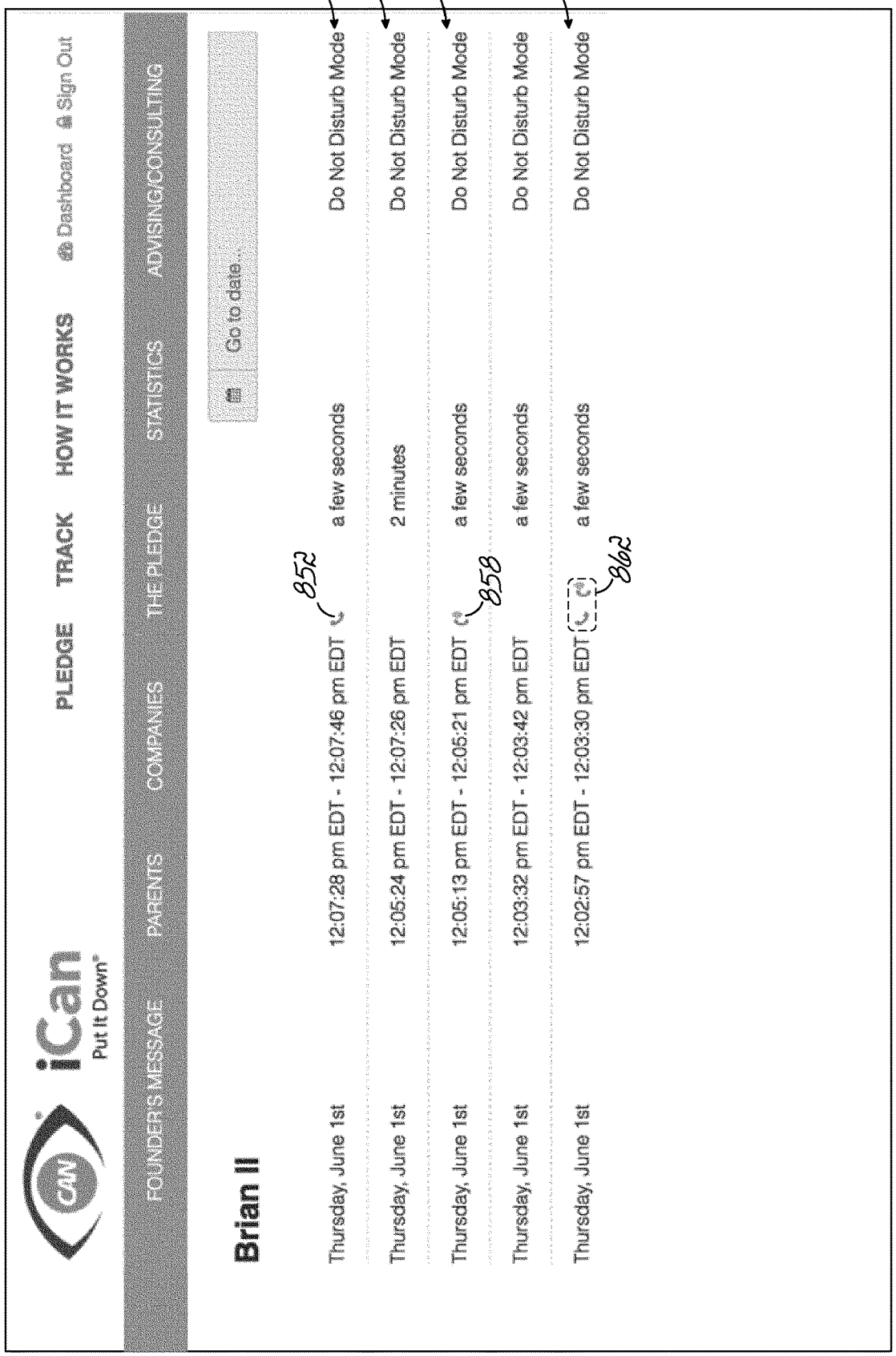

For example, referring to FIG. 72, if a device is in DND mode, and an outgoing call is made, the current DND entry will be stopped and reported and a new recorded entry, such as entry 850 will begin. When entry 850 is completed, such as if the device is taken out of the DND mode or another change in operational status, that reported status is displayed still as a time that the device was in the DND mode as seen in FIG. 72, but the reported entry will include a phone icon 852 that indicates that an outgoing call was made. In the embodiment disclosed herein with respect to FIG. 72, when an outgoing call is made, the current and ongoing time duration/entry of the device in DND mode will be stopped or ended. At that time the data regarding the stopped entry will be captured by the device and then recorded and displayed as shown in the previous entry 854. Then the new entry 850 that is triggered by an outgoing phone call will be started at the time of the start of the outgoing call. In the disclosed embodiment, the outgoing call started at 12:07:28 and thus entry 850 begins at that time. The previous entry 854 for the time in DND mode is indicated as ending around 12:07:26 or around the start of the outgoing call. The duration of the status entry 850 will last until the device is ultimately taken out of the disabled operational mode (DND mode) or until the user makes another outgoing call, for example. Then, when there is a change in the operational status of the device (e.g. the device taken out of DND mode), the entry 850 associated with the call is completed, the information about that status change and the outgoing call is recorded and reported to application 132 and then displayed. A person reviewing the dashboard screen of FIG. 72 will know that an outgoing call was made and will have information about the time of that call. Alternatively, rather than the device having a change in operational status to end the entry and trigger the reporting of entry 850, if an incoming call occurs during the duration of the entry 850, that might also end the entry as discussed herein.

In accordance with another feature of an embodiment of the invention, the incoming calls might also be recorded in a dashboard entry similar to the reporting of a change in operational status but with additional activity information reported, such as with a particular icon. Such incoming calls occurring when the device is in a DND mode may reported with an icon such as 858 with soundwaves to indicate incoming calls. In the case of an incoming call, the current entry duration is stopped when the incoming call is concluded and then the entry 856 is reported with the additional activity information like icon 858. There is not information about when the call started but rather when it ended which coincides with the reported duration end in entry 856. Referring to FIG. 72, the entry 856 indicates that the device was in a DND mode and an incoming call was received some time during that duration. That entry was stopped at the conclusion of the incoming call around 12:05:21 and reported. Then data regarding a new entry was captured and started and the device was again monitored in the DND mode, as reflected in entry 854. Therefore, entry 856 tells a person monitoring the device that an incoming call was received sometime during the duration of entry 856.

In certain scenarios, an outgoing call might be made which starts a new monitoring duration and entry, and then as that duration in DND mode continues, an incoming call might be received. In such a scenario, the completion of the incoming call will stop the duration of that entry and it will be reported to the application 132 for display. Since both an outgoing call (to start the duration/entry) was made and then an incoming call also occurred (ending the current duration entry), then when the status is reported as in entry 860, the additional activity information regarding the calls is reported and then both icons 862 are displayed with other information in the entry 860. A person monitoring the device would know that calls were made and received during that duration. Generally, the start of the entry is indicative of the start of the outgoing call and the end of the entry indicates the end of the incoming call. Therefore, you generally would only get double icons in the scenario of entry 860. Two outgoing calls made back to back would be shown in separate entries since each outgoing call stops the current entry and results in the sending of data to program 132 and reporting of the current entry and then triggers the capture of data and reporting for a new duration/entry. Two incoming calls would also be shown in separate entries since those outgoing calls end their respective entries when the calls are completed. Therefore an outgoing and then incoming scenario as in entry 860 would reflect the dual icons in such an embodiment. In the entries of FIG. 72, the outgoing call 852 was handsfree as the icon such as 818 in FIG. 70 is not displayed in the previous entry 854 to indicate a handheld call.

In accordance with another embodiment of the invention, the status monitoring application 170 is automatically opened and activated based upon one or more trigger conditions or triggers that are detected by the device, and the device is automatically placed in a disabled operational mode. That is, the user does not have to open the status monitoring application on the device. The application may be opened automatically and the device put into a disabled operational mode for the detection or satisfaction of some trigger conditions. For other trigger conditions, the application 170 may be opened automatically, and the user might be prompted to take further action to put the device into a disabled operational mode. For one example, a device operating with an Android operating system, might function with automatic features as noted herein.

Figure 73:
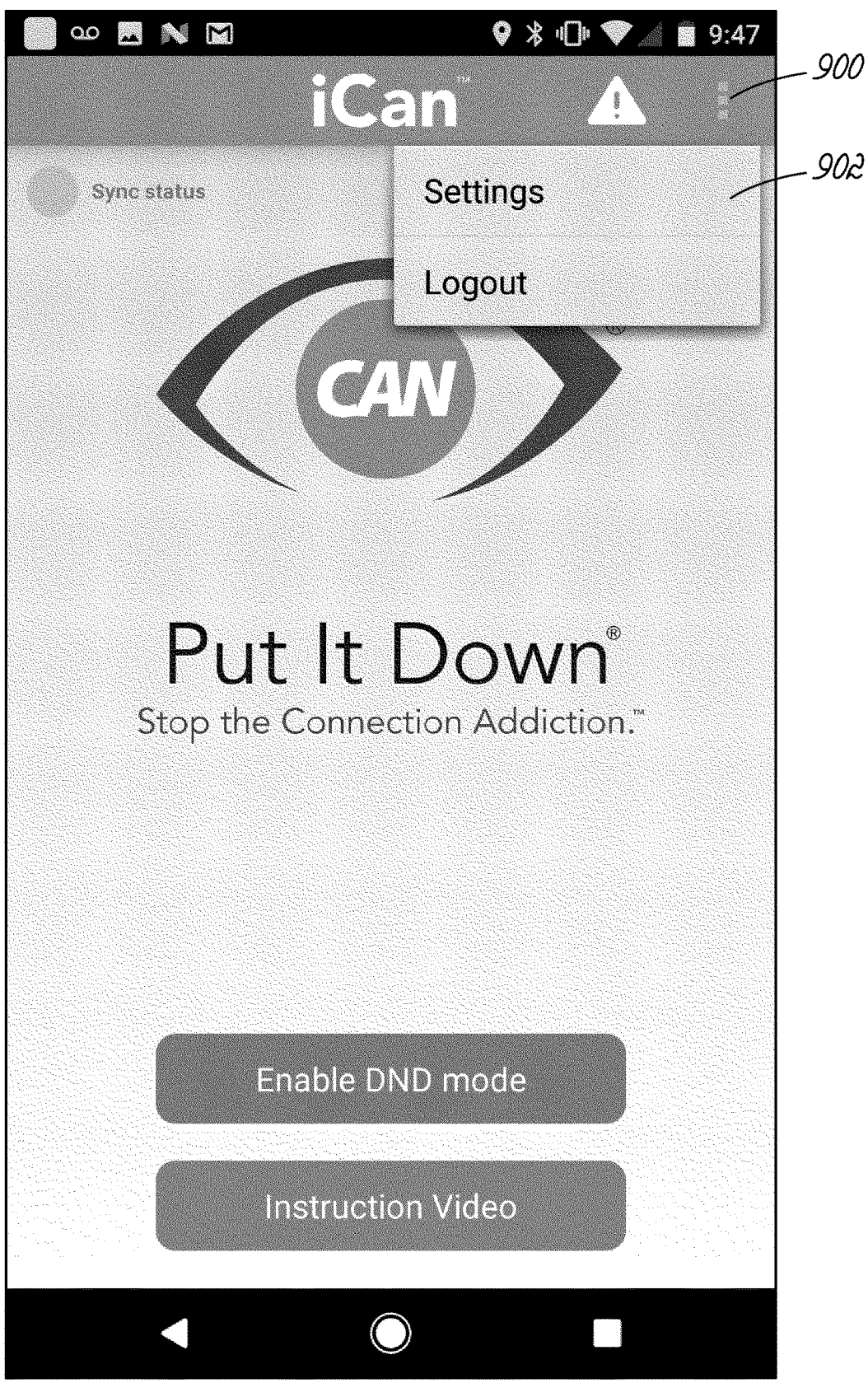
FIGS. 73-83 are diagrammatic views of other example graphical user interfaces that may be output on a display of a mobile device for selecting among various automatic features of the invention for deactivating a device upon various detected conditions, in accordance with the invention.
Figure 74:
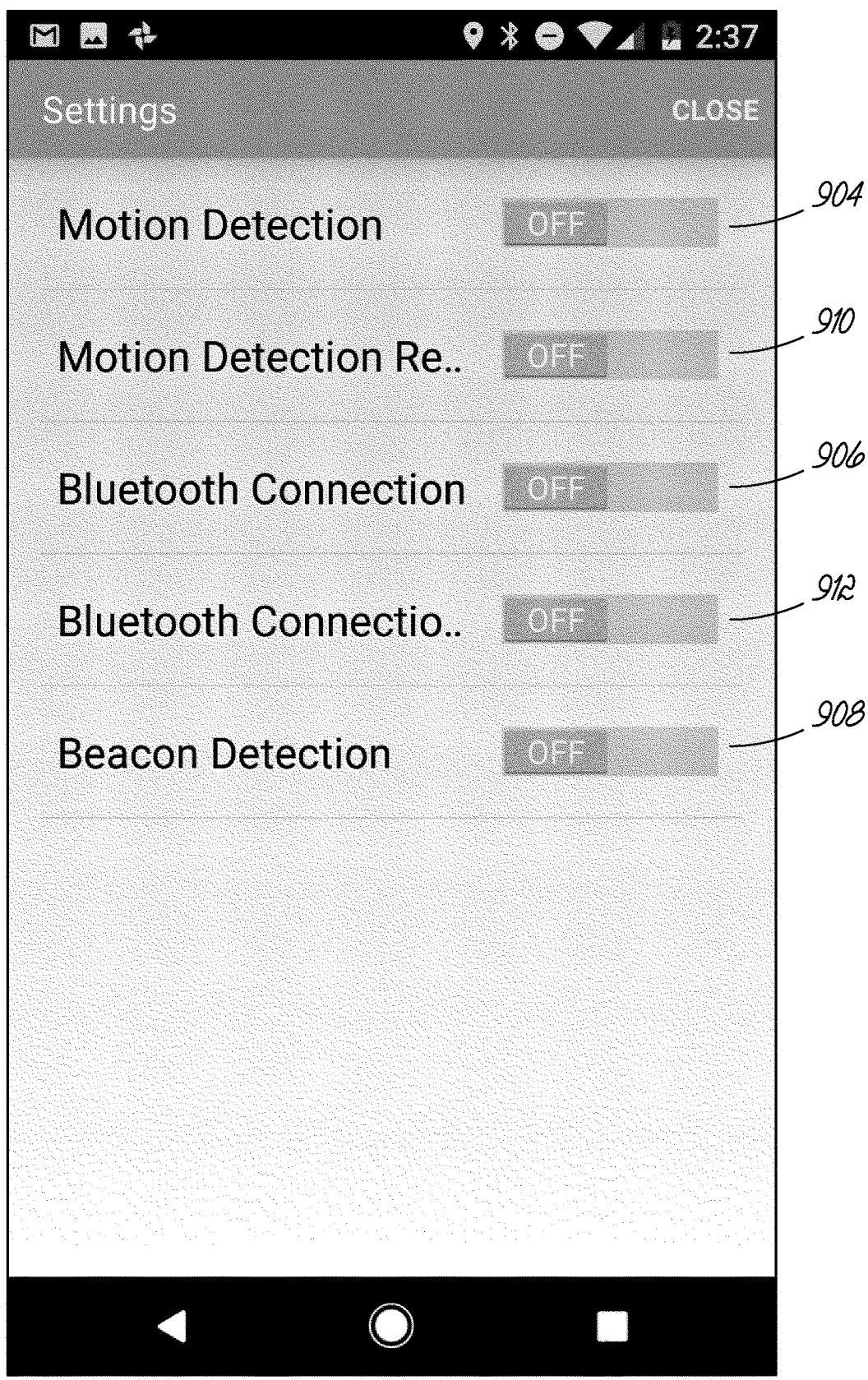

Referring to FIG. 73, a device may be configured for operating with the automatic features of the invention by selecting or activating one or more of the trigger conditions for the device to detect. Depending on the trigger condition or conditions that are selected, different automatic features are activated in the device as part of the status monitoring program 170. A drop down menu 900 might present a selectable setting field 902 and once engaged, the various trigger conditions for automatic operation are displayed as illustrated in FIG. 74. The conditions may be activated by being turned ON. In accordance with the illustrated embodiment, the various trigger conditions might include the detection of motion, such as in a vehicle, per a selectable field 904, the connection to a Bluetooth system, per selectable field 906, or the detection of a beacon device, per selectable field 908. Turning any one of those trigger conditions to ON will automatically activate the program 170 upon the detection of a satisfied trigger condition with the device, and will put the device automatically into a disabled operational mode. That is, the user will not have to open or activate the status monitoring program 170 and will not have to put the device into a disabled operational mode as with other embodiments of the invention.

Figure 75:
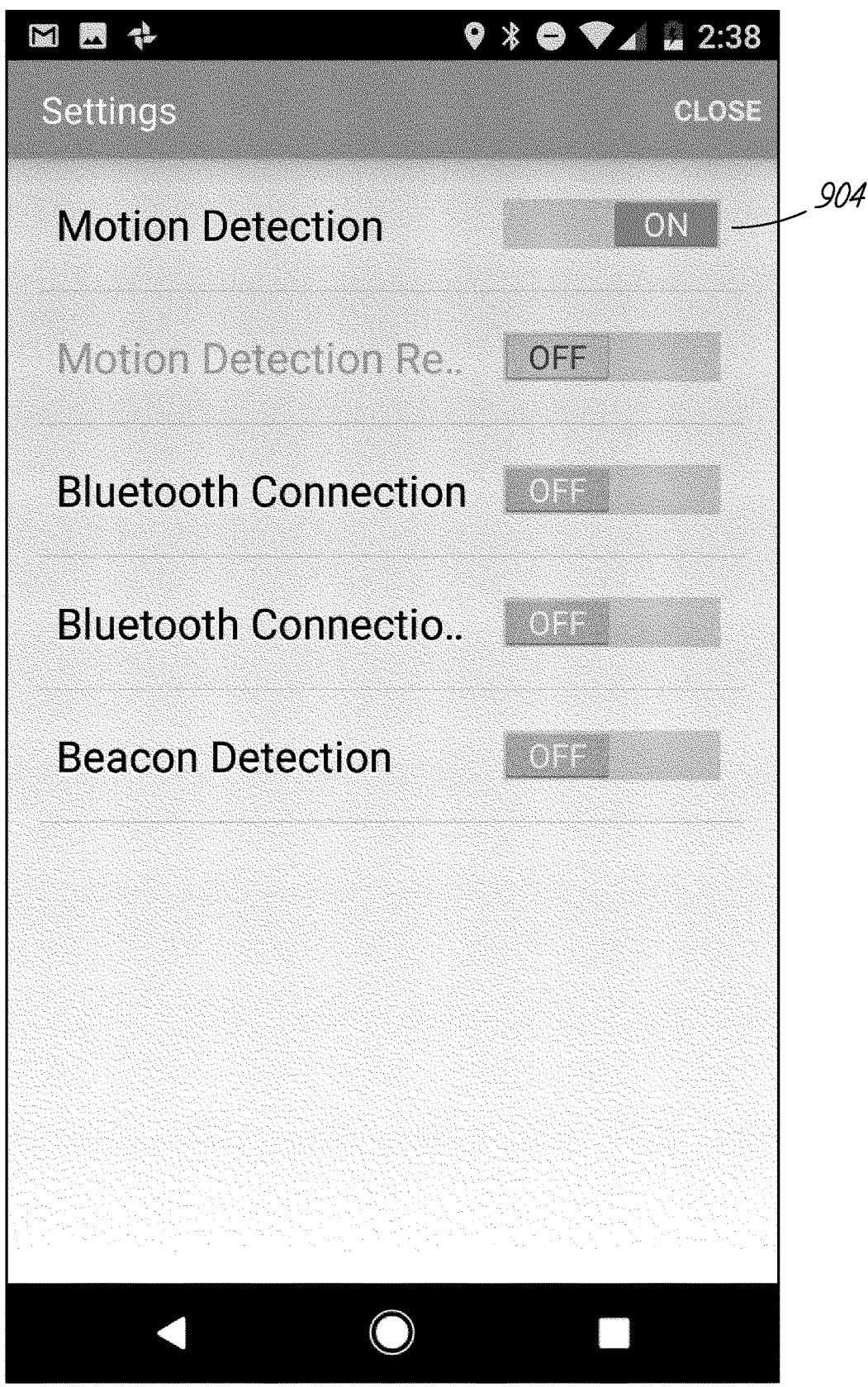

Referring to FIG. 75, the Motion Detection trigger field 904 is ON or activated and therefore the status monitoring application 170 will monitor the motion of the device, such as while traveling in a vehicle. When a certain speed of motion is detected based on a set threshold, several automatic actions happen through the application 170. The status monitoring application 170 is opened and brought to the foreground screen of the device. Also, the Motion Detection is automatically noted or reported in the reporting dashboard. An activation message is automatically sent if a message feature is active and recorded on a reporting dashboard, and the device is automatically placed in a disabled operational mode. In one embodiment, the disabled operational mode is a DND mode. The threshold might be set from 10-20 miles per hour or some other threshold to meet the trigger condition.

Figure 84A:
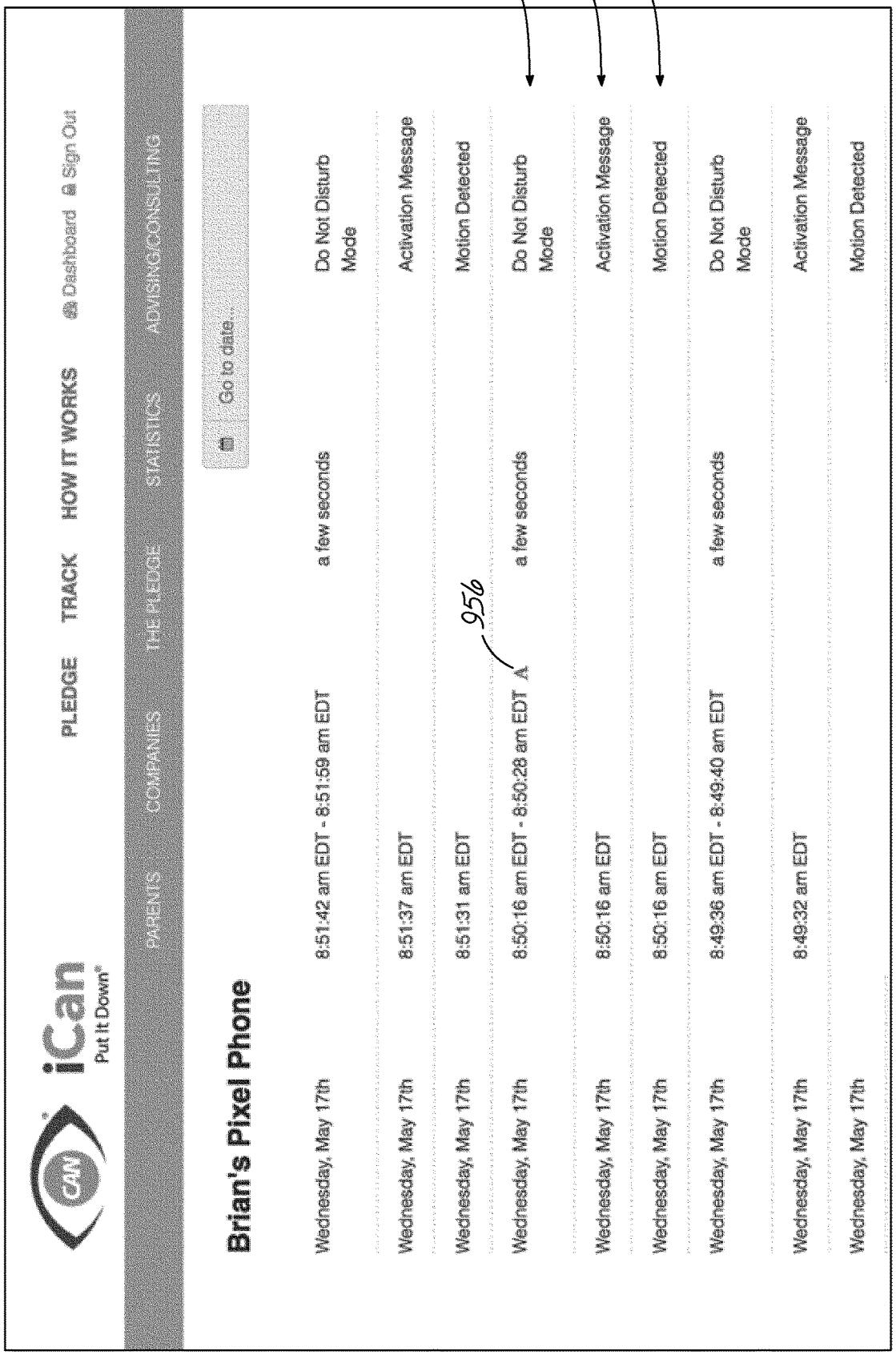
FIGS. 84A-84B are exemplary dashboard screens reporting device transactions, in accordance with the invention.
Figure 84B:
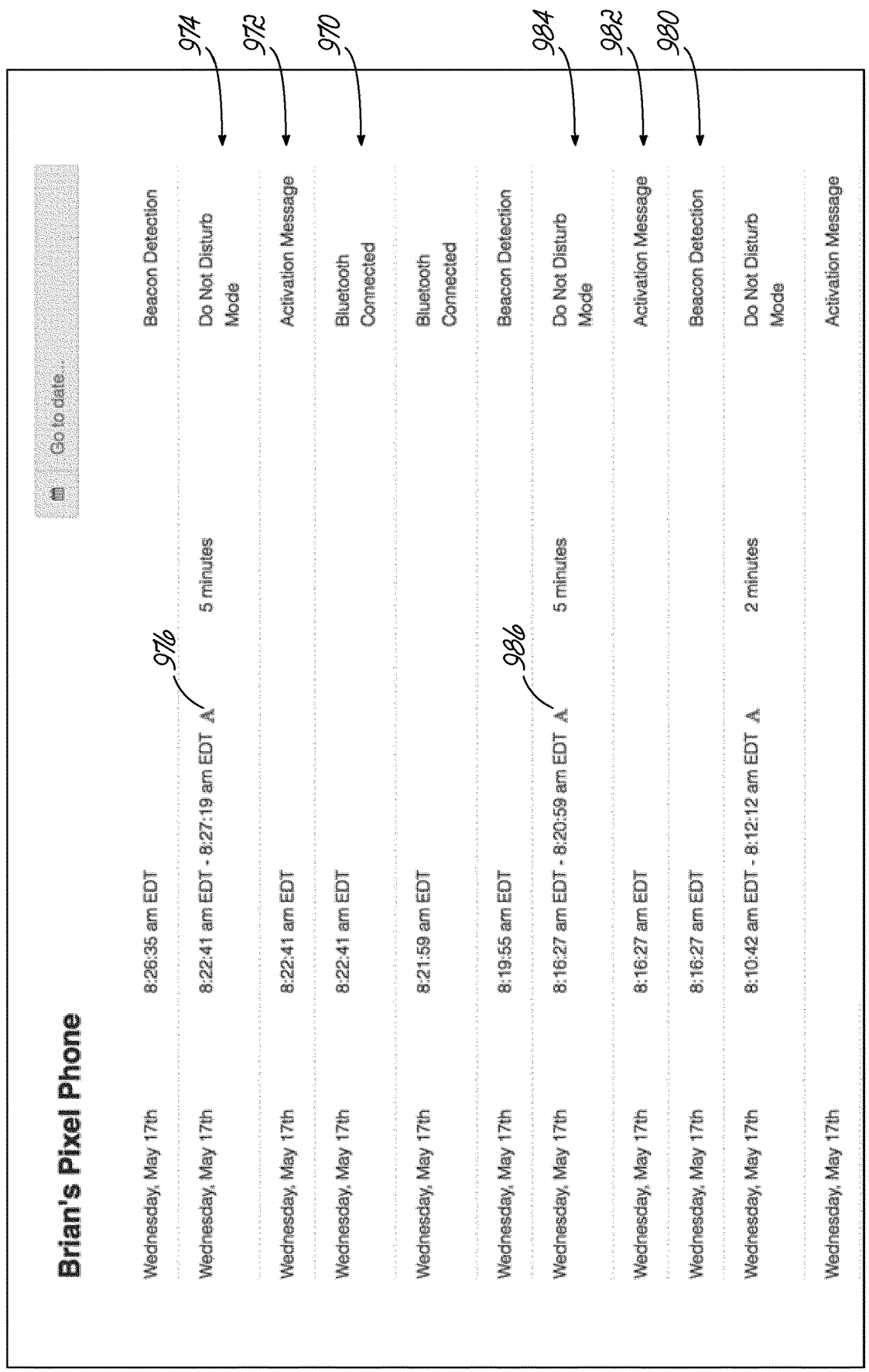

Referring to FIGS. 84A and 84B, dashboard screens are shown with various entries showing activity with a device and recordations of the status of the device and additional information associated with use of the device and changes in the operational status of the device. Referring to entry 950, upon a Motion Detection trigger condition being ON in the settings and upon detecting motion that meets the trigger condition (speed greater than a threshold), an entry for the detected motion is automatically recorded and displayed. Then the automatically sent activation message is recorded and displayed with entry 952. Upon such activation, the device is automatically placed in the DND mode and the status monitoring application is opened in the foreground on the device. The device is monitored and when there is a change in the operational status, such as the device being taken out of the DND mode, the change in the operational status is reported as noted herein, such as at entry 954. Because the status monitoring application was automatically triggered, the entry 954 will also have additional information noting the automatic nature of the status monitoring. In the illustrated embodiment, an icon "A" 956 is shown with entry 954. The entries 950-954 have the same start time when in such an automatic scenario as illustrated.

Figure 76:
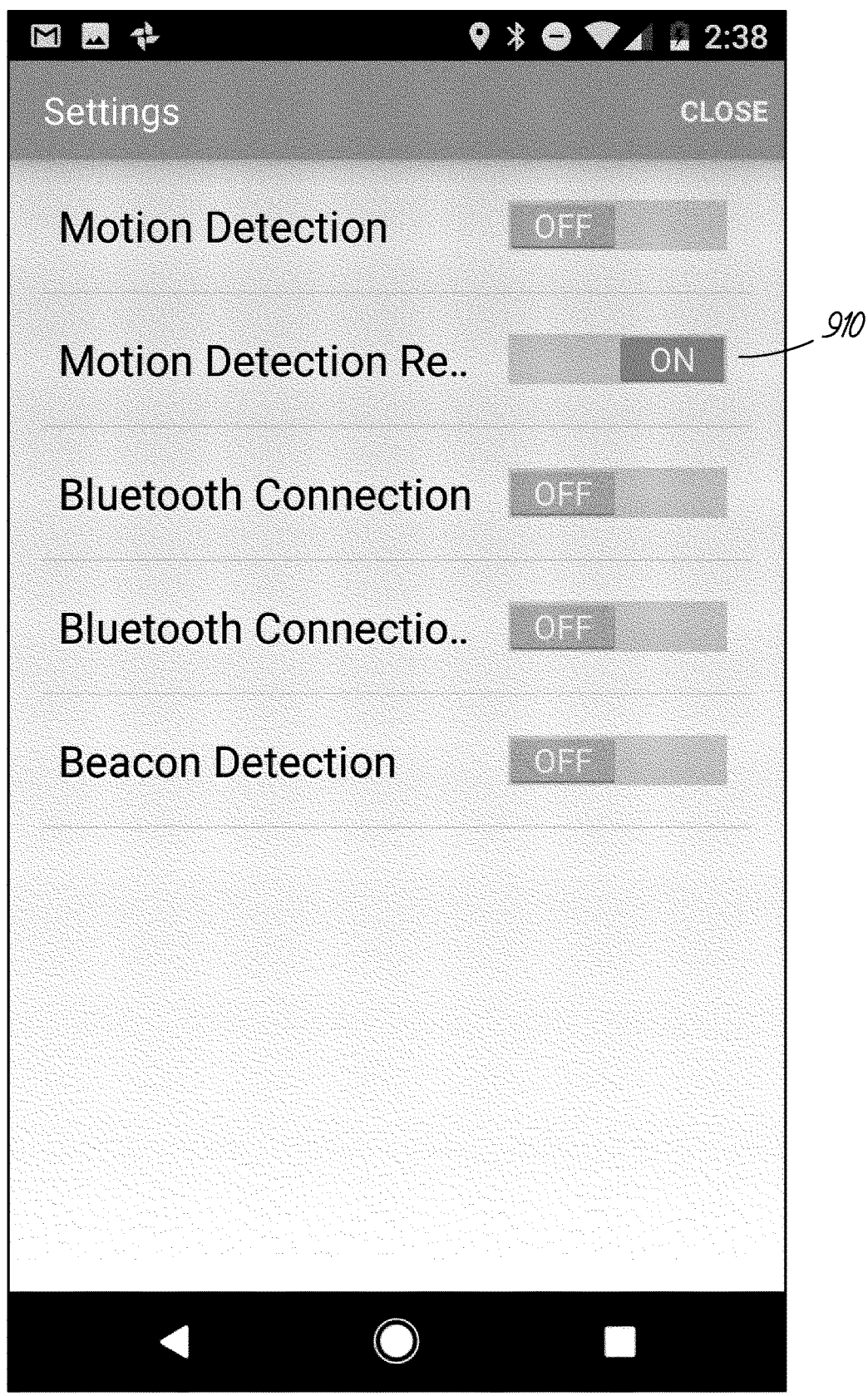
Figure 85:
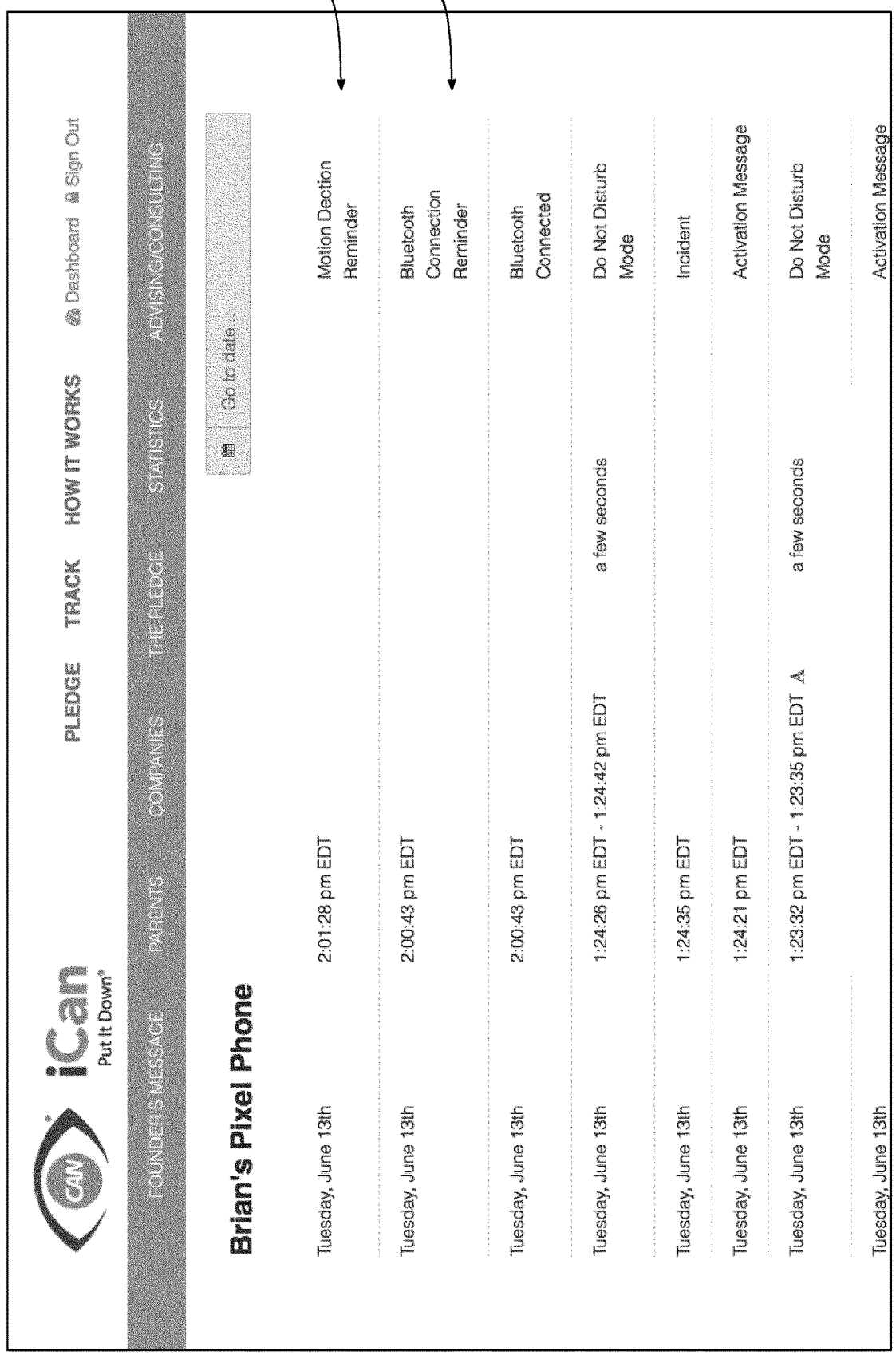
FIG. 85 is another exemplary dashboard screen reporting a device transaction, in accordance with the invention.
Figure 87:
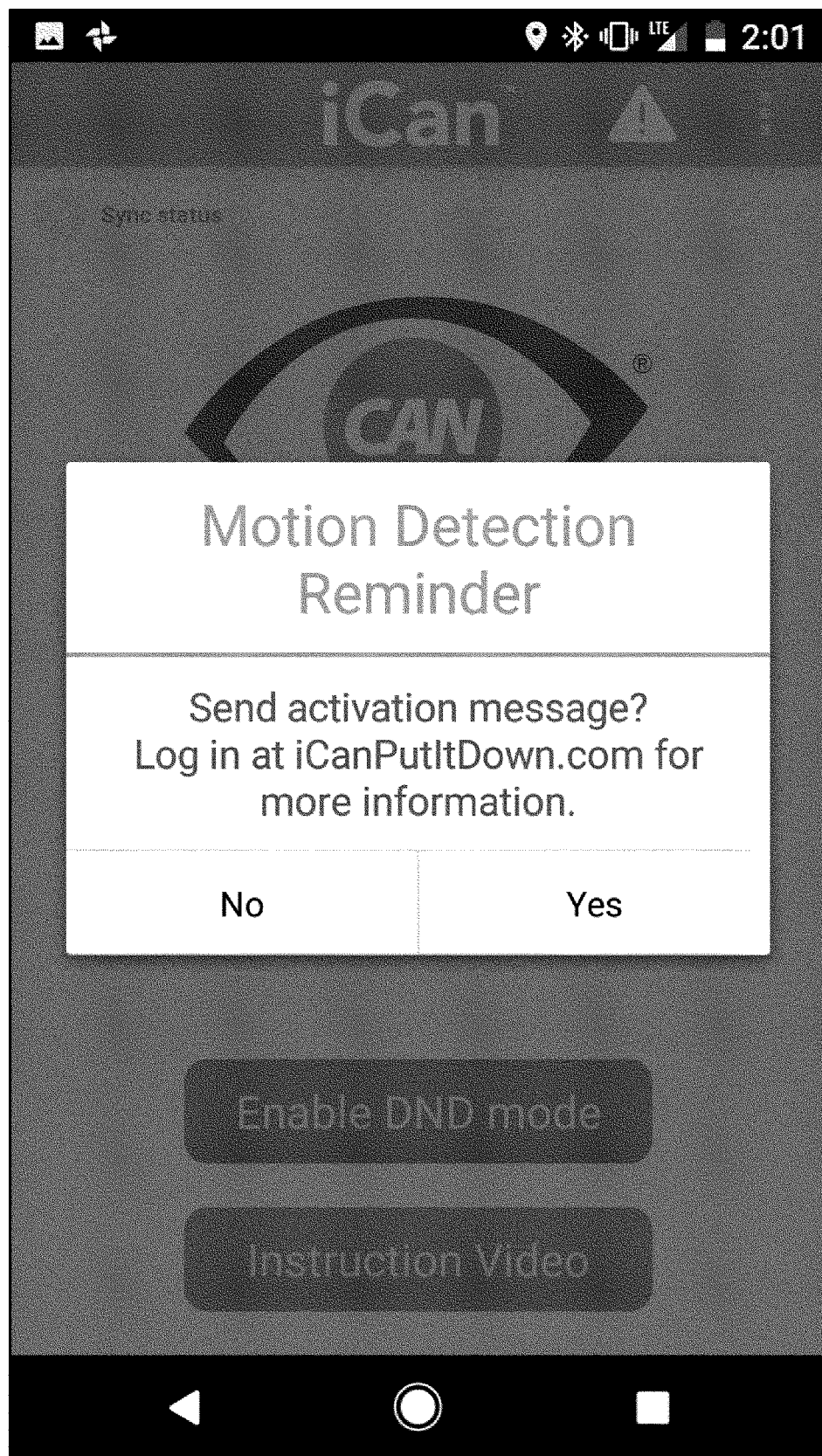

In accordance with another automatic feature, reminders to a user might be used for certain trigger conditions to cause some reporting and action to occur automatically but to allow the user to control whether the device will be put into the disabled operational mode. That is, such a device will not be put into a disabled operational mode automatically. For example, as shown in field 910 of FIG. 76, a reminder regarding motion might be used as a trigger condition as noted by Motion Detection Reminder field 910. When the Motion Detection Reminder trigger field 910 is ON in the settings and motion is detected that meets the trigger condition (speed greater than a threshold), an entry for the Motion Detection Reminder is automatically recorded and displayed as shown in entry 966 of the dashboard screen of FIG. 85. Then the application 170 is automatically opened and brought to a foreground screen with a message screen that is provided to the device user to note the Reminder, such as is shown in FIG. 87. Therein, a message 960 notes the Motion Detection Reminder and gives the user the option to send an activation message through fields 962. Then if the user wants to put the device into a disabled operational status, such as a DND mode, the user can manually engage field 964 once the activation message is sent and the message screen disappears as discussed herein. (See FIG. 73).

If the user does not want to put the device into a disabled operational status, they can close the status monitoring application at the device. Therefore, the Motion Detection Reminder trigger option gives the user the ability to have a trigger condition such as motion as a reminder and sends an automatic dashboard entry and message to the user and automatically opens and brings the application 170 to the screen of the device. This allows a person monitoring the activity of the user and the device to know that the user was reminded that they are doing a task such as driving and should put the device in a disabled operational mode. The user still has the choice to do so or not do so, but they have been warned and the warning is documented.

As a vehicle travels it may stop occasionally, such as at a traffic signal, or may otherwise slow down below the threshold. In order to not have constant triggering and dashboard notifications, in one feature of the application, the application will prevent additional triggering or notification of the Motion Detection trigger conditions until the vehicle motion is below the threshold for a set amount of time, such as 5 minutes for example. In that way, once the motion is triggered and the device either automatically put into the disabled operational mode or the user given a reminder, there will not be further triggering or reporting until the vehicle stops or stays below the threshold speed for some set amount of time.

Figure 77:
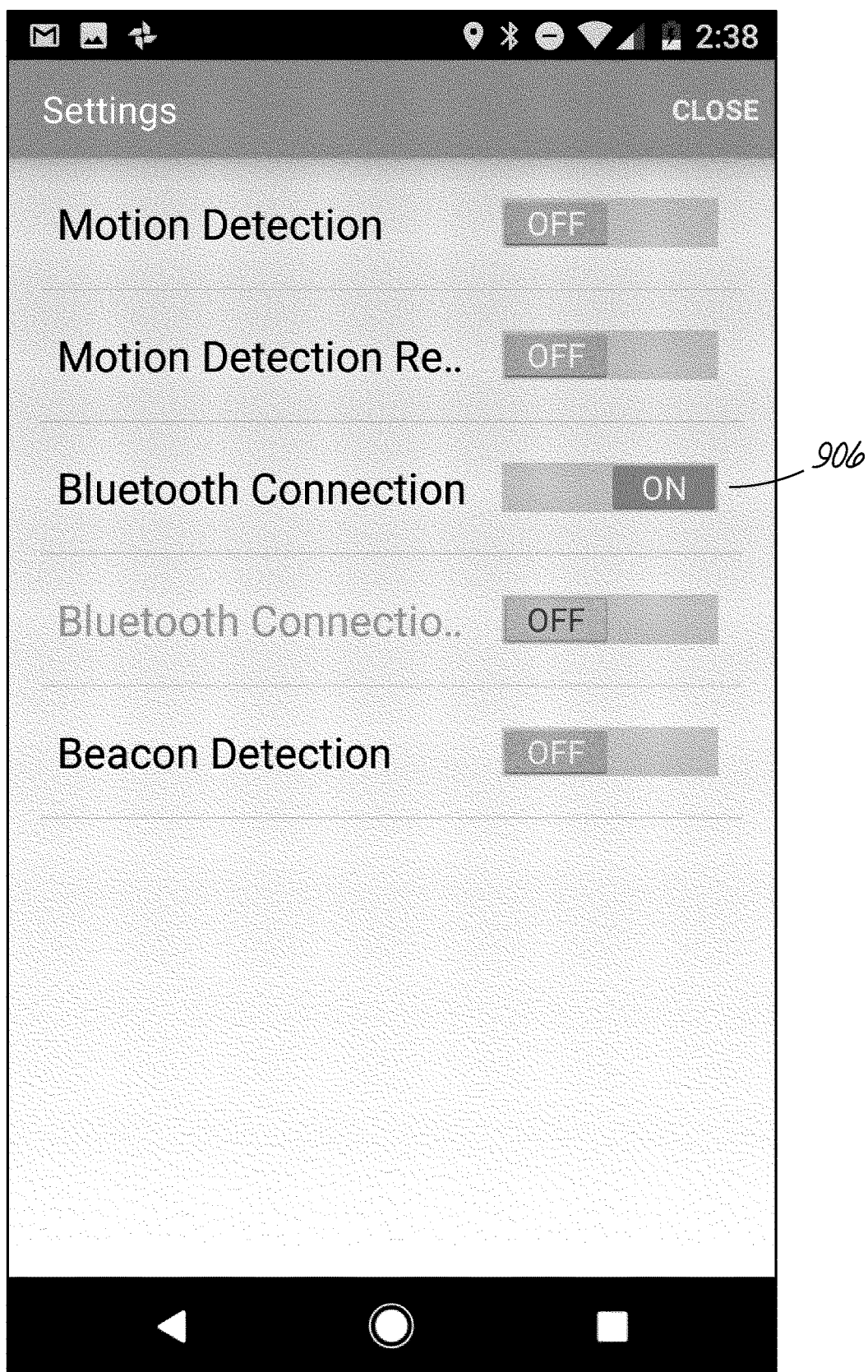

Another trigger condition might be connection of the device to another device or system through a wireless network. Referring to FIG. 77, the Bluetooth Connection trigger field 906 is ON or activated and therefore the status monitoring application 170 will monitor the connection of the device to some other system or device through a Bluetooth or other connection. In other embodiments, connection to a device or system through some other wireless connection might also be monitored. One such Bluetooth connection might be to the system of a vehicle that the user is driving in order to prevent distraction to the user/driver by the use of the device. When a Bluetooth connection is detected, several automatic actions happen through the application 170. The status monitoring application 170 is opened and brought to the foreground screen of the device. Also, the Bluetooth Connection is automatically noted in the dashboard. An activation message is automatically sent if a message feature is active and recorded on a reporting dashboard, and the device is automatically placed in a disabled operational mode. In one embodiment, the disabled operational mode is a DND mode.

Referring to FIGS. 84A and 84B, dashboard screens are shown with various entries showing activity with a device and recordations of the status of the device and additional information associated with use of the device and changes in the operational status of the device. Referring to entry 970, upon a Bluetooth Connection trigger condition being ON in the settings and upon detecting connection to a device/system through a Bluetooth wireless connection that meets the trigger condition, an entry for the Bluetooth connection is automatically recorded and displayed. Then the automatically sent activation message is recorded and displayed with entry 972. Upon such activation, the device is automatically placed in the DND mode and the status monitoring application is opened in the foreground on the device. The device is monitored and when there is a change in the operational status, such as the device being taken out of the DND mode, the change in the operational status is reported as noted herein, such as at entry 974. Because the status monitoring application was automatically triggered, the entry 974 will also have additional information noting the automatic nature of the status monitoring. In the illustrated embodiment, an icon "A" 956 is shown with entry 974. The entries 970-974 have the same start time when in such an automatic scenario as illustrated.

In one embodiment of the invention, the status monitoring application is configured to detect only Bluetooth connections to multimedia systems, such as a multimedia system of a vehicle. In that way, those types of connections that might indicate scenarios wherein a device user should not be distracted are detected. Other connections, such as to a Bluetooth headphone device or some other device that does not indicate a non-distraction scenario, would not trigger the automatic features of the application 170 as noted herein.

Figure 78:
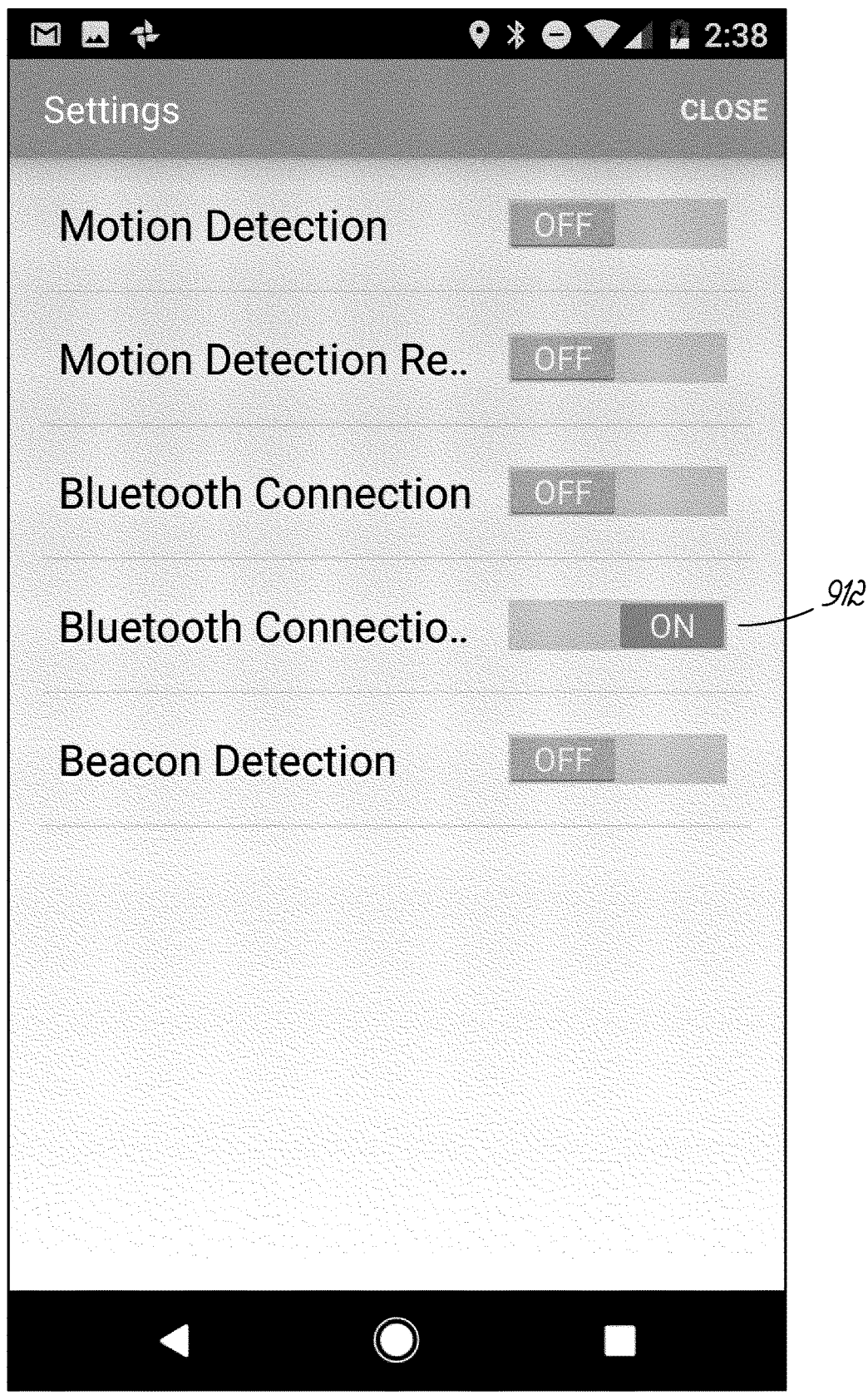
Figure 86:
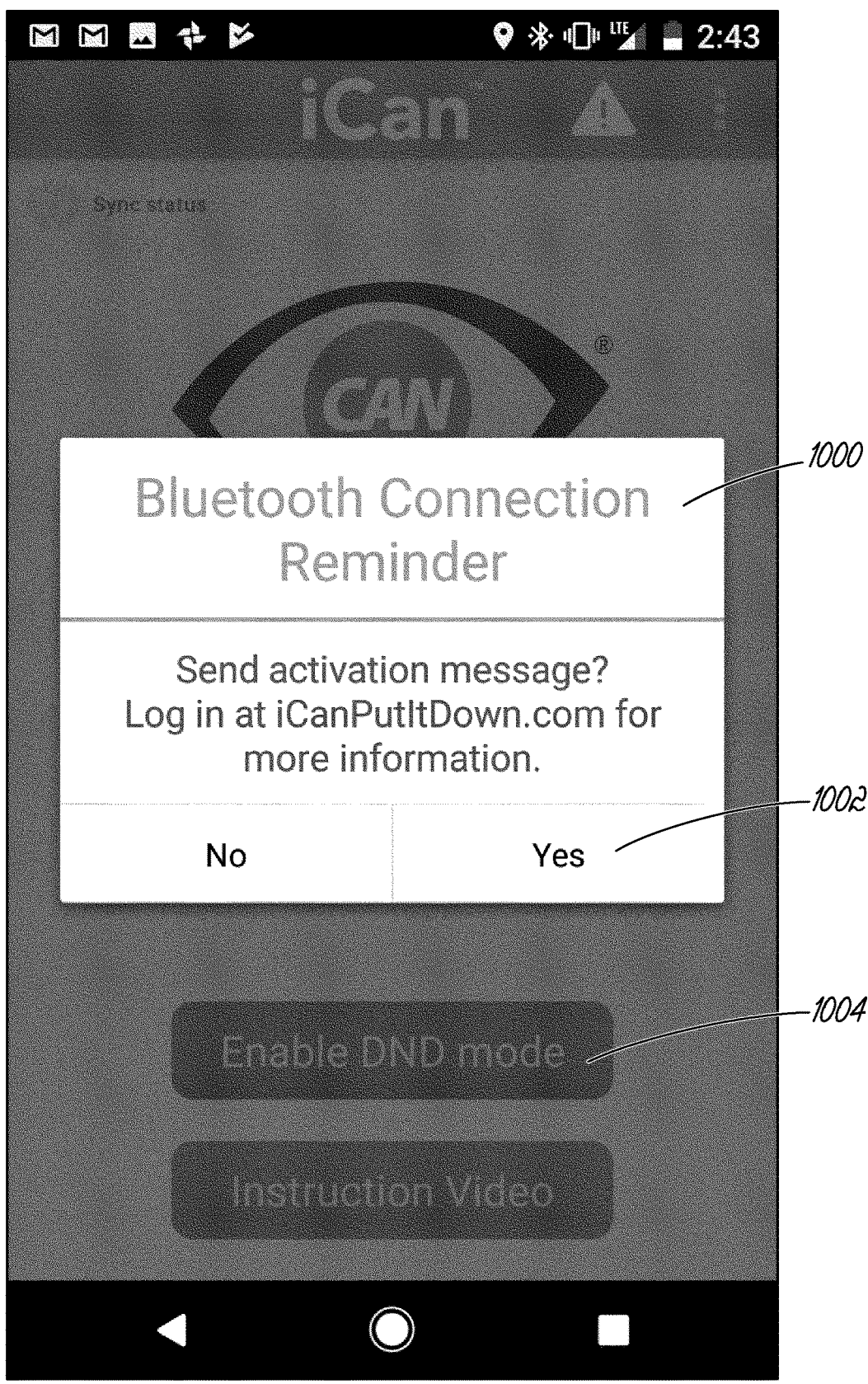
FIGS. 86-87 are diagrammatic views of other example graphical user interfaces that may be output on a display of a mobile device for messages indicating various detected conditions, in accordance with the invention.

As described, reminders to a user might be used for certain trigger conditions to cause some reporting and action to occur automatically but to allow the user to control whether the device will be put into the disabled operational mode. As another example, as shown in field 912 of FIG. 78, a reminder regarding a wireless connection, such as a Bluetooth Connection, might be used as a trigger condition as noted by the Bluetooth Connection Reminder field 912. When the Bluetooth Connection Reminder trigger field 912 is ON in the settings and a Bluetooth connection is detected that meets the trigger condition (multimedia system of a vehicle), an entry for the Bluetooth Connection Reminder is automatically recorded and displayed as shown in entry 990 of the dashboard screen of FIG. 85. Then the application 170 is automatically opened and brought to a foreground screen with a message screen that is provided to the device user to note the Reminder, such as is shown in FIG. 86. Therein, a message 1000 notes the Motion Detection Reminder and gives the user the option to send an activation message through fields 1002. Then if the user wants to put the device into a disabled operational status, such as a DND mode, the user can manually engage field 1004 once the activation message is sent and the message screen disappears as discussed herein. (See FIG. 73).

If the user does not want to put the device into a disabled operational status, they can close the status monitoring application at the device. Therefore, the Bluetooth Connection Reminder trigger option gives the user the ability to have a trigger condition such as a Bluetooth connection as a reminder and sends an automatic dashboard entry and message to the user and automatically opens and brings the application 170 to the screen of the device. This allows a person monitoring the activity of the user and the device to know that the user was reminded that they are doing a task such as driving and should put the device in a disabled operational mode. The user still has the choice to do so or not do so, but they have been warned and the warning is documented.

In accordance with another feature of the invention, the Bluetooth Connection trigger conditions are triggered once and will not be triggered again unless the device is disconnected from the Bluetooth or other system and then reconnected. In that way, there are not multiple instances of triggering or reporting in the dashboard.

Figure 79:
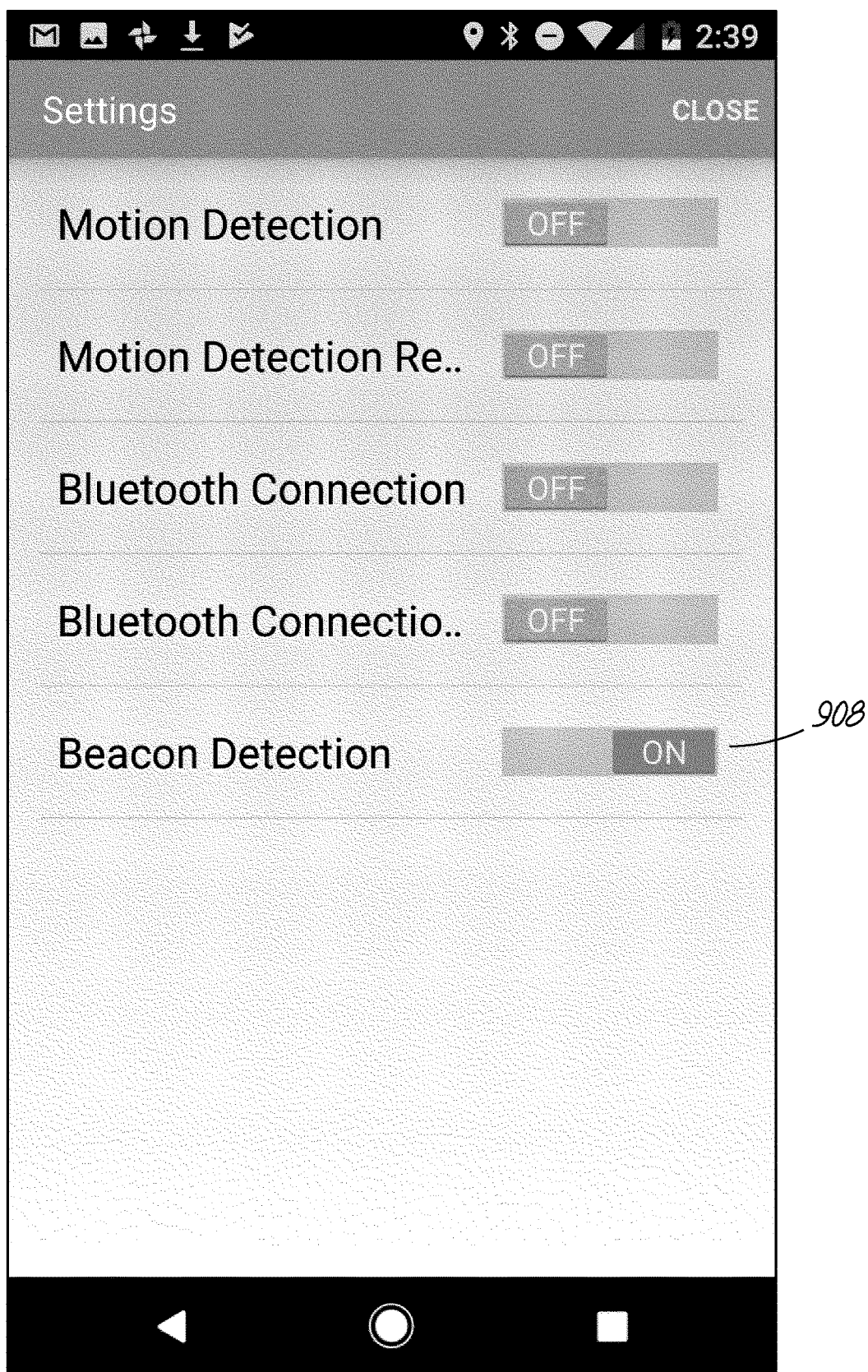

Still other trigger conditions, such as the detection of an external signal by the device might be used to trigger the automatic features of the invention based on the settings of the device. (See FIG. 74). For example, detecting a beacon signal might provide automatic operation in accordance with the features of the invention. Referring to FIG. 79, the Beacon Detection trigger field 908 is ON or activated and therefore the status monitoring application 170 will monitor the detection of a signal such as a beacon signal. In other embodiments, detection of some other external signal might also be monitored. One such external signal might be a beacon signal from a beacon in a vehicle that the user is driving in order to prevent distraction to the user/driver by the use of the device. Another external signal might be a beacon signal from a beacon that is in a facility wherein the user is to not be distracted while working or doing another task. When a beacon signal is detected, several automatic actions happen through the application 170. The status monitoring application 170 is opened and brought to the foreground screen of the device. Also, the Beacon Detection is automatically noted or reported in the reporting dashboard. An activation message is automatically sent if a message feature is active and recorded on a reporting dashboard, and the device is automatically placed in a disabled operational mode. In one embodiment, the disabled operational mode is a DND mode.

Referring to FIGS. 84A and 84B, dashboard screens are shown with various entries showing activity with a device and recordations of the status of the device and additional information associated with use of the device and changes in the operational status of the device. Referring to entry 980, upon a Beacon Detection trigger condition being ON in the settings and upon detecting a signal from a beacon that meets the trigger conditions (such as a registered beacon), an entry for the Beacon Detection is automatically recorded and displayed. Then the automatically sent activation message is recorded and displayed with entry 982. Upon such activation, the device is automatically placed in the DND mode and the status monitoring application is opened in the foreground on the device. The device is monitored and when there is a change in the operational status, such as the device being taken out of the DND mode, the change in the operational status is reported as noted herein, such as at entry 984. Because the status monitoring application was automatically triggered, the entry 984 will also have additional information noting the automatic nature of the status monitoring. In the illustrated embodiment, an icon "A" 986 is shown with entry 984. The entries 980-984 have the same start time when in such an automatic scenario as illustrated.

Figure 80:
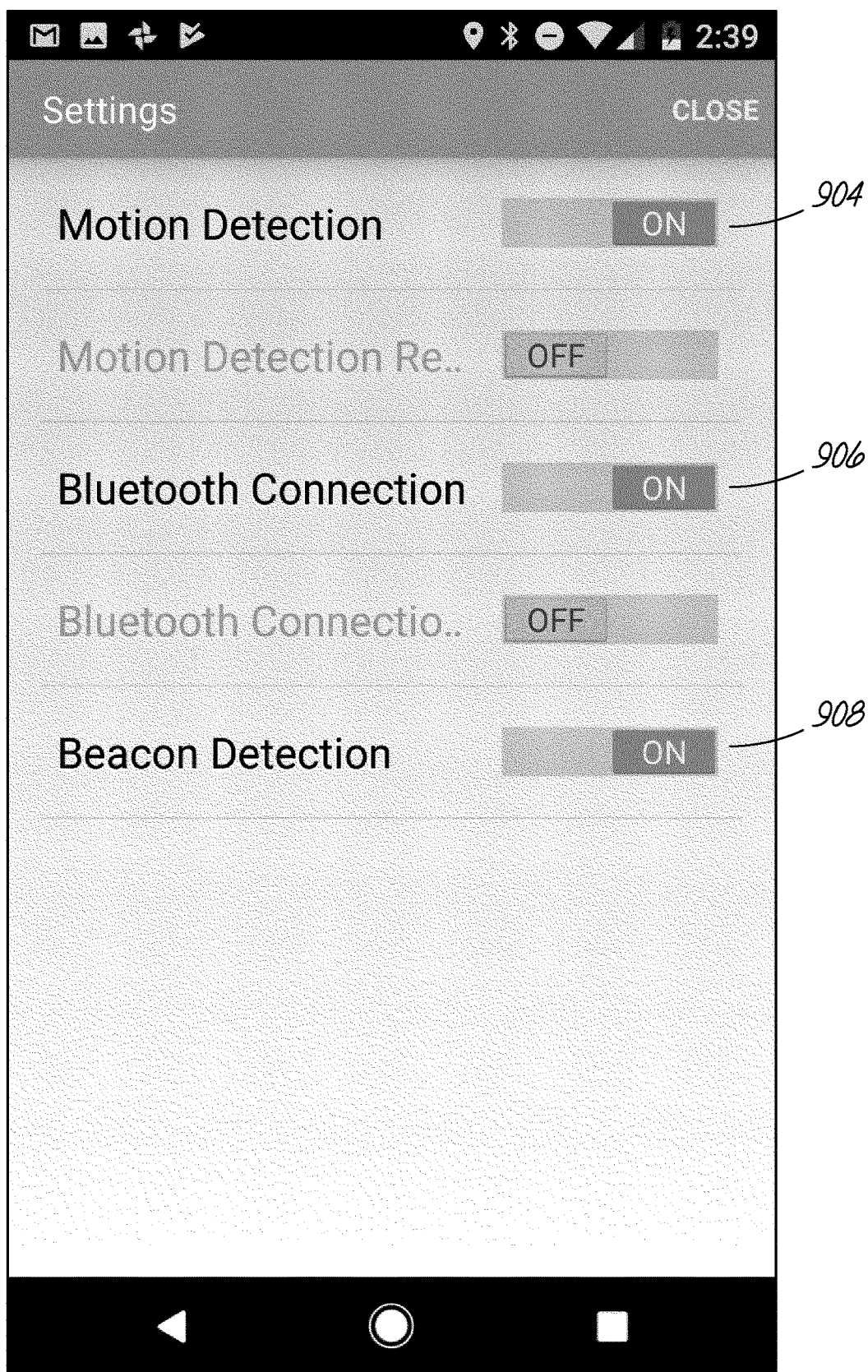

In accordance with another feature of the invention, multiple automatic trigger conditions may be used. FIG. 80 shows each of the conditions of fields 904, 906, 908 being ON. Any combination of those trigger conditions may be ON. If more than one trigger condition is selected or ON for automatic operation, the first trigger condition detected will perform the appropriate reporting and automatically put the device into a disabled operational mode and open the status monitoring application and bring it to the foreground screen. Also, the entry will be noted as being automatic, such as with the "A" icon. If other trigger conditions are subsequently detected, they will be reported in the dashboard screen as a detected trigger condition (e.g., Motion Detection or Bluetooth Connection or Beacon Detection), but since the application is open and the device already in a disabled operational mode automatically, they process will not be repeated and only the trigger condition detection is recorded and displayed.

Figure 81:
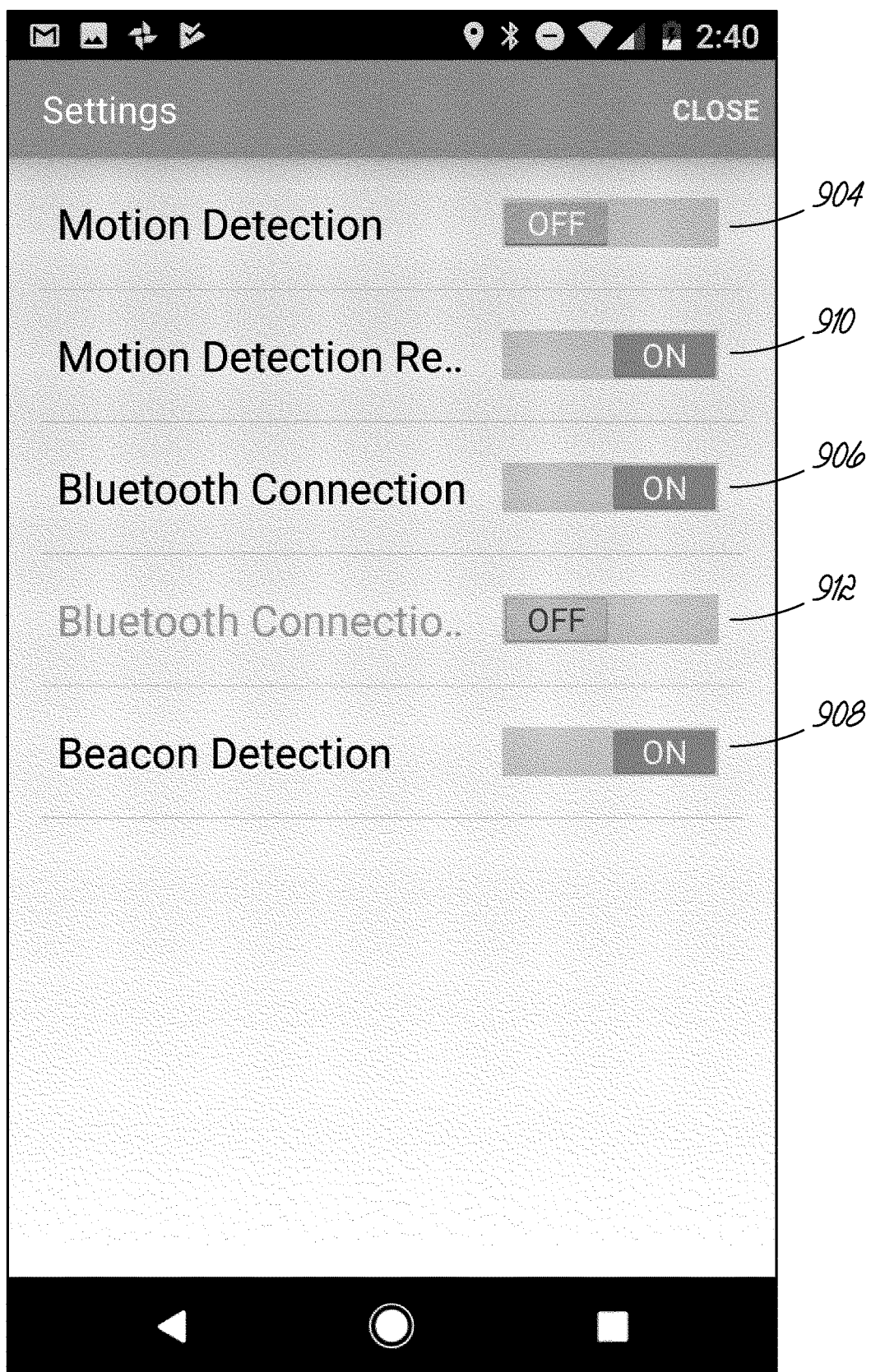

In accordance with another feature of the invention, the status monitoring application will disable certain reminder trigger fields from being selected if the underlying trigger condition is selected and ON. For example, if the Motion Detection trigger condition 904 is active (i.e., the setting field is ON), the Motion Detection Reminder trigger condition 910 cannot be activated. Referring to FIG. 80, since all the underlying trigger conditions are active (904, 906) the reminder trigger conditions (910, 912) are disabled. FIG. 81 shows the Motion Detection trigger condition as OFF or deactivated and so the Motion Detection Reminder trigger condition 910 may be selected as shown along with Bluetooth Connection and Beacon detection trigger conditions. If either of the active automatic trigger conditions (906, 908) are detected first, the status monitoring application will operate as noted turning the application on and putting the device automatically in a disabled operational mode. If the Motion Detection Reminder is then subsequently triggered, it will be suppressed by the application 170 since the device is already in a disabled operational mode and the application is On and in the foreground. Any of the other automatic conditions 906, 908 that are triggered would only have a single entry in the dashboard as noted herein. However, if the Motion Detection Reminder is triggered first, the application will proceed as described herein with the message of FIG. 87 and other automatic actions. If the user does not put the device in the disabled operational mode and/or closes the program 170, the automatic trigger conditions 906 and 908 are still active and could still be triggered appropriately.

Figure 82:
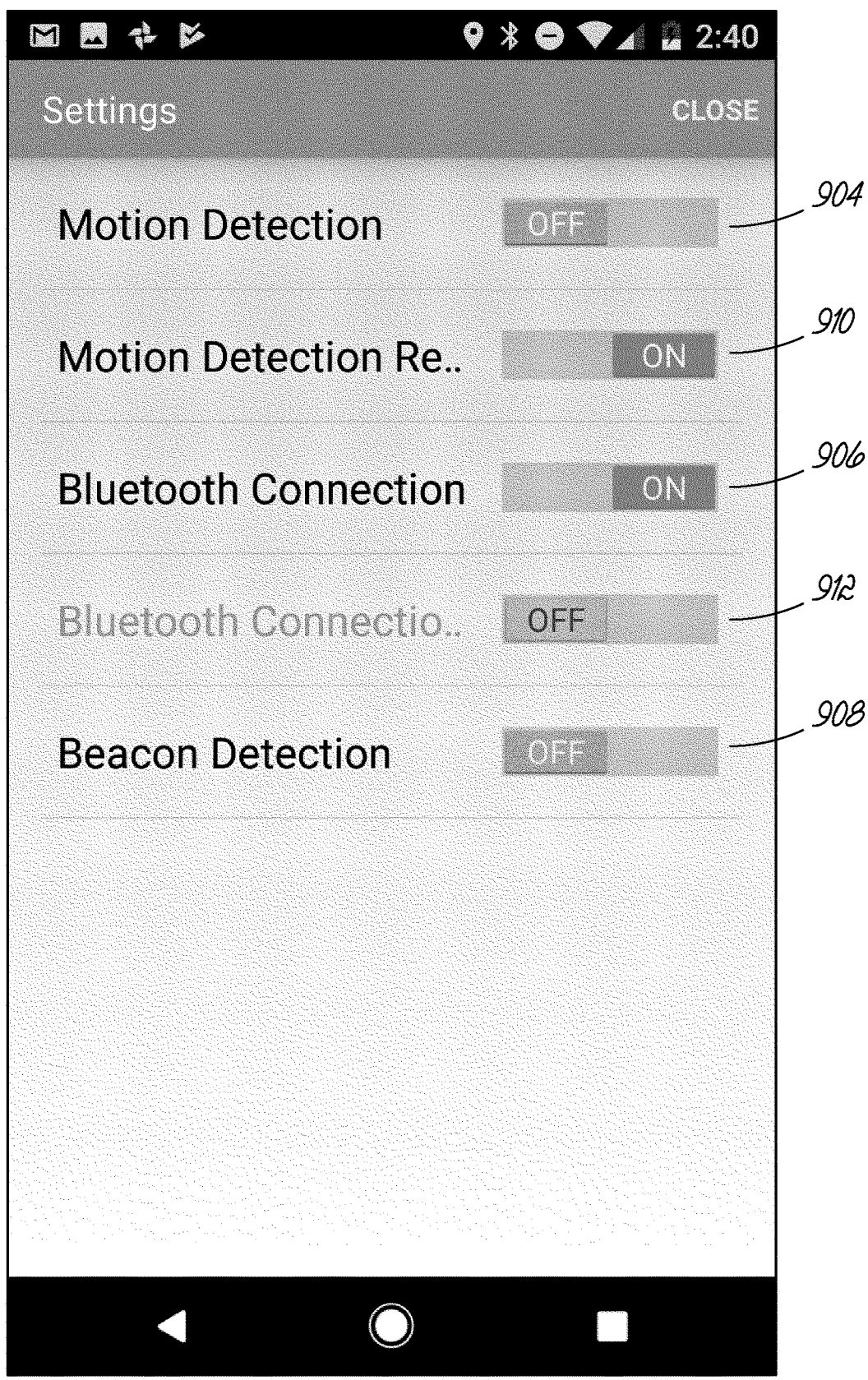

FIG. 82 discloses a Motion Detection Reminder trigger condition 910 as activated or ON and the Bluetooth Connection trigger condition 906 as ON. The reminder field may be selected to be ON since the automatic Motion Detection trigger condition 904 is OFF. If the Bluetooth Connection is triggered first, the device will automatically be in a DND mode and therefore features of the Motion Detection Reminder directed to placing the device is a disabled operational mode will be suppressed. There will only be a dashboard entry of the trigger condition.

Figure 83:
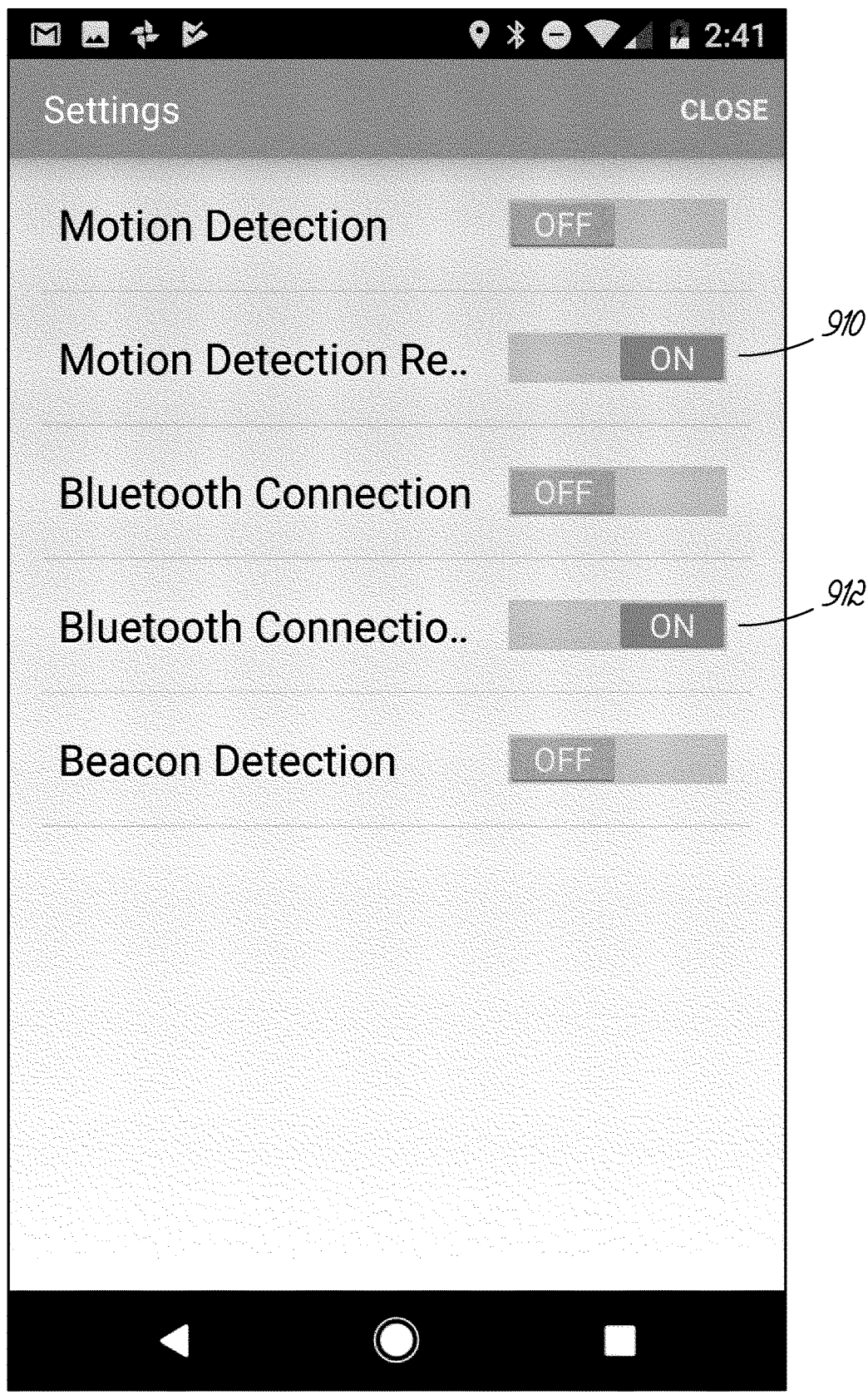

FIG. 83 illustrates both reminder trigger conditions 910, 912 as ON. If either one is triggered, the application 170 is brought to the foreground and a dashboard entry is made, such as entries 966 or 990 in FIG. 85. Also, a reminder notification screen, such as in FIGS. 86, 87 is displayed on the device. The application can be activated and the device put into a disabled operational mode, or the user can close the application. If the application is not activated, the next reminder condition will repeat the process again. If the application is activated and the device put into a mode such as DND mode, then triggering of the other reminder trigger will result in a dashboard entry but no further action.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for discouraging the inappropriate use of a mobile device by a user comprising:
   registering a mobile device with a monitoring application running on a system remote from the mobile device and coupled with a network;
   linking the mobile device with the monitoring application through the network;
   providing a plurality of selectable triggers for the mobile device;

detecting if a trigger condition is satisfied for one or more of the triggers;

if a trigger condition is satisfied, placing the device in a disabled operational mode to prevent the use of at least one communication feature of the mobile device;

monitoring, at the mobile device, an operational status of the mobile device and detecting if a user makes a change occurs in the operational status, including the mobile device being taken out of the disabled operational mode;

reporting a change in the operational status of the mobile device made by a user to the monitoring application with time information that reflects a time of a detected change in the operational status;

displaying the status change and time information in a graphical interface associated with the monitoring application.

2. The method of claim 1 wherein the mobile device is in a disabled operational mode that prevents at least one communication feature of a mobile device, the monitoring of the operational status including detecting if the mobile device is taken out of the disabled operational mode.

3. The method of claim 2 wherein the disabled operational mode includes at least one of an Airplane mode, a Do Not Disturb mode and an OFF mode.

4. The method of claim 1 further comprising providing a reminder message at the mobile device upon detecting that a trigger condition is satisfied, the monitoring application advising a user of the option to put the mobile device in the disabled operational mode.

5. The method of claim 1 further comprising, upon detecting that a trigger condition is satisfied providing an activation message at the mobile device being monitored regarding the trigger condition.

6. The method of claim 1 further comprising displaying information regarding the trigger condition in the graphical interface.

7. The method of claim 1 wherein providing a plurality of selectable triggers for the mobile device includes triggers associated with at least one of motion detection, detection of with at least one beacon device through the monitoring application, and making a connection to a Bluetooth system.

8. The method of claim 1 further comprising upon detecting if a trigger condition is satisfied and placing the device in a disabled operational mode, preventing additional detection of a trigger condition.

9. The method of claim 1 further comprising detecting a change in a mobile device operational status by detecting a change from a disabled operational mode to another operational mode and reporting the time information associated with the duration of the mobile device in the disabled operational mode.

10. A mobile device comprising:
at least one processor;
program code configured to be executed on the at least one processor, the program code causing the processor of the mobile device to detect if at least one trigger condition is satisfied for one or more of a plurality of selectable triggers and if a trigger condition is satisfied, to place the device in a disabled operational mode to prevent the use of at least one communication feature of the mobile device, to monitor the operational status of the mobile device and detect if a user makes a change in the operational status of the mobile device, including the mobile device being taken out of a disabled operational mode, to generate status change data responsive to detecting an operational status change of the mobile device made by a user including time data of a detected change in the operational status, and to transmit the status change data over a network.

11. The mobile device of claim 10 wherein the program code is configured for providing a reminder message at the mobile device upon detecting that a trigger condition is satisfied, the monitoring application advising a user of the option to put the mobile device in the disabled operational mode.

12. The mobile device of claim 10 wherein the disabled operational mode includes at least one of an Airplane mode, a Do Not Disturb mode and an OFF mode.

13. The mobile device of claim 11 wherein the program code is configured upon detecting that a trigger condition is satisfied to provide an activation message at the mobile device regarding the trigger condition.

14. The mobile device of claim 10 wherein the program code is configured for transmitting data regarding the trigger condition over a network.

15. The mobile device of claim 14 wherein the plurality of selectable triggers for the mobile device includes triggers associated with at least one of motion detection, detection of at least one beacon device and making a connection to a Bluetooth system.

16. The mobile device of claim 10 wherein the program code is configured for providing a reminder message at the mobile device upon detecting that a trigger condition is satisfied, the monitoring application advising a user of the option to put the mobile device in the disabled operational mode.

17. The mobile device of claim 10 wherein the program code is configured, upon detecting if a trigger condition is satisfied, to place the device in a disabled operational mode and preventing additional detection of a trigger condition.

18. The mobile device of claim 10 wherein the program code is configured for detecting a change in a mobile device operational status by detecting a change from a disabled operational mode to another operational mode and reporting the time information associated with the duration of the mobile device in the disabled operational mode.

* * * * *